US008525676B2

(12) United States Patent
Yasui et al.

(10) Patent No.: US 8,525,676 B2
(45) Date of Patent: Sep. 3, 2013

(54) CONTAINER FOR INCLUDING AT LEAST A RFID TAG, APPARATUS FOR COMMUNICATING WITH A RFID TAG, MANAGEMENT SERVER FOR MANAGING PRODUCTION INFORMATION OF A RFID TAG, AND MANAGEMENT SYSTEM FOR MANAGING PRODUCTION INFORMATION OF A RFID TAG

(75) Inventors: Kunihiro Yasui, Nagoya (JP); Takuya Nagai, Nagoya (JP); Tsuyoshi Ohashi, Hashima (JP); Katsuo Saito, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1863 days.

(21) Appl. No.: 11/691,214

(22) Filed: Mar. 26, 2007

(65) Prior Publication Data

US 2007/0262864 A1 Nov. 15, 2007

Related U.S. Application Data

(63) Continuation-in-part of application No. PCT/JP2005/017791, filed on Sep. 28, 2005.

(30) Foreign Application Priority Data

| Sep. 28, 2004 | (JP) | 2004-281571 |
| Sep. 28, 2004 | (JP) | 2004-281572 |
| Sep. 29, 2004 | (JP) | 2004-283689 |
| Sep. 29, 2004 | (JP) | 2004-284939 |

(51) Int. Cl.
*G08B 13/14* (2006.01)

(52) U.S. Cl.
USPC ....... 340/572.1; 340/10.1; 340/10.3; 340/505

(58) Field of Classification Search
None
See application file for complete search history.

(56) References Cited

U.S. PATENT DOCUMENTS

| 5,049,921 A | 9/1991 | Sonobe et al. |
| 5,488,223 A * | 1/1996 | Austin et al. ................... 235/375 |

(Continued)

FOREIGN PATENT DOCUMENTS

| JP | H02-207389 A | 8/1990 |
| JP | H02-219045 A | 8/1990 |

(Continued)

OTHER PUBLICATIONS

European Patent Office, Supplementary European Search Report issued in counterpart Patent Application No. EP 05787706, mailed Jul. 24, 2009.

(Continued)

*Primary Examiner* — Mohammad Ghayour
*Assistant Examiner* — Brian Wilson
(74) *Attorney, Agent, or Firm* — Baker Botts L.L.P.

(57) ABSTRACT

The RFID circuit element cartridge stores multiple RFID circuit elements for producing RFID labels. Each of the elements includes an IC circuit part configured to store information and an antenna connected to the IC circuit part. The RFID circuit element cartridge is detachably mounted to an apparatus for communicating with a RFID tag. The apparatus includes an antenna configured to carry out wireless communication with each RFID circuit element for producing a RFID label. The RFID circuit element cartridge includes a RFID circuit element Tc for cartridge identifying configured to store identification information for identifying the cartridge. The identification information serves as a communication factor that determines a performance of communication between the antenna and each RFID circuit element for producing a RFID label.

19 Claims, 92 Drawing Sheets

(56) References Cited

U.S. PATENT DOCUMENTS

| | | | |
|---|---|---|---|
| 6,246,466 B1* | 6/2001 | Hirano et al. | 355/407 |
| 6,694,884 B2* | 2/2004 | Klinefelter et al. | 101/484 |
| 6,802,659 B2* | 10/2004 | Cremon et al. | 400/76 |
| 7,206,010 B2* | 4/2007 | Maghakian | 347/214 |
| 2005/0131842 A1* | 6/2005 | Sansone et al. | 705/410 |
| 2005/0274799 A1* | 12/2005 | Torchalski et al. | 235/432 |

FOREIGN PATENT DOCUMENTS

| | | |
|---|---|---|
| JP | H05-128337 A | 5/1993 |
| JP | H06-053726 A | 2/1994 |
| JP | H06-127756 A | 5/1994 |
| JP | H10-025046 A | 1/1998 |
| JP | H11-346174 A | 12/1999 |
| JP | 2001022230 A | 1/2001 |
| JP | 2001-134724 A | 5/2001 |
| JP | 2001-155133 A | 6/2001 |
| JP | 2002086864 A | 3/2002 |
| JP | 2002-117298 A | 4/2002 |
| JP | 2003-063111 A * | 3/2003 |
| JP | 2003-140548 A | 5/2003 |
| JP | 2003159838 A | 6/2003 |
| JP | 2003160229 A | 6/2003 |
| JP | 2003-196600 A | 7/2003 |
| JP | 2003208573 A | 7/2003 |
| JP | 2003216766 A | 7/2003 |
| JP | 2003326741 A | 11/2003 |
| JP | 2004-030241 A | 1/2004 |
| JP | 2004-245870 A | 9/2004 |
| WO | 2006/035791 A1 | 4/2006 |

OTHER PUBLICATIONS

International Search Report for Int'l Patent Appl'n No. PCT/JP2005/017791, mailed Apr. 6, 2006.

Japan Patent Office; Notice of Reasons for Rejection in Japanese Patent Application No. 2004-284939 mailed on Jun. 10, 2010.

Japan Patent Office; Notice of Reasons for Rejection in Japanese Patent Application No. 2004-281572 mailed on Jun. 10, 2010.

Japan Patent Office; Notice of Reasons for Rejection in Japanese Patent Application No. 2004-281571 mailed on Jun. 10, 2010.

Japan Patent Office; Notice of Reasons for Rejection in Japanese Patent Application No. 2004-283689 mailed on Jun. 10, 2010.

* cited by examiner

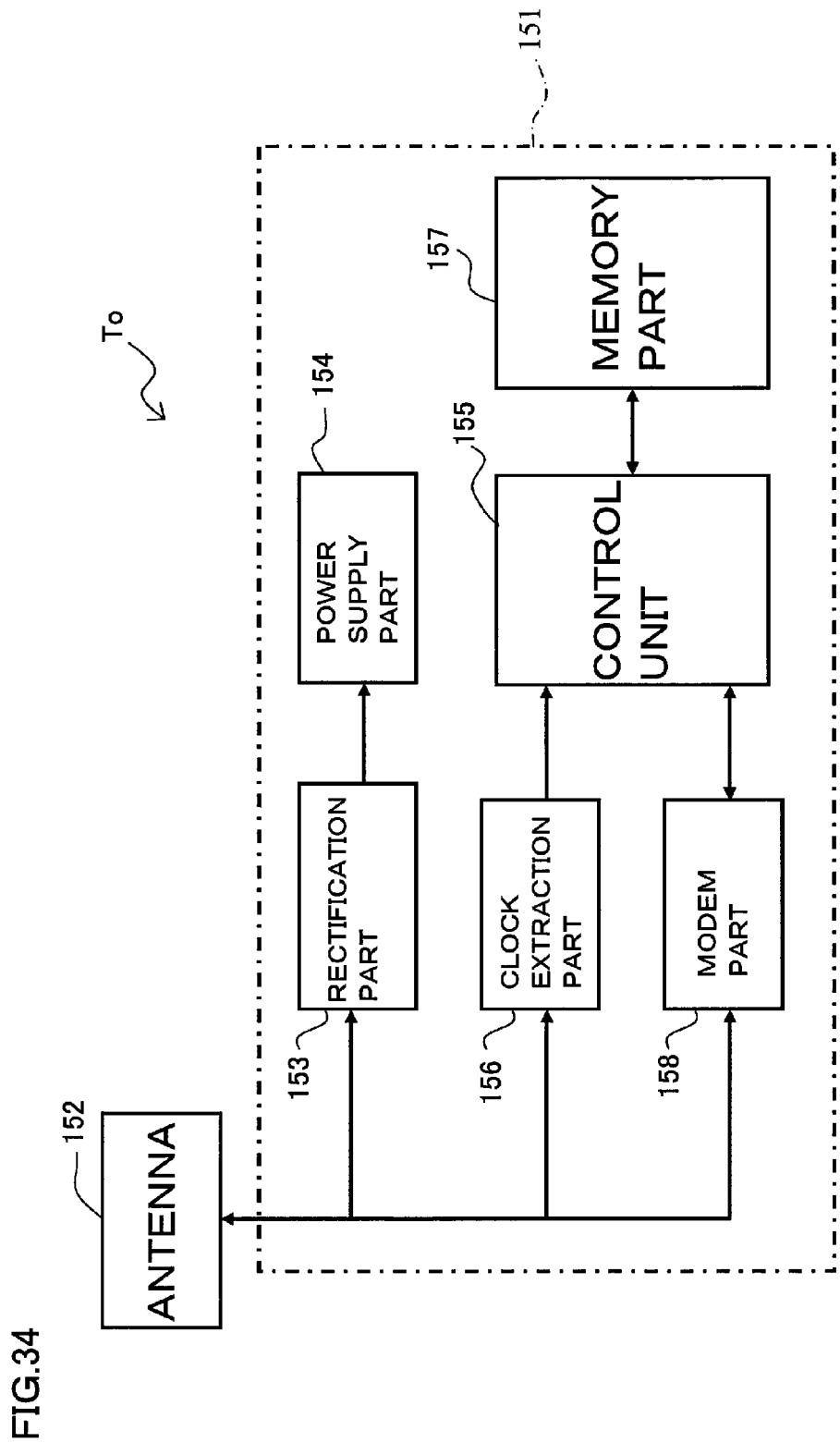

FIG.37

| PRINT CHARACTERS | R F - I D |
|---|---|
| ACCESS ID | 16,777,215 |
| ARTICLE INFORMATION | 131,071 |
| SERVER INFORMATION | 2,097,151 |

FIG.39

| 100 | 050 | 065 | 085 | ...... | 040 | 040 |
|-----|-----|-----|-----|--------|-----|-----|

ADDRESS   0   1   2   3   ......   99   100

FIG.56

| TAG ID | READOUT RETRY TIMES | APPARATUS IDENTIFICATION INFORMATION | READOUT RESULT |
|---|---|---|---|
| TAG 1 | 1 | ID-a | OK |
| TAG 2 | 1 | ID-b | OK |
| TAG 3 | 3 | ID-b | OK |
| TAG 4 | 2 | ID-b | OK |
| TAG 5 | — | ID-b | NG |
| TAG 6 | 5 | ID-b | OK |
| TAG 7 | 1 | ID-a | OK |
| TAG 8 | — | ID-c | NG |
| TAG 9 | — | ID-c | NG |
| TAG 10 | 2 | ID-b | OK |
| TAG 11 | 3 | ID-c | OK |
| . | . | . | . |
| . | . | . | . |
| . | . | . | . |

FIG.59

| TAG ID | WRITING RETRY TIMES | APPARATUS IDENTIFICATION INFORMATION | WRITING RESULT |
|---|---|---|---|
| TAG 1 | 1 | ID-a | OK |
| TAG 2 | 1 | ID-b | OK |
| TAG 3 | 2 | ID-b | OK |
| TAG 4 | 4 | ID-b | OK |
| TAG 5 | — | ID-b | NG |
| TAG 6 | 5 | ID-b | OK |
| TAG 7 | 1 | ID-a | OK |
| TAG 8 | — | ID-c | NG |
| TAG 9 | — | ID-c | NG |
| TAG 10 | 3 | ID-b | OK |
| TAG 11 | 4 | ID-c | OK |
| . | . | . | . |
| . | . | . | . |
| . | . | . | . |

FIG.60

| TAG ID | READOUT RETRY TIMES | APPARATUS IDENTIFICATION INFORMATION | REQUIRED POWER | READOUT RESULT |
|---|---|---|---|---|
| TAG 1 | 1 | ID-a | SMALL | OK |
| TAG 2 | 1 | ID-b | SMALL | OK |
| TAG 3 | 3 | ID-b | MEDIUM | OK |
| TAG 4 | 2 | ID-b | MEDIUM | OK |
| TAG 5 | — | ID-b | — | NG |
| TAG 6 | 5 | ID-b | LARGE | OK |
| TAG 7 | 1 | ID-a | SMALL | OK |
| TAG 8 | — | ID-c | — | NG |
| TAG 9 | — | ID-c | — | NG |
| TAG 10 | 2 | ID-b | MEDIUM | OK |
| TAG 11 | 3 | ID-c | MEDIUM | OK |
| . | . | . | . | . |
| . | . | . | . | . |
| . | . | . | . | . |

FIG.61

| TAG ID | WRITING RETRY TIMES | APPARATUS IDENTIFICATION INFORMATION | REQUIRED POWER | WRITING RESULT |
|---|---|---|---|---|
| TAG 1 | 1 | ID-a | SMALL | OK |
| TAG 2 | 1 | ID-b | SMALL | OK |
| TAG 3 | 2 | ID-b | MEDIUM | OK |
| TAG 4 | 4 | ID-b | MEDIUM | OK |
| TAG 5 | — | ID-b | — | NG |
| TAG 6 | 5 | ID-b | LARGE | OK |
| TAG 7 | 1 | ID-a | SMALL | OK |
| TAG 8 | — | ID-c | — | NG |
| TAG 9 | — | ID-c | — | NG |
| TAG 10 | 3 | ID-b | MEDIUM | OK |
| TAG 11 | 4 | ID-c | MEDIUM | OK |
| . | . | . | . | . |
| . | . | . | . | . |
| . | . | . | . | . |

ACCESS HISTORY INFORMATION

| TAG ID | READOUT RETRY TIMES | APPARATUS IDENTIFICATION INFORMATION | READOUT RESULT |
|---|---|---|---|
| TAG 1 | 1 | ID-a | OK |
| TAG 2 | 1 | ID-b | OK |
| TAG 3 | 3 | ID-b | OK |
| TAG 4 | 2 | ID-b | OK |
| TAG 5 | — | ID-b | NG |
| TAG 6 | 5 | ID-b | OK |
| TAG 7 | 1 | ID-a | OK |
| TAG 8 | — | ID-c | NG |
| TAG 9 | — | ID-c | NG |
| TAG 10 | 2 | ID-b | OK |
| TAG 11 | 3 | ID-c | OK |
| . | . | . | . |
| . | . | . | . |
| . | . | . | . |

FIG.65

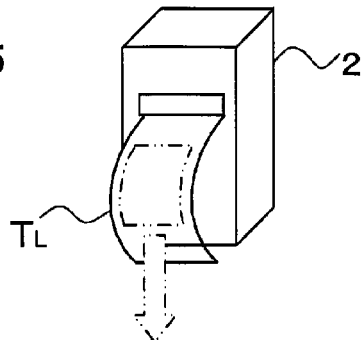

TO OUR CUSTOMERS

THANK YOU FOR USING OUR CARTRIDGE (MODEL NO.****). WE WILL DISCOUNT YOUR NEXT PURCHASE BY □*.
JUST TAKE THIS LABEL CARTRIDGE TO ONE OF THE FOLLOWING AUTHORIZED DEALERS OR ELECTRONICS STORES

AUTHORIZED DEALER: AA ELECTRONICS
PHONE NO. ○○○-○○○○
BB ELECTRONIC APPLIANCES
PHONE NO. ○○○-○○○○
CC ELECTRONICS OFFICE SUPPLIES
PHONE NO. ○○○-○○○○

IF YOU HAVE BEEN REGISTERED WITH US AS A MEMBER, ACCESS OUR HOMEPAGE AT
http://www.○○○○○○
WHERE YOU CAN SIGN UP ONLINE FOR CONTINUED PURCHASE, WITH DISCOUNTS ACCORDING TO ACCUMULATED POINTS.

→→→→ IF YOU DESIRE TO REGISTER WITH US A NEW MEMBER, ACCESS HOMEPAGE AT
http://www.○○○○○○

FOR OTHER INQUIRIES, PLEASE FEEL FREE TO CONTACT CUSTOMER ASSISTACE AT ○○ INDUSTRIES
PHONE ○○○-○○○○ (OPERATORS STANDING BY 24HOURS)
FAX    ○○○-○○○○
E-MAIL info@ ○○○○.co.jp

| ACCESSS HISTORY INFORMATION |
|---|
| ○○○-△△△-×× |

FIG.76

| TAG ID | READOUT RETRY TIMES | APPARATUS IDENTIFICATION INFORMATION | READOUT RESULT |
|---|---|---|---|
| TAG 1 | 1 | ID-a | OK |
| TAG 2 | 1 | ID-b | OK |
| TAG 3 | 3 | ID-b | OK |
| TAG 4 | 2 | ID-b | OK |
| TAG 5 | — | ID-b | NG |
| TAG 6 | 5 | ID-b | OK |
| TAG 7 | 1 | ID-a | OK |
| TAG 8 | — | ID-c | NG |
| TAG 9 | — | ID-c | NG |
| TAG 10 | 2 | ID-b | OK |
| TAG 11 | 3 | ID-c | OK |
| . | . | . | . |
| . | . | . | . |
| . | . | . | . |

FIG.78

TO OUR CUSTOMERS

TAHANK YOU FOR USING OUR CARTRIGE (MODEL NO. OOOO).
THIS CARTRIGE IS DISCOUNTED AS A SERVICE TO OUR MEMBERS.

PLEASE INPUT YOUR MEMBER ID

201  MEMBER ID  ★★★★★★★

IF YOU ARE NOT YET REGISTERED AS A MEMBER, YOU WILL NEED TO BE REGISTERED AS A NEW MEMBER.
PLEASE REGISTER BY FILLING OUT THE MEMBER REGISTRATION PAGE.

MEMBER REGISTRATION    WILL NOT REGISTER

FOR OTHER INQUIRES, PLEASE FEEL FREE TO CONTACT CUSTOMER ASSISTANCE AT OO INDUSTRIES
PHONE  OOO-OOOO  (OPERATORS STANDING BY 24 HOURS)
FAX    OOO-OOOO
MAIL   info@OOOO.com

FIG.80

RECEIPT

MEMBER ID:○○○○
MEMBER NAME:○○○○

THANK YOU FOR PURCHASING OUR RFID TAG CARTRIGES.
WE HAVE CHARGED YOUR ACCOUNT FOR THE CREATED TAGS SHOWN BELOW THAT.

AMOUNT RECEIVED: ¥○○○○
DATE OF RECEIPT :(DATE OF TRANSFER) MM/DD
BILLING PERIOD  :  FOR YOMO/MM
BANK   DDDD BANK, EEEE BRANCH
ACCOUNT TYPE AND NO.SAVINGS
ACCOUNT, NO.○○○○

ITEMIZED STATEMENT

| DATE LABELS | CREATED NUMBER | COMPLETION | STATUS |
|---|---|---|---|
| MM/DD/HH/MM | 1 | OK | NORMAL BILLING |
| MM/DD/HH/MM | 2 | OK | NORMAL BILLING |
| MM/DD/HH/MM | 1 | NG | NOT BILLED |
| MM/DD/HH/MM | 3 | OK | NORMAL BILLING |

FIG.81

INVOICE

ADDRESS:○○○ ○○
PHONE NO.:○○○-○○○○
MEMBER NAME:○○ ○○
MEMBER ID: ( ○○○○)
THANK YOU FOR USING OUR RFID TAG CARTRIGES.
PLEASE PAY THE FOLLOWING AMOUNT FOR OUR
TAG PRODUCING SERVICES TO THE FOLLOWING
ACCOUNT BY MM/DD.

AMOUNT:            ○○○○
DATE OF BILLING:   MM/DD
BILLING PERIOD:    FOR MM/MM

BANK    FFFF BANK, GGGG BRANCH
ACCOUNT TYPE AND NO.SAVINGS
ACCOUNT, NO. ○○○○○
ACCOUNT NAME   ○○INDUSTRIES, ○○CUSTOMER
BILLING CENTER

ITEMIZED STATEMENT
DATE LABELS CREATED COMPLETION STATUS
            NUMBER

| MM/DD/HH/MM | 1 | OK | NOAMAL BILLING |
| MM/DD/HH/MM | 2 | OK | NORMAL BILLING |
| MM/DD/HH/MM | 1 | NG | NOT BILLED |
| MM/DD/HH/MM | 3 | OK | NORMAL BILLING |

FIG.84

| TAG ID | WRITING RETRY TIMES | APPARATUS IDENTIFICATION INFORMATION | WRITING RESULTS |
|---|---|---|---|
| TAG 1 | 1 | ID-a | OK |
| TAG 2 | 1 | ID-b | OK |
| TAG 3 | 2 | ID-b | OK |
| TAG 4 | 4 | ID-b | OK |
| TAG 5 | — | ID-b | NG |
| TAG 6 | 5 | ID-b | OK |
| TAG 7 | 1 | ID-a | OK |
| TAG 8 | — | ID-c | NG |
| TAG 9 | — | ID-c | NG |
| TAG 10 | 3 | ID-b | OK |
| TAG 11 | 4 | ID-c | OK |
| . | . | . | . |
| . | . | . | . |
| . | . | . | . |

FIG.85

| TAG ID | READOUT RETRY TIMES | APPARATUS IDENTIFICATION INFORMATION | REQUIRED POWER | READOUT RESULT |
|---|---|---|---|---|
| TAG 1 | 1 | ID-a | SMALL | OK |
| TAG 2 | 1 | ID-b | SMALL | OK |
| TAG 3 | 3 | ID-b | MEDIUM | OK |
| TAG 4 | 2 | ID-b | MEDIUM | OK |
| TAG 5 | — | ID-b | — | NG |
| TAG 6 | 5 | ID-b | LARGE | OK |
| TAG 7 | 1 | ID-a | SMALL | OK |
| TAG 8 | — | ID-c | — | NG |
| TAG 9 | — | ID-c | — | NG |
| TAG 10 | 2 | ID-b | MEDIUM | OK |
| TAG 11 | 3 | ID-c | MEDIUM | OK |
| . | . | . | . | . |
| . | . | . | . | . |
| . | . | . | . | . |

FIG.86

| TAG ID | WRITING RETRY TIMES | APPARATUS IDENTIFICATION INFORMATION | REQUIRED POWER | WRITING RESULT |
|---|---|---|---|---|
| TAG 1 | 1 | ID-a | SMALL | OK |
| TAG 2 | 1 | ID-b | SMALL | OK |
| TAG 3 | 2 | ID-b | MEDIUM | OK |
| TAG 4 | 4 | ID-b | MEDIUM | OK |
| TAG 5 | — | ID-b | — | NG |
| TAG 6 | 5 | ID-b | LARGE | OK |
| TAG 7 | 1 | ID-a | SMALL | OK |
| TAG 8 | — | ID-c | — | NG |
| TAG 9 | — | ID-c | — | NG |
| TAG 10 | 3 | ID-b | MEDIUM | OK |
| TAG 11 | 4 | ID-c | MEDIUM | OK |
| . | . | . | . | . |
| . | . | . | . | . |
| . | . | . | . | . |

CONTAINER FOR INCLUDING AT LEAST A RFID TAG, APPARATUS FOR COMMUNICATING WITH A RFID TAG, MANAGEMENT SERVER FOR MANAGING PRODUCTION INFORMATION OF A RFID TAG, AND MANAGEMENT SYSTEM FOR MANAGING PRODUCTION INFORMATION OF A RFID TAG

CROSS-REFERENCE TO RELATED APPLICATION

This is a CIP application PCT/JP2005/17791, filed Sep. 28, 2005, which was not published under PCT article 21(2) in English and claims the benefits of Japanese Patent application No. 2004-281572 filed Sep. 28, 2004, No. 2004-283689 filed Sep. 29, 2004, No. 2004-284939 filed Sep. 29, 2004, and No. 2004-281571 filed Sep. 28, 2004.

BACKGROUND OF THE INVENTION

1. Field of the Invention

The present invention relates to a container for including at least a RFID tag including a RFID circuit element configured to allow RFID tag information to be read out and written from/to external objects via wireless communication, an apparatus for communicating with a RFID tag configured to use the container for including at least a RFID tag, and a management server for managing production information of a RFID tag and a management system for managing production information of a RFID tag when RFID labels are created.

2. Description of the Related Art

A RFID (Radio Frequency Identification) system is known. The system allows information to be accessed (read/written) between a small-size RFID tag and a reader/writer (reading/writing apparatus) in a non-contact manner. For example, a RFID circuit element is disposed at a label-shaped RFID tag. The RFID circuit element includes an IC circuit part configured to store predetermined RFID tag information and an antenna connected to the IC circuit part. Thus, the RFID circuit element carries out transmission/reception of information. Such an arrangement enables the reader/writer to access (readout/writing of information) the RFID tag information even if the RFID tag has become soiled or even if the RFID tag has come to be located at a position where it cannot be seen. Thus, it is anticipated that such a technique will be of practical use in various fields such as inventory control and manufacturing process inspection.

Known examples of a writer (printer) for writing information to such a RFID circuit element include an arrangement disclosed in Patent document 1. With such a prior art, the rectangular label chips (RFID labels) are adhered onto a strip of tag tape (base sheet) at a predetermined pitch. With such an arrangement, a strip of tag tape is fed out from a tag tape roll (supply shaft) and is transported along the feeding path. On the other hand, predetermined RFID tag information is created by the writing apparatus. The RFID tag information is transmitted toward the antenna of the RFID circuit element included within each label chip. Thus, the RFID tag information is consecutively written to each IC circuit part (IC chip) connected to the antenna. Subsequently, the label chips are transported downstream, and print information is printed by the printing unit (thermal head) on the surface of each RFID label corresponding to the RFID tag information thus written. In this way, a RFID label is completed.

Also, Patent document 2 discloses an arrangement that the RFID tags produced are used in management of consumable supplies, for example. In the prior art, the RFID tag is provided to a recording agent storage cartridge employed in a printer, a copying machine, etc. In such an arrangement, the cartridge is mounted to a main body of the printer or the like. On the other hand, a reader/writer is provided to the main body to read out the profile information with respect to the recording agent from the RFID circuit element. Further, the profile information is newly written or to be updated according to the state of use when the cartridge is mounted to the printer or the like.

Also, the Patent document 3 discloses an arrangement in which the aforementioned RFID tags are employed in management of detachable components, for example. In this prior art, the RFID tags are disposed at a developing cartridge and a process cartridge respectively. Each of the cartridges is detachably mounted to a main body of an image formation apparatus. The developing cartridge includes a developing device and a toner hopper. The process cartridge includes a photosensitive drum and electricity removing unit. In such an arrangement, each cartridge is mounted to the main body of the image formation apparatus. On the other hand, a reader/writer is provided to the main body to read out various information from a RFID circuit element. This prevents erroneous mounting of the components, and allows life expectancy to be estimated in a simple manner.

On the other hand, Patent document 4 discloses a prior art that a processing apparatus configured to perform predetermined processing, is connected to a network. In this art, the state, and so forth of the processing of the processing apparatus are transmitted to a management server or a database on the network, for example. In the prior art, a printer or a terminal of the user is connected to the management server via the network. With such an arrangement, the user-side printer executes printing processing according to print data transmitted from the management server connected to the database. In a case of failure in printing, the user performs manual operations according to the situation, whereupon a corresponding signal is transmitted to the management server. The management server transmits data with a new identifier and a new security number to the user-side terminal again according to the signal thus received, thereby retrying the printing.

Patent Publication 1: JP, A, 2003-159838 (Paragraphs 0011 to 0039, FIGS. 1 to 5)
Patent Publication 2: JP, A, 2002-86864 (Paragraphs 0022 to 0057, FIG. 1)
Patent Publication 3: JP, A, 2001-22230 (Paragraphs 0024 to 0068, FIG. 5)
Patent Publication 4: JP, A, 2003-216766 (Paragraphs 0033 to 0086, FIG. 1)

As described above, RFID tags are used in various fields. In creating such RFID labels, a container for including at least a RFID tag (e.g., a RFID circuit element cartridge, a tag tape roll, etc.) is mounted to a container mounting portion (cartridge holder portion, roll holder portion, or the like) of the apparatus. The RFID element container includes a strip of tag medium (tag tape). RFID circuit elements have been provided on the tag medium at a predetermined pitch along the tape longitudinal direction. Then, the RFID circuit elements are transported along the tape longitudinal direction by feeding out the tag tape. Furthermore, predetermined RFID tag information is created by the apparatus. The RFID tag information is transmitted via an apparatus antenna so as to consecutively access (read/write) the IC circuit part connected to the antenna of the RFID circuit element. The RFID circuit element is transported downstream after the RFID tag information has been read out/written from/to the RFID circuit element. Thus, the RFID tag is transported downstream and cut off in the form of a label. In this way, a RFID label is completed in the end.

Here, with an arrangement having a RFID circuit element cartridge as the container for including at least a RFID tag (i.e., a structure in which the tag tape roll is detachably mounted to a cartridge holder of the apparatus in the form of a cartridge) a user can replace the tag tape with ease in a simple manner. Namely, the user only replace the cartridge with a new one when the tag tape as a consumable supply has run out. Furthermore, in such an arrangement, the user can use tags with various sizes or various kinds of tags by using multiple cartridges and replacing the cartridges. With such an arrangement using such a cartridge, in order to continuously maintain smooth communication with the RFID circuit element after the cartridge replacement, the kind of the RFID circuit elements stored in the cartridge (in other words, the kind of the cartridge) is preferably checked before communication.

In order to solve the aforementioned problem, an arrangement with RFID circuit element for identifying cartridge can be conceivable. The RFID circuit element for identifying cartridge is provided to the cartridge, in addition to the multiple RFID circuit elements (RFID circuit elements for producing RFID labels) provided on the tag tape stored in the cartridge. Then the unique cartridge identification information is stored in the additional RFID circuit element. However, in an arrangement including one circuit configured to access the aforementioned RFID circuit element for producing a RFID label and the other circuit configured to access the RFID circuit element for identifying cartridge. Such an arrangement leads to a complicated circuit structure, increased size and weight of the overall system, and increased producing costs.

A system according to the prior art disclosed in the aforementioned Patent document 3 employs RFID tags only for monitoring the states of the multiple cartridges mounted to the image formation apparatus main body. That is to say, such a system is given no consideration with the replacement of the cartridges or the aforementioned problems due to the replacement, etc. in RFID labels creating.

On the other hand, of the aforementioned RFID label producing procedure, access (reading/writing) to the RFID tag information stored in the IC circuit part is made via wireless communication in a non-contact manner. Accordingly, with such an arrangement, the risk of access failure or access error (error in reading or writing) cannot be completely suppressed. For instance, the access failure or access error may due to erroneous operations of the user, the insufficient power supply voltage (dead battery), and adverse effects of the surrounding radio waves. Such a problem leads to an extra load for the manufacturer of the apparatus, the servicing firm, and so forth, for the purpose of ensuring the performance of the apparatus and the RFID tags created by the apparatus.

The prior art disclosed in the aforementioned Patent document 2 provides another system. In the system, RFID tags are configured to monitor the state of consumable supplies to be mounted to an apparatus main body. However, as above-described prior art, the system is also given no consideration with neither the guarantee of the producing performance of a producing apparatus configured to create articles, such as a RFID label producing apparatus, nor the guarantee of the quality of the RFID labels.

On the other hand, the prior art disclosed in the aforementioned Patent document 4 provides a printing processing. In the printing processing, the print data acquired from a management server is printed by the user-side printer. With such an arrangement, the print data is transmitted only in one direction from the management server to a user-side apparatus. With such an arrangement, the user needs to perform manual input operations according to the print results. The signal that corresponds to a user operation is transmitted to the management server. On the other hand, with the aforementioned arrangement in which the RFID tags are created, in general, access is made to each RFID circuit element in a non-contact manner as described above. Moreover, two-way (automatic) communication is made. Such an arrangement employing the two-way communication should be able to automatically acquire the information with respect to the access results (success in access, failure in access, the state of access, etc.) without involving manual operations in RFID tag producing. However, such an automatic data acquisition technique art not proposed in prior arts including the aforementioned prior art.

On the other hand, when the RFID circuit elements to be provided to the tag tape are created, in practice, the tag property data deviate somewhat from design specification values for each RFID circuit element. The unevenness due to e.g., the communication sensitivity, the access conditions such as the memory writing voltage and the writing time for the IC circuit part, etc. However, communication is made with all the RFID circuit elements by using uniform tag property data sets regardless of such unevenness with prior arts as disclosed in Patent document 1. Therefore, in such an arrangement configured to carry out create multiple RFID circuit elements creating, sufficiently high output of the apparatus antenna is to be set beforehand. Because, as to e.g. communication sensitivity, there is a need to ensure sufficient communication performance with the RFID circuit element having lower communication sensitivity.

As a result, in a case of communication with a satisfactory RFID circuit element having sufficient sensitivity, such high output is excessive, leading to waste of energy. Furthermore, undesirable effects can occur from the perspective of communication on the condition that such high output has exceeded the permissible output range of the RFID circuit element. Examples of such undesirable effects include distorted signals obtained received by the RFID circuit element, communication interference with other RFID circuit elements, difficulty in identifying the reflected wave component due to the high intensity of the carrier waves, etc. The rest of tag property data, e.g., access conditions etc., such as the memory writing voltage, memory writing time, and so forth for the IC circuit part have similar problems.

As described above, in all the prior arts, there is difficulty to eliminate communication failures or bad effects, or to attempt smooth communication positively in RFID label creating. This leads to difficulty in producing RFID labels with high reliability.

SUMMARY OF THE INVENTION

It is a first object of the present invention to provide a container for including at least a RFID tag, an apparatus for communicating with a RFID tag, a management server for managing production information of a RFID tag, and a management system for managing production information of a RFID tag, capable of creating RFID labels with high reliability by attempting smooth communication positively or by eliminating communication failures and bad effects in RFID labels creating.

It is a second object of the present invention to provide a container for including at least a RFID tag and an apparatus for communicating with a RFID tag capable of creating RFID labels with high reliability under a smooth communication condition in producing RFID label by identifying the kind of each cartridge even in a case that multiple kinds of RFID circuit element cartridges are used with exchanging, and capable of lower an overall size and weight of an apparatus and a production cost thereof by means of simplify a circuit arrangement necessary for the identification processing.

It is a third object of the present invention to provide a container for including at least a RFID tag and an apparatus for communicating with a RFID tag capable of creating RFID labels with high reliability under a smooth communication condition in producing RFID label by achieving an optimum communication mode for each RFID circuit element corresponding to unevenness due to manufacturing of the RFID circuit elements, and to provide a container for including at least a RFID tag and capable of preventing waste of energy and bad effects on communication.

It is a fourth object of the present invention to provide a container for including at least a RFID tag and an apparatus for communicating with a RFID tag with improved reliability, capable of creating RFID labels with high reliability by eliminating communication failures or bad effects to ensure apparatus performance and a quality of RFID labels.

It is a fifth object of the present invention to provide a container for including at least a RFID tag, an apparatus for communicating with a RFID tag, a management server for managing production information of a RFID tag, and a management system for managing production information of a RFID tag, capable of creating RFID labels with high reliability while eliminating communication failures and bad effects by means of automatically and efficiently acquiring information with respect to the access results in producing RFID label to ensure apparatus performance and a quality of RFID labels.

BRIEF DESCRIPTION OF THE DRAWINGS

FIG. 34 is a functional block diagram which shows a functional configuration of the RFID circuit element.

FIG. 37 is a diagram which shows an example of a screen displayed on a terminal or a general purpose computer when access to the RFID tag information is performed.

FIG. 39 is a diagram which shows the contents stored in the memory part of the RFID circuit element.

FIG. 56 is a diagram which shows an example of the access history information to be written to the RFID circuit element.

FIG. 59 is a diagram which shows an example of the access history information to be written to the RFID circuit element.

FIG. 60 is a diagram which shows an example of an arrangement in which the power value that has provided success in access is stored in the form of a component of the access history information.

FIG. 61 is a diagram which shows another example of an arrangement in which the power value that has provided success in access is stored in the form of a component of the access history information.

FIG. 65 is a diagram which shows a modification that provides an expanded function of the user service.

FIG. 76 is a diagram which shows an example of the access history information to be written to a database of the management server.

FIG. 78 is a diagram which shows an example of an initializing screen shown in FIG. 77.

FIG. 80 is a diagram which shows an example of a receipt transmitted to the user.

FIG. 81 is a diagram which shows an example of an invoice transmitted to the user.

FIG. 84 is a diagram which shows an example of the access history information to be written to the database of the management server.

FIG. 85 is a diagram which shows an example of an arrangement in which the power value that has provided success in access is stored in the form of a component of the access history information.

FIG. 86 is a diagram which shows another example of an arrangement in which the power value that has provided success in access is stored in the form of a component of the access history information.

DETAILED DESCRIPTION OF THE PREFERRED EMBODIMENTS

Description will be made below regarding an embodiment of the present invention with reference to the drawings.

Description will be made regarding a first embodiment of the present invention with reference to FIGS. 1 through 12.

Figure 1:
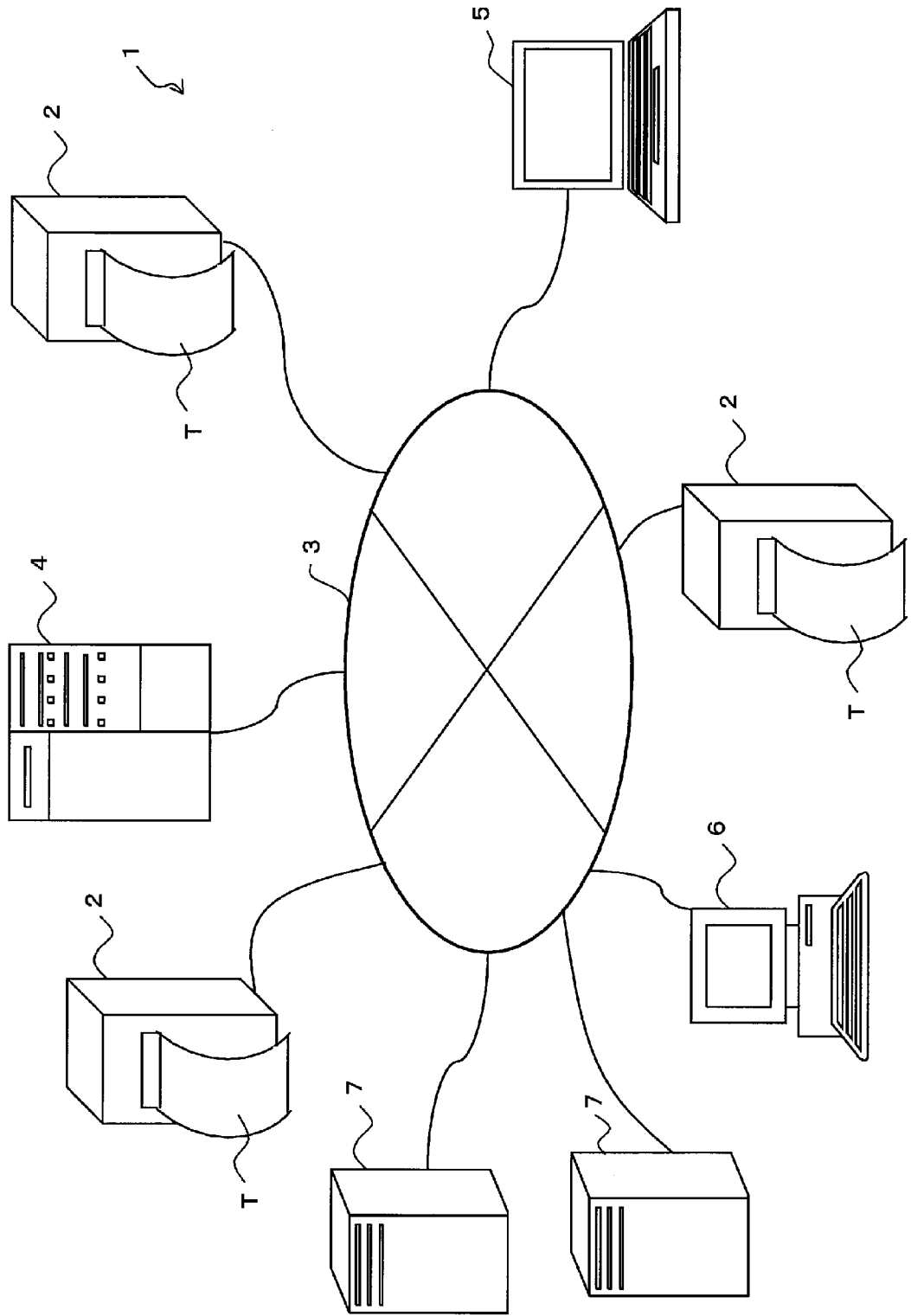
FIG. 1 is a system configuration diagram which shows a RFID tag producing system which an apparatus for communicating with a RFID tag is applied according to each embodiment of the present invention.

FIG. 1 is a system configuration diagram which shows a RFID tag producing system (RFID tag information communication system) employing an apparatus for communicating with a RFID tag according to the present embodiment. With the present embodiment, the present invention is applied to a producing system configured to create readable RFID tags (having no writing function).

With a RFID tag producing system 1 shown in FIG. 1, an apparatus 2 for communicating with a RFID tag according to the present embodiment is connected to a route server 4, a terminal 5, a general purpose computer 6, and multiple information servers 7 via a communication line 3 in a wired or wireless manner.

Figure 2:
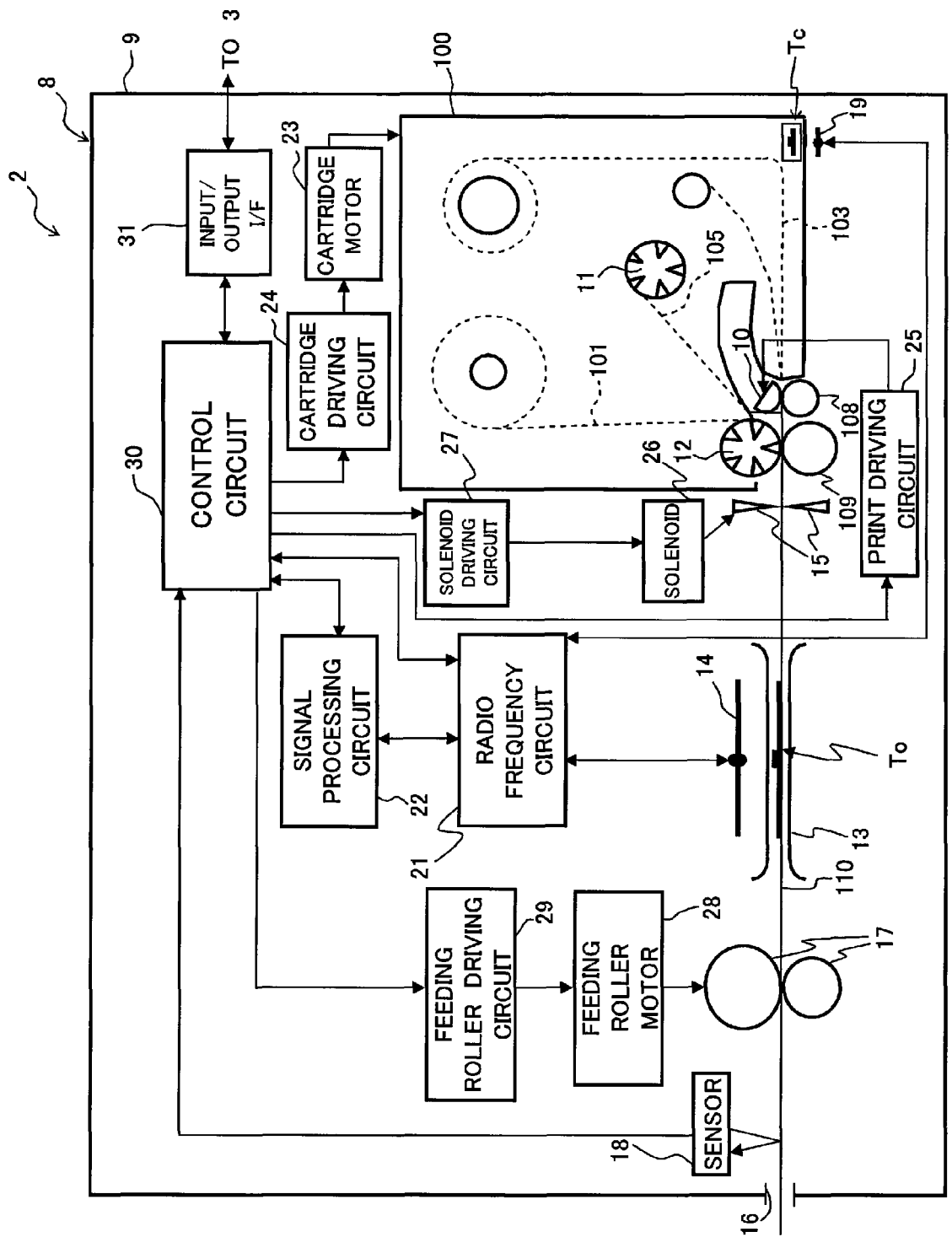
FIG. 2 is a conceptual configuration diagram which shows a detailed configuration of the apparatus for communicating with a RFID tag according to a first embodiment of the present invention.

FIG. 2 is a conceptual configuration diagram which shows a detailed configuration of the aforementioned apparatus 2 for communicating with a RFID tag.

In FIG. 2, an apparatus main body 8 of the apparatus 2 for communicating with a RFID tag includes a cartridge holder portion (container mounting portion, not shown) formed in the shape of a recess. A cartridge 100 (RFID circuit element cartridge) is detachably mounted to the holder portion.

The apparatus main body 8 includes a housing 9, a print head (thermal head, in this example) 10, a ribbon take-up roller driving shaft 11, a feeding roller drive shaft (driving shaft) 12, an antenna (antenna for creating RFID label) 14, an antenna 19 (cartridge identification antenna), a cutter 15, a pair of feeding guides 13, a feeding roller 17, and a sensor 18. The housing 9 has the aforementioned cartridge holder portion that allows the cartridge 100 to be engaged therewith, and which provides the exterior. The print head 10 performs predetermined printing of a cover film 103. The ribbon take-up roller driving shaft 11 drives an ink ribbon 105 after the printing of the cover film 103. The feeding roller drive shaft (driving shaft) 12 adheres the cover film (printing target film) 103 to a base tape 101 fed out from a first roll 102 and feeds out the pressed tape from the cartridge 100 as a tag label tape 110 with print. The antenna 14 transmits/receives signals to/from a RFID circuit element To include in the tag label tape 110 with print (each RFID circuit element for producing a RFID label, of which detailed description will be made later). The antenna 14 communicates via wireless communication using a high frequency band such as a UHF band or the like. The antenna 19 transmits/receives signals to/from a RFID circuit element Tc (RFID circuit element for identifying cartridge, record portion) included in the cartridge 100 in the same way as described above. The cutter 15 cuts the aforementioned tag label tape 110 with print at a predetermined timing and to a predetermined length, thereby forms label-shaped RFID labels T (of which detailed description will be made later). The pair of feeding guides 13 sets and holds each RFID circuit element To within a predetermined access area that faces the antenna 14 during transmission/reception of signals via the wireless communication. The feeding guides 13 also guides the tape 110 (i.e., RFID labels T) after the tape 110 has been cut off. The feeding roller 17 transports the RFID labels T thus guided to an output opening (discharge opening) 16, thereby outputs the RFID labels T. The sensor 18 detects the presence or absence of the RFID label T at the output opening 16.

Also, the apparatus main body 8 includes a radio frequency circuit 21, a signal processing circuit 22, a motor 23 to drive cartridge shaft, a cartridge shaft drive circuit 24, a print-head drive circuit 25, a solenoid 26, a solenoid drive circuit 27, a tape-feeding-roller motor 28, a tape-feeding-roller drive circuit 29, and a control circuit 30. The radio frequency circuit 21 accesses (writes or reads) the aforementioned RFID circuit element To via the antenna 14, and accesses the aforementioned RFID circuit element Tc via the antenna 19. The signal processing circuit 22 processes signals read out from the RFID circuit elements To and Tc. The motor 23 to drive cartridge shaft drives the ribbon take-up roller driving shaft 11 and the feeding roller driving shaft 12. The cartridge shaft drive circuit 24 controls the driving of the motor 23 to drive cartridge shaft. The print-head drive circuit 25 controls the supply of power to the aforementioned print head 10. The solenoid 26 drives the aforementioned cutter 15 such that it performs the cutting operation. The solenoid drive circuit 27 controls the solenoid 26. The tape-feeding-roller motor 28 drives the aforementioned feeding roller 17. The tape-feeding-roller drive circuit 29 controls the tape-feeding-roller motor 28. The control circuit 30 controls the radio frequency circuit 21, the signal processing circuit 22, the cartridge shaft drive circuit 24, the print-head drive circuit 25, the solenoid drive circuit 27, the tape-feeding-roller drive circuit 29, and so forth. The control circuit 30 controls the operation of the overall system of the apparatus 2 for communicating with a RFID tag.

The control circuit 30 is a so-called microcomputer. While detailed description thereof will be omitted, the control circuit 30 comprises a CPU which is a central computation processing device, ROM, RAM, and so forth. The control circuit 30 performs signal processing according to a program stored beforehand in the ROM using the temporary storage function provided by the RAM. Furthermore, the control circuit 30 is connected to the communication line via the input/output interface 31, for example. Such an arrangement allows the control circuit 30 to transmit/receive information with the route server 4, the other terminals 5, the general purpose computer 6, the information server 7, etc.

Figure 3:
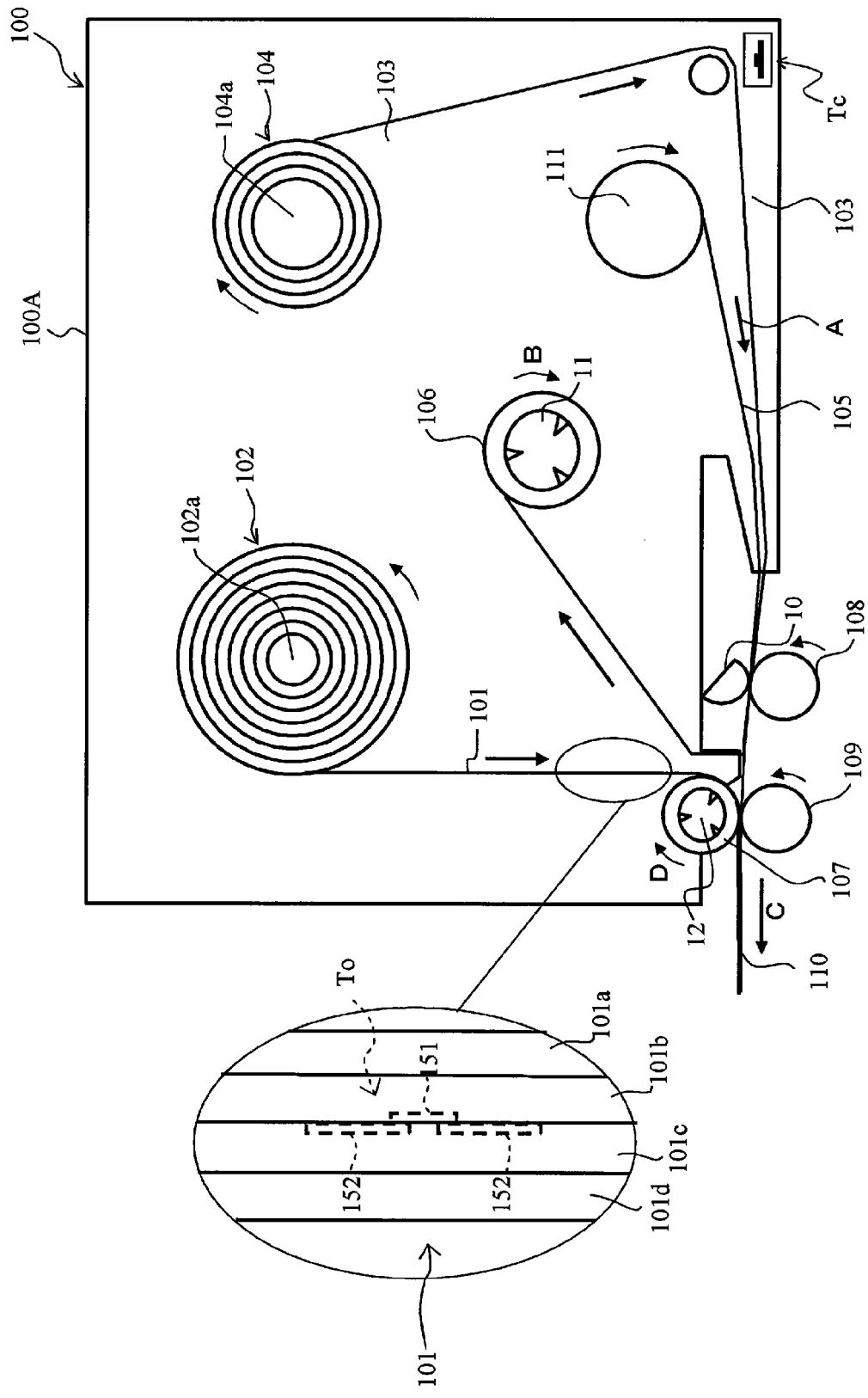
FIG. 3 is an explanatory diagram for describing the detailed configuration of the cartridge.

FIG. 3 is an explanatory diagram for describing the detailed configuration of the cartridge 100.

In FIG. 3, the cartridge 100 comprises a housing 100A, the first roll 102, a second roll 104, a ribbon-supply-side roll 111, a ribbon take-up roller 106, a pressure roller 107, and the aforementioned RFID circuit element Tc. The first roll 102 winds a strip of base tape 101 (tag tape) around its outer face. The first roll is disposed within the housing 100A. The second roll 104 winds the transparent cover film 103 around its outer face. The cover film 103 has approximately the same width as that of the base tape 101. The ribbon-supply-side roll 111 supplies the ink ribbon 105 (heat transfer ribbon. Notice that the ribbon-supply-side roll can be eliminated in a case of employing a thermo-sensitive tape as the cover film). The ribbon take-up roller 106 rewinds the ribbon 105 after the printing. The pressure roller 107 adheres the base tape 101 and the cover film 103 to each other by applying pressure. The pressure roller 107 also transports the tag label tape 110 with print thus formed in the direction of the arrow A (i.e., serving as a feeding roller). The RFID circuit element Tc is disposed at a position approximately facing the antenna 19 of the apparatus main body 8.

The first roll 102 stores, in a manner such that it is wound around a reel member 102*a*, the base tape 101, which has a structure in which multiple RFID circuit elements To are consecutively formed at a predetermined pitch along the longitudinal direction.

The base tape 101 has a four-layer structure (see partial enlarged view in FIG. 3) comprising an adhesive layer 101*a* formed of an appropriate adhesive material, a colored base film 101*b* formed of PET (polyethylene terephthalate) or the like, an adhesive layer 101*c* formed of an appropriate adhesive material, and a detachable paper sheet 101*d*. The four layers of the base tape 101 are layered in that order from the layer that corresponds to the inner side of the rolled tape (the rightmost layer in FIG. 3) to the layer that corresponds to the opposite side (the leftmost layer in FIG. 3).

The base film 101*b* includes antennas (tag antennas) 152, which provide a function of transmission/reception of information, on the back face of the base film 101*b* (on the left side in FIG. 3) such that they and the base film 101*b* form a single member. Furthermore, an IC circuit part 151 for updatably (rewritably) storing information is formed such that it is connected to each tag antenna 152, thereby forming individual RFID circuit elements To (the aforementioned RFID circuit element Tc is provided in the same way as described above).

The aforementioned adhesive layer 101*a* is formed on the front face (right side in FIG. 3) of the base film 101*b*, which enables the cover film 103 to be adhered in the following step. Furthermore, the aforementioned detachable paper sheet 101*d* is adhered to the base film 101*b* through the aforementioned adhesive layer 101*c* provided on the back face of the base film 101*b* (left side in FIG. 3) so as to include the RFID circuit elements To. Note that the user peels off the detachable paper sheet 101*d* when the user adheres the RFID label T as a finished product to an inventory item or the like, thereby adhering the RFID label T to the inventory item or the like.

The second roll 104 stores the aforementioned cover film 103 such that it is wound around a reel member 104*a*. The cover film 103 is supplied from the second roll 104. The ribbon 105 is supplied on the back side of the cover film 103 (i.e., on the face of the side which is to be adhered to the base tape 101), and is driven by the ribbon-supply-side roll 111 and the ribbon winding roll 106. The ribbon 105 thus supplied is pressed by the print head 10, thereby coming into contact with the back face of the cover film 103.

The aforementioned motor 23 to drive cartridge shaft (see FIG. 2 described above), which is a pulse motor externally provided to the cartridge 100, transmits driving force to each of the ribbon take-up roller driving shaft 11 and the feeding roller drive shaft 12, thereby rotationally driving the ribbon take-up roller 106 and the pressure roller 107.

The RFID circuit element Tc stores the identification information with respect to the cartridge 100, which serves as a communication factor (which will be simply referred to as "cartridge information" hereafter. Here, the cartridge information may provide a function of identifying the individual cartridges. Also, an arrangement may be made in which the cartridge information provides a function of identifying the kind of each cartridge, instead of providing a function of identifying the individual cartridges.). With such an arrangement, the cartridge information is read out before access (readout in this example, writing in a modification described later) is made via the antenna 14 to the RFID tag information stored in the IC circuit part 151 of each RFID circuit element To provided to the base tape 101 (of which description will be made later).

With the cartridge 100 having the aforementioned configuration, the base tape 101 fed out from the aforementioned first roll 102 is supplied to the pressure roller 107. On the other hand, the ink ribbon 105 is driven by the ribbon-supply-side roll 111 and the ribbon take-up roller 109 disposed on the back side thereof (i.e., the side of the face which is to be adhered to the base tape 101) so as to be located on the back face side of the cover film 103 fed out from the second roll 104. Furthermore, the ink ribbon 105 thus driven is pressed by the print head 10, thereby being brought into contact with the back face of the cover film 103.

With such an arrangement, upon shifting the roll holder (not shown) from the separate position to the contact position after mounting the cartridge 100 to the cartridge holder portion of the apparatus main body 8. The cover film 103 and the ink ribbon 105 are held by the nip between the print head 10 and the platen roller 108. The base tape 101 and the cover film 103 are held by the nip between the pressure roller 107 and a sub roller 109. Then, the ribbon take-up roller 106 and the pressure roller 107 are synchronously rotationally driven along the directions denoted by the arrow B and the arrow D, respectively, by the driving force provided from the motor 23 to drive cartridge shaft. Furthermore, the feeding roller drive shaft 12, the sub roller 109, and the platen roller 108 are connected to one another by a gear set (not shown). With such an arrangement, upon driving the feeding roller drive shaft 12, the pressure roller 107, the sub roller 109, and the platen roller 108 rotate, thereby feeding out the base tape 101 from the first roll 102. The base tape thus fed out is supplied to the pressure roller 107 as described above. On the other hand, the cover film 103 is fed out from the second roll 104. At the same time, power is supplied to multiple heater elements provided to the print head 10 from the print-head drive circuit 25. As a result, printing is performed, thereby forming printed letters R (see FIG. 6 described later) on the back face of the cover film 103. Then, the base tape 101 and the printed cover film 103 are adhered (crimped) to each other by the pressure roller 107 and the sub roller 109 so as to form a single tape, thereby forming the tag label tape 110 with print. The tag label tape 110 with print thus formed is transported to outside the cartridge 100. Note that the ink ribbon 105 is rewound around the ribbon take-up roller 106 by the driving force provided from the ribbon take-up roller driving shaft 11 after the printing of the cover film 103.

Figure 4:
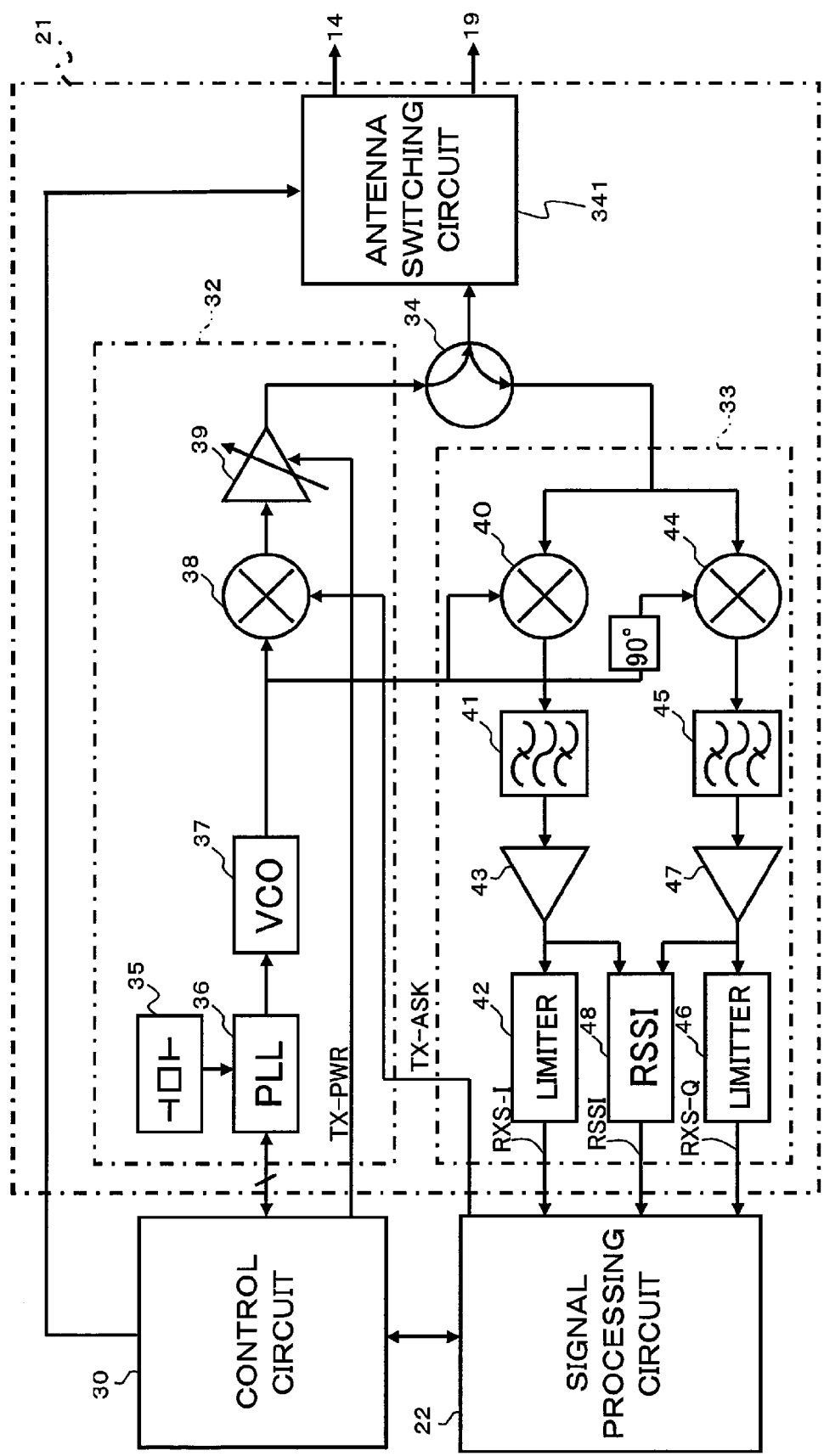
FIG. 4 is a functional block diagram which shows the functions of the radio frequency circuit in detail.

FIG. 4 is a functional block diagram which shows the functions of the aforementioned radio frequency circuit 21 in detail. In FIG. 4, the radio frequency circuit 21 comprises an antenna switching circuit 341 configured to perform switching operation according to an instruction from the control circuit 30, a transmitting portion 32 configured to transmit signals to the RFID circuit element To or Tc via the antenna 14 or 19 according to the switching operation of the antenna switching circuit 341, a receiving portion 32 configured to receive the reflected waves from the RFID circuit element To or Tc via the antenna 14 or 19, and a transmit-receive splitter 34.

The antenna switching circuit 341 is a switching circuit employing known radio-frequency FETs or diodes. The antenna switching circuit 341 provides a function of connecting one of the antennas 14 and 19 to the transmit-receive splitter 34 according to a selection signal from the control circuit 30.

The transmitting portion 32 includes a quartz oscillator 35, a PLL (Phase Locked Loop) 36, a VCO (Voltage Controlled Oscillator) 37, a transmission multiplying circuit 38 (note that, in a case of amplitude modulation, it may be replaced by an amplitude factor variable amplifier or the like), and a variable transmission amplifier 39. The quartz oscillator 35, the PLL 36, and the VCO 37 generates carrier waves for accessing (reading in this example, and access includes also writing in a modification described later) the RFID tag information stored in the IC circuit part 151 of the RFID circuit element To or Tc according to a control signal (carrier wave generating instruction signal) from the control circuit 30. The transmission multiplying circuit 38 modulates (in this case, amplitude modulation according to the "TX_ASK" signal supplied from the signal processing circuit 22) the carrier waves generated as described above according to a signal supplied from the signal processing circuit 22. The variable transmission amplifier 39 amplifies the modulated waves (RFID tag information) modulated by the transmission multiplying circuit 38 with an amplification factor determined according to a "TX_PWR" signal supplied from the control circuit 30. With such an arrangement, the UHF frequency band is preferably employed for the carrier waves generated as described above. The output from the transmission amplifier 39 is transmitted to either the antenna 14 or 19 via the transmit-receive splitter 34 according to the switching operation of the antenna switching circuit 341. Accordingly, the output signal is supplied to the IC circuit part 151 of the RFID circuit element To or Tc. Note that the RFID tag information is not restricted to the signals thus modulated. In some cases, only a plain carrier wave is transmitted as the RFID tag information.

The receiving portion 33 includes a first receiving signal multiplying circuit 40, a first band-pass filter 41, a first receiving signal amplifier 43, a first limiter 42, a second receiving signal multiplying circuit 44, a second band-pass filter 45, a second receiving signal amplifier 47, and a second limiter 46. The first receiving signal multiplying circuit 40 multiplies the reflected waves received from the RFID circuit element To or Tc via the antenna 14 or 19 by the carrier waves generated as described above. The first band-pass filter 41 extracts only the signals within the necessary frequency band range from the output signals received from the first receiving signal multiplying circuit 40. The first receiving signal amplifier 43 amplifies the output signal from the first band-pass filter 41. The first limiter 42 further amplifies the output of the first receiving signal amplifier 43 and converting the output thus amplified into a digital signal. The second receiving signal multiplying circuit 44 multiplies the reflected waves received from the RFID circuit element To or Tc via the antenna 14 or 19 by the carrier waves that have been delayed by a phase angle of 90° after having been generated as described above. The second band-pass filter 45 extracts only the signals within the necessary frequency band range from the output signals of the second receiving signal multiplying circuit 44. The second receiving signal amplifier 47 amplifies the output signal of the second band-pass filter 45. The second limiter 46 further amplifies the output of the second reception amplifier 47 and converts the output thus amplified into a digital signal. With such an arrangement, the signal "RXS-I" output from the aforementioned first limiter 42 and the signal "RXS-Q" output from the aforementioned second limiter 46 are input to the aforementioned signal processing circuit 22, whereupon these signals are processed by the signal processing circuit 22.

Furthermore, the output signals from the first receiving signal amplifier 43 and the second receiving signal amplifier 47 are input to an RSSI (Received Signal Strength Indicator) circuit 48. With such an arrangement, the signal "RSSI" which indicates the magnitude of these signals is input to the signal processing circuit 22. As described above, the apparatus 2 for communicating with a RFID tag according to the present embodiment performs demodulation of the reflected waves from the RFID circuit element To or Tc by I-Q quadrature demodulation.

Figure 5:
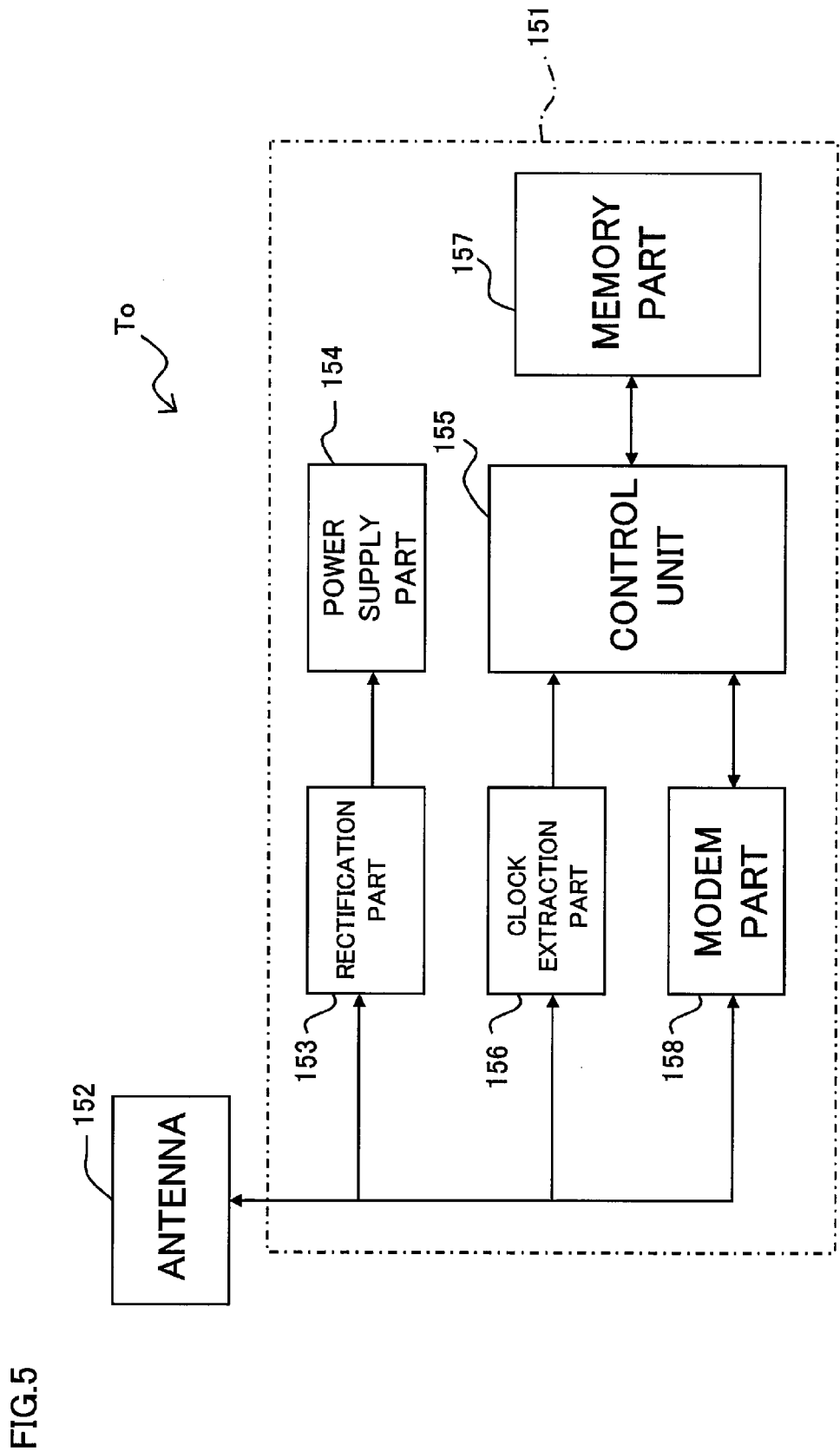
FIG. 5 is a functional block diagram which shows the functional configuration of a RFID circuit element.

FIG. 5 is a functional block diagram which shows the functional configuration of the aforementioned RFID circuit element To. In FIG. 5, the RFID circuit element To includes the aforementioned antenna 152 configured to perform transmission/reception of signals to/from the antenna 14 of the apparatus 2 for communicating with a RFID tag in a non-contact manner using high-frequency radio waves of the UHF frequency band or the like, and the aforementioned IC circuit part 151 connected to the antenna 152.

The IC circuit part 151 includes a rectification part 153, a power source part 154, a clock extraction part 156, a memory part 157, a modem part 158, and a control unit 155. The rectification part 153 rectifies the carrier waves received via the antenna 152. The power source part 154 stores the energy of the carrier waves thus rectified by the rectification part 153, which serves as a driving power supply for the IC circuit part 151. The clock extraction part 156 extracts the clock signals from the carrier waves thus received by the antenna 152, and supplies the clock signals thus extracted to a control unit 155. The memory part 157 stores predetermined information signals. The modem part 158 is connected to the antenna 152. The control unit 155 controls the operation of the aforementioned RFID circuit element To via the rectification part 153, the clock extraction part 156, the modem part 158, etc.

The modem part 158 performs demodulation of communication signals which have been transmitted from the antenna 14 of the aforementioned apparatus 2 for communicating with a RFID tag, and which have been received via the antenna 152. Also, the modem part 158 performs modulation of the carrier waves received via the antenna 152 according to a response signal from the aforementioned control unit 155, and the carrier waves thus modulated are transmitted as reflected waves.

The control unit 155 analyzes the received signals demodulated by the modem part 158, creates the response signals based upon the information signals stored in the memory part 157, and executes basic control such as the control for instructing the modem part 158 to transmits a response signal.

Note that the RFID circuit element Tc provided to the cartridge 100 has the same configuration as that of the aforementioned RFID circuit element To, which includes the IC circuit part 151, the antenna 152, and so forth. Description thereof will be omitted.

Figure 6A:
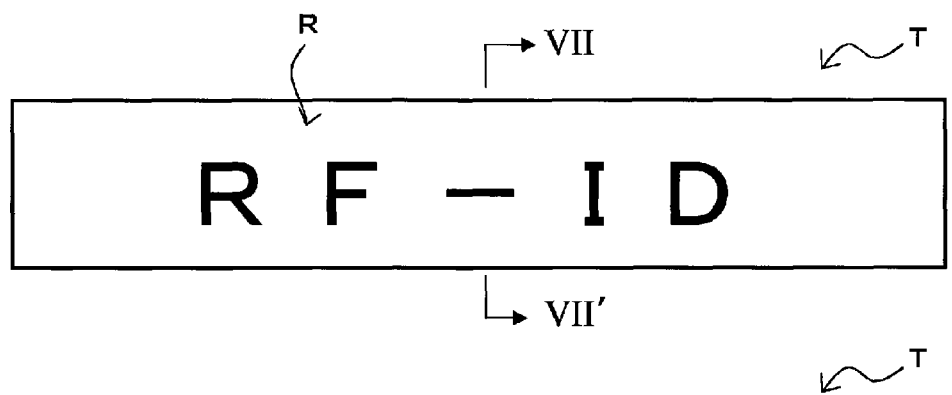
FIG. 6A shows a top view of an example of the exterior of a RFID label.
Figure 6B:
FIG. 6B shows a bottom view of an example of the exterior of a RFID label.

FIGS. 6A and 6B are diagrams which show an example of the exterior of a RFID label T cut off from the tag label tape 110 with print after information has been written to the RFID circuit element To as described above. FIG. 6A is a top view, and FIG. 6B is a bottom view. On the other hand, FIG. 7 is a lateral cross-sectional view taken along line VII-VII' in FIG. 6A.

Figure 7:
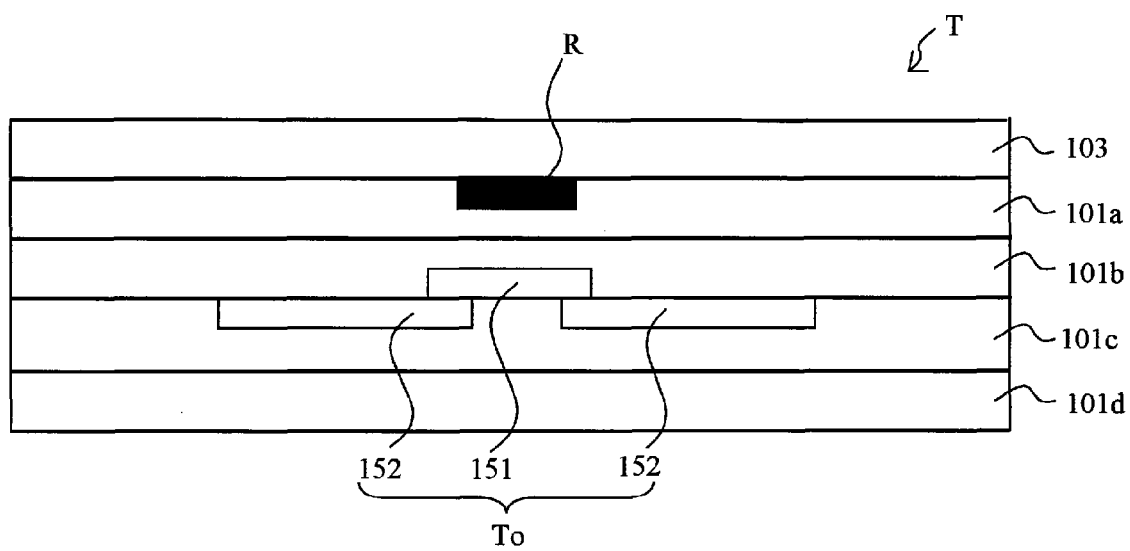
FIG. 7 is a lateral cross-sectional view taken along line VII-VII' in FIG. 6A.

As shown in FIGS. 6A, 6B, and 7, the RFID label T has a five-layer structure in which the cover film 103 is provided to the four-layer structure shown in FIG. 3. Specifically, the five-layer structure comprises the cover film 103, the adhesive layer 101a, the base film 101b, the adhesive layer 101c, and the detachable paper sheet 101d, in that order from the side of the cover film 103 (upper side in FIG. 7) to the opposite side (lower side in FIG. 7). Furthermore, as described above, the RFID circuit elements To including the antennas 152 provided on the back side of the base film 101b are provided within the adhesive layer 101c. Furthermore, the printed characters R (which read "RF-ID" to indicate the kind of RFID label) are printed on the back of the cover film 103.

Figure 8:
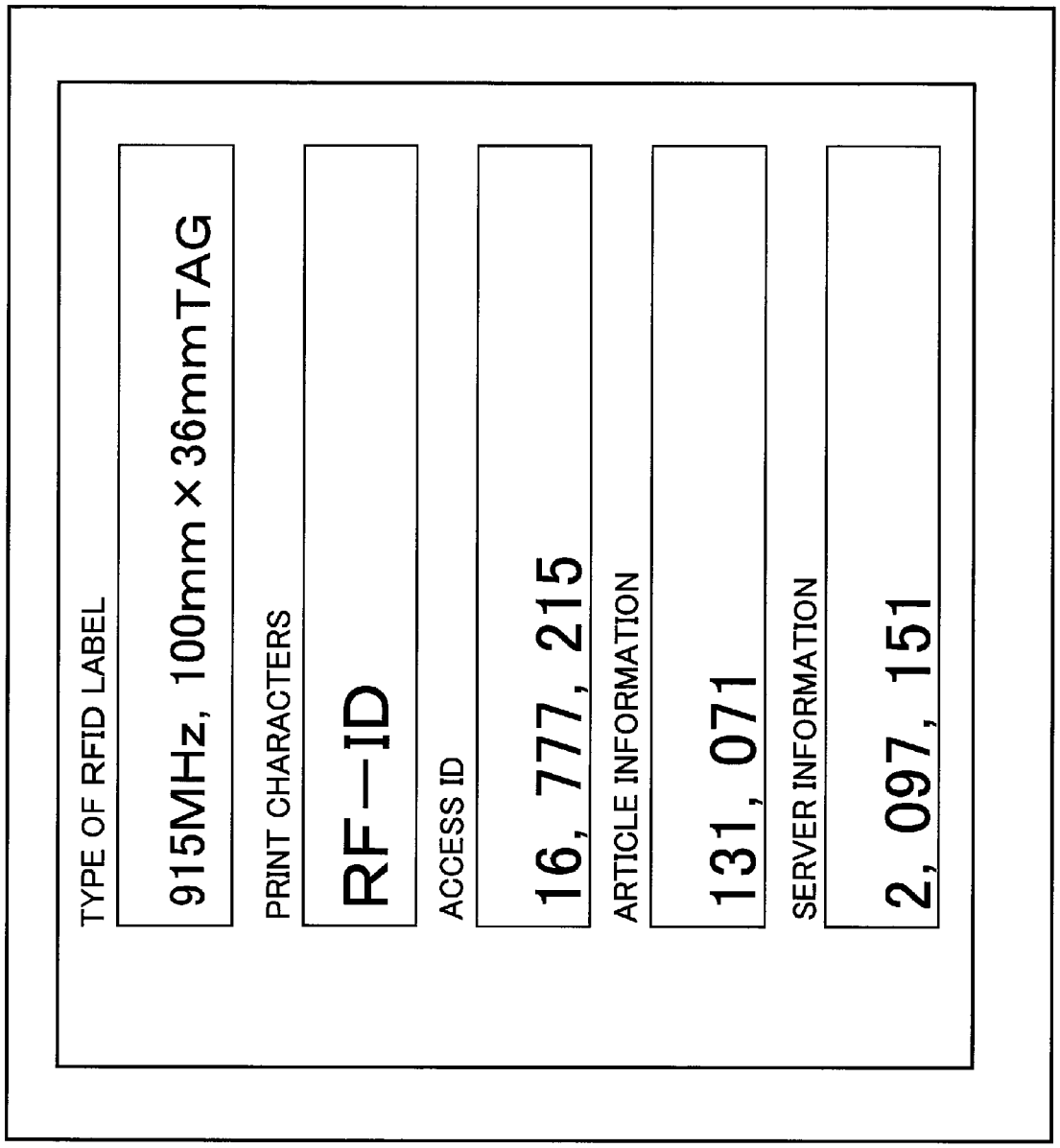
FIG. 8 is a diagram which shows an example of a screen displayed on a terminal or a genera-purpose computer when the RFID tag information is accessed.

FIG. 8 is a diagram which shows an example of a screen displayed on the terminal 5 or the general purpose computer 6 when the apparatus 2 for communicating with a RFID tag accesses (reads or writes) RFID tag information stored in the IC circuit part 151 of the RFID circuit element To.

FIG. 8 shows a display arrangement in which the terminal 5 or the general purpose computer 6. The arrangement includes a RFID label type, the printed characters R, an access (writing/reading) ID, an inventory item information address, a storage destination address, etc. The RFID label type is determined based upon the cartridge information read out from the RFID circuit element Tc. The printed characters R is printed corresponding to each RFID circuit element To. The access (writing/reading) ID is the unique ID of each RFID circuit element To. The inventory item information address is stored in the information server 7. The storage destination address of the corresponding information is stored in the aforementioned route server 4. etc. With such an arrangement, upon operating the terminal 5 or the general purpose computer 6 for creating tags, the apparatus 2 for communicating with a RFID tag operates. Specifically, after the cartridge information stored in the IC circuit part 151 of the RFID circuit element Tc has been read out, the aforementioned printed characters R are printed on the cover film 103. Furthermore, the RFID tag information such as the inventory item information etc., stored beforehand in the IC circuit part 151 of the RFID circuit element To is read out (or the information such as the aforementioned writing ID and the inventory item information are written to the IC circuit part 151).

While description has been made regarding an arrangement in which access (reading or writing) is made for the tag label tape 110 with print, which is moving along the feeding guides 13 after the printing, while holding the tag label tape 110 with print within the access area by the feeding guides 13. The present invention is not restricted to such an arrangement. Also, an arrangement may be made in which the tag label tape 110 with print is temporarily stopped at a predetermined position, and the access is made while holding the tag label tape 110 with print by the feeding guides 13.

In the aforementioned reading step or writing step, the correspondence between the ID of each RFID label T thus formed and the information read out from the IC circuit part 151 (or written to the IC circuit part 151) of the RFID label T is stored in the aforementioned route server 4. With such an arrangement, the correspondence can be used as reference data as required.

Figure 9:
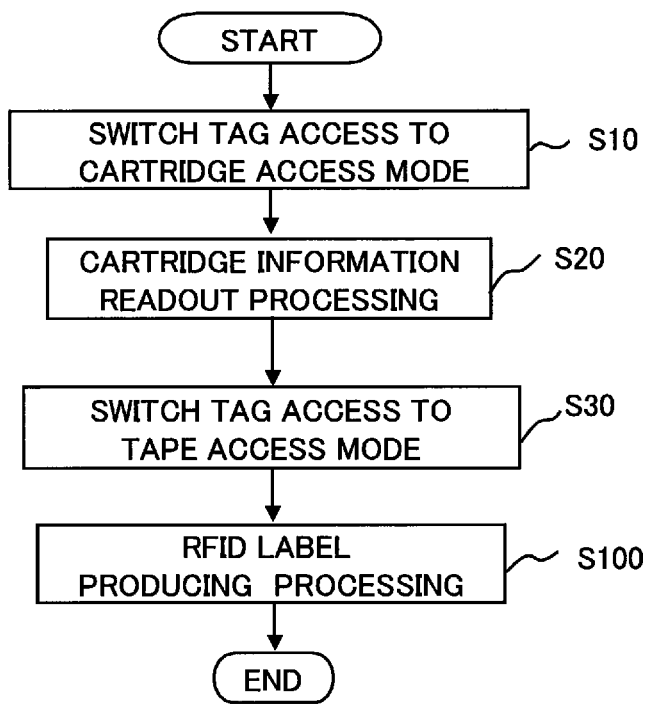
FIG. 9 is a flowchart which shows a control procedure executed by a control circuit.

FIG. 9 is a flowchart which shows a control procedure executed by the control circuit 30. The flowchart includes a step for instructing the print head 10 to perform printing of the cover film 103 while feeding the cover film 103, a step for adhering the base tape 101 to the cover film 103 so as to form the tag label tape 110 with print, and the subsequent step for cutting off the tag label tape 110 with print in increments of the RFID circuit elements To so as to form the RFID labels T.

In FIG. 9, upon performance of the readout operation by the apparatus 2 for communicating with a RFID tag, the flow starts. First, in Step S10, tag access is switched to the cartridge tag access. Specifically, a selection signal is output to the antenna switching circuit 341 such that it is switched to the state in which the antenna 19 is connected to the transmit-receive splitter 34.

In the next Step S20, readout processing is performed for the cartridge information stored beforehand in the memory part 157 (see FIG. 5 as described above) of the RFID circuit element Tc (see FIG. 10 described later).

In the next Step S30, the tag access is switched to the tape tag access. Specifically, a selection signal is output to the antenna switching circuit 341 such that it is switched to the state in which the antenna 14 is connected to the transmit-receive splitter 34.

Subsequently, the flow proceeds to Step S100 where a RFID label producing process is performed (detailed description will be made later with reference to FIG. 11). Specifically, the RFID tag information stored in the memory part 157 of the IC circuit part 151 of each RFID circuit element To is read out under the communication conditions (frequency band, communication protocol, transmission power, etc.) corresponding to the cartridge information thus read out in the aforementioned Step S20. At the same time, predetermined printing is performed on the cover film 103. Subsequently, the tag label tape 110 with print is cut off in increments of the RFID circuit elements To, thereby forming the RFID labels T, whereupon this flow ends.

Figure 10:
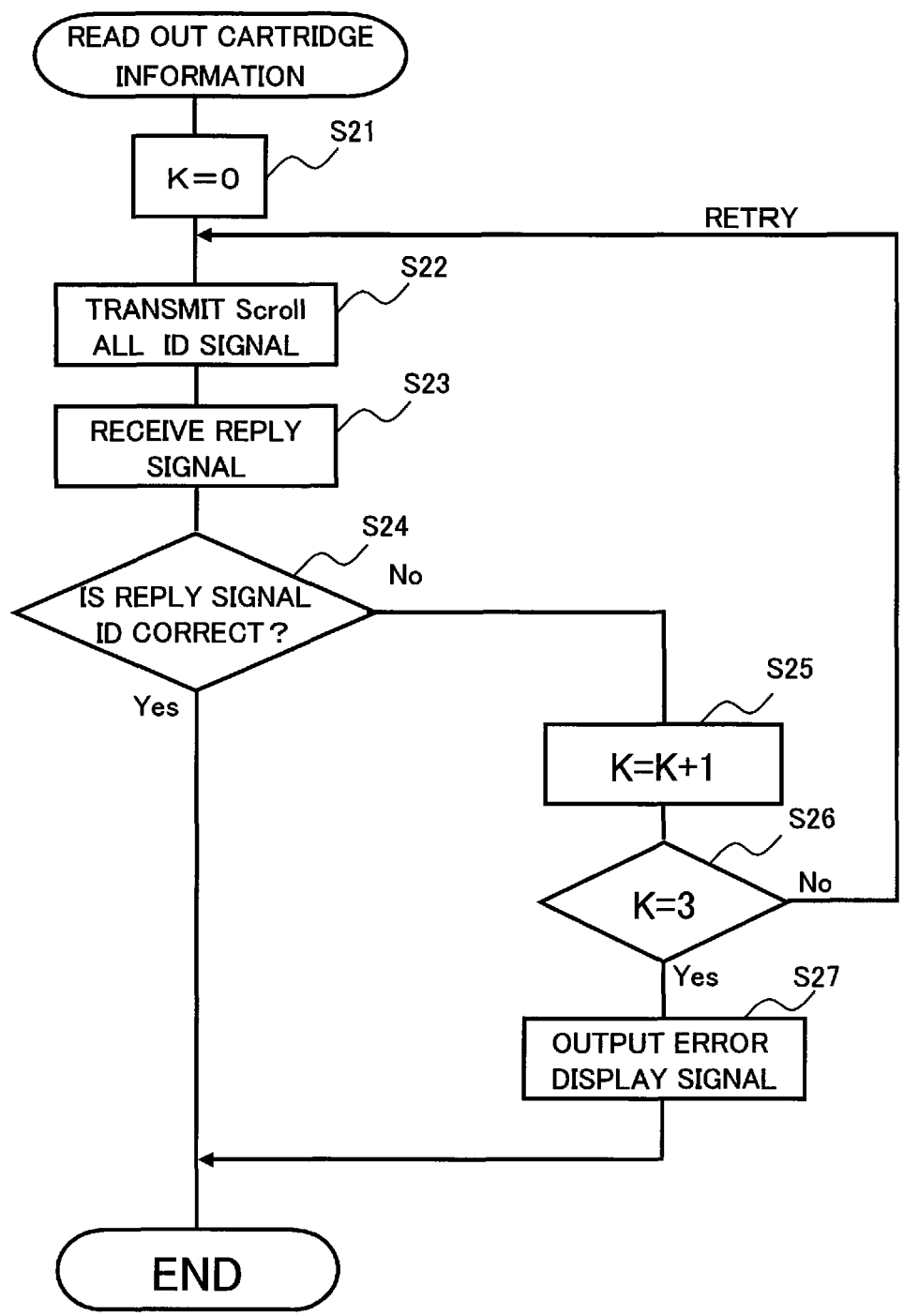
FIG. 10 is a flowchart which shows a procedure in Step S20 shown in FIG. 9 in detail.

FIG. 10 is a flowchart which shows a detailed procedure of the aforementioned Step S20.

In FIG. 10, first, in Step S21, the variable K is initialized to zero, which is a variable for counting the retries (access retries) in the event of reception of no response from the RFID circuit element To.

Subsequently, in Step S22, a "Scroll ALL ID" command is output to the signal processing circuit 22 configured to read out the cartridge information stored in the RFID circuit element Tc using predetermined communication parameters (frequency band, communication protocol, etc.) set to fixed values beforehand. The signal processing circuit 22 creates a "Scroll All ID" signal, which is access information, according to the "Scroll ALL ID" command. The "Scroll All ID" signal thus created is transmitted to the RFID circuit element Tc provided to the cartridge 100 via the radio frequency circuit 21, which requests a reply.

In the next Step S23, a reply signal (cartridge information), which has been transmitted from the RFID circuit element Tc of the cartridge 100 in response to the aforementioned "Scroll All ID" signal, is received via the antenna 19. The reply signal is acquired via the radio frequency circuit 21 and the signal processing circuit 22 (also, the reply signal may be temporarily stored in appropriate memory).

In the next Step S24, determination is made whether or not the reply signal received in the aforementioned Step S23 is correct using a known error detection code (CRC; Cyclic Redundancy Check or the like).

In a case that determination has been made that the condition has not been satisfied, the flow proceeds to Step S25 where the variable K is incremented by 1, and the flow proceeds to Step S26. In Step S26, determination is made whether or not the variable K has reached a predetermined retry number (three times in this example. Also, the retry number may be set to an appropriate number). In a case that the variable K is equal to or smaller than 2, determination is made that the condition has not been satisfied, and the flow returns to Step S22 where the same procedure is repeated. In a case that the variable K is equal to 3, the flow proceeds to Step S27 where an error display signal is output to the terminal 5 or the general purpose computer 6 via the input/output interface 31 and the communication line 3 so as to display a readout failure (error) screen, whereupon this flow ends. As described above, readout retry is performed a predetermined maximum times (three times in this example). In a case that determination has been made that the condition has been satisfied in Step S24, readout of the cartridge information from the RFID circuit element Tc is completed, whereupon this flow ends.

The cartridge information stored in the IC circuit part 151 of the RFID circuit element Tc provided to the cartridge 100 is read out according to the above-described routine.

Figure 11:
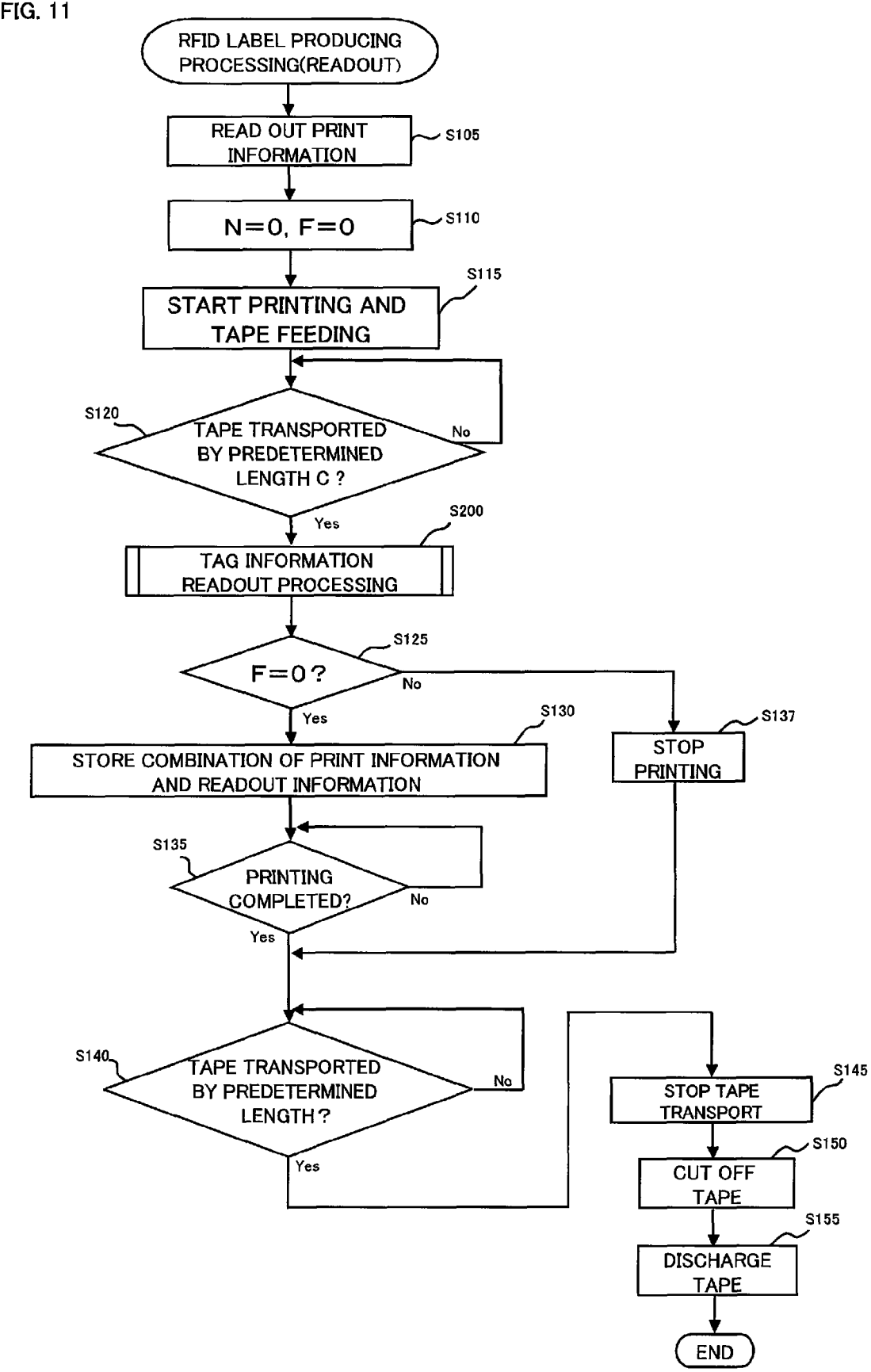
FIG. 11 is a flowchart which shows a procedure in Step S100 shown in FIG. 9 in detail.

FIG. 11 is a flowchart which shows the aforementioned Step S100.

In FIG. 11, first, in Step S105, the printing information, which has been input by operating the aforementioned terminal 5 or the general purpose computer 6 and which instructs the print head 10 to print the RFID label T, is read out via the communication line 3 and the input/output interface 31.

Subsequently, in Step S110, the variable N for counting the retries (access retries) in the event that a sign of communication failure is detected, and the flag F that indicates whether or not normal communication is performed, are initialized to zero.

Subsequently, in Step S115, a control signal is output to the cartridge shaft drive circuit 24, whereupon the ribbon take-up roller 106 and the pressure roller 107 are rotationally driven by the driving force provided from the motor 23 to drive cartridge shaft. Thus, the base tape 101 is fed out from the first roll 102, and is supplied to the pressure roller 107. On the other hand, the cover film 103 is fed out from the second roll 104. At the same time, a control signal is output to the print-head drive circuit 25 such that the power is supplied to the print head 10. As a result, the characters R such as letters, symbols, barcodes, etc., thus read out in Step S105 are printed on predetermined regions in the cover film 103 (e.g., the regions to be adhered to the back faces of the RFID circuit elements To disposed on the base tape 101 at a predetermined pitch and at a constant interval). Furthermore, a control signal is output to the tape-feeding-roller motor 28 via the tape-feeding-roller drive circuit 29 so as to rotationally drive the feeding roller 17. As a result, the base tape 101 and the printed cover film 103 are adhered to each other by the pressure roller 107 and the sub roller 109, thereby forming a tape in the form of a single member. With such an arrangement, the tape thus formed, which is the tag label tape 110 with print, is transported to outside of the cartridge 100.

Subsequently, in Step S120, determination is made that the tag label tape 110 with print is transported to a predetermined distance C (e.g., the transport distance at which the RFID circuit element To adhered to the corresponding printed cover film 103 moves up to the position of the transport guides 13). In order to determine the transport distance, an arrangement suffices in which an appropriate identification mark provided to the base tape 101 is detected by a known tape sensor provided additionally. In a case that determination has been made that the condition has been satisfied, the flow proceeds to Step S200.

In Step S200, tag information readout processing is performed. Specifically, an inquiry signal for readout is transmitted to the RFID circuit element To, and the reply signal including the RFID tag information is received and read out (detailed description will be made later with reference to FIG. 12). Upon completion of Step S200, the flow proceeds to Step S125.

In Step S125, determination is made that the flag F is equal to zero. In a case that readout processing has been normally completed with success, the flag F remains zero (see Step S280 of the flow shown in FIG. 12 described later). Accordingly, determination is made that the condition has been satisfied, the flow proceeds to Step S130.

In Step S130, the combination of the information read out from the RFID circuit element To in the aforementioned Step S200 and the printed information printed by the print head 10 corresponding to the information thus read out is output to the terminal 5 or the general purpose computer 6 via the input/output interface 31 and the communication line 3. The combination of these information sets is stored in the information server 7 or the route server 4. Note that the data thus stored is stored in a database, for example, in a manner that allows the data thus stored to be used as reference data via the terminal 5 or the general purpose computer 6 as necessary.

Subsequently, in Step S135, after printing processing has been completed for the entire region of the cover film 103 that corresponds to the RFID circuit element To which is the processing target at the current point in time, the flow proceeds to Step S140.

Note that, in a case that, due to any cause, the reading processing has not been normally completed in the aforementioned Step S125, the flag F is set to 1 (see Step S280 in the flow shown in FIG. 12 described later). Accordingly, in this case, determination is made that the condition has not been satisfied, and the flow proceeds to Step S137 where a control signal is output to the print-head drive circuit 25 so as to stop the supply of power to the print head 10, whereupon the printing is stopped. With such an arrangement, in a case that the target RFID circuit element To is defective, the printing is stopped before being completed as described above, thereby notifying the user of the defect. Subsequently, the flow proceeds to Step S140.

In Step S140, determination is made whether or not the tag label tape 110 with print have been further transported to a predetermined distance (e.g., whether or not the target RFID circuit element To and the entire printed region of the cover film 103 that corresponds to the target RFID circuit element To have been transported beyond the cutter 15 to a predetermined length (margin)). In order to determine the transport distance, an arrangement suffices in which a mark is detected by a tape sensor in the same way as in Step S120 described above. In a case that determination has been made that the condition has been satisfied, the flow proceeds to Step S145.

In Step S145, control signals are output to the cartridge shaft drive circuit 24 and the tape-feeding-roller drive circuit 29 so as to stop the driving of the motor 23 to drive cartridge shaft and the tape-feeding-roller motor 28. As a result, the rotations of the ribbon take-up roller 106, the pressure roller 107, and the feeding roller 17 are stopped. Accordingly, the feeding out of the base tape 101 from the first roll 102, the feeding out of the cover film 103 from the second roll 104, and the transport of the tag label tape 110 with print by the feeding roller 17 are stopped.

Subsequently, in Step S150, a control signal is output to the solenoid drive circuit 27 so as to drive the solenoid 26. In this step, the solenoid is driven such that the tag label tape 110 with print is cut off by the cutter 15. As described above, at this point in time, the RFID circuit element To, which is the processing target, and the entire printed region of the cover film 103 that corresponds to the RFID circuit element To sufficiently extend beyond the position of the cutter 15. Thus, a label-shaped RFID label T, which includes the RFID circuit element To from which the RFID tag information has been read out, and on which printing has been performed corresponding to the RFID tag information thus read out, is formed by cutting the tag label tape 110 with print using the cutter 15.

Subsequently, the flow proceeds to Step S155 where a control signal is output to the tape-feeding-roller drive circuit 29 so as to drive the tape-feeding-roller motor 28 again. Note that the feeding roller 17 is rotated during a period of time when the sensor 18 detects the RFID label T. As a result, the feeding roller 17 begins transport again. Accordingly, the RFID label T thus formed in the shape of a label in the aforementioned Step S150 is transported toward the discharge opening 16, and the RFID label T is thereby discharged to outside the apparatus 2 via the discharge opening 16.

Figure 12:
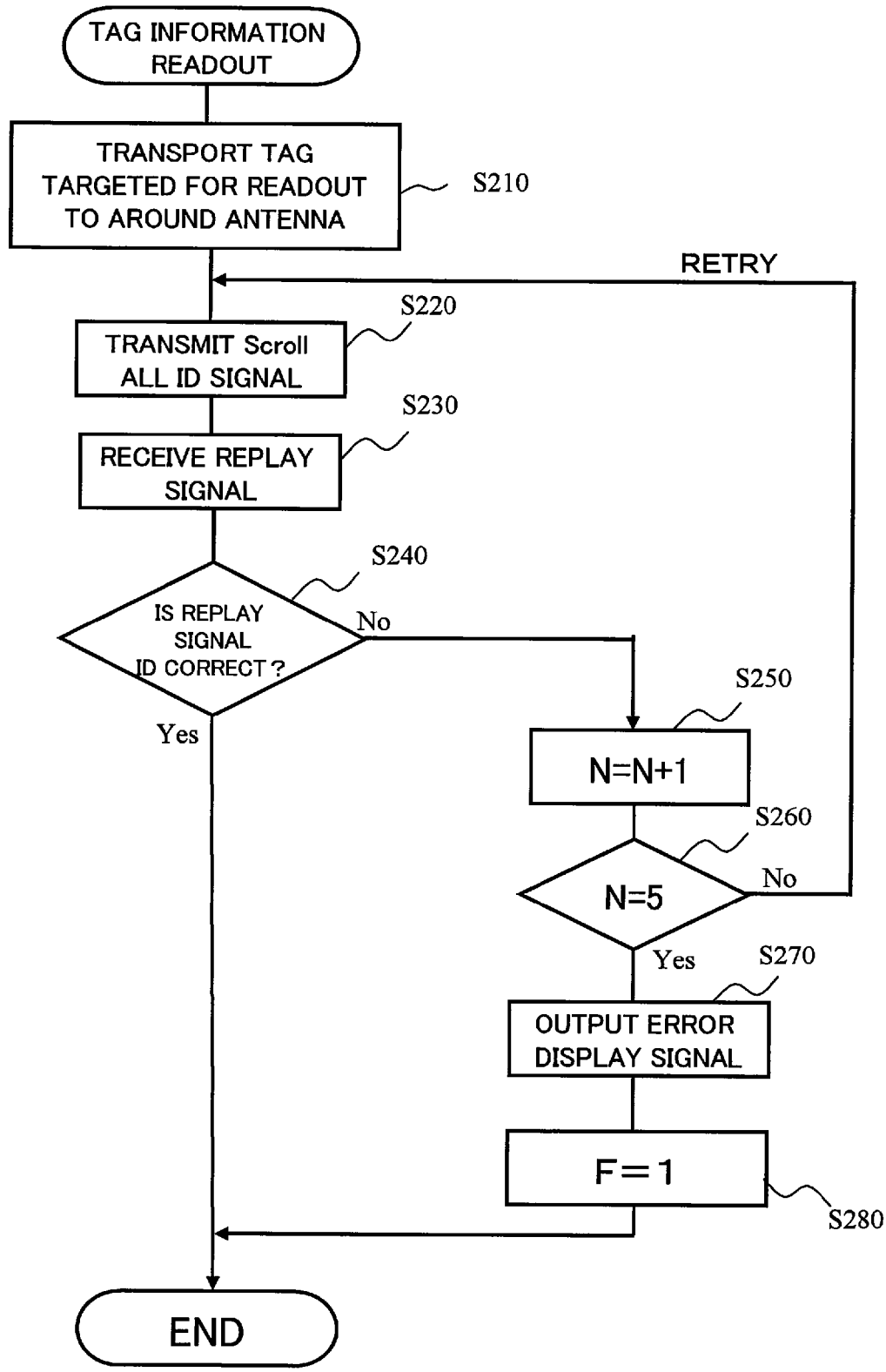
FIG. 12 is a flowchart which shows a procedure in Step S200 shown in FIG. 11 in detail.

FIG. 12 is a flowchart which shows a procedure of the aforementioned Step S200 in detail.

In FIG. 12, first, in Step S210, after the printing step for providing the tag label tape 110 with print, the RFID circuit element To, of which information to be read out, is transported to around the antenna 14.

Subsequently, in Step S220, the "Scroll All ID" command, which is an instruction to read out the information stored in the RFID circuit element To under the communication conditions according to predetermined communication parameters (the aforementioned frequency band, communication protocol, etc.) determined based upon the aforementioned cartridge information, is output to the signal processing circuit 22. The signal processing circuit 22 creates a "Scroll All ID" signal, which is used as the access information, based upon the "Scroll All ID" command. The "Scroll All ID" signal thus created is transmitted to the access-target RFID circuit element To via the radio frequency circuit 21, which requests a reply.

Next, in Step S230, the reply signal (RFID tag information such as the inventory item information, tag identification information ID, etc.) transmitted from the access-target RFID circuit element To in response to the aforementioned "Scroll All ID" signal is received via the antenna 14. The reply signal thus received is acquired via the radio frequency circuit 21 and the signal processing circuit 22.

Next, in Step S240, determination is made whether or not the reply signal received in the aforementioned Step S230 is correct using a known error detection code (CRC; Cyclic Redundancy Check or the like).

In a case that determination has been made that the condition has not been satisfied, the flow proceeds to Step S250 where the variable N is incremented by 1, and the flow proceeds to Step S260. In Step S260, determination is made whether or not the variable N has reached a predetermined retry number (five times in this example. Also, the retry number may be set to an appropriate number). In a case that the variable N is equal to or smaller than 4, determination is made that the condition has not been satisfied, and the flow returns to Step S220 where the same procedure is repeated. In a case that the variable N is equal to 5, the flow proceeds to Step S270 where an error display signal is output to the terminal 5 or the general purpose computer 6 via the input/output interface 31 and the communication line 3 so as to display a readout failure (error) screen. Then, the flow proceeds to Step S280 where the flag F is set to 1, whereupon this flow ends. As described above, readout retry is performed a predetermined maximum times (five times in this example).

In a case that determination has been made that the condition has been satisfied in Step S240, readout of RFID tag information from the RFID circuit element To is completed, whereupon this flow ends.

The RFID tag information stored in the IC circuit part 151 of the access-target RFID circuit element To stored within the cartridge 100 is accessed and is read out according to the above-described routine.

In the above description, the IC circuit part 151 and the antenna 152 of the RFID circuit element To correspond to a first IC circuit part and a first antenna described in each claim. On the other hand, the IC circuit part 151 and the antenna 152 of the RFID circuit element Tc correspond to a second IC circuit part and a second antenna described in each claim.

On the other hand, the antenna 14 and the antenna 19 form device (apparatus) antenna unit configured to perform wireless communication with the RFID circuit element for producing a RFID label and the RFID circuit element for identifying cartridge. On the other hand, the signal processing circuit 22 provides access information creating unit configured to create first and second access information (the "Scroll All ID" signal, and a "Program" signal, a "Erase" signal, a "Verify" signal, etc., described later) which allow the respective IC circuit parts 151 of the RFID circuit elements To and Tc to be accessed. On the other hand, the transmitting portion 32 of the radio frequency circuit 21 provides information transmitting unit configured to transmit the first and second access information thus created by the access information creating unit to the first and second antennas via the apparatus (device) antenna unit in a non-contact manner, thereby accessing the RFID tag information stored in the first IC circuit part or the cartridge identification information stored in the second IC circuit part. On the other hand, the antennas 14 and 19, the signal processing circuit 22, and the transmitting portion 32 of the radio frequency circuit 21 form input/output unit configured to receive communication factors, which are used for determining the performance of the communication with the RFID circuit element for producing a RFID label, from the record portion.

On the other hand, the antenna switching circuit 341 provides switching connection unit configured to connect the information transmitting unit to the selected one of the antenna for creating RFID label and the cartridge identification antenna.

As described above, with the apparatus 2 for communicating with a RFID tag according to the present embodiment, upon mounting the cartridge 100 to the cartridge holder portion for creating the RFID labels T, the signal processing circuit 22 creates the "Scroll All ID" signal, which corresponds to the second access information, as described above with reference to FIG. 10. The "Scroll All ID" signal thus created is transmitted to the RFID circuit element Tc via the radio frequency circuit 21, thereby accessing the IC circuit part 151. Then, the reply signal is received via the antenna 19, and the reply signal thus received is acquired via the radio frequency circuit 21 and the signal processing circuit 22, thereby reading out the cartridge information. After the type of the cartridge and so forth have been identified based upon the cartridge information, the signal processing circuit 22 creates the "Scroll All ID" signal, which corresponds to the first access information", according to the communication conditions determined based upon the information thus identified. The "Scroll All ID" signal thus created is transmitted to the RFID circuit element To via the radio frequency circuit 21, thereby accessing the IC circuit part 151 of the RFID circuit element To. Then, the reply signal is received via the antenna 19, and the reply signal thus received is acquired via the radio frequency circuit 21 and the signal processing circuit 22, thereby reading out the RFID tag information (RFID tag information such as the inventory item information, tag ID, etc.). As described above, with such an arrangement, before the communication with the RFID circuit elements To, the cartridge identification information is read out from the RFID circuit element Tc, and is acquired by the apparatus 2 for communicating with a RFID tag. Such an arrangement provides smooth communication when the RFID labels T are created, thereby creating RFID labels T with high reliability. Furthermore, with such an arrangement, the RFID labels T are created using the RFID circuit elements To stored in the cartridge 100 while identifying the type of the cartridge 100, which is to be replaced with an appropriate one as appropriate. With such an arrangement, both the second access information for accessing the RFID circuit element Tc configured to identify the cartridge and the first access information for accessing the RFID circuit element To on the RFID label are created by the same signal processing circuit 22. Furthermore, the first access information and the second access information are transmitted by the same radio frequency circuit transmitting portion 32 via the antennas 14 and 19. Such an arrangement provides a simpler circuit configuration, thereby providing the small-sized and lightweight overall system of the apparatus 2 for communicating with a RFID tag at reduced costs, as compared with an arrangement in which the first access information and the second access information are handled using separate circuits 2.

Furthermore, with such an arrangement, when the cartridge is to be identified, the antenna switching circuit 341 is switched to the mode for the antenna 19 so as to transmit the second access information received from the radio frequency circuit transmitting portion 32 to the RFID circuit element Tc, thereby reading out the cartridge information. On the other hand, when the RFID labels T are created, the antenna switching circuit 341 is switched to the mode for the antenna 14 so as to transmit the first access information received from the radio frequency circuit transmitting portion 32 to the RFID circuit element To, thereby reading out the RFID tag information. As described above, such an arrangement employs separate antennas 14 and 19. Such an arrangement provides separate communicable ranges for the cartridge information and the RFID tag information, thereby avoiding crosstalk between the cartridge information and the RFID tag information (i.e., avoiding response of undesired RFID circuit element which is not a target).

Description will be made regarding a second embodiment of the present invention with reference to FIG. 13 through FIG. 15. With the present embodiment, the antenna unit comprise a common antenna 14. Such an arrangement has a function of switching the communication protocol for the communication made via the antenna 14. This allows the apparatus 2 for communicating with a RFID tag to access the RFID circuit element To for creating the RFID label T and to access the RFID circuit element Tc for reading out the cartridge information. The same components as those of the aforementioned first embodiment are denoted by the same reference numerals, and description thereof will be omitted as appropriate.

Figure 13:
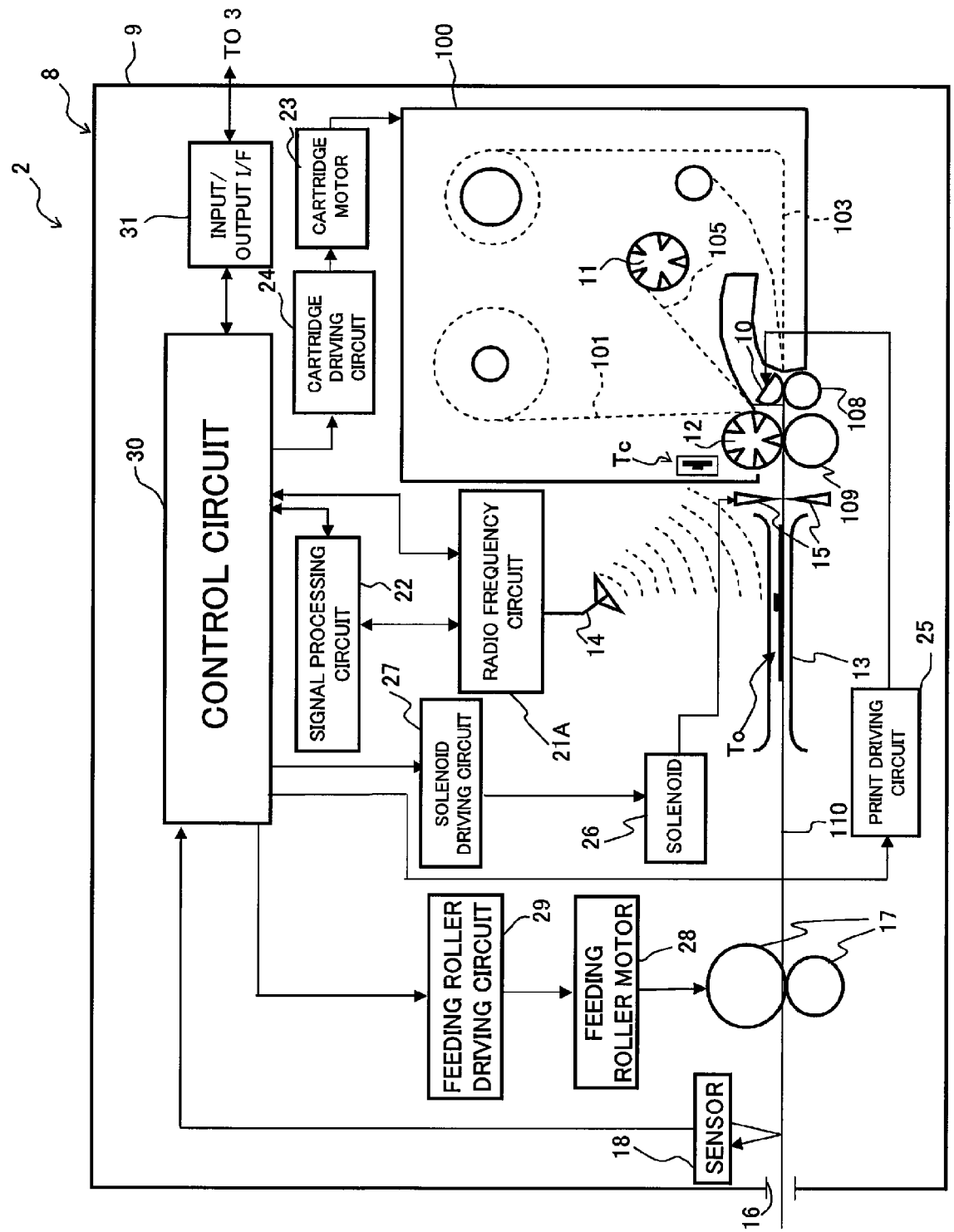
FIG. 13 is a conceptual configuration diagram which shows a detailed configuration of an apparatus for communicating with a RFID tag according to a second embodiment of the present invention.

FIG. 13 is a schematic configuration diagram which shows a configuration of the apparatus 2 for communicating with a RFID tag according to the present embodiment in detail, and which corresponds to FIG. 2 in the first embodiment described above. In FIG. 13, only the common antenna 14 (the single common antenna 14, in this example) is connected to a radio frequency circuit 21A (in other words, the antenna 19 shown in FIG. 2 is eliminated). Furthermore, the RFID circuit element Tc is disposed around the antenna 14. With such an arrangement, signals are transmitted/received via wireless communication using higher frequency bands such as a UHF band etc., between the antenna 14 and the RFID circuit element To (RFID circuit element for producing a RFID label) provided on the tag label tape 110 with print and the RFID circuit element Tc (RFID circuit element for identifying cartridge) provided to the cartridge 100.

Figure 14:
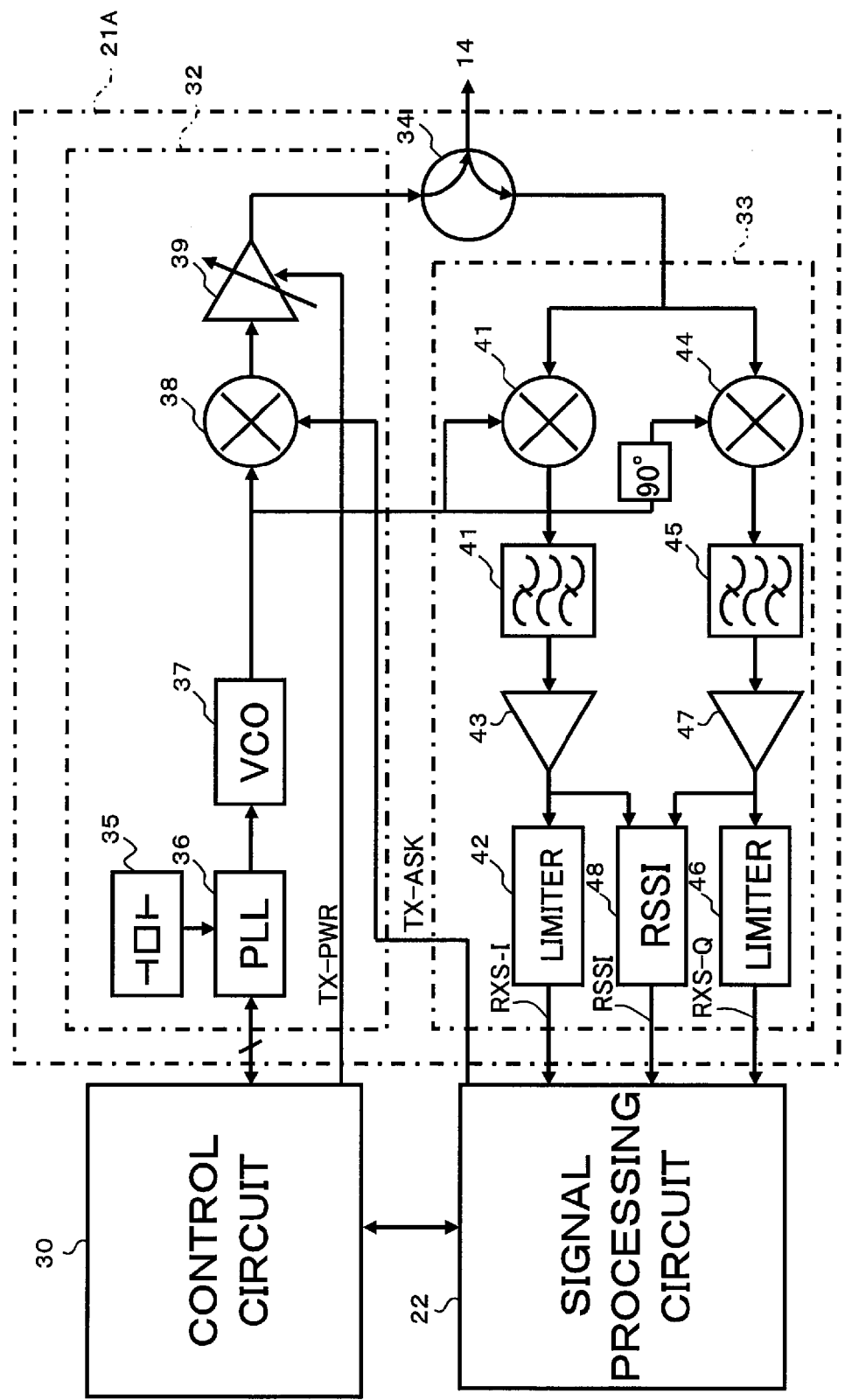
FIG. 14 is a functional block diagram which shows a function of a radio frequency circuit in detail.

FIG. 14 is a functional block diagram which shows a function of the aforementioned radio frequency circuit 21A in detail, and corresponds to FIG. 4 described in the aforementioned first embodiment. As shown in FIG. 14, the radio frequency circuit 21A does not include the antenna switching circuit 31 shown in FIG. 4, which corresponds to the above description. With such an arrangement, the transmit-receive splitter 34 is directly connected to the antenna 14.

Figure 15:
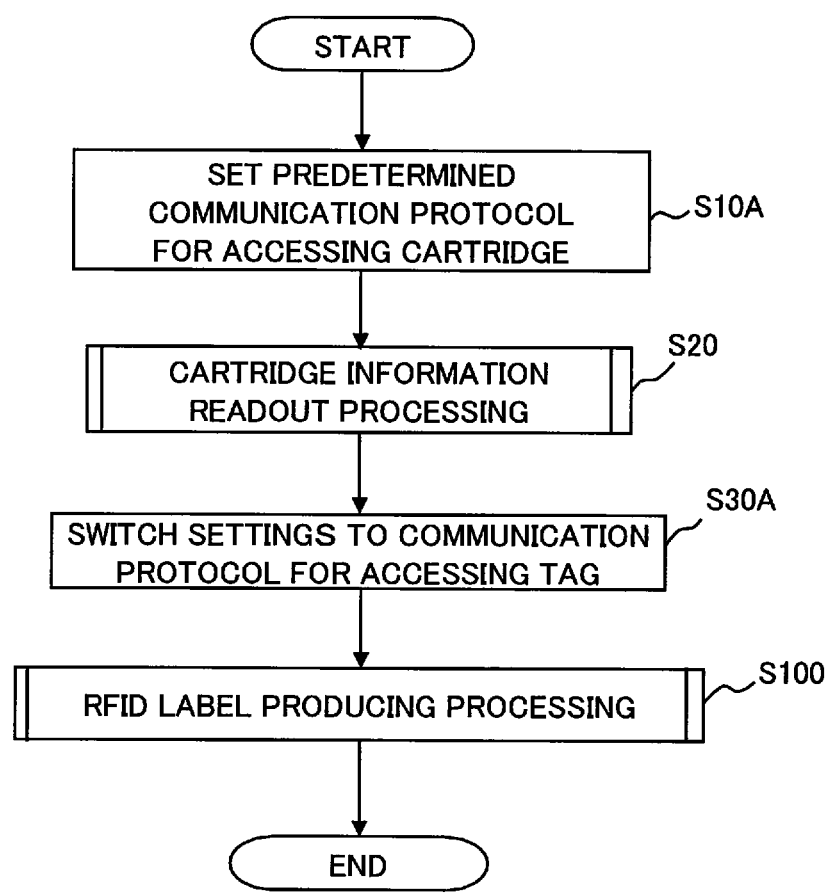
FIG. 15 is a flowchart which shows a control procedure executed by a control circuit.

FIG. 15 is a flowchart which shows a control procedure executed by the control circuit 30 included in the apparatus 2 for communicating with a RFID tag according to the present embodiment, and corresponds to FIG. 9 described in the aforementioned first embodiment. Here, the same steps as those shown in FIG. 9 are denoted by the same reference numerals.

In FIG. 15, upon performance of the readout operation at the apparatus 2 for communicating with a RFID tag, this flow starts. First, in Step S10A, which is provided instead of Step S10, the communication protocol, which is used for transmission/reception via wireless communication using the antenna 14, is set to a predetermined fixed protocol determined for communication with the RFID circuit element Tc.

Next, the flow proceeds to Step S20. In Step S20, readout processing is performed for the aforementioned cartridge information stored beforehand within the memory part 157 of the RFID circuit element Tc using the communication protocol determined in the aforementioned Step S10A as described above.

Subsequently, the flow proceeds to Step S30A, which is provided instead of Step S30. In Step S30A, the communication protocol, which is used for transmission/reception via wireless communication using the antenna 14, is set to a predetermined fixed protocol determined for communication with a protocol (for communication with the RFID circuit element To) determined based upon the cartridge information acquired in the aforementioned Step S20. Note that description is being made regarding an arrangement in which the communication protocol is switched between the protocol for accessing the cartridge and the protocol for creating the RFID labels as described above. Furthermore, let us say that the same frequency band is employed for the RFID circuit element To and the RFID circuit element Tc. Note that it is needless to say that an arrangement may also be made in which the communication frequency band is switched (see third embodiment described later).

Subsequently, the flow proceeds to Step S100 which is the same step as described above. In Step S100, a RFID label producing process is performed. Specifically, the RFID tag information stored in the memory part 157 of the IC circuit part 151 of each RFID circuit element To is read out using the communication protocol set in the aforementioned Step S30A. At the same time, predetermined printing is performed on the cover film 103. Subsequently, the tag label tape 110 with print is cut off in increments of the RFID circuit elements To, thereby forming the RFID labels T, whereupon this flow ends.

With the present embodiment, the RFID labels T are created using the RFID circuit elements To stored in the cartridge 100 while identifying the type of the cartridge 100, which is to be replaced with an appropriate one as appropriate, in the same way as with the aforementioned first embodiment. With such an arrangement, both the second access information for accessing the RFID circuit element Tc for identifying the cartridge and the first access information for accessing the RFID circuit element To on the RFID label are created by the same signal processing circuit 22. The present embodiment provides the same advantage as those provided by the aforementioned first embodiment, i.e., a simple circuit configuration, thereby providing the small-sized and lightweight overall system of the apparatus 2 for communicating with a RFID tag at reduced costs.

Furthermore, with such an arrangement, separate communication protocols are employed for transmission of the first access information to the RFID circuit element To via the antenna 14 and transmission of the second access information to the RFID circuit element Tc via the antenna 14. Such an arrangement prevents erroneous communication in a sure manner, such as an undesired communication in which access is made to an undesired RFID circuit element To for producing RFID label which is not a target when the cartridge is to be identified, and an undesired communication in which access is made to the undesired RFID circuit element Tc for identifying the cartridge when the RFID labels are to be created.

Note that it is not needless to say that an arrangement may be made in which access is made via the separate antennas 14 and 19 as described in the aforementioned first embodiment using communication protocols that differ from one another as described in the present second embodiment. Such an arrangement provides the same advantage as that provided by the second embodiment, i.e., the advantage of preventing erroneous communication in a sure manner.

Description will be made regarding a third embodiment of the present invention with reference to FIG. 16 and FIG. 17. The present embodiment employs the common antenna 14 in the same way as with the aforementioned second embodiment. Furthermore, with the present embodiment, the communication frequency band used for communication via the antenna 14 is switched, thereby allowing the apparatus 2 for communicating with a RFID tag to access the RFID circuit element To for creating the RFID label T and to access the RFID circuit element Tc for reading out the cartridge information. The same components as those of the aforementioned second embodiment are denoted by the same reference numerals, and description thereof will be omitted as appropriate.

Figure 16:
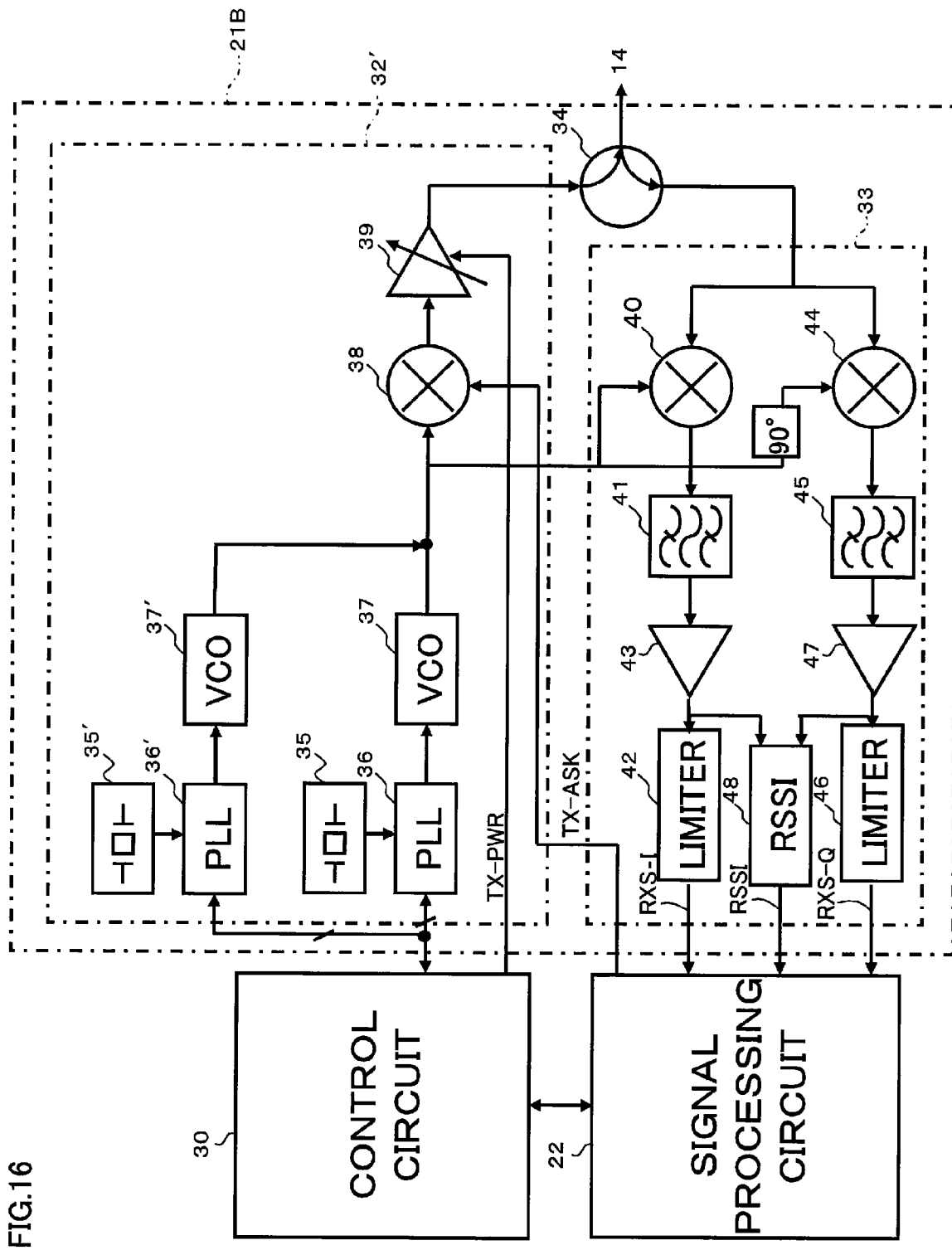
FIG. 16 is a functional block diagram which shows a function of a radio frequency circuit included in an apparatus for communicating with a RFID tag according to a third embodiment.

FIG. 16 is a functional block diagram which shows a function of a radio frequency circuit 21B included in the apparatus 2 for communicating with a RFID tag according to the present embodiment in detail, and corresponds to FIG. 14 described in the aforementioned second embodiment 2. As shown in FIG. 16, the radio frequency circuit 21B further includes another set of a quartz oscillator 35', a PLL 36', and a VCO 37', which has the same functions as those of the aforementioned set of the quartz oscillator 35, the PLL 36, and the VCO 37, in addition to the set of the quartz oscillator 35, the PLL 36, and the VCO 37 configured to generate a carrier wave as described above. These component sets provide carrier waves with frequency bands that differ from one another. For example, the set of quartz oscillator 35, the PLL 36, and the VCO 37 is configured so as to generate a carrier wave with a frequency of 2.45 GHz. On the other hand, the set of quartz oscillator 35', the PLL 36', and the VCO 37' is configured so as to generate a carrier wave with a frequency of 915 MHz. Furthermore, with such an arrangement, the selected one of these carrier waves is supplied to the transmission multiplying circuit 38 according to a control signal received from the control circuit 30. Note that an arrangement may be made in which ON/OFF switching is made in increments of units each of which comprises a quartz oscillator, a PLL, and a VCO, as described above. Also, an arrangement may be made in which these two units are maintained in the ON state (i.e., a mode for generating a carrier wave), and a selected one carrier wave is supplied using an output selection unit (not shown) provided to the output of each unit.

Furthermore, there is a difference in the frequency properties of the receiving sensitivity between the RFID circuit element To for creating the RFID label T and the RFID circuit element Tc for identifying the cartridge. That is to say, for example, the RFID circuit element To exhibits the maximum receiving sensitivity for a carrier wave at a frequency of 2.45 GHz. On the other had, the RFID circuit element Tc exhibits the maximum receiving sensitivity for a carrier wave at a frequency of 915 MHz.

Figure 17:
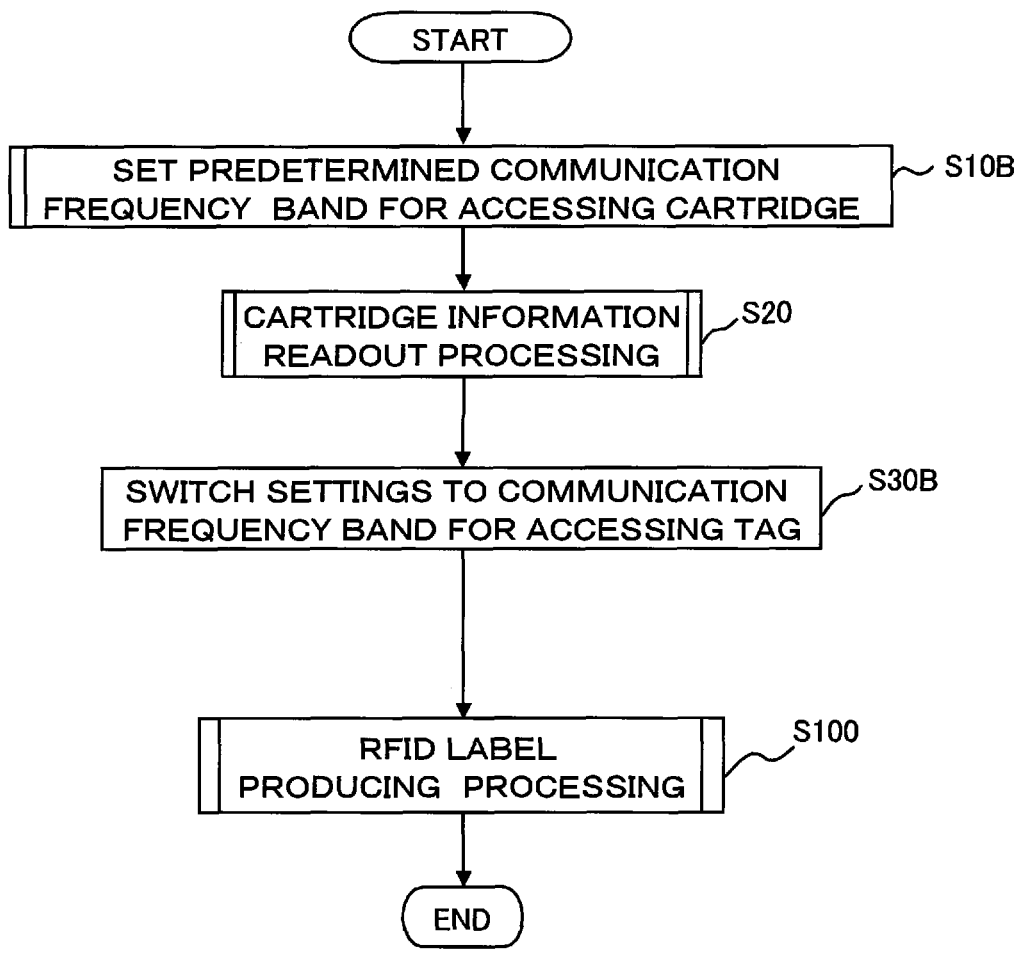
FIG. 17 is a flowchart which shows a control procedure executed by a control circuit.

FIG. 17 is a flowchart which shows a control procedure executed by the control circuit 30 included in the apparatus 2 for communicating with a RFID tag according to the present embodiment. Here, the same steps as those shown in FIG. 15 are denoted by the same reference numerals.

In FIG. 17, upon performance of the readout operation at the apparatus 2 for communicating with a RFID tag, this flow starts. First, in Step S10B, which is provided instead of Step S10A, the communication frequency band, which is used for transmission/reception via wireless communication using the antenna 14, is set to a predetermined fixed communication frequency band for communication with the RFID circuit element Tc (in other words, settings are performed such that the control circuit 30 outputs a carrier wave generating instruction signal to the set of the quartz oscillator 35', the PLL 36', and the VCO 37' in the following Step S20 where the cartridge information is read out. At the same time, the other set of the quartz oscillator 35, the PLL 36, and the VCO 37 is set to the OFF state in which these components do not operate.).

Next, the flow proceeds to Step S20. In Step S20, a carrier wave generating instruction signal is output to the set of the quartz oscillator 35', the PLL 36', and the VCO 37'. As a result, with the aforementioned example, a carrier wave at 915 MHz is output, thereby reading out the aforementioned cartridge information stored beforehand in the memory part 157 of the RFID circuit element Tc as described above.

Subsequently, the flow proceeds to Step S30B, which is provided instead of Step S30. In Step S30B, the communication frequency for transmission/reception via wireless communication using the antenna 14 is switched to a frequency determined based upon the cartridge information acquired in the aforementioned Step S20 (in the aforementioned example, settings are performed such that the control circuit 30 outputs a carrier wave generating instruction signal to the set of the quartz oscillator 35, the PLL 36, and the VCO 37. At the same time, the other set of the quartz oscillator 35', the PLL 36', and the VCO 37' is set to the OFF state in which these components do not operate, for example). Note that, with such an arrangement, the communication frequency band is switched between the frequency band for accessing the cartridge and the frequency band for creating the RFID labels as described above. On the other hand, the same communication protocol is used for both the RFID circuit element To and the RFID circuit element Tc. Note that it is needless to say that the communication protocol may also be switched (see the second embodiment described above).

Subsequently, the flow proceeds to Step S100 in the same way as described above. In Step S100, a carrier wave generating instruction signal is output to the set of the quartz oscillator 35, the PLL 36, and the VCO 37, according to the settings made in the aforementioned Step S30, thereby generating a carrier wave at 2.45 GHz in this example. As a result, the RFID tag information stored in the memory part 157 of the IC circuit part 151 of the RFID circuit element To is read out in the same way as described above. At the same time, predetermined printing is performed on the cover film 103. Subsequently, the tag label tape 110 with print is cut off in increments of the RFID circuit elements To, thereby performing the RFID label producing process for creating the RFID labels T, whereupon this flow ends.

With the present embodiment, the RFID labels T are created using the RFID circuit elements To stored in the cartridge 100 while identifying the type of the cartridge 100, which is to be replaced with an appropriate one as appropriate, in the same way as with the aforementioned second embodiment. With such an arrangement, both the second access information for accessing the RFID circuit element Tc for identifying the cartridge and the first access information for accessing the RFID circuit element To on the RFID label are created by the same signal processing circuit 22. Furthermore, the second access information and the first access information are transmitted using a shared radio frequency circuit transmitting portion 32' (except for the set of the quartz oscillator 35, PLL 36, and the VCO 37, and the set of the quartz oscillator 35', PLL 36', and the VCO 37'). The present embodiment provides the same advantage as described above, i.e., a simple circuit configuration, thereby providing the small-sized and lightweight overall system of the apparatus 2 for communicating with a RFID tag at reduced costs.

Furthermore, with such an arrangement, separate communication frequency bands are employed for transmission of the first access information to the RFID circuit element To via the antenna 14 and transmission of the second access information to the RFID circuit element Tc via the antenna 14. Such an arrangement provides a difference in the received electric power between the RFID circuit element To and the RFID circuit element Tc each of which is a radio wave receiver. This enables only one selected from the RFID circuit element To and the RFID circuit element Tc to operate. As a result, such an arrangement prevents erroneous communication in a sure manner, such as an undesired communication in which access is made to an undesired RFID circuit element To for producing RFID label which is not a target when the cartridge is to be identified, and an undesired communication in which access is made to the undesired RFID circuit element Tc for identifying the cartridge when the RFID labels are to be created.

Note that it is not needless to say that an arrangement may be made in which access is made via the separate antennas 14 and 19 as described in the aforementioned first embodiment using communication frequency bands that differ from one another as described in the present third embodiment. Such an arrangement provides the same advantage as that provided by the present third embodiment, i.e., the advantage of preventing erroneous communication in a sure manner.

Description will be made regarding a fourth embodiment of the present invention with reference to FIG. 18 through FIG. 22. The present embodiment employs a common antenna (micro strip antenna) 14' as the antenna unit. With such an arrangement, the polarization plane (which is defined by the electric field of the signal generated from the antenna, and which is defined along an arbitrary plane including the antenna) of the antenna 14' is switched between planes that cross one another at approximately 90°. This allows the apparatus 2 for communicating with a RFID tag to access the RFID circuit element To for creating the RFID label T and to access the RFID circuit element Tc for reading out the cartridge information. The same components as those of the aforementioned first embodiment are denoted by the same reference numerals, and description thereof will be omitted as appropriate.

Figure 18:
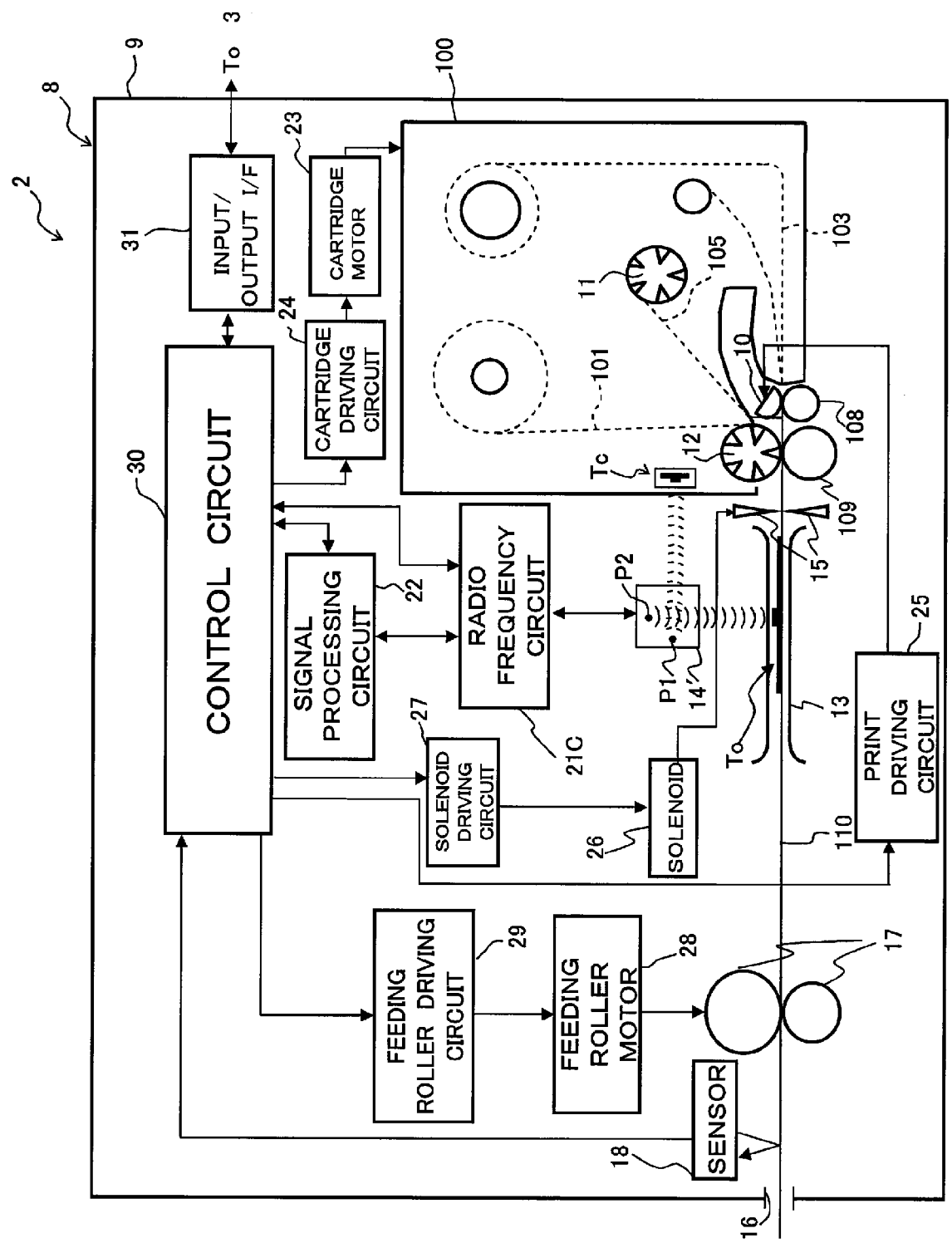
FIG. 18 is a conceptual configuration diagram which shows a detailed configuration of an apparatus for communicating with a RFID tag according to a fourth embodiment of the present invention.

FIG. 18 is a schematic configuration diagram which shows a configuration of the apparatus 2 for communicating with a RFID tag according to the present embodiment, and corresponds to FIG. 2 described in the aforementioned first embodiment. In FIG. 18, only the aforementioned common antenna 14' (the single common antenna 141, in this example) is connected to a radio frequency circuit 21C as described above. Such an arrangement allows signals to be transmitted/received between the antenna 14' and the RFID circuit element To (RFID circuit elements for producing RFID labels) provided on the tag label tape 110 with print and the RFID circuit element Tc (RFID circuit element for identifying cartridge) provided to the cartridge 100 using radio frequency bands such as UHF band etc.

Figure 19A:
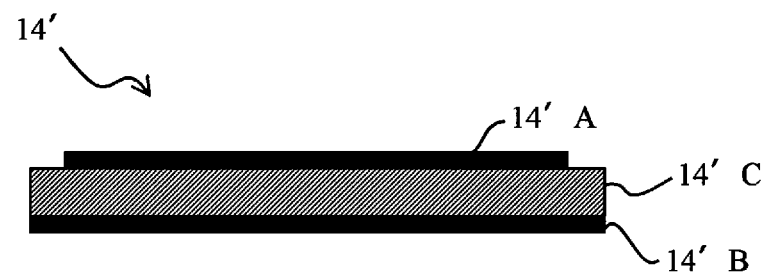
FIG. 19A shows a side view that shows a detailed configuration of an antenna.
Figure 19B:
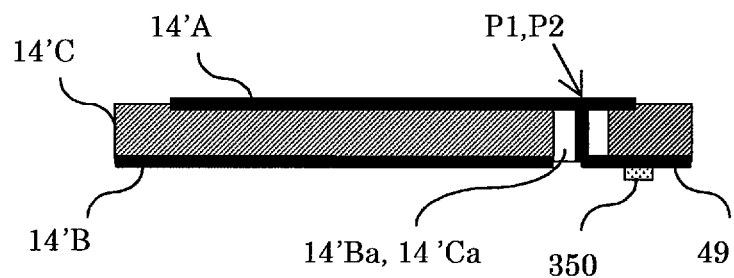
FIG. 19B shows a cross-sectional view that shows a detailed configuration of an antenna.

FIG. 19A is a side view which shows a configuration of the aforementioned antenna 14' in detail. On the other hand, FIG. 19B is a cross-sectional view thereof. As shown in FIG. 19A and FIG. 19B, the antenna 14' includes a micro strip antenna element 14'A on one face thereof (the upper face thereof in the drawing). The antenna 14' includes a base 14'B on the other face thereof (the lower face thereof). Furthermore, the antenna 14' includes a dielectric member 14'C introduced between the micro strip antenna element 14'A and the base 14'B.

The base 14'B and the dielectric member 14'C has through holes 14'Ba and 14'Ca at two positions along the thickness direction. Furthermore, a micro strip line 49, which serves as a power supply line for the antenna 14' and of which one terminal is connected to the radio frequency circuit 21C (see FIG. 21 described later), is connected to a polarization plane switch 350 (polarization plane control unit). Furthermore, two power supply lines 49A, which are connected to the switch 350 in a shape such that the micro strip line 49 forks into the two power supply lines 49A, are extended such that they are connected to power supply points P1 and P2 provided at two positions on the micro strip antenna element 14A via the through holes 14'Ba and 14'Ca.

Figure 20A:
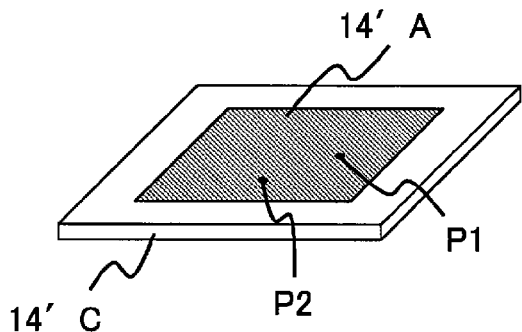
FIG. 20A shows a disassembled perspective view showing the configuration of the antenna.
Figure 20B:
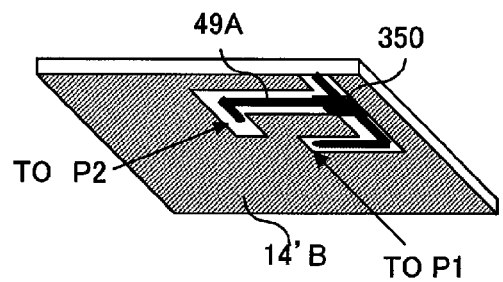
FIG. 20B shows a disassembled perspective view showing the configuration of the antenna.

FIG. 20A is a perspective view which shows a schematic structure of the upper face of the micro strip antenna element 14'A and the dielectric member 14C'. FIG. 20B is a perspective view which shows a schematic structure of the lower face of the base 14'B. On the other hand, FIG. 20C is an explanatory diagram which shows a configuration how the antenna 14' and the radio frequency circuit 21C are electrically connected to each other.

Figure 20C:
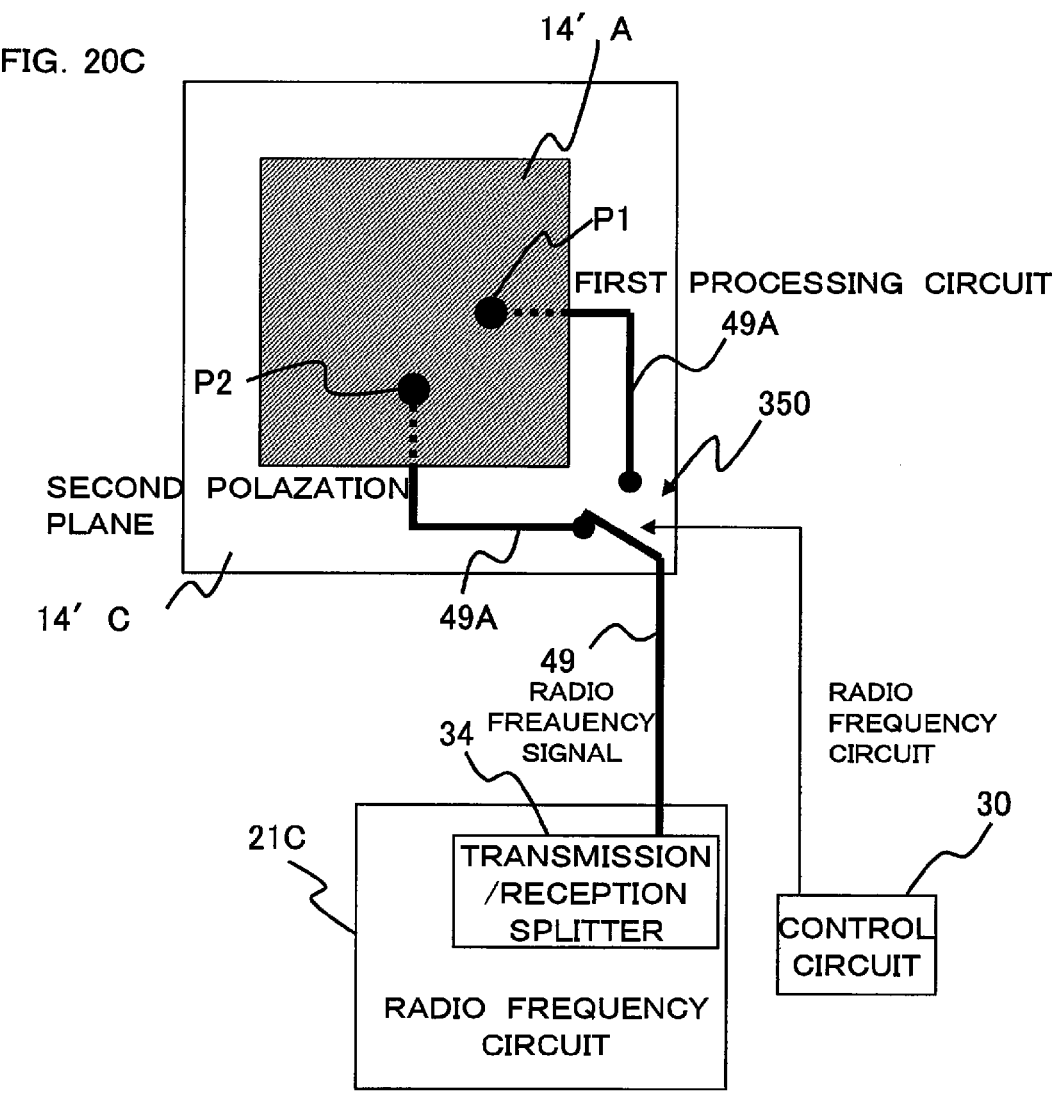
FIG. 20C shows an explanatory diagram which shows the electrical connection relation between the antenna and the radio frequency circuit.

As shown in FIG. 20A through FIG. 20C, the aforementioned antenna element 14'A has a first polarization power supply point P1 for providing the polarization plane to the antenna 14' for communication with the aforementioned RFID circuit element To, and a second polarization power supply point P2 for providing the polarization plane to the antenna 14' for communication with the aforementioned RFID circuit element Tc.

Figure 21:
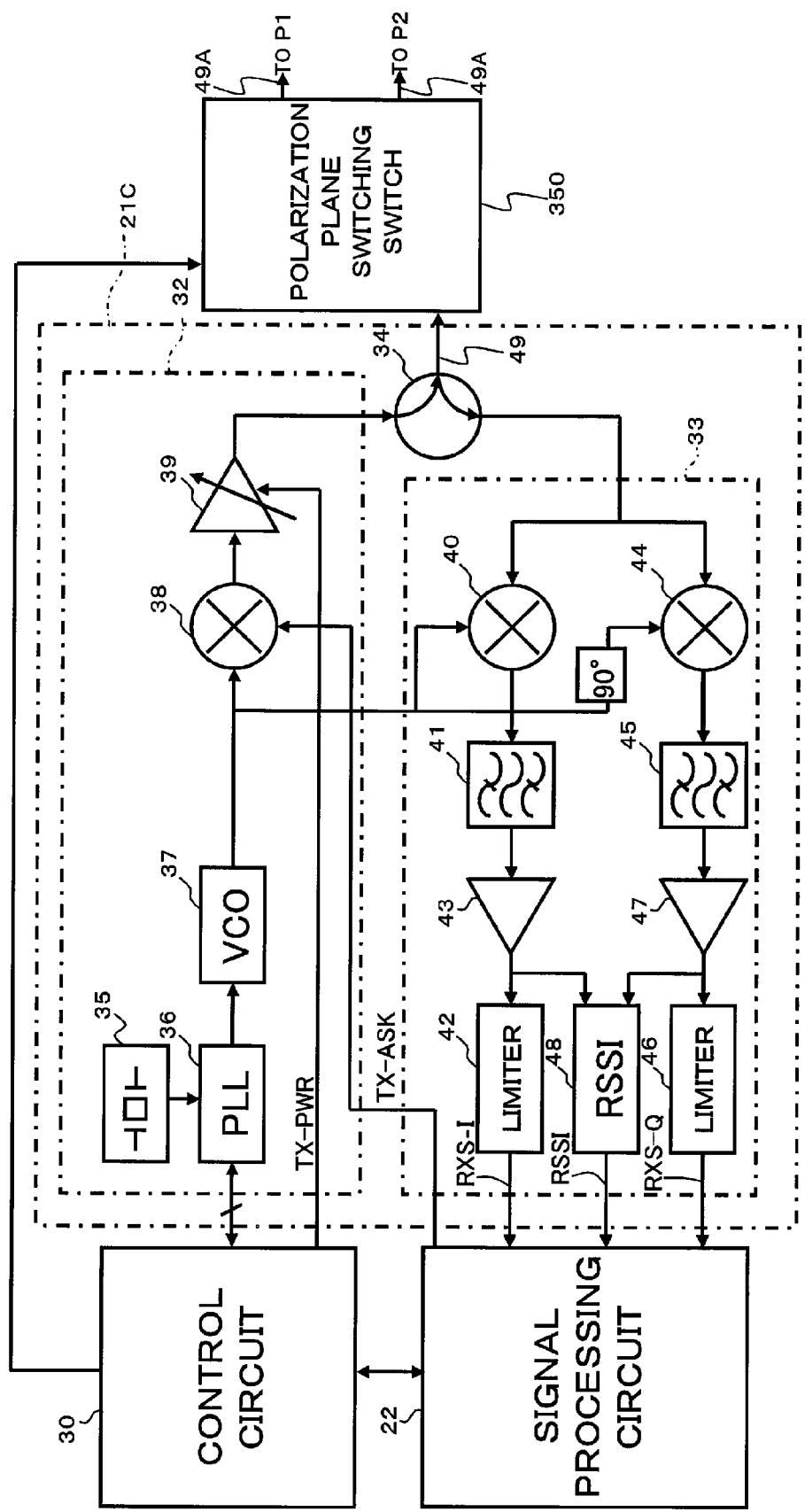
FIG. 21 is a functional block diagram which shows a function of the radio frequency circuit in detail.

FIG. 21 is a functional block diagram which shows a function of the aforementioned radio frequency circuit 21C in detail. As shown in FIG. 21 and the aforementioned FIG. 20C, the radio frequency circuit 21 includes the aforementioned polarization plane switch 350 which performs switching operation according to a switching signal received from the control circuit 30. Upon switching the polarization plane switch 350 to the first polarization mode shown in FIG. 20A, the radio frequency signal from the radio frequency circuit transmitting portion 32 is introduced to the first polarization supply point P1, thereby providing the first polarization plane suitable for transmission/reception of signals to/from the RFID circuit element To. On the other hand, upon switching the polarization plane switch 350 to the second polarization mode shown in FIG. 20A, the radio frequency signal is introduced to the second polarization supply point P2, thereby providing the second polarization plane suitable for transmission/reception of signals to/from the RFID circuit element Tc (which is approximately orthogonal to the aforementioned first polarization plane).

That is to say, in general, let us consider a case in which radio communication is made between two antennas. In this case, in a case that the polarization planes of the two antennas are parallel with each other, communication is made with the maximum communication signal intensity. On the other hand, let us consider a case in which the two antennas are not parallel with each other, i.e., they cross one another at a certain cross angle. In this case, the greater the cross angle is, the smaller the intensity of the communication signal is. The present embodiment has a configuration as follows using such a phenomenon. Specifically, the first polarization plane provided by the power supply to the aforementioned first polarization power supply point P1 is approximately parallel to the polarization plane provided by the antenna 152 of the RFID circuit element To held within the access area by the feeding guides 13. Furthermore, the first polarization plane is approximately orthogonal to the polarization plane provided by the antenna 152 of the RFID circuit element Tc. On the other hand, the second polarization plane provided by the power supply to the aforementioned second polarization power supply point P2 is approximately orthogonal to the polarization plane provided by the antenna 152 of the RFID circuit element To held within the access area by the feeding guides 13. Furthermore, the second polarization plane is approximately parallel to the polarization plane provided by the antenna 152 of the RFID circuit element Tc.

Figure 22:
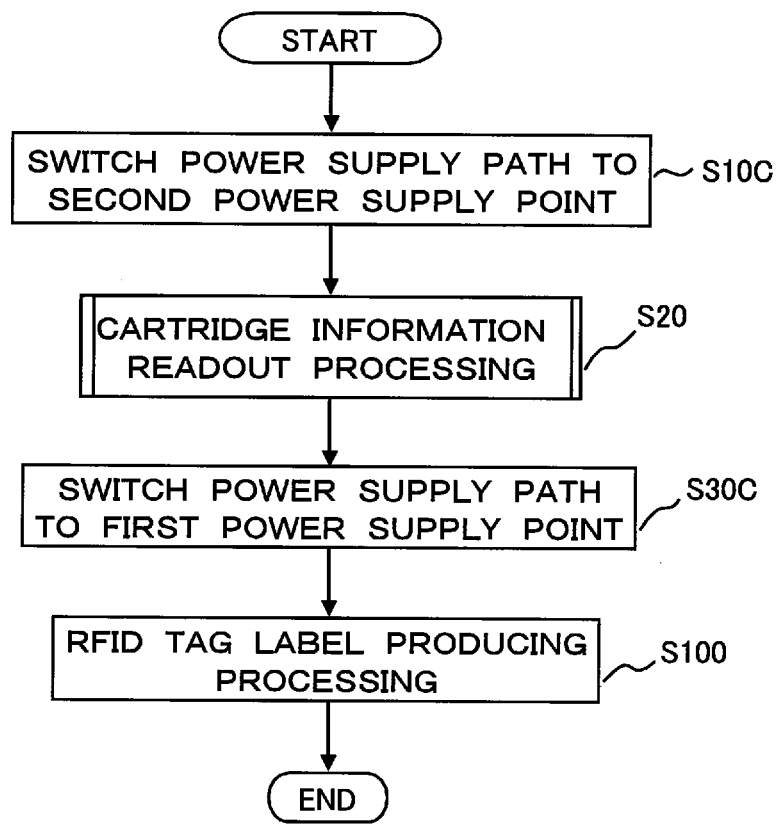
FIG. 22 is a flowchart which shows a control procedure executed by the control circuit.

FIG. 22 is a flowchart which shows a control procedure executed by the control circuit 30 included in the apparatus 2 for communicating with a RFID tag according to the present embodiment, and corresponds to FIG. 15 described in the aforementioned second embodiment. The same steps as those shown in FIG. 15 are denoted by the same reference numerals.

In FIG. 22, upon performance of the readout operation at the apparatus 2 for communicating with a RFID tag, this flow starts. First, in Step S10C, which is provided instead of Step S10A, a switching signal is output to the polarization plane switch 350 such that a radio wave signal is introduced to the second polarization supply point P2.

Next, the flow proceeds to Step S20. In Step S20, readout processing is performed for the aforementioned cartridge information stored beforehand in the memory part 157 of the RFID circuit element Tc in the same way as described above, while maintaining the second polarization plane of the antenna 14' suitable for communication with the RFID tag circuit Tc, which has been set by the switching operation performed in the aforementioned Step S10C.

Subsequently, the flow proceeds to Step S30C which is provided instead of Step S30. In Step S30, a switching signal is output to the polarization plane switch 350 such that a radio wave signal is introduced to the first polarization power supply point P1.

Next, the flow proceeds to Step S100. In Step S100, readout processing is performed for the RFID tag information stored in the memory part 157 of the RFID circuit element To in the same way as described above, while maintaining the first polarization plane of the antenna 14' suitable for communication with the RFID tag circuit To, which has been set by the switching operation performed in the aforementioned Step S30C. At the same time, predetermined printing is performed on the cover film 103. Subsequently, the tag label tape 110 with print is cut off in increments of the RFID circuit elements To, thereby performing the RFID label producing process for creating the RFID labels T, whereupon this flow ends.

With the present embodiment, the RFID labels T are created using the RFID circuit elements To stored in the cartridge 100 while identifying the type of the cartridge 100, which is to be replaced with an appropriate one as appropriate, in the same way as with the aforementioned second embodiment. With such an arrangement, both the second access information for accessing the RFID circuit element Tc for identifying the cartridge and the first access information for accessing the RFID circuit element To on the RFID label are created by the shared signal processing circuit 22. Furthermore, the second access information and the first access information are transmitted using the shared radio frequency circuit transmitting portion 32 via the antenna 14'. The present embodiment provides the same advantage as described above, i.e., a simple circuit configuration, thereby providing the small-sized and lightweight overall system of the apparatus 2 for communicating with a RFID tag at reduced costs.

Furthermore, with such an arrangement, the direction of the polarization plane provided by the antenna 14' is switched between different directions, i.e., the direction of the polarization for transmitting the first access information to the RFID circuit element To and the direction of the polarization for transmitting the second access information to the RFID circuit element Tc. Such an arrangement allows the received electric power of the RFID circuit elements To and Tc that receive radio waves to be greatly changed. That is to say, as described above, the direction of the polarization plane provided by the RFID circuit element To and the direction of the polarization plane provided by the RFID circuit element Tc are approximately orthogonal to one another. Let us consider a case in which a signal is transmitted via the antenna 14' with the first polarization plane. In this case, the RFID circuit element To receives the signal with a great electric field strength, thereby receiving great electric power. On the other hand, the RFID circuit element Tc receives the signal with extremely small electric field strength, thereby receiving small electric power. On the other hand, let us consider a case in which a signal is transmitted via the antenna 14' with the second polarization plane. In this case, the RFID circuit element Tc receives the signal with a great electric field strength, thereby receiving great electric power. On the other hand, the RFID circuit element To receives the signal with extremely small electric field strength, thereby receiving small electric power. As a result, such an arrangement enables only the selected one of the RFID circuit elements To ad Tc to operate. Thus, such an arrangement prevents erroneous communication in a sure manner, such as an undesired communication in which access is made to an undesired RFID circuit element To for producing RFID label which is not a target when the cartridge is to be identified, and an undesired communication in which access is made to the undesired RFID circuit element Tc, which is not a target, for identifying the cartridge when the RFID labels are to be created.

Note that it is not needless to say that an arrangement may be made in which access is made via the separate antennas 14 and 19 as described in the aforementioned first embodiment using polarization plane directions that differ from one another as described in the present fourth embodiment. Such an arrangement provides the same advantage as that provided by the present fourth embodiment, i.e., the advantage of preventing erroneous communication in a sure manner. Furthermore, it is needless to say that an arrangement may be made having a function of switching the communication protocol, or a function of switching the communication frequency band, in addition to the aforementioned function (see the aforementioned second and third embodiments).

Description will be made regarding a fifth embodiment according to the present invention with reference to FIG. 23 through FIG. 25. The present embodiment employs an array-type antenna 14 including multiple (three, in this example) antenna elements 14A, 14B, and 14C. Such an arrangement provides both a function of accessing the RFID circuit element To for creating the RFID label T and a function of accessing the RFID circuit element Tc for reading out the cartridge information by switching the directivity (directional angle) of the antenna 14. The same components as those described in the aforementioned first embodiment are denoted by the same reference numerals, and description thereof will be omitted as appropriate.

Figure 23:
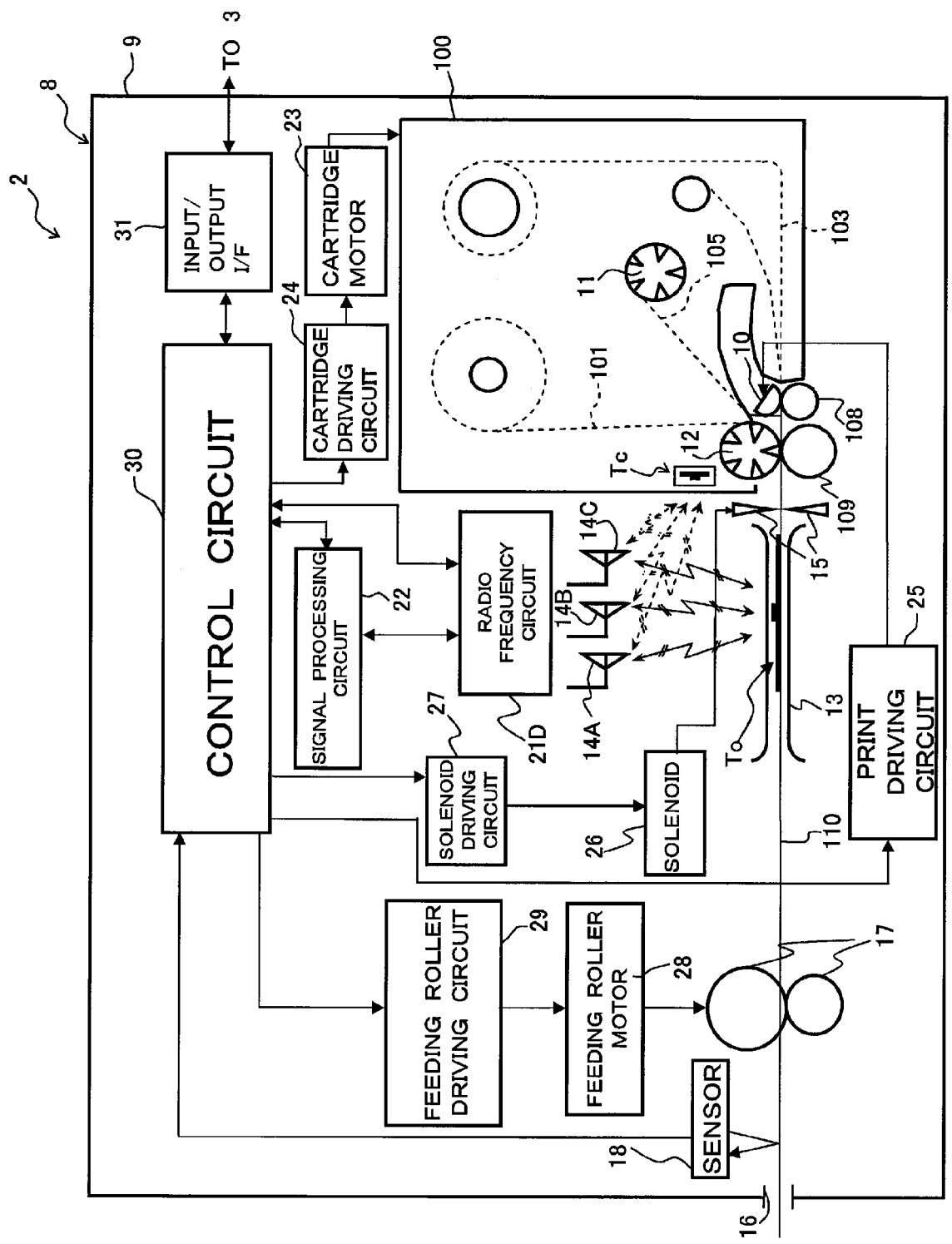
FIG. 23 is a conceptual configuration diagram which shows a detailed configuration of an apparatus for communicating with a RFID tag according to a fifth embodiment.

FIG. 23 is a schematic configuration diagram which shows a detailed configuration of the apparatus 2 for communicating with a RFID tag according to the present embodiment, and corresponds to FIG. 4 in the aforementioned first embodiment. In FIG. 23, the three antenna elements 14A, 14B, and 14C are connected to a radio frequency circuit 21D, as described above. With such an arrangement, these antenna elements 14A through 14C allows signals to be transmitted/received to/from the RFID circuit elements To (RFID circuit element for producing a RFID label) provided on the tag label tape 110 with print and the RFID circuit element Tc (RFID circuit element for identifying cartridge) provided to the cartridge 100 via wireless communication using radio frequency bands such as UHF band etc.

Figure 24:
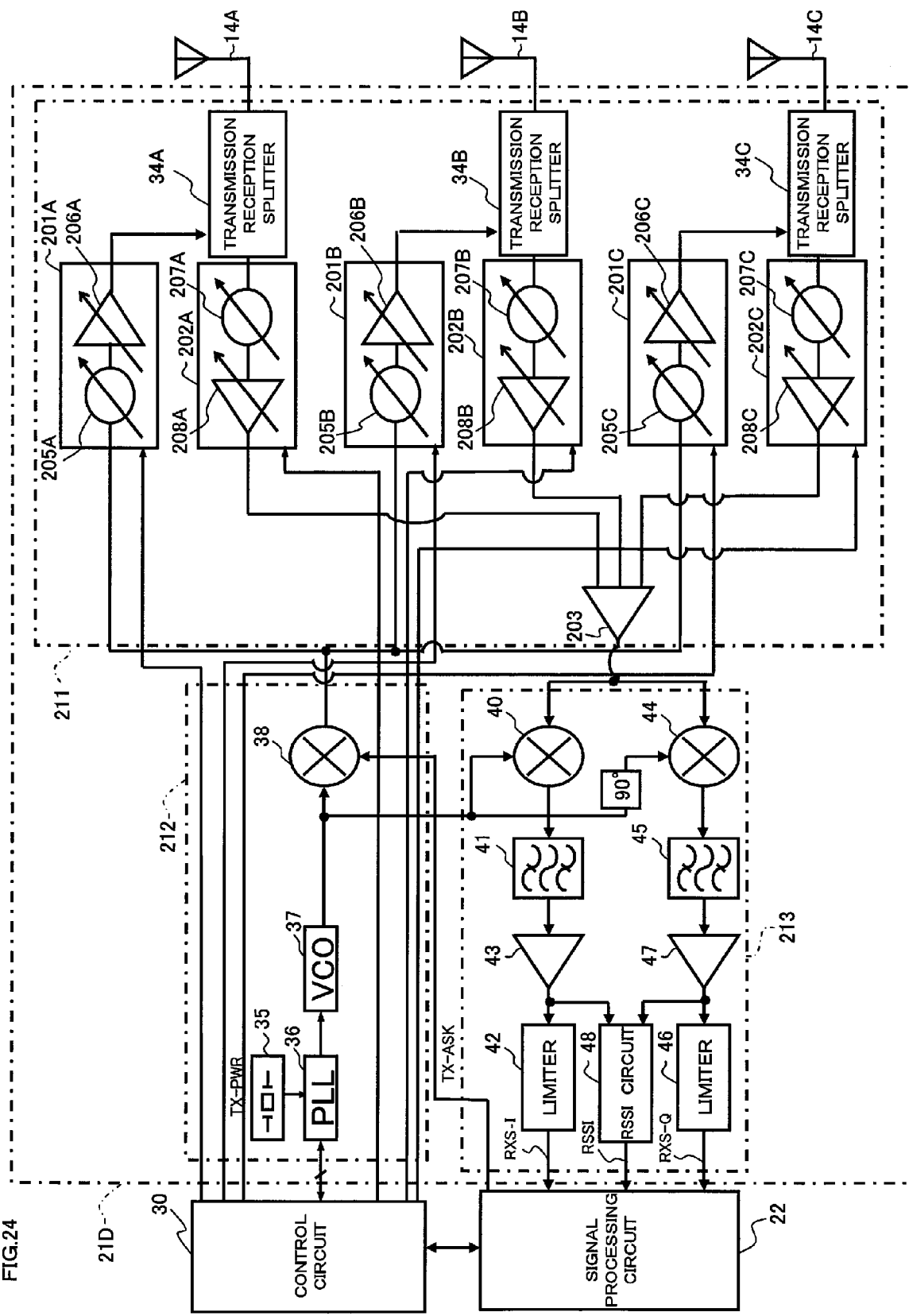
FIG. 24 is a functional block diagram which shows a function of a radio frequency circuit in detail.

FIG. 24 is a functional block diagram which shows a function of the aforementioned radio frequency circuit 21D in detail, and corresponds to FIG. 4 described in the aforementioned first embodiment. As shown in FIG. 24, the radio frequency circuit 21D comprises a directivity control unit (phased array control unit or beam forming control unit) 211, a transmitting portion 212, and a receiving portion 213. The directivity control unit (phased array control unit or beam forming control unit) 211 is connected to the aforementioned antenna elements 14A through 14C having both a transmission function and a reception function, and which serves as directivity control unit. The transmitting portion 212 transmits signals to the RFID circuit elements To and Tc from the antenna elements 14A through 14C via the directivity control unit 211. The receiving portion 213 allows reflected waves to be input. The waves have been reflected from the RFID circuit element To and Tc, and which have been received via the antenna elements 14A through 14C.

The directivity control unit 211 includes wave transmission control units 201A, 201B, and 201C, wave reception control units 202A, 202B, and 202C, an adder 203, and a transmit-receive splitter 34A (which comprises a circulator or the like, for example. The same can be said of other splitters), a transmit-receive splitter 34B, and a transmit-receive splitter 34C. The wave transmission control units 201A, 201B, and 201C correspond to the antenna elements 14A, 14B, and 14C, respectively. The wave reception control units 202A, 202B, and 202C correspond to the antenna elements 14A, 14B, and 14C, respectively. The adder 203 adds the outputs from the wave reception control unit 202A, 202B, and 202C. The transmit-receive splitter 34A connects a selected one of the wave transmission control unit 201A and the wave receiving portion 202A to the antenna element 14A. For instance, the transmit-receive splitter 34A transmits a signal from the wave transmission control unit 201A to the antenna element 14A and transmits a signal received via the antenna element 14A to the wave reception control unit 202A. The transmit-receive splitter 34B connects a selected one of the wave transmission control unit 201B and the wave receiving portion 202B to the antenna element 14B. The transmit-receive splitter 34C connects a selected one of the wave transmission control unit 201C and the wave receiving portion 202C to the antenna element 14C.

The wave transmission control units 201A, 201B, and 201C include phase controllers 205A, 205B, and 205C, and transmission variable gain amplifiers 206A, 206B, 206C. The phase controllers 205A, 205B, and 205C receives wave transmission control signals from the control circuit 30, and variably sets the phases of the signals, which are to be transmitted via the antenna elements 14A, 14B, and 14C, according the wave transmission control signals. The transmission variable gain amplifiers 206A, 206B, 206C receives amplitude control signals contained in the wave transmission control signals from the control circuit 30, and amplifies the signals, which have been received from the phase controllers 205A, 205B, and 205C, according to the amplitude control signals, and further outputs the signals thus amplified to the aforementioned transmit-receive splitters 34A, 34B, and 34C.

The wave reception control units 202A, 202B, and 202C include phase controllers 207A, 207B, and 207C and reception variable gain amplifiers 208A, 208B, 208C. The phase controllers 207A, 207B, and 207C receives wave reception control signals from the control circuit 30, and a variably sets the phases of the signals, which have been received via the antenna elements 14A, 14B, and 14C, according the wave transmission control signals. The reception variable gain amplifiers 208A, 208B, 208C receives amplitude control signals contained in the wave transmission control signals from the control circuit 30, and amplifies the signals, which have been received from the phase controllers 207A, 207B, and 207C, according to the amplitude control signals, and then outputs the signals thus amplified to the aforementioned adder 203. Also, variable attenuators may be employed, instead of the transmission variable gain amplifiers 206A, 206B, and 206C, and the reception variable gain amplifiers 208A, 208B, and 208C.

The transmitting portion 212 includes the quartz oscillator 35, the PLL 36, the VCO 37 and a transmission multiplying circuit 38. The quartz oscillator 35, the PLL 36, and the VCO 37 generates carrier waves for accessing (reading/writing) the RFID tag information stored in the IC circuit parts 151 of the aforementioned RFID circuit elements To and Tc. The transmission multiplying circuit 38 modulates the carrier wave according to a signal supplied from the aforementioned control circuit 30. The modulated waves thus modulated by the aforementioned transmission multiplying circuit 38 are supplied to the aforementioned wave transmission control units 201A, 201B, and 201C. Furthermore, the modulated waves are supplied to the IC circuit parts 151 of the RFID circuit elements To and Tc via the transmit-receive splitters 34A, 34B, and 34C, and the antenna elements 14A, 14B, and 14C.

The receiving portion 213 includes the first receiving signal multiplying circuit 40, the first band-pass filter 41, the first limiter 42, the first receiving signal amplifier 43, the second receiving signal multiplying circuit 44, the second band-pass filter 45, the second limiter 46, the second receiving signal amplifier 47, and the aforementioned RSSI circuit 48. The first receiving signal multiplying circuit 40 multiplies the carrier wave generated by the aforementioned transmitting portion 212 by the sum of the reflected waves reflected from the RFID circuit element To and Tc, with the reflected waves received by the antenna elements 14A, 14B, and 14C, being input to the adder 203 via the aforementioned wave reception control units 202A, 202B, and 202C, and with the sum of the reflected waves being created by the adder 203. The second receiving signal multiplying circuit 44 multiplies the carrier wave, which has been delayed by a phase angle of 90° after having been generated by the transmitting portion 212, by the sum of the reflected waves reflected from the RFID circuit element To and Tc, with the reflected waves received by the antenna elements 14A, 14B, and 14C, being input to the adder 303 via the aforementioned wave reception control units 202A, 202B, and 202C, and with the sum of the reflected waves being created by the adder 203.

The signal processing circuit 22 performs predetermined computation processing after reception of signals from the aforementioned radio frequency circuit receiving portion 213. The signal processing circuit 22 outputs a modulation control signal to the transmission multiplying circuit 38 of the aforementioned transmitting portion 212 according to the computation results. On the other hand, the control circuit 30 outputs the wave transmission control signals, the wave reception control signals, and so forth, to the wave transmission control units 201A, 201B, and 201C, and the wave reception control units 202A, 202B, and 202C.

As an example of the directivity control, the present embodiment provides the so-called directivity control by the phased-array control or the beam forming control, which provides a function of maintaining the directivity, i.e., a function of maintaining the state in which the waves output from the multiple antenna elements 14A, 14B, and 14C, pass through with a great magnitude only in one direction, and a function of switching the direction of the directivity. Now, let us consider a case in which a single signal is propagated obliquely to the antenna elements 14A, 14B, and 14C with a certain angle when the signal is received. In this case, there is a difference in the phase of the received radio wave by the pass difference between the antenna elements 14A, 14B, and 14C. The present embodiment uses the phenomenon. That is to say, with the present embodiment, the phase controllers and the variable gain amplifiers are controlled according to the wave reception control signals such that the there is no difference in the phase between the antenna elements 14A, 14B, and 14C, and there is almost no difference in the amplitude therebetween, thereby providing a function of setting the direction of the directivity (i.e., directional angle) to a desired direction (also, providing a function of transmitting a signal with a desired directional angle in the same way as described above). In particular, the present embodiment provides a function of switching the mode between the signal transmission/reception mode to/from the RFID circuit element To and the signal transmission/reception mode to/from the RFID circuit element Tc by changing the directional angle of the array antenna formed of the antenna elements 14A through 14C according to control of the control circuit 30, which is the principal feature of the present embodiment.

Figure 25:
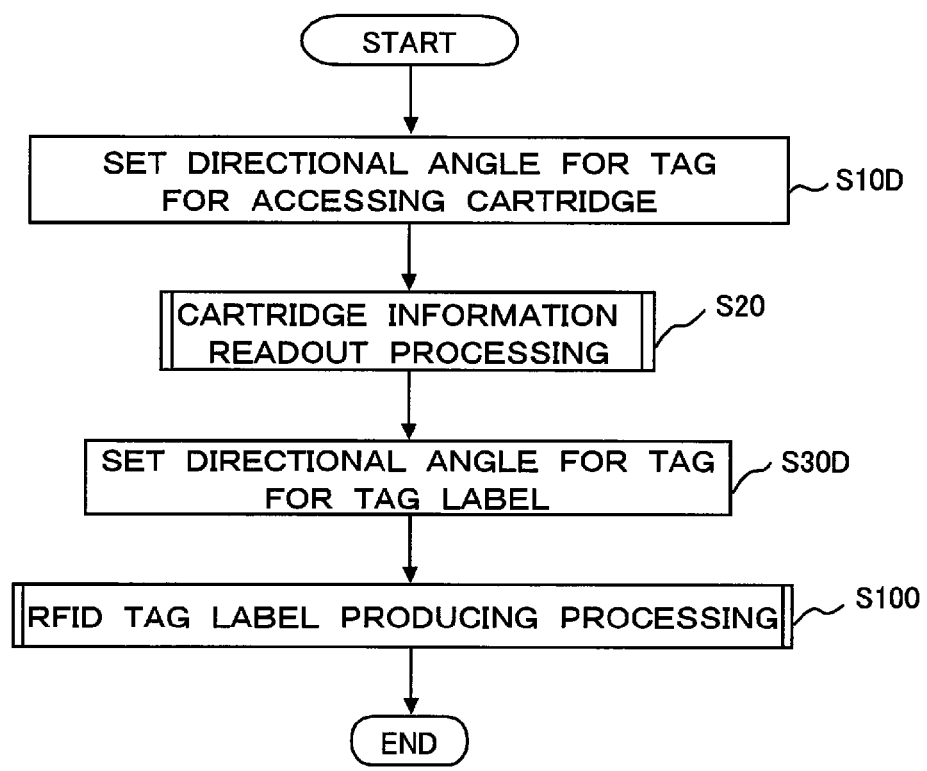
FIG. 25 is a flowchart which shows a control procedure executed by a control circuit.

FIG. 25 is a flowchart which shows a control procedure executed by the control circuit 30 included in the apparatus 2 for communicating with a RFID tag according to the present embodiment, and corresponds to FIG. 9 described in the aforementioned first embodiment. The same steps as those shown in FIG. 9 are denoted by the same reference numerals.

In FIG. 25, upon performance of the readout operation at the apparatus 2 for communicating with a RFID tag, this flow starts. First, in Step S10D, which is provided instead of Step S10, the wave reception control signals, which are to be output to the wave reception control units 202A, 202B, and 202C, and the wave transmission control signals, which are to be output to the wave transmission control units 201A, 201B, and 201C, and so forth, are output such that the directional angle of the aforementioned array-type antenna 14 formed of the antenna elements 14A through 14C is set to the direction toward the RFID circuit element Tc.

Next, the flow proceeds to Step S20. In Step S20, readout processing is performed for the aforementioned cartridge information stored beforehand within the memory part 157 of the RFID circuit element Tc in the same way as described above with the directivity thus set in the aforementioned Step S10D.

Subsequently, the flow proceeds to Step S30D, which is provided instead of Step S30. In Step S30D, the wave reception control signals, which are to be output to the wave reception control units 202A, 202B, and 202C, and the wave transmission control signals, which are to be output to the wave transmission control units 201A, 201B, and 201C, and so forth, are output such that the directional angle of the aforementioned array-type antenna 14 formed of the antenna elements 14A through 14C is set to the direction toward the RFID circuit element To.

Subsequently, the flow proceeds to Step S100. In Step S100, the RFID tag information stored in the memory part 157 of the IC circuit part 151 of the RFID circuit element To is read out with the directivity thus set in the aforementioned Step S30D. At the same time, predetermined printing is performed on the cover film 103. Then, the tag label tape 110 with print is cut off in increments of the RFID circuit elements To, thereby forming the RFID labels T, whereupon this flow ends.

With the present embodiment, the RFID labels T are created using the RFID circuit elements To stored in the cartridge 100 while identifying the type of the cartridge 100, which is to be replaced with an appropriate one as appropriate, in the same way as with the aforementioned first embodiment. With such an arrangement, both the second access information for accessing the RFID circuit element Tc for identifying the cartridge and the first access information for accessing the RFID circuit element To on the RFID label are created by the shared signal processing circuit 22. Furthermore, the second access information and the first access information are transmitted using the shared radio frequency circuit transmitting portion 212. The present embodiment provides the same advantage as described above, i.e., a simple circuit configuration, thereby providing the small-sized and lightweight overall system of the apparatus 2 for communicating with a RFID tag at reduced costs.

Furthermore, the present embodiment provides a function of switching the directional angle of the antenna elements 14A through 14C between different directional angles, i.e., between the directional angle for transmitting the first access information to the RFID circuit element To and the directional angle for transmitting the second access information to the RFID circuit element Tc, thereby enabling the communicable range to be greatly changed (In other words, when the RFID circuit element Tc or To is not a communication target, the non-target RFID circuit element is positioned outside of the communicable range thus set). Such an arrangement prevents erroneous communication in a sure manner, such as an undesired communication in which access is made to an undesired RFID circuit element To for producing RFID label which is not a target when the cartridge is to be identified, and an undesired communication in which access is made to the undesired RFID circuit element Tc for identifying the cartridge when the RFID labels are to be created.

Note that the directional angle control is not restricted to the aforementioned method. For example, an arrangement may also be made in which the directivity of the antenna 14 is controlled by adjusting the voltage control of parasitic elements. With such an arrangement, the unit (e.g., the control circuit 30) configured to control the voltage applied to the parasitic elements serve as the directivity control unit.

Also, it is not needless to say that an arrangement may be made in which access is made using separate antennas 14 and 19 as described in the aforementioned first embodiment, in addition to the aforementioned arrangement according to the fifth embodiment in which each of the antennas are formed of multiple antenna elements, and which provides a function of switching the directivity for communication. Such an arrangement provides the same advantage as that provided by the present fifth embodiment, i.e., the advantage of preventing erroneous communication in a sure manner. Furthermore, it is needless to say that an arrangement may be made having a function of switching the communication protocol, or a function of switching the communication frequency band, in addition to the function of switching the directivity of the antenna (see the aforementioned second to fourth embodiments).

Note that the present invention is not restricted to the aforementioned embodiments. Rather, various modifications may be made without departing from the spirit and technical scope of the present invention. Description will be made below regarding such modifications.

(1-1) An Arrangement Having a Function of Writing Information to a RFID Circuit Element.

While description has been made regarding an arrangement in which the present invention is applied to a readable-only (i.e., unwritable) RFID tag circuit producing system. The present invention is not restricted to such an arrangement. Also, the present invention may be applied to a RFID tag producing system having a function of writing the RFID tag information to the IC circuit part 151 of each RFID circuit element To.

Figure 26:
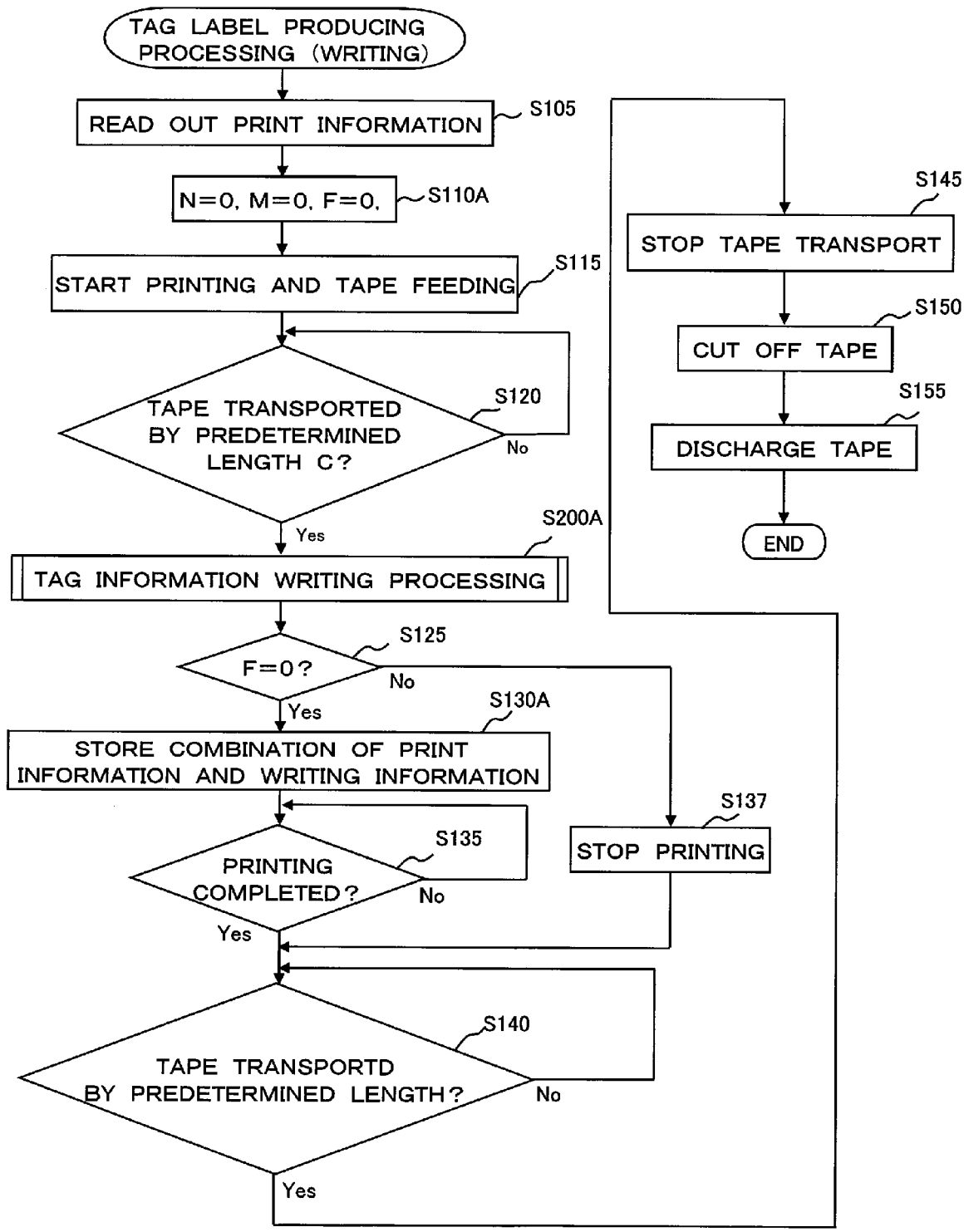
FIG. 26 is a flowchart which shows a procedure for creating the RFID labels, i.e., a procedure for writing information to each RFID circuit element, executed by the control circuit according to a modification.

FIG. 26 is a flowchart which shows a RFID label producing process procedure (RFID tag information writing process procedure, in this arrangement) in Step S100 shown in FIG. 9, FIG. 15, FIG. 17, FIG. 22, and FIG. 25, for example, which is a part of the control procedure executed by the control circuit 30 according to the present modification, and corresponds to FIG. 11 described above. The same steps as shown in FIG. 11 are denoted by the same reference numerals.

In FIG. 26, Step S105 is provided in the same way as in FIG. 11. After completion of this step, the flow proceeds to Step S110A. In Step S110A, an additional variable M (of which detailed description will be made later) is initialized to zero, as well as initializing the variable N and the flag F as described above.

Subsequently, the flow proceeds to Step S200A via Steps S115 and S120 which are the same steps as those shown in FIG. 11. In Step S200A, tag information writing processing is performed. Specifically, after the memory initialization (erasing) for writing, the RFID tag information is transmitted to the RFID circuit element To, thereby writing the RFID tag information to the RFID circuit element To (of which detailed description will be made later with reference to FIG. 27). Upon completion of the aforementioned Step S200A, the flow proceed to Step S125 in the same way as described with reference to FIG. 11.

In Step S125, determination is made whether or not the flag is equal to zero in the same way as described with reference to FIG. 11. In a case that determination has been made that the condition has been satisfied, the flow proceeds to Step S130A.

In Step S130A, a combination of the information, which has been written to the RFID circuit element To in the aforementioned Step S200A, and the printing information, which has been used for printing by the print head 10, is output via the input/output interface 31 and the communication line 3 and via the terminal 5 or the general purpose computer 6, whereupon the combination of the information sets is stored in the route server 4 in the same way as in Step S130 shown in FIG. 11, for example. Note that the storage data is stored in and held in a manner that allows it to be used as a reference via the terminal 5 or the general purpose computer 6 as necessary.

The subsequent steps are substantially the same as those shown in FIG. 11, and accordingly, description thereof will be omitted.

Figure 27:
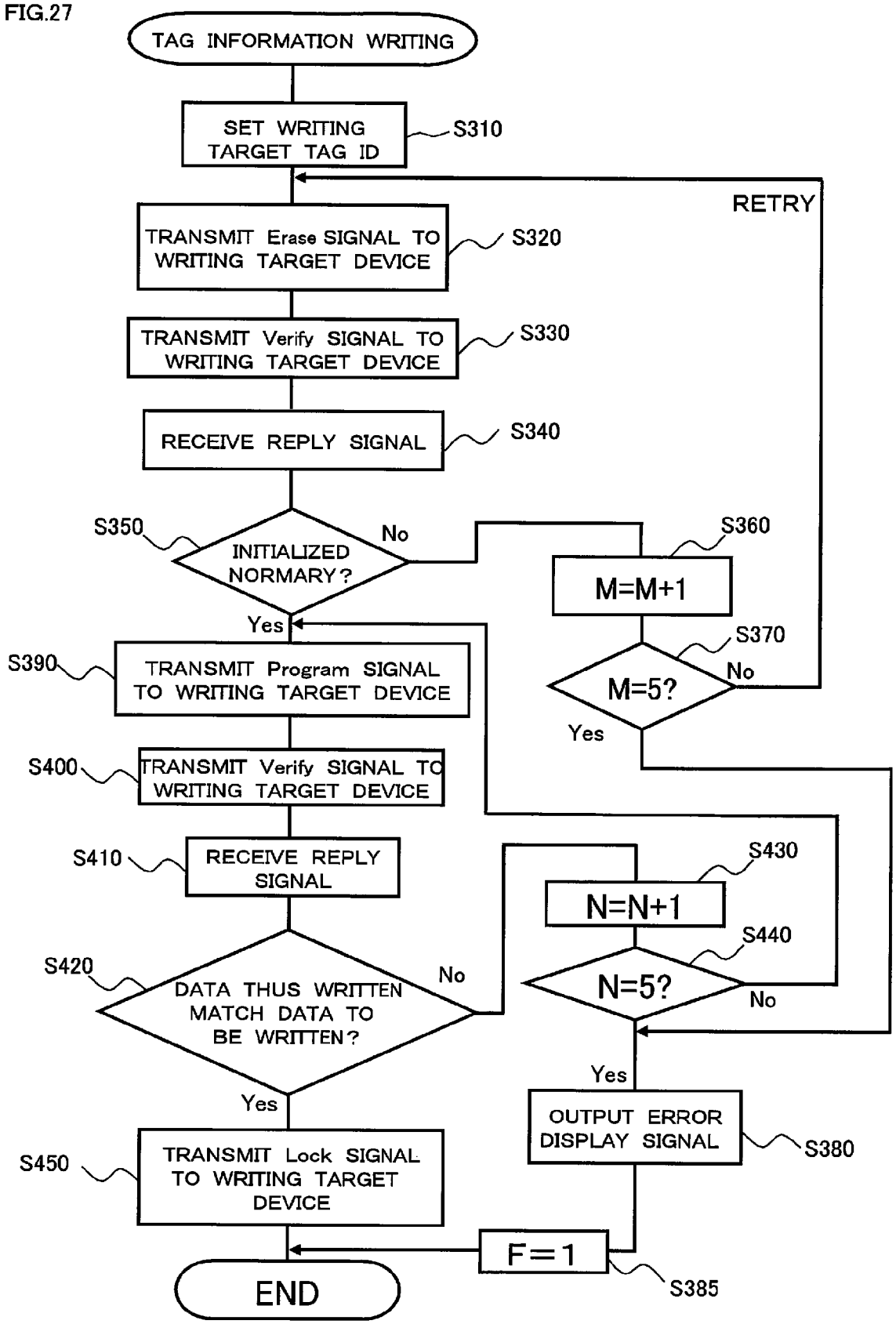
FIG. 27 is a flowchart which shows a procedure of Step S200 shown in FIG. 26 in detail.

FIG. 27 is a flowchart which shows a procedure in the aforementioned Step S200A in detail.

In FIG. 27, first, in Step S310, an identification number ID is set using a known and appropriate method.

Subsequently, the flow proceeds to Step S320. In Step S320, an "Erase" command is output to the signal processing circuit 22 for initializing the information stored in the memory part 157 of the RFID circuit element To in a manner following the communication parameters (the aforementioned frequency band, communication protocol, etc.) determined according to the aforementioned cartridge information. The signal processing circuit 22 creates an "Erase" signal as access information according to the "Erase" command. The "Erase" signal thus created is transmitted to the writing-target RFID circuit element To via the radio frequency circuit 21, thereby initializing the memory part 157.

In the following Step S330, a "Verify" command is output to the signal processing circuit 22 for verifying the contents stored in the memory part 157 according to the predetermined communication parameters in the same way as described above. Then, the signal processing circuit 22 creates a "Verify" signal as the access information according to the "Verify" command. The "Verify" signal thus created is transmitted to the RFID circuit element To, which is the information writing target, via the radio frequency circuit 21, thereby requesting the RFID circuit element To to transmit a reply signal. Subsequently, in Step S340, the reply signal transmitted from the writing-target RFID circuit element To in response to the aforementioned "Verify" signal is received via the antenna 14, and is acquired via the radio frequency circuit 21 and the signal processing circuit 22.

In the next Step S350, the information stored in the memory part 157 of the RFID circuit element To is checked based upon the reply signal, and determination is made whether or not the memory part 157 is normally initialized.

In a case that determination has been made that the condition has not been satisfied, the flow proceeds to Step S360 where the variable M is incremented by 1. Furthermore, the flow proceeds to Step S370 where determination is made whether or not the variable M has reached a predetermined retry number (five times, in this example. Also, the retry number may be set to an appropriate number). In a case that the variable M is equal to or smaller than 4, determination is made that the condition has not been satisfied, and the flow returns to Step S320 where the same procedure is repeated. In a case that the variable M is equal to 5, the flow proceeds to Step S380 where an error display signal is output to the terminal 5 or the general purpose computer 6 via the input/output interface 31 and the communication line 3 so as to display a writing failure (error) screen. As described above, readout retry is performed a predetermined maximum times (five times in this example). Upon completion of Step S380, the flow proceeds to Step S385. In Step S385, the aforementioned flag F is set to 1, whereupon the flow proceeds to Step S460.

On the other hand, in a case that determination has been made in Step S350 that the condition has been satisfied, the flow proceeds to Step S390. In Step S390, a "Program" command is output to the signal processing circuit 22 for writing desired data to the memory part 157 according to the predetermined communication parameters in the same way as described above. The signal processing circuit 22 creates a "Program" signal as the access information including the tag ID information. The "Program" signal thus created is transmitted to the RFID circuit element To, which is the information writing target, via the radio frequency circuit 21, thereby writing the information to the memory part 157.

Subsequently, in Step S400, a "Verify" command is output to the signal processing circuit 22. The signal processing circuit 22 creates a "Verify" signal as the access information in a manner following the predetermined communication parameters according to the "Verify" command in the same way as described above. The "Verify" command thus created is transmitted to the RFID circuit element To, which is the information writing target, via the radio frequency circuit 21, thereby requesting the RFID circuit element To transmit a reply signal. Subsequently, in Step S410, the reply signal transmitted from the writing-target RFID circuit element To in response to the aforementioned "Verify" signal is received via the antenna 14, and is acquired via the radio frequency circuit 21 and the signal processing circuit 22.

In the next Step S420, the information stored in the memory part 157 of the RFID circuit element To is checked based upon the reply signal, and determination is made whether or not the predetermined information transmitted as described above has been normally stored in the memory part 157.

In a case that determination has been made that the condition has not been satisfied, the flow proceeds to Step S430 where the variable N is incremented by 1. Furthermore, the flow proceeds to Step S440 where determination is made whether or not the variable N has reached a predetermined retry number (five times, in this example. Also, the retry number may be set to an appropriate number). In a case that the variable N is equal to or smaller than 4, determination is made that the condition has not been satisfied, and the flow returns to Step S390 where the same procedure is repeated. In a case that the variable N is equal to 5, the flow proceeds to Step S380 for instructing the aforementioned terminal 5 or general purpose computer 6 to display a writing failure (error) screen. Furthermore, in Step S385, the aforementioned flag F is set to 1, whereupon this flow ends. As described above, readout retry is performed a predetermined maximum times (five times in this example) even in a case of failure in writing.

On the other hand, in a case that determination has been made in Step S420 that the condition has been satisfied, the flow proceeds to Step S450 where a "Lock" command is output to the signal processing circuit 22. The signal processing circuit 22 creates a "Lock" signal in a manner following the predetermined communication parameters according to the "Lock" command in the same way as described above. The "Lock" signal thus created is transmitted to the RFID circuit element To, which is the information writing target, via the radio frequency circuit 21, so as to inhibit additional writing of the information to the RFID circuit element To. In this stage, the writing of the RFID tag information to the writing-target RFID circuit element To is completed, whereupon the RFID circuit element To is discharged as described above. Upon completion of Step S450, this flow ends.

The routine described above allows desired RFID tag information to be written to the IC circuit part 151 for each RFID circuit element To which is an access target stored in the cartridge 100.

As described above, a RFID tag producing system having a function of wiring RFID tag information according to the present modification provides approximately the same advantages as those provided by the aforementioned embodiments.

Also, writing of the RFID tag information may be performed for the cartridge identification tag. Such an arrangement allows the access history information such as the date, time, etc, at which the RFID labels T have been created, and the number of the RFID circuit elements To remaining within the cartridge, to be updated as appropriate in the form of the cartridge information.

(1-2) Modification without Adhesion Processing

Description has been made in the aforementioned embodiment regarding an arrangement in which printing is performed on the cover film 103 separate from the tag tape (base tape) 101 including RFID circuit elements To, following which the tag tape 101 and the cover film 103 are adhered to each other. Instead of such an arrangement, with regard to the present modification, the present invention is applied to a RFID circuit element cartridge for a RFID label producing apparatus cartridge for directly performing printing of the cover film provided to the tag tape.

Figure 28:
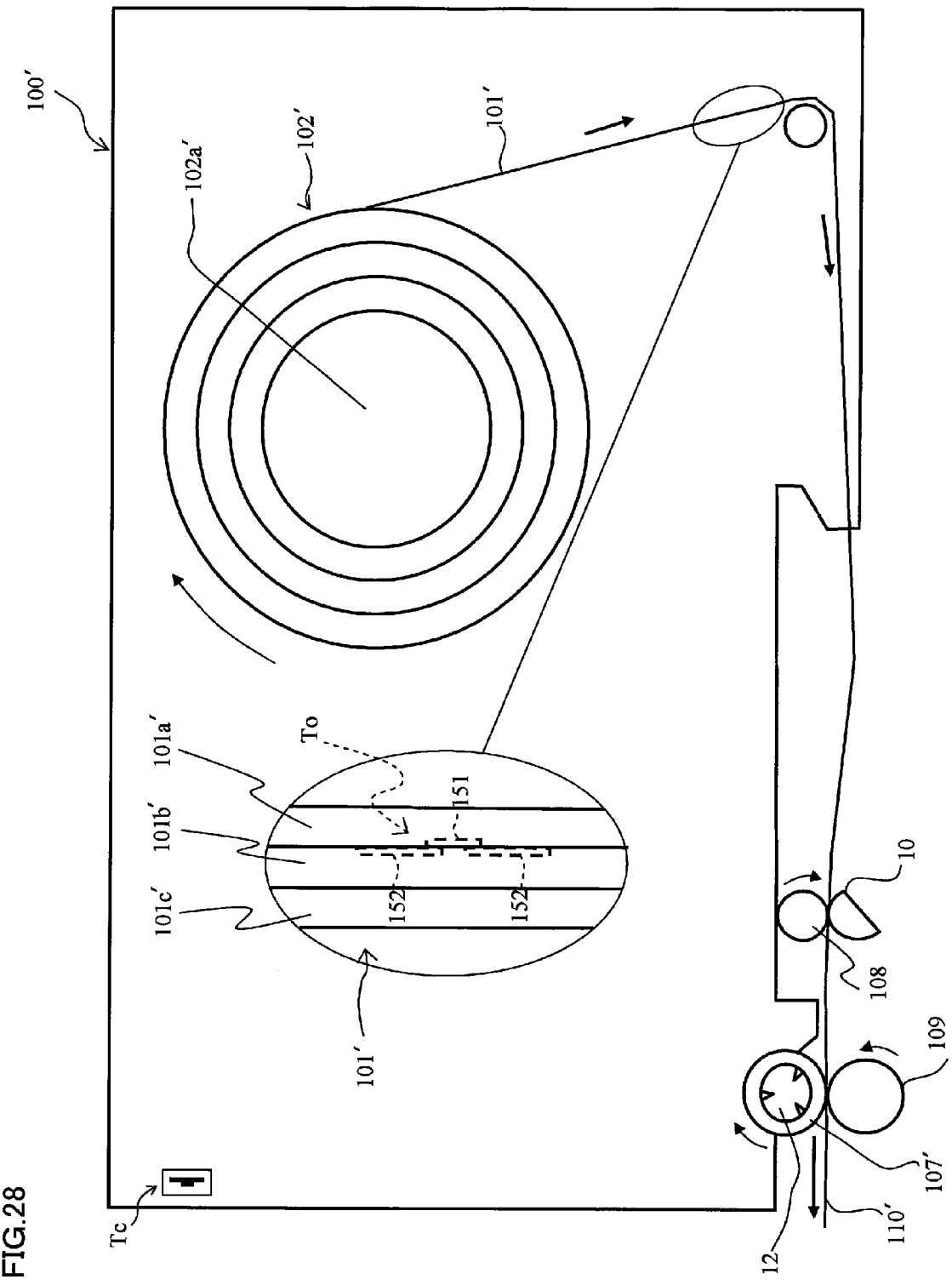
FIG. 28 is an explanatory diagram for describing a detailed structure of a cartridge having no function of tape adhesion according to a modification.

FIG. 28 is an explanatory diagram for describing a detailed configuration of a cartridge 100' according to the present modification, which corresponds to FIG. 3 described above. The same components as those shown in FIG. 3 are denoted by the same reference numerals, and description thereof will be omitted as appropriate.

As shown in FIG. 28, the cartridge 100' comprises a first roll (tag tape roll) 102' around which a thermo-sensitive tape 101' (tag tape) has been wound, and a feeding roller 107' configured to transport the thermo-sensitive tape 101' in the direction external to the cartridge 100'.

The first roll 102' has a structure in which a strip of the aforementioned transparent thermo-sensitive tape 101', on which multiple RFID circuit elements To have been consecutively formed along the longitudinal direction, is wound around a reel member 102a'.

In this example, the thermo-sensitive tape 101', which is to be wound around the first roll 102', has a three-layer structure (see partial enlarged view in FIG. 28) comprising a cover film 101a', an adhesive layer 101b', and a detachable sheet 101c'. The cover film 101a' is formed of PET (polyethylene terephthalate) or the like having a thermal recording layer on the surface thereof. The adhesive layer 101b' is formed of an appropriate adhesive material. The three layers are layered in that order from the layer that corresponds to the outer side of the rolled tape to the layer that corresponds to the opposite side.

The aforementioned IC circuit parts 151 configured to store information are provided on the back face of the cover film 101'a so as to form a single member. Furthermore, the aforementioned antenna 152 is provided on the surface of the back side of the cover film 101'a. Moreover, the aforementioned detachable sheet 101c' is adhered onto the back face of the cover film 101a' through the aforementioned adhesion layer 101b'.

With the aforementioned configuration, upon shifting the roll holder (not shown) from the separate position to the contact position after mounting the cartridge 100' to the cartridge holder portion of the aforementioned apparatus 2 for communicating with a RFID tag, the thermo-sensitive tape 101' is held by the nip between the print head 10 and the platen roller 108, and the thermo-sensitive tape 101' is held by the nip between the feeding roller 107' and the sub roller 109. Then, the feeding roller 107', the sub roller 109, and the platen roller 108 are synchronously rotationally driven by the driving force provided from the motor 23 to drive cartridge shaft (see FIG. 2) through the feeding roller drive shaft 12, thereby feeding out the thermo-sensitive tape 101' from the first roll 102'.

The thermo-sensitive tape 101' thus fed out is supplied to the print head 10 downstream along the transport direction. Electric power is supplied to the multiple heater elements included in the print head 10 by the aforementioned printhead drive circuit 25 (see FIG. 2), thereby printing the surface of the cover film 101a' of the thermo-sensitive tape 101'. The tag label tape 110' with print thus formed is transported to outside the cartridge 100'. Note that it is needless to say that printing may be performed using an ink ribbon in the same way as in the above-described embodiment.

After the tag label tape 110' with print has been transported outside of the cartridge 100', access (read/write) is performed to the RFID tag information via the aforementioned antenna 14. Furthermore, the access history information etc., in this step is transmitted to the RFID circuit element Tc provided to the cartridge 100' via the antenna 19, and is stored in the RFID circuit element Tc, in the same way as in the aforementioned embodiments. The subsequent steps such as a step for transporting the tag label tape 110' with print by the tape-feed roller 17, a step for cutting off the tag label tape 110' with print using the cutter 15, etc., are performed in the same way as in the aforementioned embodiments, and accordingly, description thereof will be omitted.

The present modification also offers the same advantages as those of the aforementioned embodiments, i.e., the advantage of a simple circuit configuration, thereby providing a small-sized overall system of the apparatus 2 for communicating with a RFID tag at reduced costs, etc.

(1-3) Modification Employing Tray-Type Cartridge

Description has been made regarding an arrangement in which the cartridge 100 or 100' is employed which includes the first roll 102 having a structure in which a strip of the base tape 101, on which multiple RFID circuit elements To have been consecutively formed along the longitudinal direction, is wound into a roll (or the first roll 102' having a structure in which the thermo-sensitive tape 101' is wound into a roll). The present invention is not restricted to such an arrangement. Rather, any type of cartridge may be employed.

Figure 29:
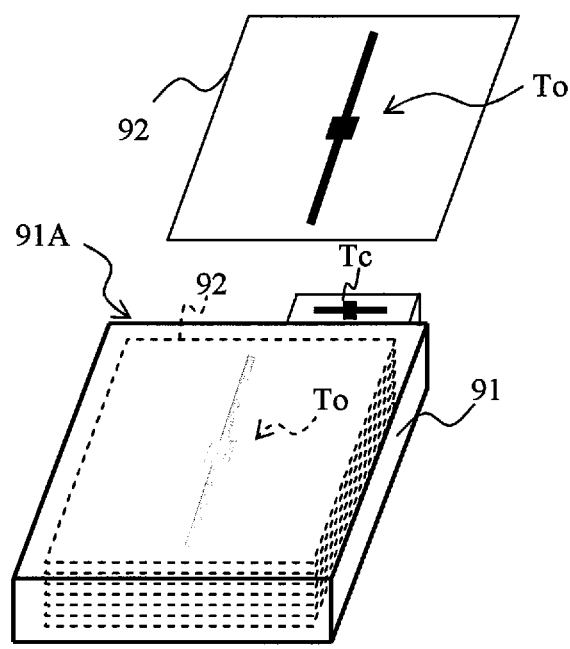
FIG. 29 is a conceptual perspective view which shows a modification employing a tray-type cartridge.

FIG. 29 is a conceptual perspective view which shows such a modification. The same components as those of the aforementioned embodiments are denoted by the same reference numerals, and description thereof will be omitted or simplified.

With the present modification shown in FIG. 29, an approximately box-shaped tray member 91 is provided as a RFID circuit element cartridge. The tray member 91 stores multiple stock label sheets 92, each of which has a single RFID circuit element To (RFID circuit element for producing a RFID label) formed thereon, in a manner such that they are stacked. Furthermore, the tray member 91 has an output opening 91A provided on a side face (away from the viewer in the drawing, in this example), which enables the raw labels 92 to be fed out in increments of sheets, thereby allowing the multiple RFID circuit elements To be consecutively supplied. The RFID circuit element To thus supplied from the tray member 91 is set at a position facing the antenna 14 provided to the aforementioned apparatus 2 for communicating with a RFID tag, whereupon access (read or write) is performed to the RFID circuit element To thus supplied.

The tray member 91 further includes the RFID circuit element Tc (RFID circuit element for identifying cartridge) on one side face thereof (on the left side in the drawing, in this example). The RFID circuit element Tc is disposed at a position approximately facing the antenna 19 provided to the apparatus main body 8 when the tray member 91 is mounted to the aforementioned cartridge holder portion of the aforementioned apparatus main body 8 of the apparatus 2 for communicating with a RFID tag.

With the present modification, upon mounting the tray member 91 to the cartridge holder portion for creating the RFID labels T, the signal processing circuit 22 creates a "Scroll All ID" signal in the same way as described above. Then, the "Scroll All ID" signal is transmitted to the RFID circuit element Tc via the radio frequency circuit 21, whereupon access to the IC circuit part 151 is performed. Subsequently, a reply signal is received via the antenna 19, and is acquired via the radio frequency circuit 21 and the signal processing circuit 22, thereby reading out the cartridge information. After the type of the cartridge (in other words, the kind of the RFID circuit element To) or the like has been identified, the signal processing circuit 22 creates a "Scroll All ID" signal. Then, the "Scroll All ID" signal thus created is transmitted to the RFID circuit element To via the radio frequency circuit 21, thereby accessing the IC circuit part 151. Subsequently, a reply signal is received via the antenna 14, and is acquired via the radio frequency circuit 21 and the signal processing circuit 22, thereby reading out the RFID tag information (RFID tag information such as article information, tag ID, etc).

With the present modification, the RFID labels T are created using the RFID circuit elements To stored in the tray member 91 while identifying the type of the tray member 91, which is to be replaced with an appropriate one as appropriate, in the same way as with the aforementioned embodiments. With such an arrangement, both the second access information for accessing the RFID circuit element Tc for identifying the cartridge and the first access information for accessing the RFID circuit element To on the RFID label are created by the shared signal processing circuit 22. Furthermore, both the second access information and the first access information are transmitted by the shared radio frequency transmitting portion 32 via the antennas 14 and 19. As a result, the present modification provides the same advantage as described above, i.e., a simple circuit configuration, as compared with an arrangement in which separate circuits are provided for the first access information and the second access information. This provides the small-sized and lightweight overall system of the apparatus 2 for communicating with a RFID tag at reduced costs.

Description has been made regarding an arrangement in which the tag label tape 110 with print is cut off using the cutter 15 so as to create the RFID labels T after printing and access (read or write) to the RFID circuit element To has been completed. The present invention is not restricted to such an arrangement. For example, let us consider an arrangement in which label mounting sheets (so-called die cut label), which have been formed beforehand separately from one another with a predetermined size that corresponds to a label, are consecutively formed on a tape which is to be fed out from a roll. With such an arrangement, there is no need to providing cutting processing using the cutter 15. In this case, after the tape has been discharged via the discharge opening 16, each label sheet (after access to the RFID circuit element To provided to the label sheet and corresponding printing have been completed) is separated from the tape by peeling, thereby creating the RFID label T.

Also, any combination of techniques according to the aforementioned first through fifth embodiments may be made as appropriate, in addition to the aforementioned modifications.

Description will be made below regarding a sixth embodiment of the present invention with reference to the drawings. In order to clarify the configuration, the same components as those in the first through fifth embodiments are denoted by the same reference numerals, and description will be made with reference to the same drawings as appropriate.

Figure 30:
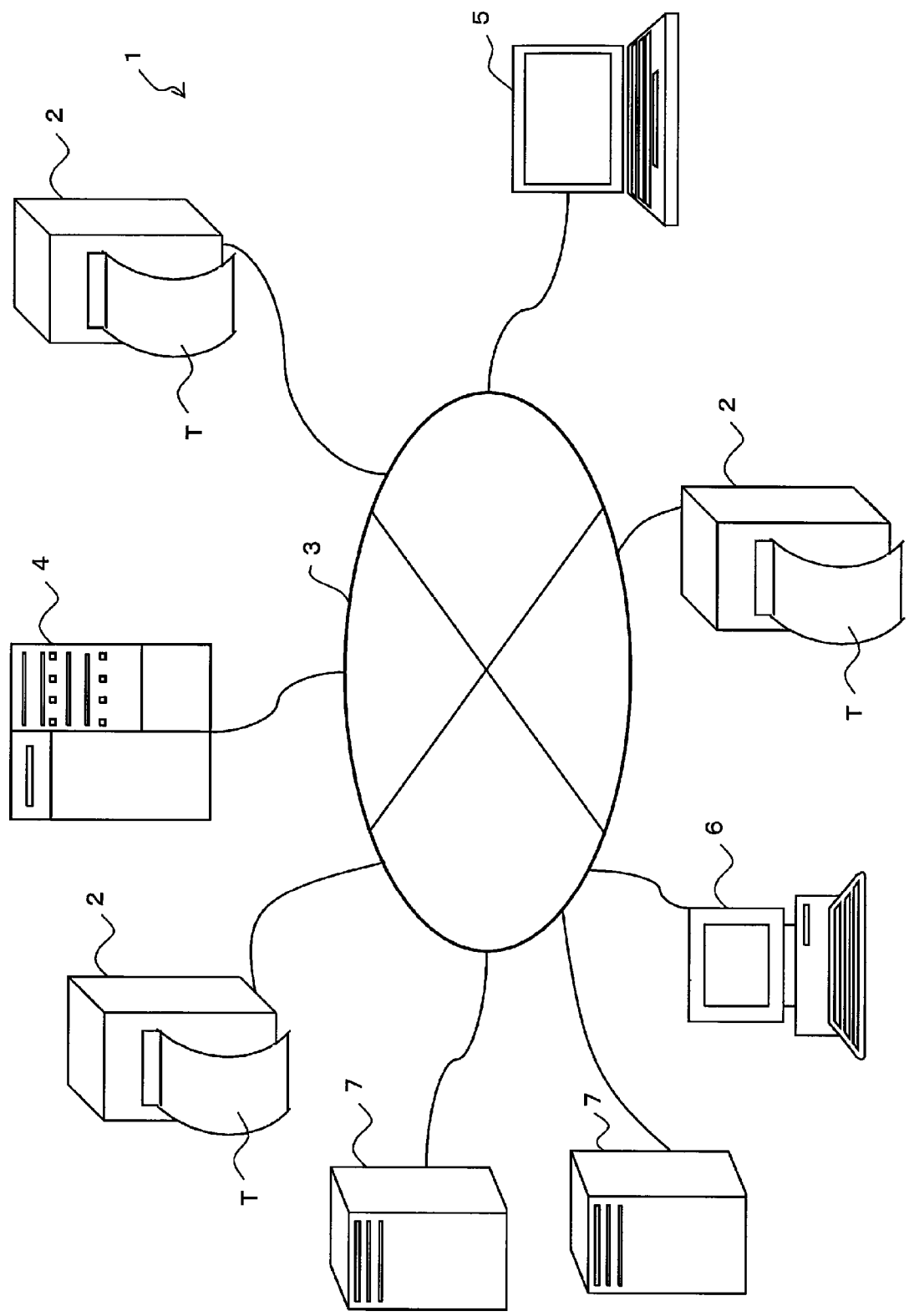
FIG. 30 is a system configuration diagram which shows a RFID tag producing system which the apparatus for communicating with a RFID tag is applied according to a sixth embodiment of the present invention.

FIG. 30 is a system configuration diagram which shows a RFID tag producing system which applies an apparatus for communicating with a RFID tag according to the present embodiment.

With a tag label producing system 1 shown in FIG. 30, an apparatus 2 for communicating with a RFID tag according to the present embodiment is connected to a route server 4, a terminal 5, a general purpose computer 6, and multiple information servers 7 via a communication line 3 in a wired or wireless manner.

Figure 31:
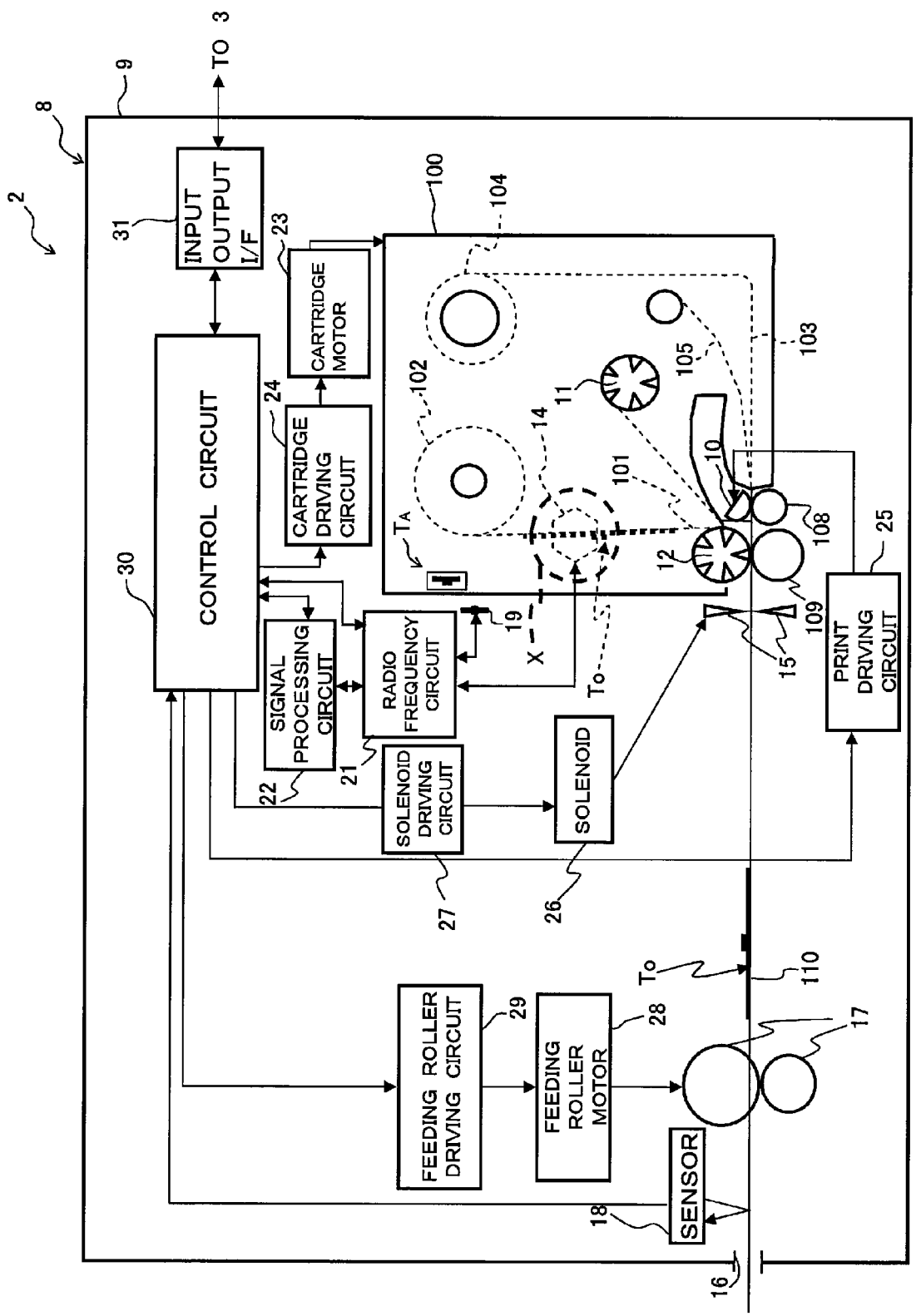
FIG. 31 is a conceptual configuration diagram which shows a detailed configuration of the apparatus for communicating with a RFID tag shown in FIG. 30.

FIG. 31 is a conceptual configuration diagram which shows a detailed configuration of the aforementioned apparatus 2 for communicating with a RFID tag.

In FIG. 31, an apparatus main body (apparatus housing) 8 of the apparatus 2 for communicating with a RFID tag includes a cartridge holder portion (container mounting portion, which is not shown) formed in the shape of a recess. A cartridge (RFID circuit element cartridge, container for including at least a RFID tag) 100 is detachably mounted to the holder portion.

The apparatus main body 8 includes a print head (thermal head) 10, a ribbon take-up roller driving shaft 11, a feeding roller drive shaft 12, an antenna (apparatus antenna) 14, a cartridge antenna 19, a cutter 15, a feeding roller 17, a sensor 18, and a housing 9. The print head 10 performs predetermined printing of a cover film 103 fed out from a second roll 104. The ribbon take-up roller driving shaft 11 drives an ink ribbon 105 after the printing of the cover film 103. The feeding roller drive shaft 12 adheres the cover film 103 to a base tape (tag tape) 101 fed out from a first roll 102, and feeds out the pressed tape from the cartridge 100 as a tag label tape 110 with print. The antenna 14 transmits/receives signals to/from a RFID circuit element To (RFID circuit element for producing a RFID label, of which detailed description will be made later) included in the base tape 101 via wireless communication using a radio frequency band such as a UHF band or the like. The cartridge antenna 19 transmits/receives signals to/from a RFID circuit element (recording medium, first RFID circuit element) TA included in the cartridge 100. The cutter 15 cuts the aforementioned tag label tape 110 with print at a predetermined timing and to a predetermined length, and then label-shaped RFID labels T (of which detailed description will be made later) are formed. The feeding roller 17 transports the RFID labels T to an output opening (discharge opening) 16, hence outputs the RFID labels T. The sensor 18 detects the presence or absence of the RFID label T at the aforementioned output opening. The housing 9 forms the exterior, and which has the aforementioned cartridge holder portion that allows the cartridge 100 to be detachably mounted to the housing and the aforementioned output opening 16.

The antenna 14 comprises a directional antenna having single-direction directivity (in the direction of the viewer in FIG. 31, in this example) (in this case, a so-called patch antenna is employed), disposed near to and alongside the axial direction of the aforementioned first roll 102 (away from the viewer in FIG. 31) such that it provides a communication range X over which communication can be made via the antenna 14, and which is provided near the tape feeding portion where the base tape 101 is fed from the first roll 102. Description has been made regarding an arrangement in which the first roll 102 is disposed outside of the region X, and only the tag label base tape 101 fed out from the first roll 102 is included in the region X. Also, an arrangement may be made in which a part of the first roll 102 is included in the region X. Also, a arrangement may be made in which the entire region of the first roll 102 is included in the region X.

Also, the apparatus main body 8 includes a radio frequency circuit 21, a signal processing circuit (access information creating unit) 22, a motor 23 to drive cartridge shaft, a cartridge shaft drive circuit 24, a print-head drive circuit 25, a solenoid 26, a solenoid drive circuit 27, a tape-feeding-roller motor 28, a tape-feeding-roller drive circuit 29, a control circuit (transmission control unit) 30. The radio frequency circuit 21 accesses (writing or reading) the aforementioned RFID circuit elements To and TA via the antenna 14 and the cartridge antenna 19. The signal processing circuit (access information creating unit) 22 processes signals read out from the RFID circuit elements To and TA. The motor 23 to drive cartridge shaft drives the ribbon take-up roller driving shaft 11 and the feeding roller drive shaft 12. The cartridge shaft drive circuit 24 controls the driving of the motor 23 to drive cartridge shaft. The print-head drive circuit 25 controls the supply of power to the aforementioned print head 10. The solenoid 26 drives the aforementioned cutter 15 such that it performs the cutting operation. The solenoid drive circuit 27 controls the solenoid 26. The tape-feeding-roller motor 28 drives the aforementioned feeding roller 17. The control circuit 30 controls the radio frequency circuit 21, the signal processing circuit 22, the cartridge shaft drive circuit 24, the print-head drive circuit 25, the solenoid drive circuit 27, the tape-feeding-roller drive circuit 29, and so forth, then controls the operation of the overall system of the apparatus 2 for communicating with a RFID tag.

The control circuit 30 is a so-called microcomputer. While detailed description thereof will be omitted, the control circuit 30 comprises a CPU which is a central computation processing unit, ROM, RAM, and so forth, and performs signal processing according to a program stored beforehand in the ROM using the temporary storage function provided by the RAM. Furthermore, the control circuit 30 is connected to the communication line via the input/output interface 31, for example. Such an arrangement allows the control circuit 30 to transmit/receive information with the route server 4, the other terminals 5, the general purpose computer 6, the information server 7, etc.

Figure 32:
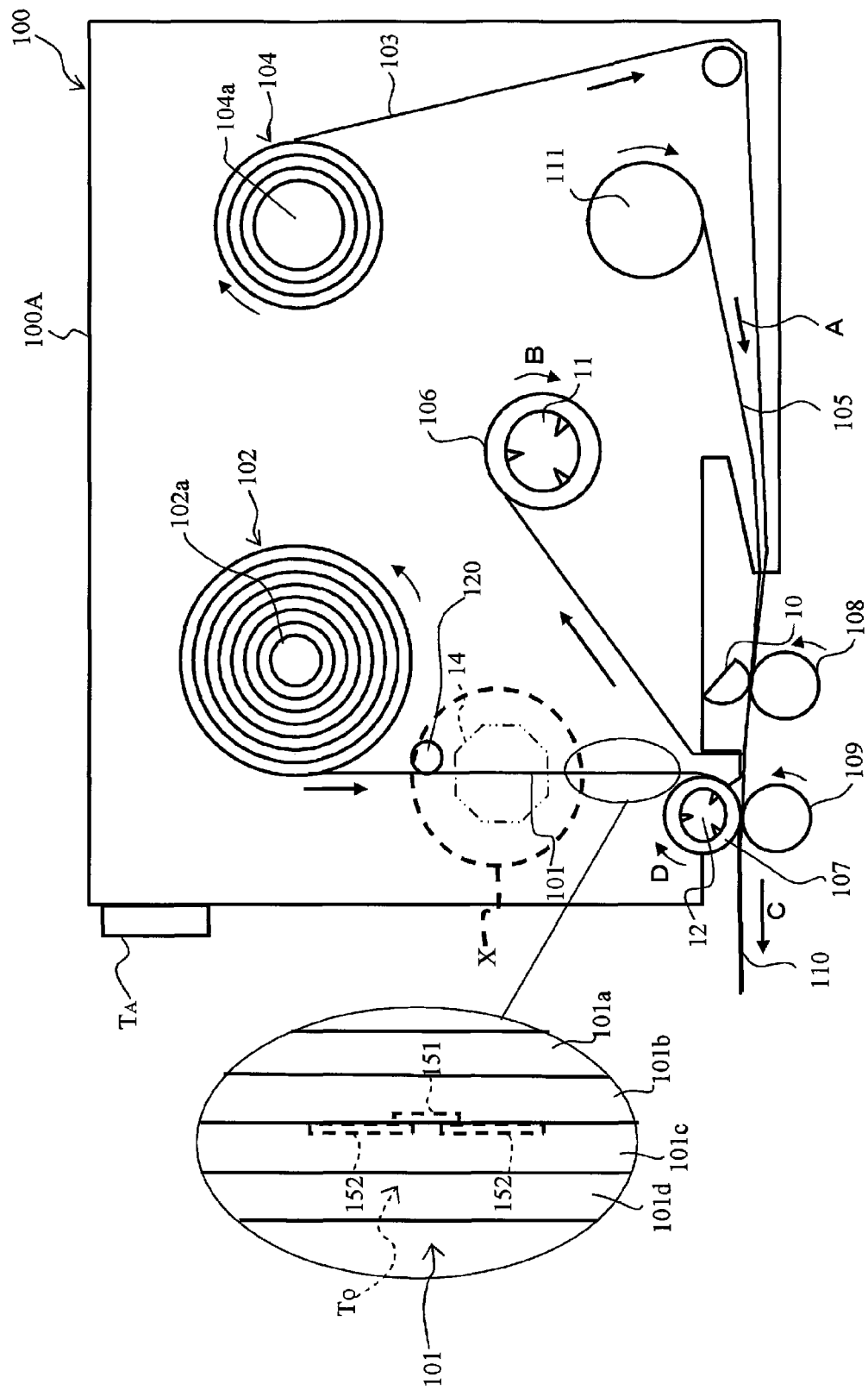
FIG. 32 is an explanatory diagram for describing a detailed structure of the cartridge shown in FIG. 31.

FIG. 32 is an explanatory diagram for describing the detailed configuration of the aforementioned cartridge 100.

In FIG. 32, the cartridge 100 comprises a housing 100A, the first roll 102, the second roll 104, a ribbon-supply-side roll 111, a ribbon take-up roller 106, a pressure roller (adhering unit) 107, and the RFID circuit element TA. The first roll 102 winds the strip base tape and is disposed within the housing 100A. The second roll 104 winds the transparent cover film 103. The cover film has approximately the same width as that of the base tape 101. The ribbon-supply-side roll 111 supplies the ink ribbon 105 (heat transfer ribbon, which can be eliminated in a case that the cover film comprises a thermo-sensitive tape). The ribbon take-up roller 106 rewinds the ribbon 105 after the printing. The pressure roller (adhering unit) 107 adheres the base tape 101 and the cover film 103 to each other by applying pressure and transports the printed tag label tape thus formed in the direction of the arrow A (i.e., serving as a feeding roller). The RFID circuit element TA is disposed such that it faces the cartridge antenna 19 of the aforementioned apparatus main body 8 provided around the outer face of the aforementioned housing 100A.

The first roll 102 stores, in a manner such that it is wound around a reel member 102a, the base tape 101, which has a structure in which multiple RFID circuit elements To are consecutively provided at a predetermined pitch along the longitudinal direction.

In this example, the base tape 101 has a four-layer structure (see partial enlarged view in FIG. 32) comprising an adhesive layer 101a formed of an appropriate adhesive material, a colored base film 101b formed of PET (polyethylene terephthalate) or the like, an adhesive layer 101c formed of an appropriate adhesive material, and a detachable paper sheet 101d. The four layers of the base tape 101 are layered in that order from the layer that corresponds to the inner side of the rolled tape (the rightmost layer in FIG. 32) to the layer that corresponds to the opposite side (the leftmost layer in FIG. 32).

The base film 101b includes antennas (first antennas) 152, which provide a function of transmission/reception of information, on the back face of the base film 101b (on the left side in FIG. 32) such that they and the base film 101b form a single member. Furthermore, an IC circuit part 151 (first IC circuit part) for updatably (rewritably) storing information is formed such that it is connected to each tag antenna 152, thereby forming individual RFID circuit elements To (the RFID circuit element TA has the same structure).

The aforementioned adhesive layer 101a is formed on the front face (right side in FIG. 32) of the base film 101b, which enables the cover film 103 to be adhered in the following step. Furthermore, the aforementioned detachable paper sheet 101d is adhered to the base film 101b through the aforementioned adhesive layer 101c provided on the back face of the base film 101b (left side in FIG. 32) so as to include the RFID circuit elements To. Note that the user peels off the detachable paper sheet 101d when the user adheres the RFID label T, which has been formed in the shape of a label, as a finished product to an inventory item or the like, thereby adhering the RFID label T to the inventory item or the like through the adhesive layer 101c.

The second roll 104 stores the aforementioned cover film 103 such that it is wound around a reel member 104a. The cover film 103 is supplied from the second roll 104. The ribbon 105 is supplied on the back side of the cover film 103 (i.e., on the face of the side which is to be adhered to the base tape 101), and is driven by the ribbon-supply-side roll 111 and the ribbon winding roll 106. The ribbon 105 thus supplied is pressed by the print head 10, thereby coming into contact with the back face of the cover film 103.

The aforementioned motor 23 to drive cartridge shaft (see FIG. 31 described above), which is a pulse motor externally provided to the cartridge 100, transmits driving force to each of the ribbon take-up roller driving shaft 11 and the feeding roller drive shaft 12, thereby rotationally driving the ribbon take-up roller 106 and the pressure roller 107.

The RFID circuit element TA stores property information (communication factor in this example, the optimum access power (output power)) for each of the multiple RFID circuit elements To included in the base tape 101. With such an arrangement, the control circuit 30 controls the aforementioned radio frequency circuit 21 based upon the property information read out from the RFID circuit element TA. Such an arrangement provides the optimum communication (with the optimum access power) for each RFID circuit element To (of which detailed description will be made later).

With the cartridge 100 having the aforementioned configuration, the base tape 101 fed out from the aforementioned first roll 102 is supplied to the pressure roller 107. On the other hand, the ink ribbon 105 is driven by the ribbon-supply-side roll 111 and the ribbon take-up roller 106 so as to be located on the back face side (i.e., the face of the side which is to be adhered to the base tape 101) of the cover film 103 fed out from the second roll 104. Furthermore, the ink ribbon 105 thus driven is pressed by the print head 110, thereby being brought into contact with the back face of the cover film 103.

With such an arrangement, upon shifting the roll holder (not shown) from the separate position to the contact position after mounting the cartridge 100 to the cartridge holder portion of the apparatus main body 8, the cover film 103 and the ink ribbon 105 are held by the nip between the print head 10 and the platen roller 108, and the base tape 101 and the cover film 103 are held by the nip between the pressure roller 107 and a sub roller 109. Then, the ribbon take-up roller 106 and the pressure roller 107 are synchronously rotationally driven along the directions denoted by the arrow B and the arrow D, respectively, by the driving force provided from the motor 23 to drive cartridge shaft. Furthermore, the feeding roller drive shaft 12, the sub roller 109, and the platen roller 108 are connected to one another by a gear set (not shown). With such an arrangement, upon driving the feeding roller drive shaft 12, the pressure roller 107, the sub roller 109, and the platen roller 108 rotate, thereby feeding out the base tape 101 from the first roll 102. The base tape thus fed out is supplied to the pressure roller 107 as described above. On the other hand, the cover film 103 is fed out from the second roll 104. At the same time, power is supplied to multiple heater elements provided to the print head 10 from the print-head drive circuit 25. As a result, printing is performed, thereby forming printed letters R (see FIG. 36 described later) on the back face of the cover film 103. Then, the base tape 101 and the printed cover film 103 are adhered to each other by the pressure roller 107 and the sub roller 109 so as to form a single tape, thereby forming the printed tag label tape. The printed tag label tape thus formed is transported to outside the cartridge 100. Note that the ink ribbon 105 is rewound around the ribbon take-up roller 106 by the driving force provided by the ribbon take-up roller driving shaft 11 after the printing of the cover film 103. Furthermore, a guide roller 120 is provided near the feeding portion of the first roll 102, which provides a function of maintaining the position of the antenna 14 of the apparatus relative to the RFID label T regardless of the change in the outer diameter of the first roll 102 due to the amount of the tape remaining in the first roll 102. This maintains the communications conditions between the antenna 14 of the writing apparatus and the RFID label To.

Figure 33:
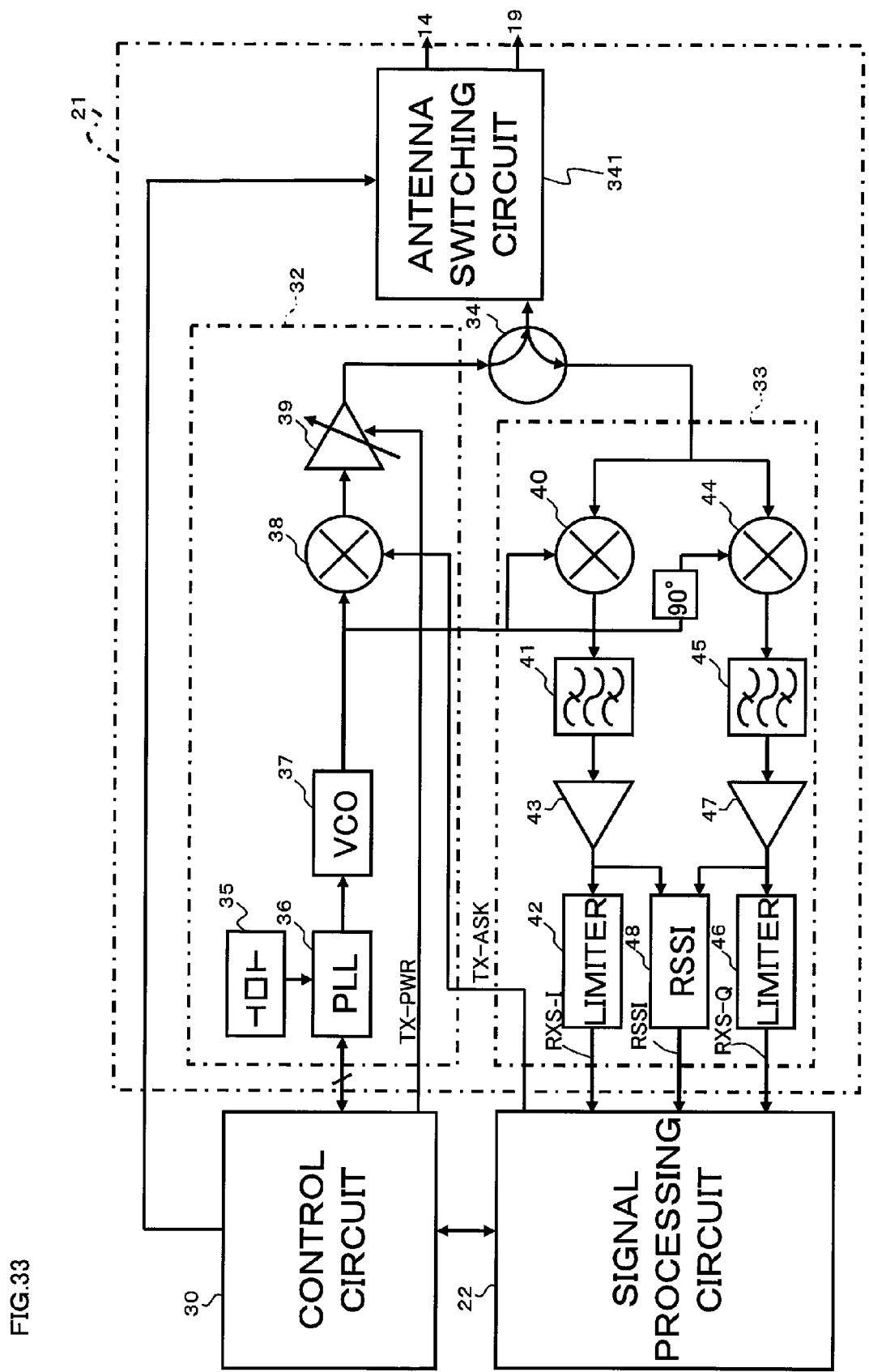
FIG. 33 is a functional block diagram which shows a function of the radio frequency circuit shown in FIG. 32.

FIG. 33 is a functional block diagram which shows the functions of the aforementioned radio frequency circuit 21 in detail. In FIG. 33, the radio frequency circuit 21 comprises an antenna switching circuit 341, a transmitting portion (information transmitting unit) 32, a receiving portion 33, and a transmit-receive splitter 34. The antenna switching circuit 341 performs switching operation according to the control from the control circuit 30. The transmitting portion 32 transmits signals to the RFID circuit elements To and TA via the antenna switching circuit 341 and the antennas 14 and 19. The receiving portion 33 receives reflected waves via the antennas 14 and 19, which have been reflected from the RFID circuit elements To and TA.

The antenna switching circuit 341 is a switching circuit comprising a known radio frequency FET or diode. The antenna switching circuit 341 has a function of connecting a selected one of the antennas 14 and 19 to the transmit-receive splitter 34 according to a selection signal received from the control circuit 30.

The transmitting portion 32 includes a quartz oscillator 35, a PLL (Phase Locked Loop) 36, a VCO (Voltage Controlled Oscillator) 37, a transmission multiplying circuit 38 (note that, in a case of amplitude modulation, it may be replaced by an amplitude factor variable amplifier or the like), and a variable transmission amplifier 39. The quartz oscillator 35, the PLL 36, and the VCO 37 generates carrier waves for accessing (reading or writing) the RFID tag information stored in the IC circuit part 151 of each of the RFID circuit elements To and TA. The transmission multiplying circuit 38 modulates (in this case, amplitude modulation according to the "TX_ASK" signal supplied from the signal processing circuit 22) the carrier waves generated as described above according to a signal supplied from the signal processing circuit 22. The variable transmission amplifier 39 amplifies the modulated waves (RFID tag information) modulated by the transmission multiplying circuit 38 with an amplification factor determined according to a "TX_PWR" signal supplied from the control circuit 30. With such an arrangement, the UHF frequency band is preferably employed for the carrier waves generated as described above. The output signal from the transmission amplifier 39 is transmitted to a selected one of the antennas 14 and 19 via the antenna switching circuit 341 and the transmit-receive splitter 34, whereby the output signal is supplied to the IC circuit part 151 of the RFID circuit element To or TA. Note that the RFID tag information is not restricted to the signals thus modulated. In some cases, only a plain carrier wave is transmitted as the RFID tag information.

The receiving portion 33 includes a first receiving signal multiplying circuit 40, a first band-pass filter 41, a first receiving signal amplifier 43, a second receiving signal multiplying circuit 44, a second band-pass filter 45, and a second receiving signal amplifier 47. The first receiving signal multiplying circuit 40 multiplies the reflected waves received from the RFID circuit element To or TA via the antenna 14 or 19 by the carrier waves generated as described above. The first band-pass filter 41 extracts only the signals within the necessary frequency band range from the output signals received from the first receiving signal multiplying circuit 40. The first receiving signal amplifier 43 amplifies the output signal from the first band-pass filter 41 and supplies the output signal thus amplified to a first limiter 42. The second receiving signal multiplying circuit 44 multiplies the reflected waves received from the RFID circuit element To or TA via the antenna 14 or 19 by the carrier waves that have been delayed by a phase angle of 90° after having been generated as described above. The second band-pass filter 45 extracts only the signals within the necessary frequency band range from the output signals of the second receiving signal multiplying circuit 44. The second receiving signal amplifier 47 amplifies the output signal input from the second band-pass filter 45, and supplies the signal thus amplified to a second limiter 46. With such an arrangement, the signal "RXS-I" output from the aforementioned first limiter 42 and the signal "RXS-Q" output from the aforementioned second limiter 46 are input to the aforementioned signal processing circuit 22, whereupon these signals are processed by the signal processing circuit 22.

Furthermore, the output signals from the first receiving signal amplifier 43 and the second receiving signal amplifier 47 are input to an RSSI (Received Signal Strength Indicator) circuit 48. With such an arrangement, the signal "RSSI" which indicates the magnitude of these signals is input to the signal processing circuit 22. As described above, the apparatus 2 for communicating with a RFID tag according to the present embodiment performs demodulation of the reflected waves from the RFID circuit element To by I-Q quadrature demodulation.

Also, with the present embodiment, in order to avoid crosstalk between communication in a state in which the antenna switching circuit 341 has been switched to the cartridge antenna 19 (communication between the cartridge antenna 19 and the RFID circuit element TA) and communication in a state in which the antenna switching circuit 341 has been switched to the antenna 14 (communication between the antenna 14 and the RFID circuit element To), control is performed so as to change the communication protocol according to switching operation of the switching circuit 341. Such an arrangement allows a desired RFID circuit element to be accessed without such crosstalk. Also, an arrangement may be made in which the access frequency for accessing the RFID circuit element is changed (e.g., access frequency is switched between 13 MHz and 950 MHz) according to the switching operation of the antenna switching circuit 341, instead of switching the communication protocol.

FIG. 34 is a functional block diagram which shows the functional configuration of the aforementioned RFID circuit element To. In FIG. 34, the RFID circuit element To includes the aforementioned antenna 152 configured to transmit/receive signals with the apparatus 2 for communicating with a RFID tag via the antenna 14 in a non-contact manner using high-frequency radio waves of the UHF frequency band or the like, and the aforementioned IC circuit part 151 connected to the antenna 152.

The IC circuit part 151 includes a rectification part 153, a power source part 154, a clock extraction part 156, a memory part 157, a modem part 158, and a control unit 155. The rectification part 153 rectifies the carrier waves received via the antenna 152. The power source part 154 stores the energy of the carrier waves thus rectified by the rectification part 153, which serves as a driving power supply. The clock extraction part 156 extracts the clock signals from the carrier waves thus received by the antenna 152, and supplies the clock signals thus extracted to a control unit 155. The memory part 157 stores predetermined information signals. The modem part 158 is connected to the antenna 152. The control unit 155 controls the operation of the aforementioned RFID circuit element To via the rectification part 153, the clock extraction part 156, the modem part 158, etc.

The modem part 158 performs demodulation of communication signals which have been transmitted from the antenna 14 of the aforementioned apparatus 2 for communicating with a RFID tag, and which have been received via the antenna 152. Also, the modem part 158 performs modulation of the carrier waves received via the antenna 152 according to a response signal from the aforementioned control unit 155, and the carrier waves thus modulated are transmitted as reflected waves.

The control unit 155 analyzes the received signals demodulated by the modem part 158, creates a response signal based upon the information signal stored in the memory part 157, and executes basic control such as the control for instructing the modem part 158 to transmit a response signal.

Note that the RFID circuit element TA provided to the cartridge 100 has the same structure as that of the aforementioned RFID circuit element To. Specifically, the RFID circuit element TA also includes the IC circuit part 151 (not shown), the antenna 152 (not shown), and so forth, of which detailed configuration is not shown.

Figure 35A:
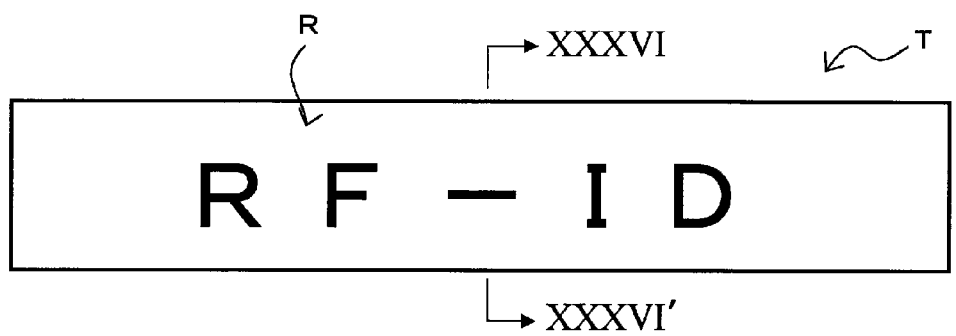
FIG. 35A shows a top view which show an example of the exterior of the RFID label.
Figure 35B:
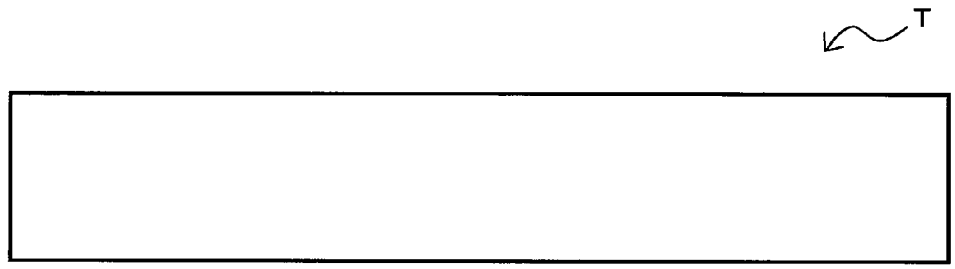
FIG. 35B shows a bottom view which show an example of the exterior of the RFID label.

FIGS. 35A and 35B are diagrams which show an example of the exterior of a RFID label T cut off from the tag label tape 110 with print after information has been written to the RFID circuit element To as described above. FIG. 35A is a top view, and FIG. 35B is a bottom view. On the other hand, FIG. 36 is a lateral cross-sectional view taken along line XXXVI-XXXVI' in FIG. 35A.

Figure 36:
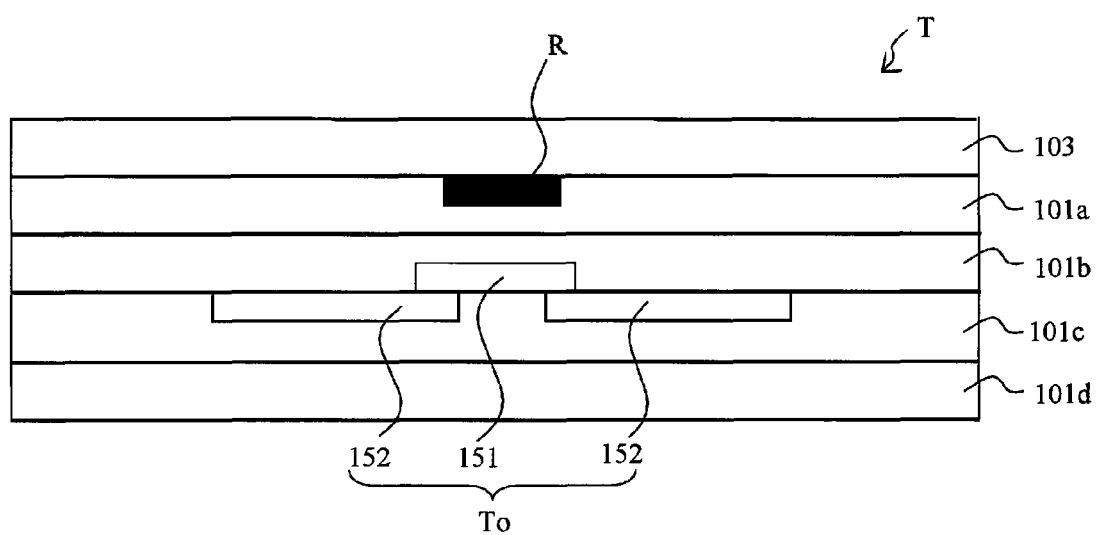
FIG. 36 is a lateral cross-sectional view taken along line XXXVI-XXXVI' in FIG. 35A.

As shown in FIGS. 35A, 35B, and FIG. 36, the RFID label T has a five-layer structure in which the cover film 103 is provided to the four-layer structure shown in FIG. 32. Specifically, the five-layer structure comprises the cover film 103, the adhesive layer 101a, the base film 101b, the adhesive layer 101c, and the detachable paper sheet 101d, in that order from the side of the cover film 103 (upper side in FIG. 36) to the opposite side (lower side in FIG. 36). Furthermore, as described above, the RFID circuit elements To including the antennas 152 provided on the back side of the base film 101b are provided within the adhesive layer 101c. Furthermore, the printed characters R (which read "RF-ID" to indicate the kind of RFID label) are printed on the back of the cover film 103.

FIG. 37 is a diagram which shows an example of a screen displayed on the terminal 5 or the general purpose computer 6 when the apparatus 2 for communicating with a RFID tag accesses (reads or writes) RFID tag information stored in the IC circuit part 151 of the RFID circuit element To.

FIG. 37 shows a display arrangement in which the terminal 5 or the general purpose computer 6. The arrangement includes a printed characters R, an access (writing/reading) ID, an inventory item information address, a storage destination address of the corresponding information, etc. The printed characters R is printed corresponding to each RFID circuit element To. The access ID is the unique ID of each RFID circuit element To. The inventory item information address is stored in the information server 7. The storage destination address of the corresponding information is stored in the aforementioned route server 4. With such an arrangement, upon operating the terminal 5 or the general purpose computer 6, the apparatus 2 for communicating with a RFID tag operates. Specifically, the aforementioned printed characters R are printed on the cover film 103. Furthermore, the information such as the aforementioned writing ID and the inventory item information are written to the IC circuit part 151 (alternatively, the RFID tag information such as the inventory item information stored beforehand in the IC circuit part 151 is read out).

In the aforementioned writing step (or readout step), the correspondence between the ID of each RFID label T thus formed and the information read out from (or written to) the IC circuit part 151 of the RFID label T is stored in the aforementioned route server 4. With such an arrangement, the correspondence can be used as reference data as required.

The principal feature of the apparatus 2 for communicating with a RFID tag according to the present embodiment is that the control circuit 30 controls the radio frequency circuit 21 according to the property information (optimum access power value) for each RFID circuit element To stored in and read out from the RFID circuit element TA. Such an arrangement enables each RFID circuit element To be accessed under the optimum communication condition (with the optimum access power). Detailed description thereof will be made below with reference to FIG. 38.

Figure 38:
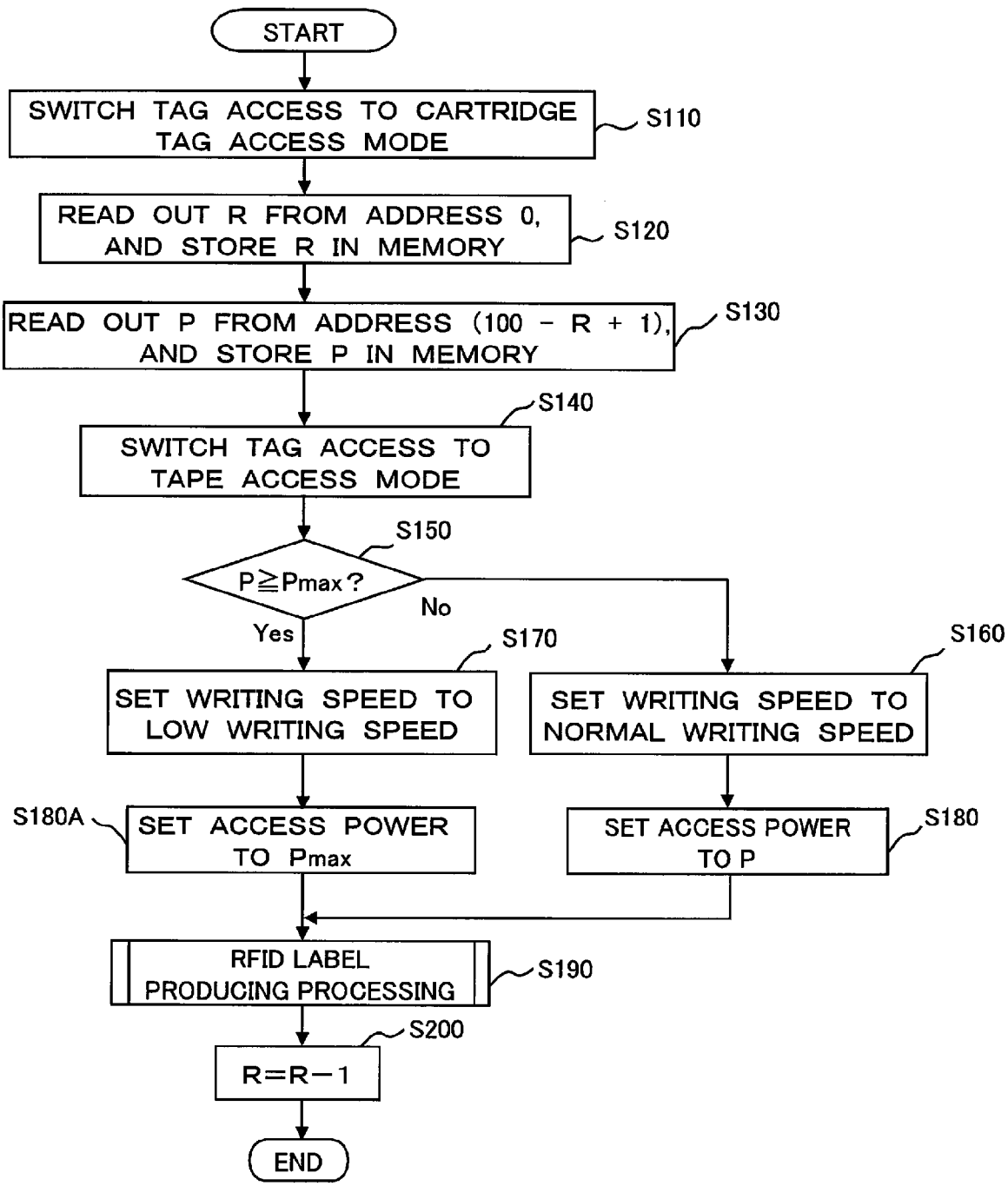
FIG. 38 is a flowchart which shows a control procedure executed by the control circuit.

FIG. 38 is a flowchart showing a control procedure executed by the control circuit 30, which provides access to the RFID circuit element To under the optimum communication condition by controlling the radio frequency circuit 21 based upon the property information (optimum access power value) for each RFID circuit element To stored in and read out from the RFID circuit element TA.

In FIG. 38, upon performing writing (or reading) operation of the apparatus 2 for communicating with a RFID tag, this flow starts. First, in Step S110, tag access is switched to the cartridge access mode. Specifically, a selection signal is output to the antenna switching circuit 341 so as to be switched to a mode in which that the cartridge antenna 19 is connected to the transmit-receive splitter 34.

In the following Step S120, the remaining amount R stored in the address 0 in the memory part 157 (not shown) of the RFID circuit element TA is read out, and is stored in unshown memory. Note that the remaining amount R stored in the address 0 represents the number of the RFID circuit elements To remaining on the base tape 101, which have not been subjected to writing (or reading) processing (of which detailed description will be made later). Also, the aforementioned memory may be internal memory included in the control circuit 30, or may be an external memory provided externally to the control circuit 30.

In the following Step S130, the access power value P is read out, which is stored in the address (100−R+1) in the memory part 157 (not shown) of the RFID circuit element TA, and stores the access power value P thus read out in the memory (not shown). Note that the access power value P stored in the address (100−R+1) represents the optimum output electric power which is to be output from the transmitting portion 32 of the radio frequency circuit 21 according to the communication sensitivity of the communication with each RFID circuit element To via the antenna 152 provided on the base tape 101 (of which detailed description will be made later). Here, the reason why the address in which the aforementioned access power P is stored is represented by (100−R+1) is that one hundred RFID circuit elements To are initially stored in the cartridge 100. Accordingly, the expression that represents the address should be modified according to the number of the RFID circuit elements stored in the cartridge.

In the following Step S140, the tag access is switched to the tape access mode. Specifically, a selection signal is output to the antenna switching circuit 341 so as to be switched to a mode in which that the antenna 14 is connected to the transmit-receive splitter 34.

In the following Step S150, determination is made whether or not the access power value P, which has been read out in the prior Step S130, is equal to or greater than the maximum permissible value Pmax. Note that the maximum permissible value Pmax is the maximum access power (output electric power) value determined such that the output electric power (output energy amount per unit time) from the transmitting portion 32 to the RFID circuit element To for exhibiting normal writing speed does not exceed the maximum permissible (rated) output electric power determined by a standard of the apparatus main body 8 (e.g., the control circuit 30, the radio frequency circuit 21, the antenna 14, etc.). For example, the maximum permissible value Pmax is stored beforehand in the aforementioned unshown memory. In a case that the access power value P is less than the maximum permissible value Pmax, the determination is made that the condition is not satisfied, whereupon the flow proceeds to the following Step S160.

In Step S160, the writing speed for the RFID circuit element To is set to the normal writing speed. Specifically, the operating clock of the control circuit 30 and the operating clock of the signal processing circuit 22 are set to a frequency that corresponds to the normal writing speed. More specifically, this clock is set by setting a dividing ratio of the system clock. Subsequently, the flow proceeds to the following Step S180.

In Step S80, a "TX_PWR" signal is output to the aforementioned variable transmission amplifier 39 included to the transmitting portion 32 of the radio frequency circuit 21, thereby setting the access power (output electric power) value, which is to be provided to the RFID circuit element To by the transmitting portion 32, to the access power value P read out in Step S130. Subsequently, the flow proceeds to the following Step S190.

On the other hand, in a case that the access power value P is equal to or greater than the maximum permissible value Pmax in Step S150, determination is made that the condition is satisfied, whereupon the flow proceeds to Step S170. In Step S170, the writing speed for the RFID circuit element To is set to a low writing speed (which is lower than the aforementioned normal writing speed). Specifically, the operating clock of the control circuit 30 and the operating clock of the signal processing circuit 22 are set to a frequency that corresponds to the low writing speed in the same way as in the aforementioned Step S160. More specifically, a lower frequency is set by changing the dividing rate of the system clock to a greater one. With such an arrangement, in such a case, the writing speed is reduced, thereby increasing the total energy output to the RFID circuit element To from the transmitting portion 32 of the radio frequency circuit 21. Furthermore, such an arrangement enables the output electric power to be within the maximum permissible output electric power determined by the aforementioned standard of the apparatus main body 8. In the following Step S180A, the "TX_PWR" signal is output to the aforementioned variable transmission amplifier 39 included in the transmitting portion 32 of the radio frequency circuit 21, thereby setting the access power (output electric power), which is to be provided to the RFID circuit element To by the transmitting portion 32, to the aforementioned maximum permissible output power value Pmax. Upon completion of Step S180A, the flow proceeds to Step S190.

In Step S190, the RFID tag information is written to the RFID circuit element To. At the same time, predetermined printing is performed on the cover film 103. Then, the tag label tape 110 with print is cut off in increments of the RFID circuit elements To, thereby performing RFID label producing processing for creating RFID labels T (of which detailed description will be later with reference to FIG. 41).

In the following Step S200, the remaining amount R read out in the prior Step S120 is decremented by 1, and the value thus decremented is stored again in the address 0. This ensures that the remaining amount R represents the correct number of the RFID circuit elements To remaining on the base tape 101 that have not been subjected to the writing (or reading) processing. Upon completion of this step, the process shown in this flowchart ends.

Figure 39:
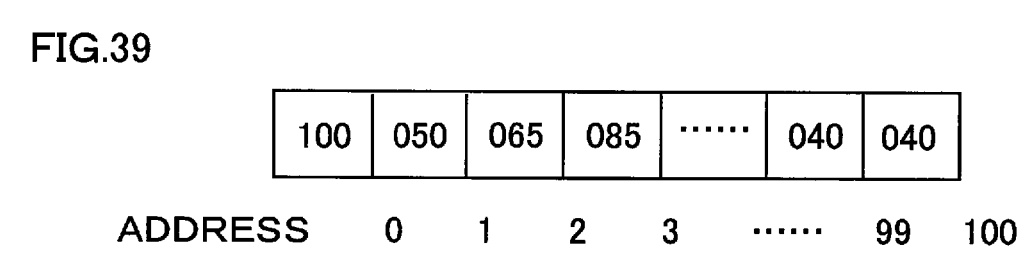

FIG. 39 is a diagram which shows the contents stored in the memory part 157 (not shown) of the RFID circuit element TA. Here, FIG. 39 shows an example in which one hundred RFID circuit elements To have been provided to the base tape 101.

In FIG. 39, the value stored in the address 0 represents the remaining amount R read out in Step S120 shown in FIG. 38 described above. That is to say, this value represents the number of the RFID circuit elements To remaining on the base tape 101, which has not been subjected to writing (or reading) processing. With such an arrangement, the remaining amount R stored in the address 0 is decremented by 1, and the updated remaining amount R is stored each time that production of the RFID label T is completed, as described above with reference to the aforementioned Step S200 shown in FIG. 38. Such an arrangement ensures that the remaining amount R represents the correct number of the RFID circuit elements To remaining on the tag tape 101 that have not been subjected to the writing (or reading) processing. Note that FIG. 39 shows a state in which the remaining amount R is 100, and accordingly, no RFID label T has yet been produced.

The values stored in the addresses 1 to 100 represent the access power values P, each of which is to be read out in the aforementioned Step S130 shown in FIG. 38. Specifically, each of these values represents the optimum output electric power which is to be output from the transmitting portion 32 of the radio frequency circuit 21 according to the communication sensitivity of the antenna 152 of the corresponding RFID circuit element To provided on the base tape 101 as described above. As described in the aforementioned Step S130, the control circuit 30 reads out the access power value P stored in the address (100−R+1). For example, in a case that the remaining amount R is 100, the control circuit 30 reads out the value 50 stored in the address 1. Then, the remaining amount R is decremented to 99, and accordingly, the control circuit 30 reads out the value 65 stored in the address 2. As described above, the control circuit 30 reads out the remaining amount stored in the address 1 to the address 100 in ascending order of the address. That is to say, the optimum access power values for the corresponding RFID circuit elements To are stored in the address 1 to address 100. Note that, in FIG. 39, the unit of the access power values P is mW (milliwatt), for example. For example, the access power P for the RFID circuit element To, which is to be produced as the first completed tag, is 50 stored in the address 1, and accordingly, the output electric power is set to 50 mW. Then, the output electric power for the RFID circuit element To, which is to be produced as the second completed tag, is set to 65 mW.

Figure 40A:
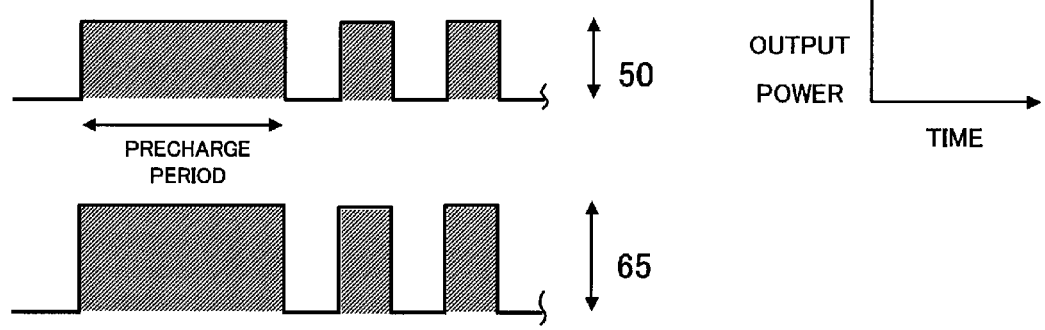
FIG. 40A is a diagram which shows a difference in the output signal to be applied to the RFID circuit element in a case of changing the writing power.
Figure 40B:
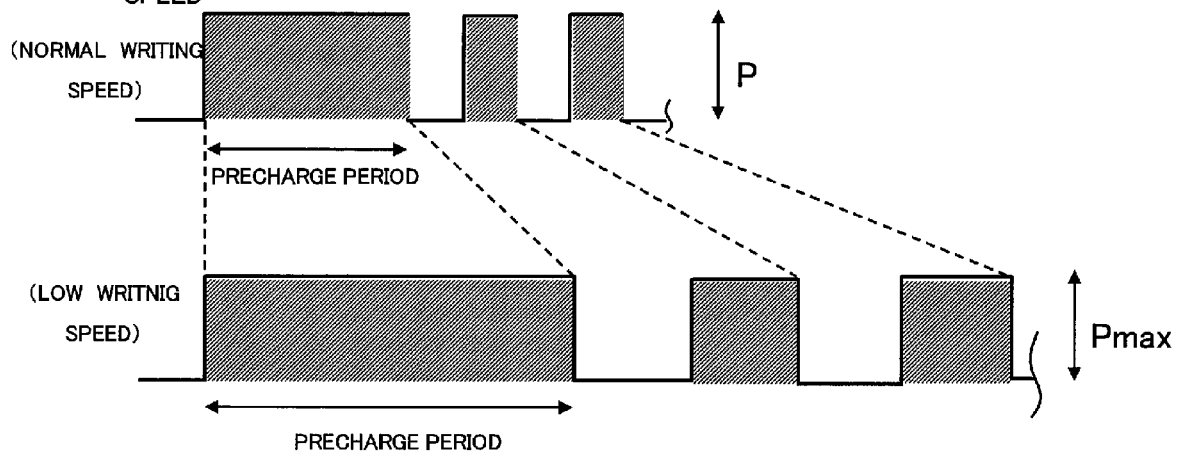
FIG. 40B is a diagram which shows a difference in the output signal to be applied to the RFID circuit element in a case of changing the writing speed.

FIG. 40A and FIG. 40B are explanatory diagrams which show difference in the output signal provided from the transmitting portion 32 to each RFID circuit element To. In the drawings, the vertical axis represents the output electric power. On the other hand, the horizontal axis represents time. The area of the hatched region, which corresponds to the product of the output electric power and time, represents the output energy.

FIG. 40A shows cases in which determination has been made in the aforementioned Step S150 that the condition has not been satisfied, and accordingly, the flow proceeds via Step S160 to Step S180 where the access power is set to the access power value P read out in Step S130. Specifically, the upper portion of FIG. 40A shows a case in which the output electric power is set to 50 mW. On the other hand, the lower portion of FIG. 40A shows a case in which the output electric power is set to 65 mW.

FIG. 40B shows a case in which determination has been made in the aforementioned Step S150 that the condition has not been satisfied, and accordingly, the flow proceeds via Step S160 to Step S180 where the access power is set to the access power value P read out in Step S130 (a case of setting the normal writing speed shown in the upper portion of the drawing), and a case in which determination has been made in the aforementioned Step S150 that the condition has been satisfied, and accordingly, the flow proceeds via Step S170 to Step S180A where the access power is set to the maximum permissible access power value Pmax regardless of the value read out in Step S130 (a case of setting the low writing speed shown in the lower portion of the drawing).

Let us consider a case in which the writing speed is reduced as shown in FIG. 40B. Now, let us say that the same access power P is maintained. In this case, the output energy is increased as compared with a case in which writing is performed with the normal writing speed (corresponding to the increased area of the hatched region). With such an arrangement, let us consider a case in which determination has been made in the aforementioned Step S150 shown in FIG. 38 that the access power value P is greater than the maximum permissible value Pmax. In this case, writing (or readout) cannot be performed with the normal writing speed due to the limitations from the specifications of the apparatus main body 8. With the present embodiment, in this case, the writing speed is reduced such that the output electric power provided from the transmitting portion 32 to the RFID circuit element To is equal to or smaller than the maximum permissible output electric power Pmax, thereby enabling data to be written to (or read from) the RFID circuit element To.

Let us say that the maximum permissible value Pmax is 75, for example. In this case, in the aforementioned example shown in FIG. 39, the access power, which is to be applied to the tag to be produced as a third completed tag, is 85, which is greater than the maximum permissible value Pmax. With the present embodiment, in this case, the output electric power is set to Pmax, and tag access is performed with a low access speed as shown in FIG. 40B.

Description has been made regarding an arrangement in which, in a case that the access power value P to be applied exceeds the maximum permissible value Pmax, the writing speed is reduced, thereby enabling writing (readout) to be performed. However, the present invention is not restricted to such an arrangement. Also, an arrangement may be made in which, in such a case, the precharge period is increased. Here, the term "precharge period" as used here represents a period of time in which a carrier wave is output to the RFID circuit element To without modulation in the first stage for supplying energy to the RFID circuit element To, which is accumulated in the form of a driving power supply available to the RFID circuit element To, before the signals for the RFID tag access information are output to the RFID circuit element To (see FIG. 40). With such an arrangement, in such a case, the precharge period is increased, thereby providing the advantage that the output electric power can be reduced in the same way as with an arrangement in which the writing speed is reduced. Such an arrangement enables data to be written to (or read out from) the RFID circuit element To.

Figure 41:
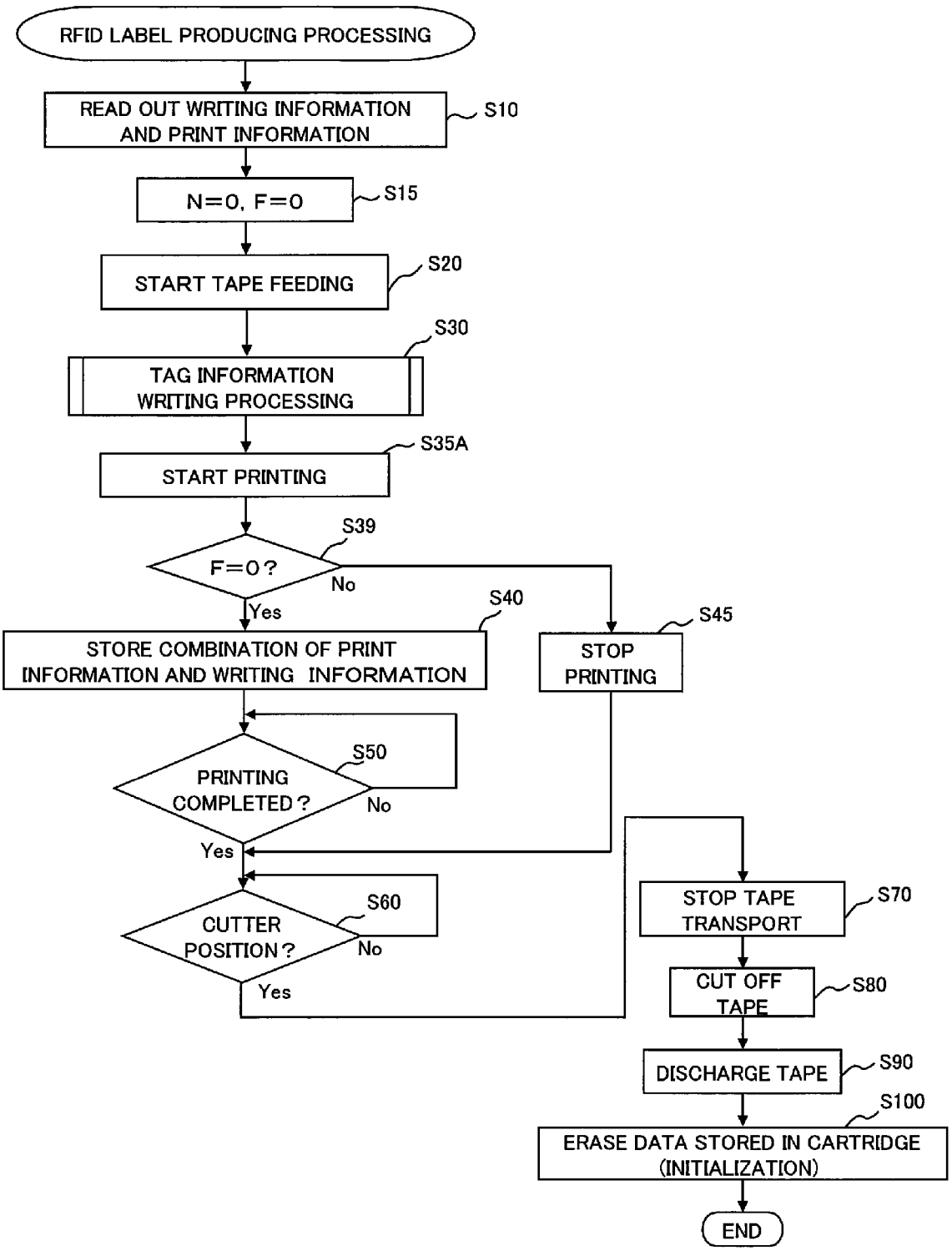
FIG. 41 is a flowchart which shows a procedure of Step S190 shown in FIG. 38 in detail.

FIG. 41 is a flowchart which shows a detailed procedure for the RFID label producing process shown in the aforementioned Step S190 in FIG. 38.

First, in Step S10, the RFID tag information, which is to be written to the IC circuit part 151 of the RFID circuit element To via the antenna 14 and which is input by operating the terminal 5 or the general purpose computer 6, and the printing information for instructing the print head 10 to print the RFID label T are read out via the communication line 3 and the input/output interface 31.

Subsequently, the flow proceeds to Step S15. In Step S15, the variable N and the flag F are initialized to zero. The variable N is used for counting the number of retries for handling a situation in which a response is not been returned from the RFID circuit element To, and the flag F indicates whether the communication succeeds or fails.

Subsequently, in Step S20, a control signal is output to the cartridge shaft drive circuit 24, whereupon the ribbon take-up roller 106 and the pressure roller 107 are rotationally driven by the driving force provided from the motor 23 to drive cartridge shaft. Thus, the base tape 101 is fed out from the first roll 102, and is supplied to the pressure roller 107. At the same time, the cover film 103 is fed out from the second roll 104. Furthermore, a control signal is output to the tape-feeding-roller motor 28 via the tape-feeding-roller drive circuit 29 so as to rotationally drive the feeding roller 17. As a result, the tapes 101, 103, and 110 are driven such that the base tape 101 and the cover film 103 (after the printing step as described above) are adhered to each other by the pressure roller 110 and the sub roller 109, thereby forming a tape in the form of a single member. With such an arrangement, the tape thus formed, which is the tag label tape 110 with print, is transported to outside the cartridge 100.

Subsequently, the flow proceeds to Step S30 where writing processing is performed, in which the RFID tag information is transmitted to and is written to the RFID circuit element To (of which detailed description will be made later with reference to FIG. 42).

Then, the flow proceeds to Step S35A, where a control signal is output to the print-head drive circuit 25 so as to supply power to the print head 10. In this step, the power is supplied such that printed characters R such as letters, symbols, barcodes, or the like, read out in Step S10 are formed in a predetermined region on the cover film 103 (e.g., the region which is to be adhered to the back face of each of the RFID circuit elements To disposed on the base tape 101 at a predetermined pitch and at a constant interval). After the completion of Step S35A, the flow proceeds to Step S39.

In Step S39, determination is made whether or not the flag F is equal to zero. In a case that the writing processing has been normally completed, the flag F remains zero (see Step S38 in the flowchart shown in FIG. 42 described later). Accordingly, determination is made that the condition is satisfied, whereupon the flow proceeds to Step S40. On the other hand, in a case that the writing processing has not been normally completed due to any cause, the flag F is set to 1 (see Step S38 in the flowchart shown in FIG. 42 described later). In this case, the flow proceeds to Step S45 where a control signal is output to the print-head drive circuit 25 so as to stop the supply of power to the print head 10, thereby stopping the printing. As described above, in this case, the printing is stopped before completion so as to clarify that the RFID circuit element To thus targeted is defective. Subsequently, the flow proceeds to Step S60 described later.

In Step S40, the combination of the RFID tag information written to the RFID circuit element To in the aforementioned Step S30 and the printed information printed by the print head 10 corresponding to the RFID tag information is output to the terminal 5 or the general purpose computer 6 via the input/output interface 31 and the communication line 3. The combination of these information sets is stored in the information server 7 or the route server 4. Note that the data thus stored is stored in a database in a manner that allows the data thus stored to be used as reference data via the terminal 5 or the general purpose computer 6 as necessary.

Subsequently, in Step S50, confirmation is made whether or not printing has been completed for the entire region of the cover film 103 that corresponds to the RFID circuit element To which is the processing target at the current point in time. After the confirmation, the flow proceeds to Step S60.

In Step S60, determination is made whether or not the tag label tape 110 with print has been transported to a predetermined position where it is to be cut off by the cutter 15. Specifically, an arrangement may be made in which determination is made whether or not the RFID circuit element To which is the target and the entire printed region of the cover film 103 that corresponds to the RFID circuit element To have extended beyond the position of the cutter 15 to a predetermined length (margin) by detecting an appropriate identification mark provided to the base tape 101 (alternatively, the identification mark may be provided to the detachable paper sheet 101d, the cover film 103, or the like), which corresponds to each RFID circuit element To, using a known tape sensor externally provided to the cartridge 100 (e.g., at a position further downstream of the cutter 15 along the transport direction). Alternatively, an arrangement may be made in which determination is made whether or not the sum of the length of the printed characters R and the margin exceeds the overall length of the RFID circuit element To based upon the printing information, instead of the aforementioned detection. With such an arrangement, in a case that the sum of the length of the printed characters and the margin exceeds the overall length of the RFID circuit element To, the region that exceeds the margin is cut by the cutter 15 in the stage in which the printing of the cover film 103 has been completed. Even in the worst case, this protects against cutting the RFID circuit element To, which is to be adhered to the cover film 103.

In a case that determination has been made in the aforementioned Step S60 that the condition has been satisfied, the flow proceeds to Step S70. In Step S70, control signals are output to the cartridge shaft drive circuit 24 and the tape-feeding-roller drive circuit 29 so as to stop the driving of the motor 23 to drive cartridge shaft and the tape-feeding-roller motor 28. As a result, the rotations of the ribbon take-up roller 106, the pressure roller 107, and the feeding roller 17 are stopped. Accordingly, the feeding out of the base tape 101 from the first roll 102, the feeding out of the cover film 103 from the second roll 104, and the transport of the tag label tape 110 with print by the feeding roller 17 are stopped.

In the following Step S80, a control signal is output to the solenoid drive circuit 27 so as to drive the solenoid 26. In this step, the solenoid 26 is driven such that the tag label tape 110 with print is cut off by the cutter 15. As described above, at this point in time, the RFID circuit element To, which is the processing target, and the entire printed region of the cover film 103 that corresponds to the RFID circuit element To sufficiently extend beyond the position of the cutter 15. Thus, a label-shaped RFID label T, which includes the RFID circuit element To from which the RFID tag information has been read out, and on which printing has been performed corresponding to the RFID tag information thus read out, is formed by cutting the tag label tape 110 with print using the cutter 15.

Subsequently, the flow proceeds to Step S90 where a control signal is output to the tape-feeding-roller drive circuit 29 so as to drive the tape-feeding-roller motor 28 again, thereby rotating the feeding roller 17. As a result, the feeding roller 17 begins transport again. Accordingly, the RFID label T thus formed in the shape of a label in the aforementioned Step S150 is transported toward the discharge opening 16, and the RFID label T is thereby discharged to outside the apparatus 2 via the discharge opening 16.

Lastly, in Step S100, the RFID tag information stored in the IC circuit part 151 of all the RFID label circuit devices To remaining within the communication range (the communication area X described above) provided within the cartridge 100 is erased (initialized). Specifically, an "Erase" command, which provides a function of initializing the information stored in the memory part 157 of the RFID circuit element To, is output to the signal processing circuit 22. Then, the signal processing circuit 22 creates an "Erase" signal in the form of RFID tag information based upon the "Erase" command. The "Erase" signal is transmitted to all the RFID circuit elements To remaining within the communication range (the aforementioned communication area X) via the transmitting portion 32 of the radio frequency circuit 21 and the antenna 14, thereby initializing the memory units 157.

Figure 42:
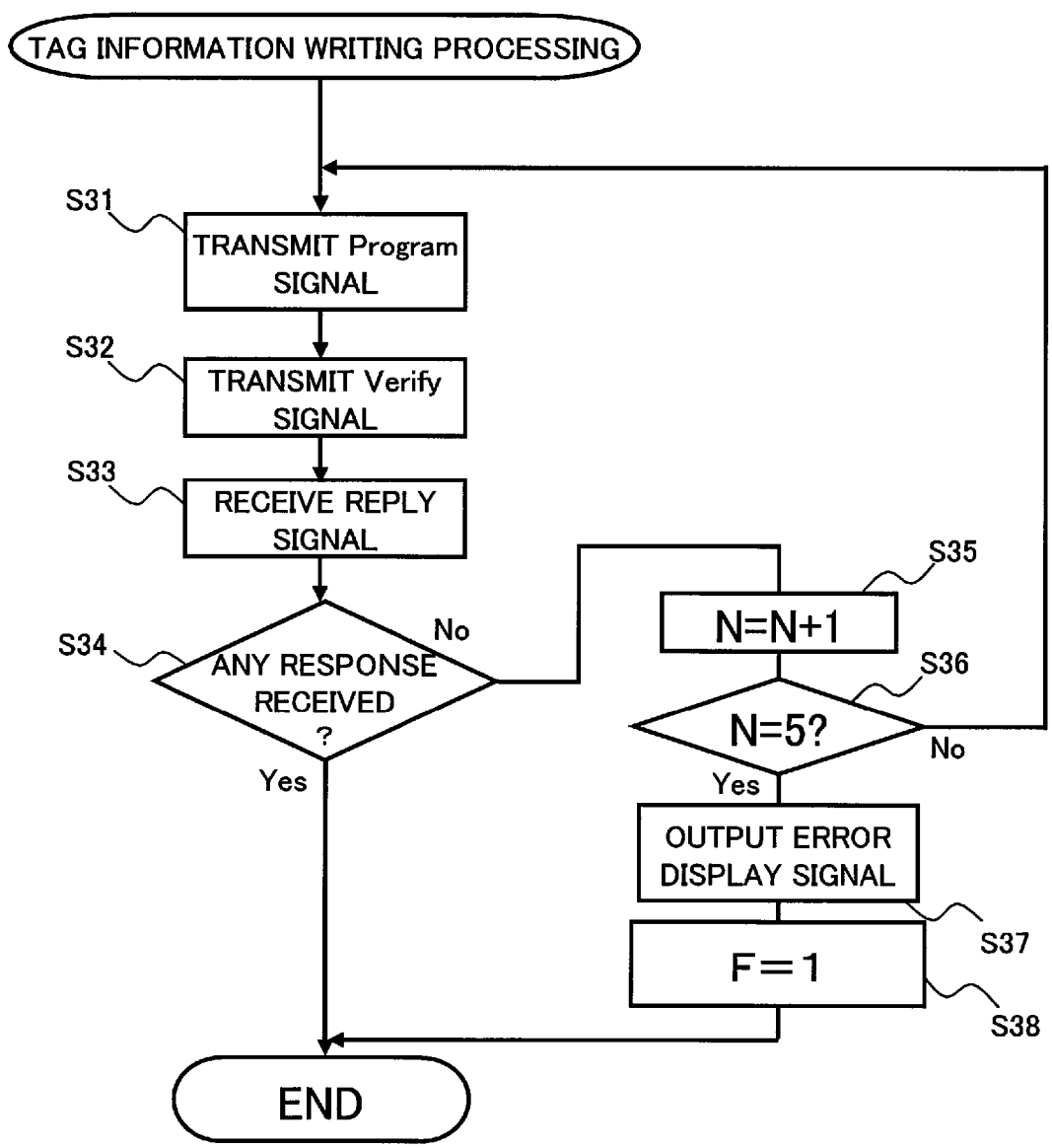
FIG. 42 is a flowchart which shows a procedure of Step S30 shown in FIG. 41 in detail.

FIG. 42 is a flowchart which shows a detailed procedure of the aforementioned Step S30.

In FIG. 42, after the completion of the aforementioned Step S20 shown in FIG. 41, first, the flow proceeds to Step S31 where a "Program" command for writing desired data to the memory part 157 is output to the signal processing circuit 22. The signal processing circuit 22 creates a "Program" signal, which is RFID tag information including the target ID information to be written, based upon the "Program" command. The "Program" signal thus created is transmitted to all the RFID circuit elements To within the communicable area (the aforementioned communication area X) via the transmitting portion 32 of the radio frequency circuit 21 and the antenna 14, thereby writing the information to the memory units 157 included within the RFID circuit elements To.

Subsequently, in Step S32, a "Verify" command is output to the signal processing circuit 22 for confirming the contents stored in the memory part 157. The signal processing circuit 22 creates a "Verify" signal in the form of RFID tag information based upon the "Verify" command. The "Verify" signal thus created is transmitted to all the RFID circuit elements To within the communicable area via the transmitting portion 32 of the radio frequency circuit 21 and the antenna 14, which instructs each RFID circuit element To transmit a response.

Then, the flow proceeds to Step S33 where a reply (response) signal transmitted from (replied by) each of all the RFID circuit elements To in response to the aforementioned "Verify" signal is received via the antenna 14. The reply signals thus received are acquired via the receiving portion 33 of the radio frequency circuit 21 and the signal processing circuit 22.

Next, in Step S34, determination is made based upon the reception results in the aforementioned Step S33 whether or not at least one valid reply signal (the signal which indicates that the information has been normally stored in the memory part 157) has been received from any one among all the RFID circuit elements To that remain in the communication area. Note that, let us consider a case in which a part of or the entire region of the first roll 102 is included in the communicable region X. Furthermore, let us consider a case in which reply signals have been received from the multiple RFID circuit elements To, and determination cannot be made whether or not the information has been normally stored, due to interference between the reply signals. In such a case, with the present embodiment, the transmission electric power is reduced such that the replay signal is received only from the RFID circuit element closest to the antenna, i.e., the RFID tag circuit which has been fed out from the roll.

In a case that determination has been made that the condition has been satisfied, the information has been correctly written to at least one of the RFID circuit elements To that remain within the aforementioned region X. In other words, a writing failure that affected all the RFID circuit elements To has not occurred. Accordingly, this routine ends. In a case that determination has been made that the condition has not been satisfied, the flow proceeds to Step S35 where the variable N is incremented by 1. Furthermore, the flow proceeds to Step S36 where determination is made whether or not the variable N is equal to 5. In a case that the variable N is equal to or less than 4, the condition has not been satisfied, and accordingly, the flow is returned to Step S31, and the same procedure is repeated. In a case that the variable N is equal to 5, the flow proceeds to the aforementioned Step S37. In Step S37, an error display signal is output to the terminal 5 or the general purpose computer 6 via the input/output interface 31 and the communication line 3 so as to display the corresponding writing failure (error) notice. Subsequently, in Step S38, the flag F is set to 1, whereupon this routine ends. As described above, with such an arrangement, a maximum of five writing retries are performed even if the information writing fails. From the perspective of the writing reliability, such an arrangement ensures stable operations.

Description has been made regarding an arrangement in which, after the setting of the optimum access power, the RFID tag information is transmitted to the RFID circuit element To so as to write the information to the IC circuit part 151. However, the present invention is not restricted to such an arrangement. Also, an arrangement may be made in which, after the setting of the optimum access power, printing is performed based upon the RFID tag information while reading out the RFID tag information from the read-only RFID circuit element that stores the predetermined RFID tag information (tag identification information etc.) in a manner that does not permit a rewrite, thereby creating a RFID label T.

With such an arrangement, only the printing information is read out in Step S10 shown in FIG. 41, and readout processing is performed for the RFID tag information in Step S30 (of which detailed description will be made later with reference to FIG. 43). Subsequently, in Step S40, the combination of the printing information and the RFID tag information thus read out is stored.

Figure 43:
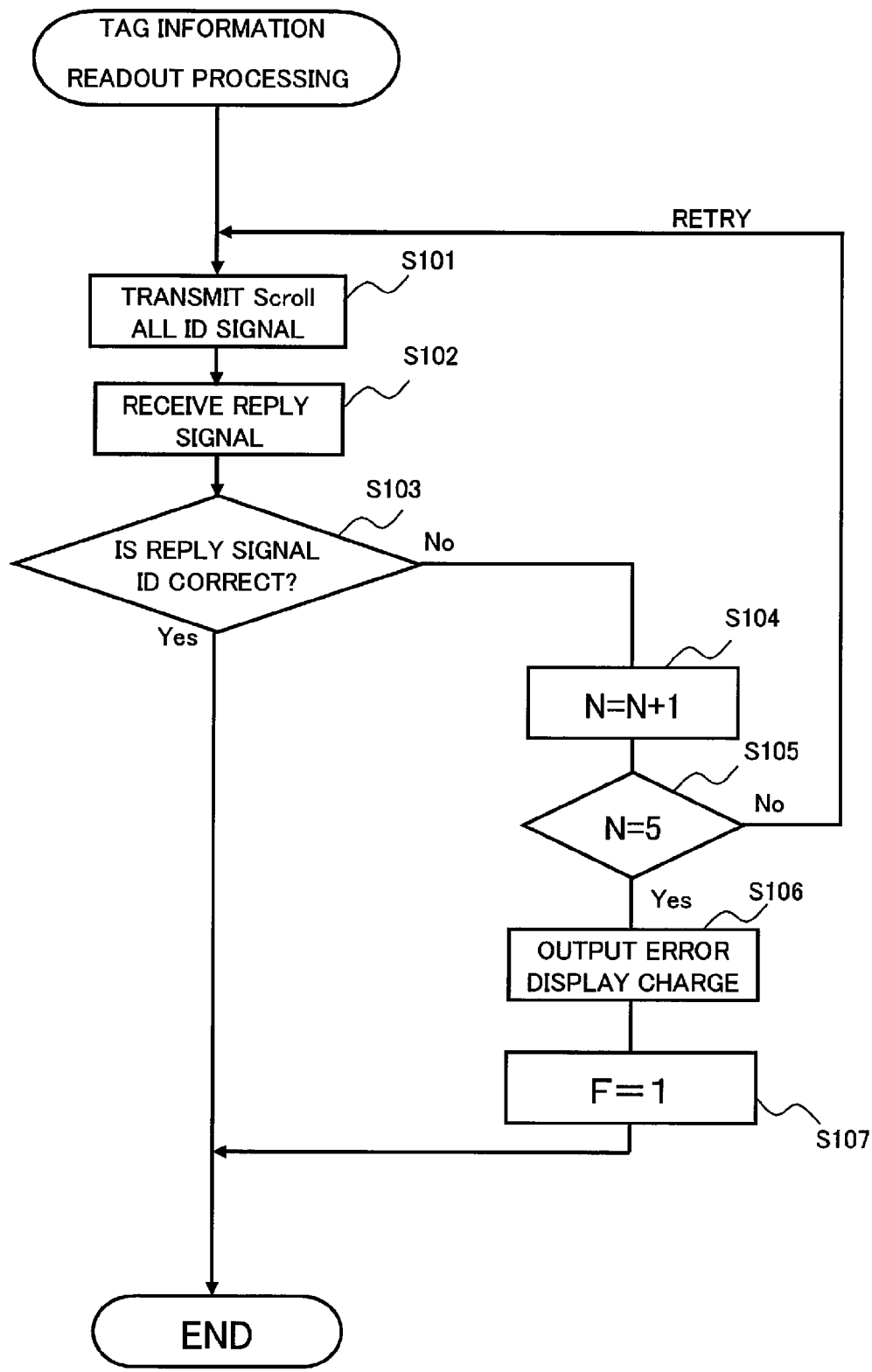
FIG. 43 is a flowchart which shows a procedure for reading out the RFID tag information executed by the control circuit.

FIG. 43 is a flowchart which shows a procedure of the aforementioned RFID tag readout process in detail.

In FIG. 43, upon the RFID circuit element To, which is an information readout target, being transported up to around the antenna 14, a "Scroll All ID" command is output to the signal processing circuit 22 in Step S101 for reading out the information stored in the RFID circuit element To. The signal processing circuit 22 creates a "Scroll All ID" signal in the form of RFID tag information based upon the "Scroll All ID" command. The "Scroll All ID" signal thus created is transmitted to the RFID circuit element To targeted for readout, via the radio frequency circuit 21, which instructs the RFID circuit element To return a response.

Subsequently, in Step S102, a reply signal (RFID tag information including tag ID information etc.), which has been transmitted from the RFID circuit element To targeted for readout in response to the aforementioned "Scroll All ID" signal, is received via the antenna 14. The reply signal thus received is acquired via the radio frequency circuit 21 and the signal processing circuit 22.

Subsequently, in Step S103, determination is made that the reply signal received in the aforementioned Step S102 is correct using known error detection code (CRC; Cyclic Redundancy Check or the like).

In a case that determination has been made that the condition has not been satisfied, the flow proceeds to Step S104 where the variable N is incremented by 1. Then, the flow proceeds to Step S105 where determination is made whether or not the variable N is equal to 5. In a case that the variable N is equal to or smaller than 4, determination is that the condition has not been satisfied, and the flow returns to Step S101, whereupon the same procedure is repeated. In a case that the variable N is equal to 5, the flow proceeds to Step S106. In Step S106, an error display signal is output to the terminal 5 or the general purpose computer 6 via the input/output interface 31 and the communication line 3 so as to display a corresponding readout failure (error) notice screen. Subsequently, the flow proceeds to Step S107 where the flag F is incremented by 1, whereupon this routine ends. As described above, with such an arrangement, a maximum of five readout retries are performed even if the information readout fails. From the perspective of the readout reliability, such an arrangement ensures stable readout operations.

In a case that determination has been made in Step S103 that the condition has been satisfied, readout of RFID tag information from the RFID circuit element To targeted for readout is completed, whereupon this routine ends.

With such an arrangement, the cartridge antenna 19, the signal processing circuit 22, and the receiving portion 33 of the radio frequency circuit 21 form readout unit configured to read out the tag property information with respect to the corresponding RFID circuit element for producing a RFID label stored in the record portion. Also, these components form input/output unit configured to input the communication factor which determines the performance of communication with the RFID circuit element for producing a RFID label, and which has been read out from the record portion. The Step S150 shown in FIG. 38 provides determining unit configured to make determination whether or not the output specified in the tag property information is within a predetermined permissible range.

With the apparatus 2 for communicating with a RFID tag described above, in a case of writing the RFID tag information to the RFID circuit element To, first, the RFID tag information that corresponds to the RFID circuit element To is created by the signal processing circuit 22 and the radio frequency circuit transmitting portion 32. Subsequently, the RFID tag information thus created is transmitted to the antenna 152 of the RFID circuit element To, which has been provided on the base tape 101, via wireless communication. Then, the RFID tag information is written to the IC circuit part 151 connected to the antenna 152. On the other hand, in a case of reading out the RFID tag information from the RFID circuit element To, the RFID tag information stored beforehand in the RFID circuit element To is received via the antenna 14, and is acquired by the control circuit 30 via the radio frequency circuit 21 and the signal processing circuit 22.

In general, in reality, the tag property data such as the communication sensitivity of the antenna 152 etc., of each RFID circuit element To deviates somewhat from the design specification value in manufacturing the RFID circuit elements To. Let us consider an arrangement in which access (writing or reading) is performed for all the RFID circuit elements To with uniform tag property data giving no consideration to such margins of error. With such an arrangement, there is a need to set sufficiently high access power, which is to be applied via the antenna 14, during a process in which access is consecutively performed for the multiple RFID circuit elements To so as to ensure sufficient communication performance even if communication is made with the RFID circuit element having lower communication sensitivity, for example.

As a result, in a case of communication with other (satisfactory) RFID tags having sufficient sensitivity, such high access power is excessive, leading to waste of energy. Furthermore, let us consider a case in which such high access power has exceeded the permissible output range of the RFID circuit element. In this case, undesirable effects can occur from the perspective of communication. Examples of such undesirable effects include distorted signals obtained from the radio waves received by the RFID circuit element To, communication interference with other RFID circuit elements To, and difficulty in identifying the reflected wave component due to the high intensity of the carrier waves, etc. The settings of the tag property data such as the memory writing voltage, memory writing time, and so forth for the memory 157 of the IC circuit part have similar problems.

In order to solve the aforementioned problems, with the apparatus 2 for communicating with a RFID tag according to the present embodiment, the RFID circuit element TA provided to the housing 100A of the cartridge 100 stores the optimum access power value for each RFID circuit element To. With such an arrangement, before transmission/reception of the RFID tag information to/from each RFID circuit element To, the corresponding access power value stored in the aforementioned RFID circuit element TA is read out. Then, settings are performed for the transmitting portion 32 of the radio frequency circuit 21 so as to provide the access power thus specified, whereby access to the RFID circuit element To is performed under the communication condition (with the access power) that accords with the RFID circuit element To. Such an arrangement provides the optimum communication condition by controlling the access power for each RFID circuit element To even if there are irregularities in the tag property data due to the manufacturing process for the RFID circuit elements To. This offers smooth communication for creating the RFID labels T. Such an arrangement enables the RFID labels T to be created with high reliability. Furthermore, such an arrangement suppresses waste of energy and adverse effects occurring from the perspective of communication, unlike the aforementioned arrangement in which communication is made for all the RFID circuit elements To with the uniform tag property data.

Description has been made regarding an arrangement which provides the optimum communication condition by adjusting the access power value as the property information with respect to the RFID circuit element To. However, the present invention is not restricted to such an arrangement. Also, an arrangement may be made in which the precharge period is adjusted as the property information. Specifically, an arrangement may be made in which the optimum precharge period is stored beforehand in the RFID circuit element TA for each RFID circuit element To. With such an arrangement, settings are made for the transmitting portion 32 of the radio frequency circuit 21 so as to provide the precharge period according to the precharge period value thus read out. Such an arrangement offers the same advantage as that provided by the aforementioned arrangement in which the access power value is adjusted as the property information, i.e., the advantage of enabling access to be made under the communication condition that accords with each RFID circuit element To.

Also, various modifications besides the above may be made according to the above-described sixth embodiment without departing from the essence and technical idea thereof. Examples of such modifications will be described in order below.

(2-1) Modification that does not Involve any Cartridge

Figure 44:
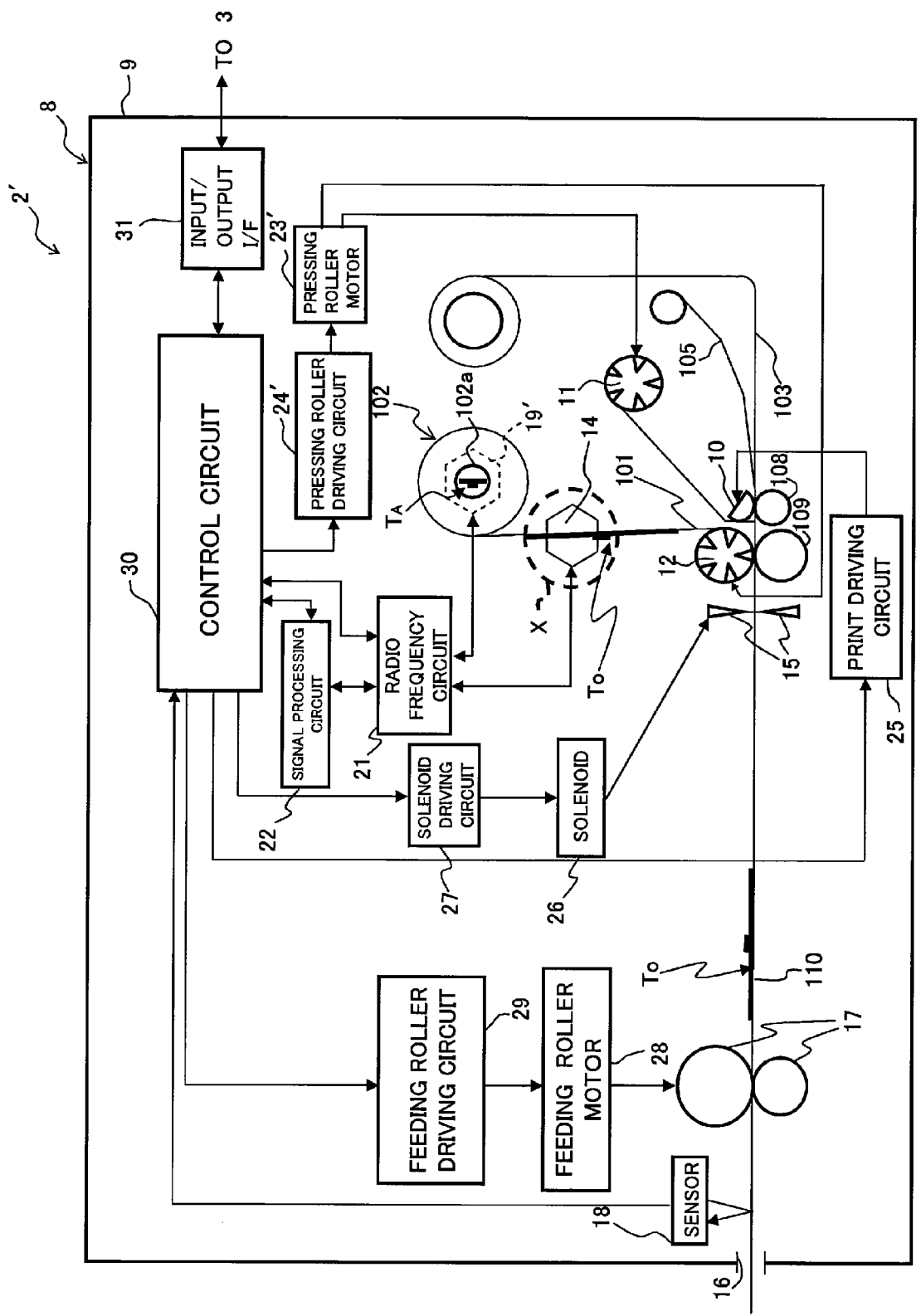
FIG. 44 is a conceptual configuration diagram which shows a detailed configuration of an apparatus for communicating with a RFID tag without involving a cartridge according to a modification.

FIG. 44 is a conceptual configuration diagram which shows a detailed configuration of an apparatus 2 for communicating with a RFID tag according to a modification that does not involve any cartridge, which corresponds to FIG. 31 showing the above-described sixth embodiment. The same components as those shown in FIG. 31 are denoted by the same reference numerals, and description thereof will be omitted as appropriate. With the modification shown in FIG. 44, the housing 9 including the aforementioned discharge opening 16 is provided to the apparatus main body 8. Furthermore, the same antennas 14 and 19' as those in the above-described sixth embodiment are provided to the housing 9.

The antenna 14 comprises a directional antenna (patch antenna) having single-direction directivity (toward the viewer in FIG. 44 in this example), disposed near to and alongside the axial direction of the aforementioned first roll 102 (away from the viewer in FIG. 44) such that it provides a communication area X near the over which communication can be made via the antenna 14, and which is provided near the tape feeding portion where the base tape 101 is fed from the first roll 102. With such an arrangement, the RFID circuit element To discharged to outside the housing 9 through the discharge opening 16 is out of the communication range provided by the antenna 14. Such an arrangement protects, in a sure manner, the RFID tag information stored in the RFID circuit element To, once it has been discharged to outside the housing 9 through the discharge opening 16, from being initialized or from being overwritten by other information transmitted from the antenna 14. Note that, in order to ensure this function, an appropriate shielding member is provided around the discharge opening 16.

Unlike the case of the above-described sixth embodiment wherein the cartridge antenna 19' (reading unit, input/output unit) disposed so as to face the RFID circuit element TA provided to the housing 100A of the cartridge 100, the cartridge antenna 19' comprises a directional antenna (patch antenna) having single-direction directivity (toward from the viewer in FIG. 44 in this example), disposed near to and alongside the axial direction of the reel member 102a (away from the viewer in FIG. 44) of the first roll 102 (configuring a container for the RFID circuit device in this modification) so as to be communicable with the RFID circuit element TA provided to the reel member 102a (e.g., to one side of the reel member 102a (toward from the viewer in FIG. 44 in this example)).

With the present modification, the cartridge 100 is eliminated, and the components, which are provided to the cartridge 100 in the above-described embodiment, are directly provided to the housing 9. In connection with such a configuration, the feeding roller drive shaft 12 and the ribbon take-up roller driving shaft 11 are driven by a pressure roller 23' that is controlled and driven by a pressure roller driving circuit 241, instead of the motor 23 to drive cartridge shaft that is controlled and driven by the cartridge shaft drive circuit 24 which are corresponding components in the above-described sixth embodiment.

With the present modification as well, the advantages of the above-described sixth embodiment can be obtained, wherein the access power value (or pre-charge time) stored in the RFID circuit element TA is read out via the cartridge antenna 19', the transmitting portion 32 of the radio frequency circuit 21 is set to that access power value (or pre-charge time), and access can be carried out in this communication mode matching the RFID circuit element To.

While the first roll 102 serving as the container for including at least a RFID tag has been described above as being configured by wrapping the base tape 1-1 around the reel member 102a, the present invention is not restricted to such an arrangement. That is to say, this may be formed as a hollow roll with no reel member 102a.

Note that while description has been made in the above sixth embodiment of the configuration using a cartridge 100 wherein the RFID circuit element TA is provided in the housing 100A of the cartridge 100, the present invention is not restricted to such an arrangement. Rather, the RFID circuit element TA may be provided to the reel member 102a within the cartridge 100, as with the present modification. In this case, configuring the cartridge antenna 19 with a directional antenna (patch antenna) having single-direction directivity (toward the viewer in FIG. 31) in the same way as with the cartridge antenna 19' in the present modification is sufficient.

(2-2) Modification that Involves a Tray-Type Cartridge

Note that while description has been made in the above sixth embodiment with regard to an example of having, as a cartridge, the cartridge 100 having a first roll 102 configured to wind a strip of base tape 101 upon which multiple RFID circuit elements To have been sequentially formed in the longitudinal direction. However, the present invention is not restricted to this example, and other cartridge forms may be used as well.

Figure 45:
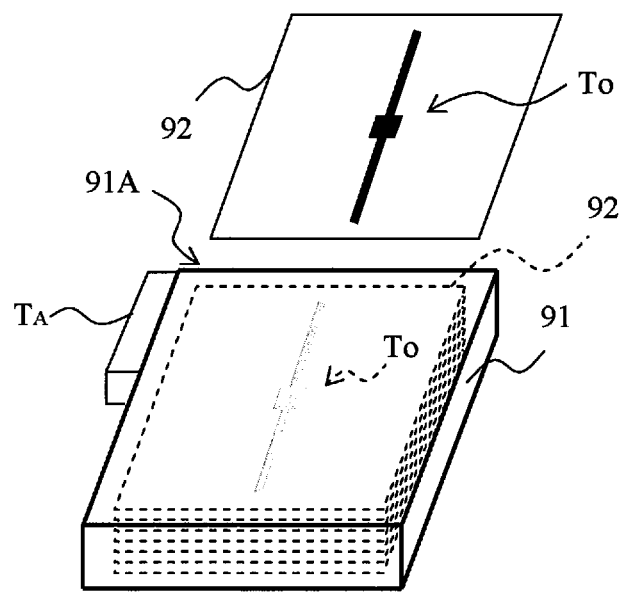
FIG. 45 is a conceptual configuration diagram which shows the overall configuration of an approximately box-shaped tray member employed as a cartridge according to a modification.

FIG. 45 is a conceptual perspective view illustrating such a modification.

In FIG. 45, a generally flat-box-shaped tray member 91 is provided as a cartridge in this modification. Multiple label material 92 sheets, upon which each of which a single RFID circuit element To is formed, are stacked flat within the tray member 91, so as to be stored therein. The sheets of label material 92 are extracted one at a time from a dispensing opening 91A provided to one side of the tray member 91 (to the far side of the drawing in this example), whereby the multiple RFID circuit elements To can be sequentially extracted. The RFID circuit elements To extracted from the tray member 91 are set at a position facing the antenna 14 provided to the apparatus 2 for communicating with a RFID tag, and readout is performed.

A RFID circuit element (second RFID circuit element) TA is provided to one side of the tray member 91 (to the left side of the drawing in this example). This RFID circuit element TA is disposed so as to be at a position generally facing the cartridge antenna 19 provided to the apparatus main body 8, at the time of the tray member 91 being attached to the apparatus main body 8 of the apparatus 2 for communicating with a RFID tag.

With the present modification as well, the access power value (or pre-charge time) stored in the RFID circuit element TA is read out via the cartridge antenna 19, the transmitting portion 32 of the radio frequency circuit 21 is set to the access power (or pre-charge time), and access can be carried out in this communication mode matching the RFID circuit element To, which is an advantage the same as with the above-described sixth embodiment.

(2-3) Modification without Adhesion Processing

That is to say, while no description will be made with reference to the drawings in particular, the present invention may be applied to a so-called non-laminate type cartridge wherein printing is performed on a cover film provided to the tag tape, rather than printing on a cover film 103 separately from the base tape 101 provided with the RFID circuit element To, and then adhering these together, as with the above-described sixth embodiment. In this case, multiple RFID circuit elements To may be provided on thermo-sensitive tape, with printing performed on the surface of the thermo-sensitive tape by a printing head having multiple heating elements, or an ink ribbon such as described in the above sixth embodiment may be used for printing.

With the present embodiment as well, the same advantage as that of the above-described sixth embodiment, wherein access can be carried out in this communication mode matching the RFID circuit element To, can be obtained.

Note that while a RFID circuit element is used in the above description as record portion configured to record the property value information of each RFID circuit element To, an arrangement may be made wherein a barcode (not shown), for example, is used. That is to say, the storage address and the like of the property value information of all of the RFID circuit elements To at the route server 4, which is recorded in the barcode, is read out with an unshown barcode scanner (reading unit, input/output unit), the control circuit 30 reads in the property value information (access power value or pre-charging time) of the RFID circuit element To from the storage address via the communication circuit 3 and the input/output interface 31, and the transmitting portion 32 of the radio frequency circuit 21 is set according to that communication mode. Thus, access can be carried out in this communication mode matching the RFID circuit element To. Note that it is sufficient for the barcode to be provided on the perimeter face of the housing 101A of the cartridge 100 with the above-described sixth embodiment and on one side face of the tray member 91 in the above modification (2), but an arrangement may be made wherein these are provided corresponding to each RFID circuit element To, for example. In this case, with the base tape 101 for example, forming a barcode for each RFID circuit element To on the detachable paper sheet 101d covering the adhesive layer 101c for applying the RFID label T to a certain product for example, is sufficient.

Also, while description has been made above regarding an arrangement wherein the property value information (access power value or pre-charging time) of the RFID circuit element To is stored in the RFID circuit element TA, the present invention is not restricted to this arrangement, and the stored property value information may be the memory writing voltage for writing to the memory part 157 of the above-described IC circuit part 151, writing time, or other like access conditions or the like. In this case as well, reading to such access condition information stored in the RFID circuit element TA and setting the transmitting portion 32 of the radio frequency circuit 21 so as to correspond to the access conditions such as the memory write voltage, write time, etc., enables access to be carried out in this communication mode matching the RFID circuit element To.

Further, the required energy changes according to the memory capacity of the memory part 157, so the amount of write power necessary at the time of writing changes according to the memory capacity, in this sense, an arrangement may be made wherein the memory capacity is also included in the property information, this being stored in the RFID circuit element TA, in order to effect control to obtain optimal power.

Further, while an example has been described above wherein communication (writing or reading) is performed to or from base tape 101 (or thermo-sensitive tape) moving within the cartridge 100 or the like as the printing operations proceed, the present invention is not restricted to this, and an arrangement may be made wherein the base tape 101 or the like is stopped at a predetermined position (in a state further held with a predetermined conveyance guide) and the above communication is performed.

Also, a combination of the technique according to the aforementioned sixth embodiment and the technique according to any one of the aforementioned modifications may be made as appropriate, in addition to the above-described arrangements.

Moreover, besides the above, the technique according to the above-described sixth embodiment and techniques according to each of the above-described modifications may be combined and used as appropriate.

A seventh embodiment of the present invention will be described with reference to the drawings. To clarify understanding of the configuration, parts which are equivalent to those in the first through sixth embodiments will be denoted with the same reference numerals, and description will be made with reference to equivalent drawings as suitable.

Figure 46:
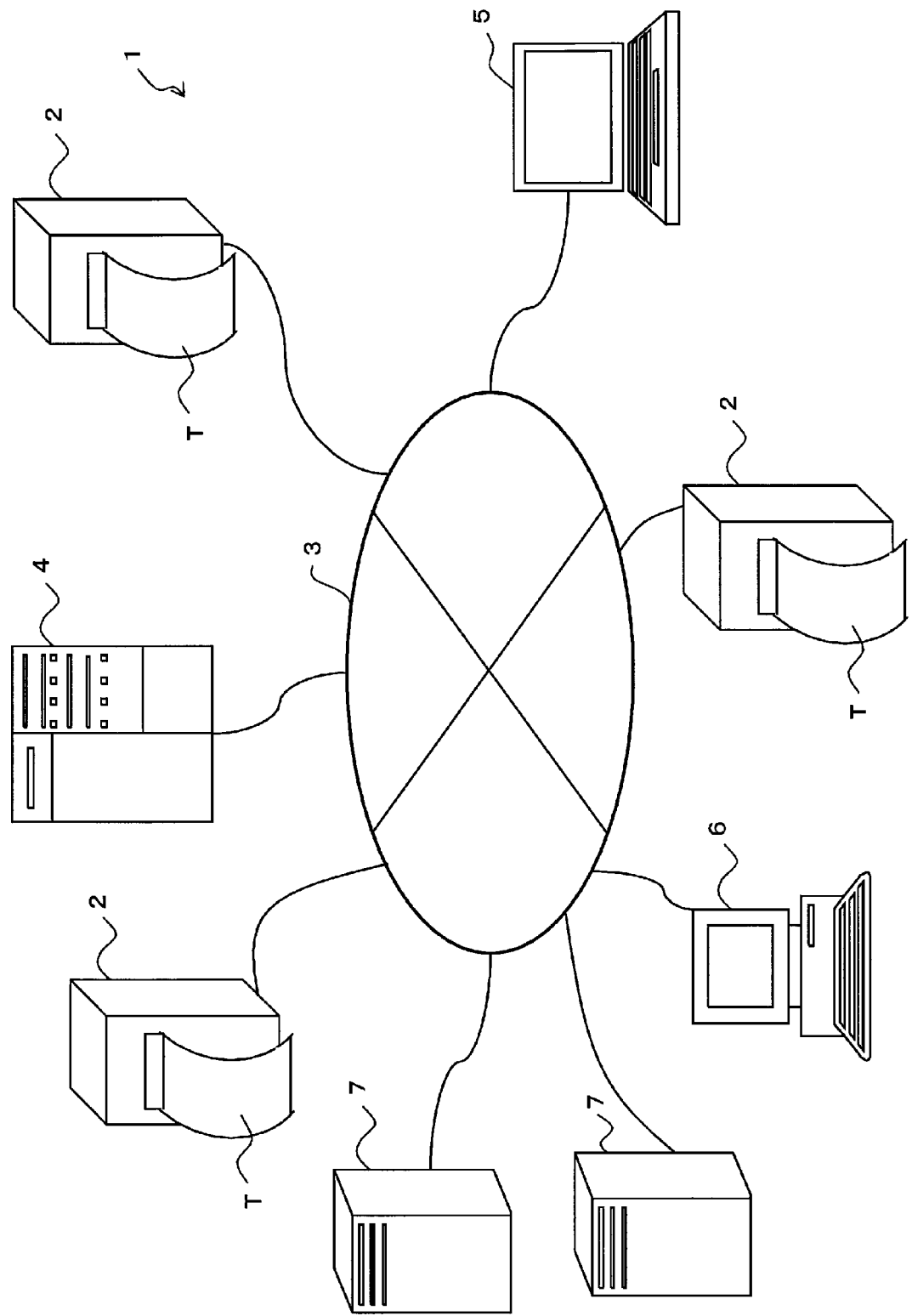
FIG. 46 is a system configuration diagram which shows a RFID tag producing system which an apparatus for communicating with a RFID tag is applied according to a seventh embodiment of the present invention.

FIG. 46 is a system configuration diagram illustrating a RFID tag manufacturing (producing) system (RFID tag information communication system) to which the apparatus for communicating with a RFID tag according to the present embodiment is applied. This embodiment is an embodiment wherein the present invention has been applied to a RFID tag manufacturing system capable of only reading (i.e., writing is not enabled).

With the RFID tag producing system 1 shown in FIG. 46, the apparatus 2 for communicating with a RFID tag according to the present embodiment is connected to a route server 4, a terminal 5, a general purpose computer 6, and multiple information servers 7 via a communication line 3 in a wired or wireless manner.

Figure 47:
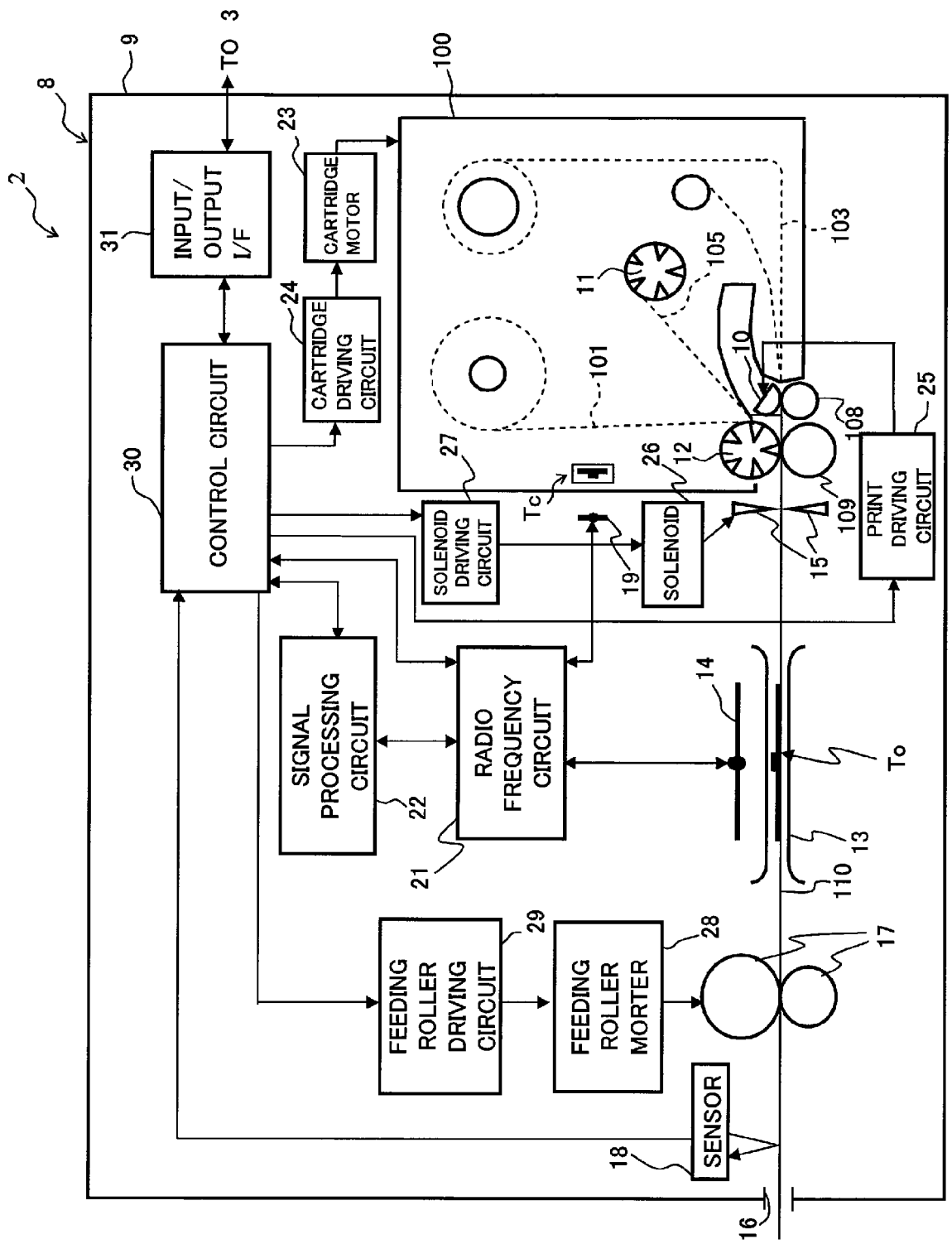
FIG. 47 is a conceptual configuration diagram which shows a detailed configuration of the apparatus for communicating with a RFID tag.

FIG. 47 is a conceptual configuration diagram which shows a detailed configuration of the aforementioned apparatus 2 for communicating with a RFID tag.

In FIG. 47, the apparatus main body 8 of the apparatus 2 for communicating with a RFID tag includes a cartridge holder portion (portion for mounting the storing member, not shown) formed in the shape of a recess. The cartridge 100 (RFID circuit element cartridge), serving as a container for including at least a RFID tag, is detachably mounted to the holder portion.

The apparatus main body 8 includes a housing 9, a print head (thermal head in this case) 10, a ribbon take-up roller driving shaft 11, a feeding roller drive shaft 12 (driving shaft), an antenna 14, an antenna 19, a cutter 15, a pair of transporting guides 13, a feeding roller 17, and a sensor 18. The housing 9 has the above-described cartridge holder portion to which the cartridge 100 is fit and also makes up the outline. The print head 10 as printing unit performs predetermined printing of the cover film 103. The ribbon take-up roller driving shaft 11 drives the ink ribbon 105 after the printing of the cover film 103. The feeding roller drive shaft 12 (driving shaft) adheres the cover film (printed tape) 103 to a base tape 101 and feeds out the pressure-bonded tape from the cartridge 100 as a tag label tape 110 with print. The antenna 14 transmits/receives signals to/from a RFID circuit element To included in the tag label tape 110 with print (RFID circuit element for a RFID label, of which detailed description will be made later) via wireless communication using a high frequency band such as a UHF band or the like. The antenna 19 transmits/receives signals by wireless communication with the RFID circuit element Tc (management RFID circuit element) provided to the cartridge 100 as described above. The cutter 15 cuts the aforementioned tag label tape 110 with print at a predetermined timing and to a predetermined length, thereby forms label-shaped RFID labels T (of which detailed description will be made later). The pair of transporting guides 13 sets and holds the RFID circuit element To at a predetermined access area facing the antenna 14 at the time of receiving/transmitting signals by the wireless communication described above, and guides the tape 100 following cutting, which is then the RFID label T. The feeding roller 17 transports the RFID labels T guided thereunto to an output opening (discharge opening) 16, thereby outputting the RFID labels T. The sensor 18 detects whether or not there is a RFID label T at the output opening 16.

Also, the apparatus main body 8 includes a radio frequency circuit 21, a signal processing circuit 22, a motor 23 to drive cartridge shaft, a cartridge shaft drive circuit 24, a print-head drive circuit 25, a solenoid 26, a solenoid drive circuit 27, a tape-feeding-roller motor 28, a tape-feeding-roller drive circuit 29, and a control circuit 30. The radio frequency circuit 21 accesses (writes or reads) the aforementioned RFID circuit element To via the antenna 14. The signal processing circuit 22 processes signals read out from the RFID circuit element To. The motor 23 to drive cartridge shaft drives the ribbon take-up roller driving shaft 11 and the feeding roller drive shaft 12. The cartridge shaft drive circuit 24 controls the driving of the motor 23 to drive cartridge shaft. The print-head drive circuit 25 controls the supply of power to the aforementioned print head 10. The solenoid 26 drives the aforementioned cutter 15 such that it performs the cutting operation. The solenoid drive circuit 27 controls the solenoid 26. The tape-feeding-roller motor 28 drives the aforementioned feeding roller 17. The tape-feeding-roller drive circuit 29 controls the tape-feeding-roller motor 28. The control circuit 30 controls the radio frequency circuit 21, the signal processing circuit 22, the cartridge shaft drive circuit 24, the print-head drive circuit 25, the solenoid drive circuit 27, the tape-feeding-roller drive circuit 29, and so forth, thereby control the operation of the overall system of the apparatus 2 for communicating with a RFID tag.

The control circuit 30 is a so-called microcomputer. While detailed description thereof will be omitted, the control circuit 30 comprises a CPU which is a central computation processing device, ROM, RAM, and so forth, and performs signal processing according to a program stored beforehand in the ROM using the temporary storage function provided by the RAM. Furthermore, the control circuit 30 is connected to the communication line via the input/output interface 31, for example. Such an arrangement allows the control circuit 30 to transmit/receive information with the route server 4, the other terminals 5, the general purpose computer 6, the information server 7, etc.

Figure 48:
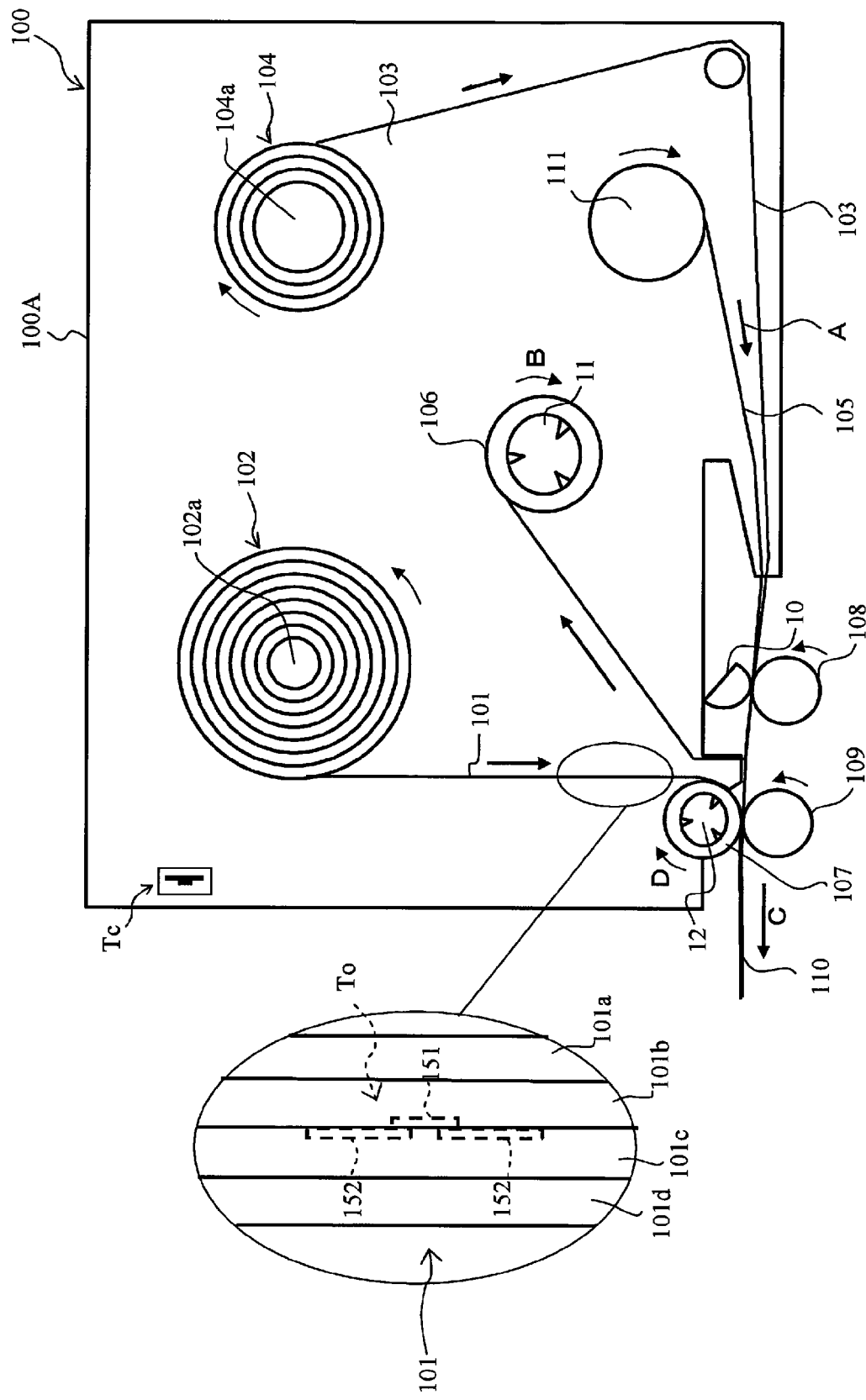
FIG. 48 is an explanatory diagram for describing the detailed structure of a cartridge.

FIG. 48 is an explanatory diagram for describing the detailed configuration of the aforementioned cartridge 100.

In FIG. 48, the cartridge 100 comprises a housing 100A, the second roll 104, a ribbon-supply-side roll 111, a ribbon take-up roller 106, a pressure roller 107, and the RFID circuit element Tc. The first roll 102 winds the strip base tape 101 (tag tape) and is disposed within the housing 100A. The second roll 104 winds the transparent cover film 103. The cover film 103 has approximately the same width as that of the base tape 101. The ribbon-supply-side roll 111 supplies the ink ribbon 105 (heat transfer ribbon, which can be eliminated in a case of employing a thermo-sensitive tape as the cover film). The ribbon take-up roller 106 rewinds the ribbon 105 after the printing. The pressure roller 107 adheres the base tape 101 and the cover film 103 to each other by applying pressure and transports the tag label tape 110 with print thus formed in the direction of the arrow A (i.e., serving as a feeding roller). The RFID circuit element Tc is disposed at a position approximately facing the antenna 19 at the apparatus main body 8 side on the housing 100A.

The first roll 102 stores, in a manner so as to be wound around a reel member 102a, the base tape 101, which has a structure in which multiple RFID circuit elements To are consecutively formed at a predetermined pitch along the longitudinal direction.

In this example, the base tape 101 has a four-layer structure (see partial enlarged view in FIG. 48) comprising an adhesive layer 101a formed of an appropriate adhesive material, a colored base film 101b formed of PET (polyethylene terephthalate) or the like, an adhesive layer 101c formed of an appropriate adhesive material, and a detachable paper sheet 101d. The four layers of the base tape 101 are layered in that order from the layer that corresponds to the inner side of the rolled tape (the rightmost layer in FIG. 48) to the layer that corresponds to the opposite side (the leftmost layer in FIG. 48).

The base film 101b includes antennas (first antennas) 152, which provide a function of transmission/reception of information, on the back face of the base film 101b (on the left side in FIG. 48) such that they and the base film 101b form a single member. Furthermore, an IC circuit part (first IC circuit part) 151 for updatably (rewritably) storing information is formed such that it is connected to each first antenna 152, thereby forming individual RFID circuit elements To (this holds true for the aforementioned RFID circuit element Tc as well).

The aforementioned adhesive layer 101a configured to adhere the cover film 103 later is formed on the front face (right side in FIG. 48) of the base film 101b, and the aforementioned detachable paper sheet 101d is adhered to the base film 101b by the aforementioned adhesive layer 101c provided on the back face of the base film 101b (left side in FIG. 48) so as to enclose the RFID circuit elements To. Note that the user peels off the detachable paper sheet 101d when the user adheres the completed RFID label T to a certain product or the like, thereby adhering the RFID label T to the product or the like, by the adhesive layer 101c.

The second roll 104 stores the aforementioned cover film 103 such that it is wound around a reel member 104a. The cover film 103 is supplied from the second roll 104. The ribbon 105 is supplied on the back side of the cover film 103 (i.e., on the face of the side which is to be adhered to the base tape 101), and is driven by the ribbon-supply-side roll 111 and the ribbon winding roll 106. The ribbon 105 thus supplied is pressed by the print head 10, thereby coming into contact with the back face of the cover film 103.

The aforementioned motor 23 to drive cartridge shaft (see FIG. 47 described above), which is a pulse motor externally provided to the cartridge 100, transmits driving force to each of the ribbon take-up roller driving shaft 11 and the feeding roller drive shaft 12, thereby rotationally driving the ribbon take-up roller 106 and the pressure roller 107.

With regard to each of the multiple RFID circuit elements To provided on the base tape 101, upon access (reading in this case, writing in a later-described modification) being made to RFID tag information of the IC circuit part 151 of each RFID circuit element To by the antenna 14, the corresponding access history information (making up a communication factor for determining communication capabilities as to the RFID circuit element To) is written and stored to the RFID circuit element Tc (details will be described later).

With the cartridge 100 having the aforementioned configuration, the base tape 101 fed out from the aforementioned first roll 102 is supplied to the pressure roller 107. On the other hand, the ink ribbon 105 is driven by the ribbon supplying side roller 111 and the ribbon take-up roller 106 so as to be located on the back face side (i.e., the face of the side which is to be adhered to the base tape 101) of the cover film 103 fed out from the second roll 104. Furthermore, the ink ribbon 105 thus driven is pressed by the print head 10, thereby being brought into contact with the back face of the cover film 103.

With such an arrangement, upon shifting the roll holder (not shown) from the separate position to the contact position after mounting the cartridge 100 to the cartridge holder portion of the apparatus main body 8, the cover film 103 and the ink ribbon 105 are held by the nip between the print head 10 and the platen roller 108, and the base tape 101 and the cover film 103 are held by the nip between the pressure roller 107 and a sub roller 109. Then, the ribbon take-up roller 106 and the pressure roller 107 are synchronously rotationally driven along the directions denoted by the arrow B and the arrow D, respectively, by the driving force provided from the motor 23 to drive cartridge shaft. Furthermore, the feeding roller drive shaft 12, the sub roller 109, and the platen roller 108 are connected to one another by a gear set (not shown). With such an arrangement, upon driving the feeding roller drive shaft 12, the pressure roller 107, the sub roller 109, and the platen roller 108 rotate, thereby feeding out the base tape 101 from the first roll 102. The base tape 101 thus fed out is supplied to the pressure roller 107 as described above. On the other hand, the cover film 103 is fed out from the second roll 104. At the same time, power is supplied to multiple heater elements provided to the print head 10 from the print-head drive circuit 25. As a result, printing is performed, thereby forming printed letters R (see FIG. 51 described later) on the back face of the cover film 103. Then, the base tape 101 and the printed cover film 103 are adhered (pressure-bonded) to each other by the pressure roller 107 and the sub roller 109 so as to form a single tape, thereby forming the printed tag label tape 101. The printed tag label tape 101 thus formed is transported to outside the cartridge 100. Note that the ink ribbon 105 is rewound by the driving force provided from the ribbon take-up roller driving shaft 11 after the printing of the cover film 103.

Figure 49:
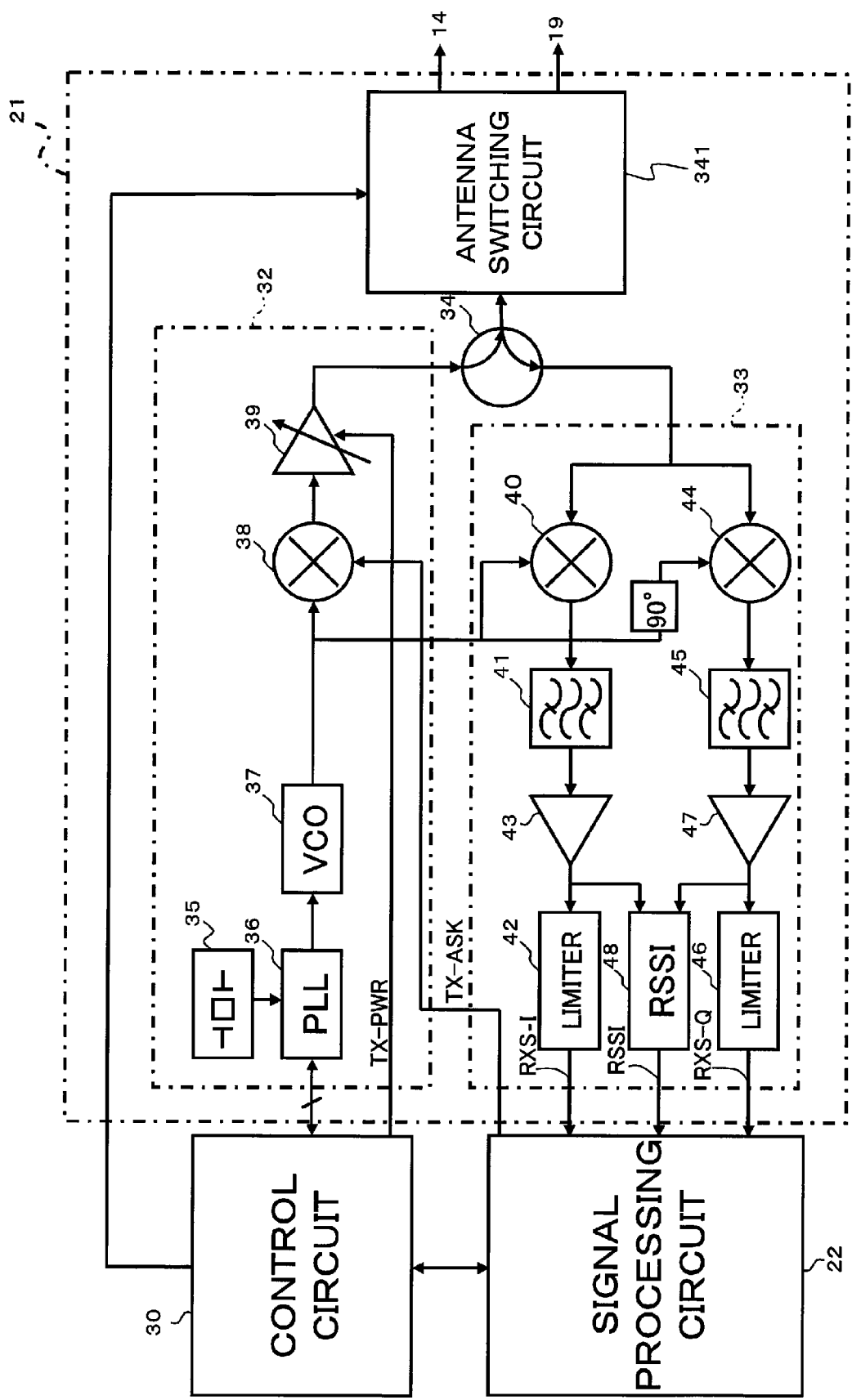
FIG. 49 is a functional block diagram which shows a function of a radio frequency circuit in detail.

FIG. 49 is a functional block diagram which shows the functions of the aforementioned radio frequency circuit 21 in detail. In FIG. 49, the radio frequency circuit 21 comprises an antenna switch (switchover) circuit 341, a transmitting portion 32, a receiving portion 33, and a transmit-receive splitter 34. The antenna switch (switchover) circuit 341 can be switched over by the control circuit 30. The transmitting portion 32 transmits signals to the RFID circuit elements To and Tc via the antenna switch circuit 341, and the antennas 14 and 19. The receiving portion 33 receives the reflected waves from the RFID circuit elements To and Tc via the antennas 14 and 19.

The antenna switch circuit 341 is a switch circuit using known high-frequency FETs and diodes, and is for connecting one or the other of the antennas 14 and 19 to the transmit-receive splitter 34, based on selection signals from the control circuit 30.

The transmitting portion 32 includes a quartz oscillator 35, a PLL (Phase Locked Loop) 36, a VCO (Voltage Controlled Oscillator) 37, a transmission multiplying circuit 38 (note that, in a case of amplitude modulation, it may be replaced by an amplitude factor variable amplifier or the like), and a variable transmission amplifier 39. The quartz oscillator 35, the PLL 36, and the VCO generates carrier waves for accessing (reading in this example, also including writing in a later-described modification) the RFID tag information stored in the IC circuit part 151 of the RFID circuit elements To and Tc. The transmission multiplying circuit 38 modulates (in this case, amplitude modulation according to the "TX_ASK" signal supplied from the signal processing circuit 22) the carrier waves generated as described above according to a signal supplied from the signal processing circuit 22. The variable transmission amplifier 39 amplifies the modulated waves (RFID tag information) modulated by the transmission multiplying circuit 38 with an amplification factor determined according to a "TX_PWR" signal supplied from the control circuit 30. With such an arrangement, the UHF frequency band is preferably employed for the carrier waves generated as described above. The output signal from the transmission amplifier 39 is transmitted to one of the antennas 14 and 19 via the transmit-receive splitter 34 and the antenna switch circuit 341, whereby the output signal is supplied to the IC circuit part 151 of the RFID circuit devices To and Tc. Note that the RFID tag information is not restricted to the signals thus modulated. In some cases, only a plain carrier wave is transmitted as the RFID tag information.

The receiving portion 33 includes a first receiving signal multiplying circuit 40, a first band-pass filter 41, a first receiving signal amplifier 43, a second receiving signal multiplying circuit 44, a second band-pass filter 45, and a second receiving signal amplifier 47. The first receiving signal multiplying circuit 40 multiplies the reflected waves received from the RFID circuit elements To and Tc via the antennas 14 and 19 by the carrier waves generated as described above. The first band-pass filter 41 extracts only the signals within the necessary frequency band range from the output signals received from the first receiving signal multiplying circuit 40. The first receiving signal amplifier 43 amplifies the output signal from the first band-pass filter 41 and supplies the output signal thus amplified to a first limiter 42. The second receiving signal multiplying circuit 44 multiplies the reflected waves received from the RFID circuit elements To and Tc via the antennas 14 and 19 by the carrier waves that have been delayed by a phase angle of 90° after having been generated as described above. The second band-pass filter 45 extracts only the signals within the necessary frequency band range from the output signals of the second receiving signal multiplying circuit 44. The second receiving signal amplifier 47 amplifies the output signal input from the second band-pass filter 45, and supplies the signal thus amplified to a second limiter 46. With such an arrangement, the signal "RXS-I" output from the aforementioned first limiter 42 and the signal "RXS-Q" output from the aforementioned second limiter 46 are input to the aforementioned signal processing circuit 22, whereupon these signals are processed by the signal processing circuit 22.

Furthermore, the output signals from the first receiving signal amplifier 43 and the second receiving signal amplifier 47 are input to an RSSI (Received Signal Strength Indicator) circuit 48. With such an arrangement, the signal "RSSI" which indicates the magnitude of these signals is input to the signal processing circuit 22. As described above, the apparatus 2 for communicating with a RFID tag according to the present embodiment performs demodulation of the reflected waves from the RFID circuit device To by I-Q quadrature demodulation.

Though not described above in particular, an arrangement may be made with the present embodiment wherein the communication protocol or access frequency are changed (e.g., 13 MHz and 950 MHz) according to the switchover position of the antenna switch circuit 341, in order to reduce the possibility of crosstalk between the communication performed when the antenna switch circuit 341 is switched over to the antenna 19 side (i.e., communication between the antenna 19 and the RFID circuit element Tc) and communication performed when the antenna switch circuit 341 is switched over to the antenna 14 side (i.e., communication between the antenna 14 and the RFID circuit element To), i.e., to reduce the possibility of a tag which was not intended responding. Also, due to similar concern, the distance between the RFID circuit element Tc and the antenna 19 is preferably as close as possible, so that access history information can be written in a sure manner.

Figure 50:
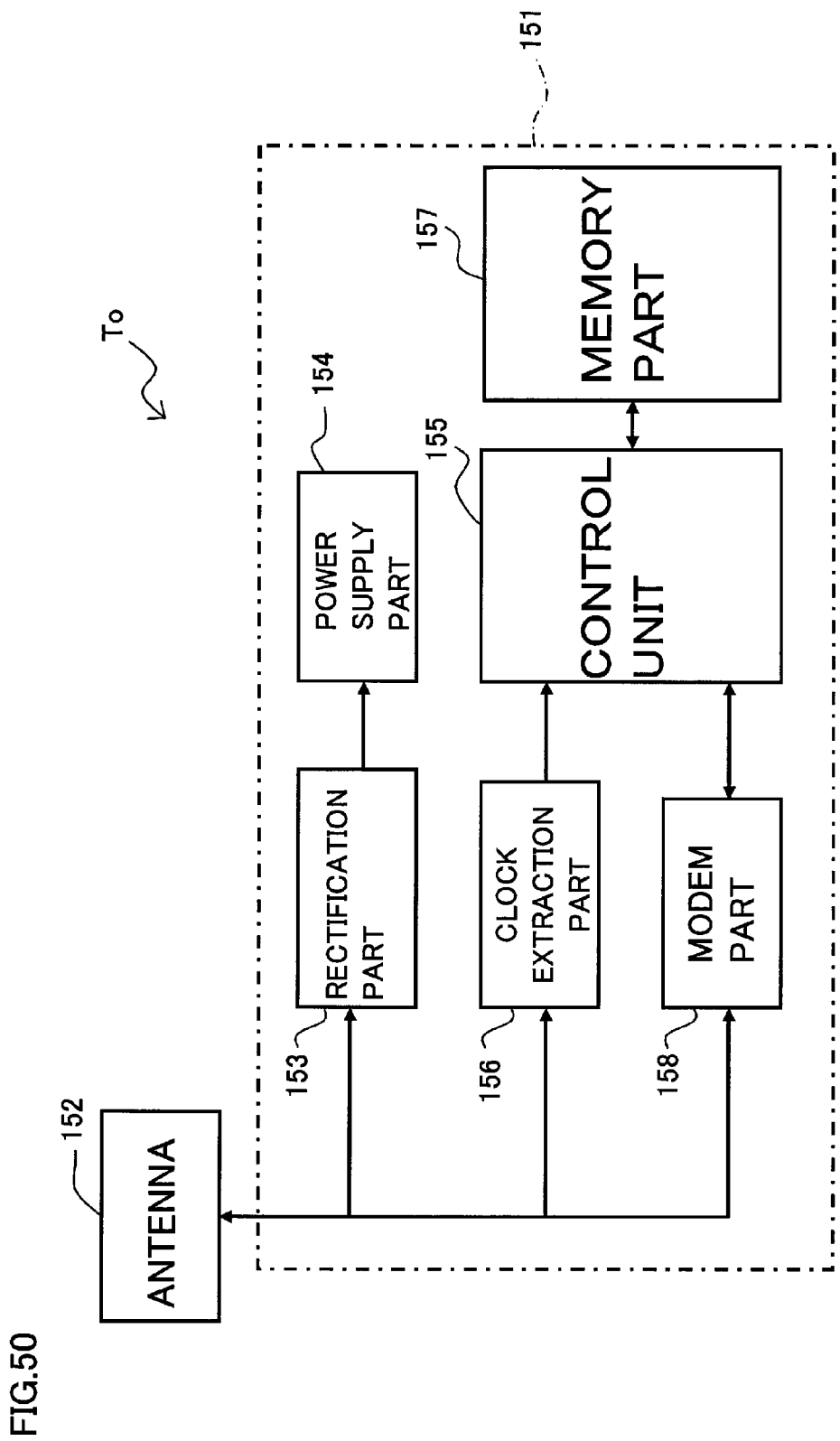
FIG. 50 is a functional block diagram which shows a functional configuration of a RFID circuit element.

FIG. 50 is a functional block diagram which shows the functional configuration of the aforementioned RFID circuit element To. In FIG. 50, the RFID circuit element includes the aforementioned antenna 152 configured to perform transmission/reception of signals in a non-contact manner using high-frequency radio waves of the UHF frequency band or the like, and the aforementioned IC circuit part 151 connected to the antenna 152.

The IC circuit part 151 includes a rectification part 153, a power source part 154, a clock extraction part 156, a memory part 157, and a control unit 155. The rectification part 153 rectifies the carrier waves received via the antenna 152. The power source part 154 stores the energy of the carrier waves thus rectified by the rectification part 153, which serves as a driving power supply. The clock extraction part 156 extracts the clock signals from the carrier waves thus received by the antenna 152, and supplies the clock signals thus extracted to a control unit 155. The memory part 157 stores predetermined information signals. The modem part 158 is connected to the antenna 152. The control unit 155 controls the operation of the aforementioned RFID circuit element To via the rectification part 153, the clock extraction part 156, the modem part 158, etc.

The modem part 158 performs demodulation of communication signals which have been transmitted from the antenna 14 of the aforementioned apparatus 2 for communicating with a RFID tag, and which have been received via the antenna 152. Also, the modem part 158 performs modulation of the carrier waves received via the antenna 152 according to a response signal from the aforementioned control unit 155, and the carrier waves thus modulated are transmitted as reflected waves.

The control unit 155 analyzes the received signals demodulated by the modem part 158, creates the response signals based upon the information signals stored in the memory part 157, and executes basic control such as the control for instructing the modem part 158 to transmits a response signal.

While detailed illustrating in the drawings is omitted, the RFID circuit element Tc provided to the cartridge 100 has the same structure as the above-described RFID circuit element To, provided with an IC circuit part 151 (not shown) and an antenna 152 (not shown) and the like.

Figure 51A:
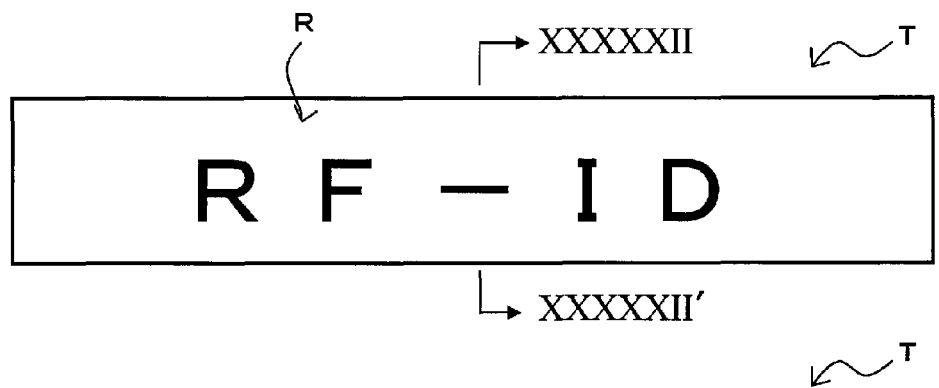
FIG. 51A shows a top view which show an example of the exterior of a RFID label.
Figure 51B:
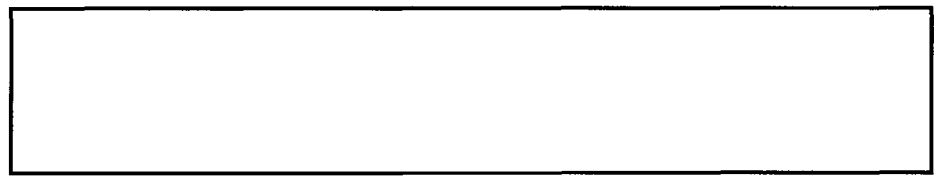
FIG. 51B shows a bottom view which show an example of the exterior of a RFID label.

FIGS. 51A and 51B are diagrams which show an example of the exterior of a RFID label T cut off from the tag label tape 110 with print after information writing to the RFID circuit element To as described above. FIG. 51A is a top view, and FIG. 51B is a bottom view. On the other hand, FIG. 52 is a lateral cross-sectional view taken along line XXXXXII-XXXXXII' in FIG. 51A.

Figure 52:
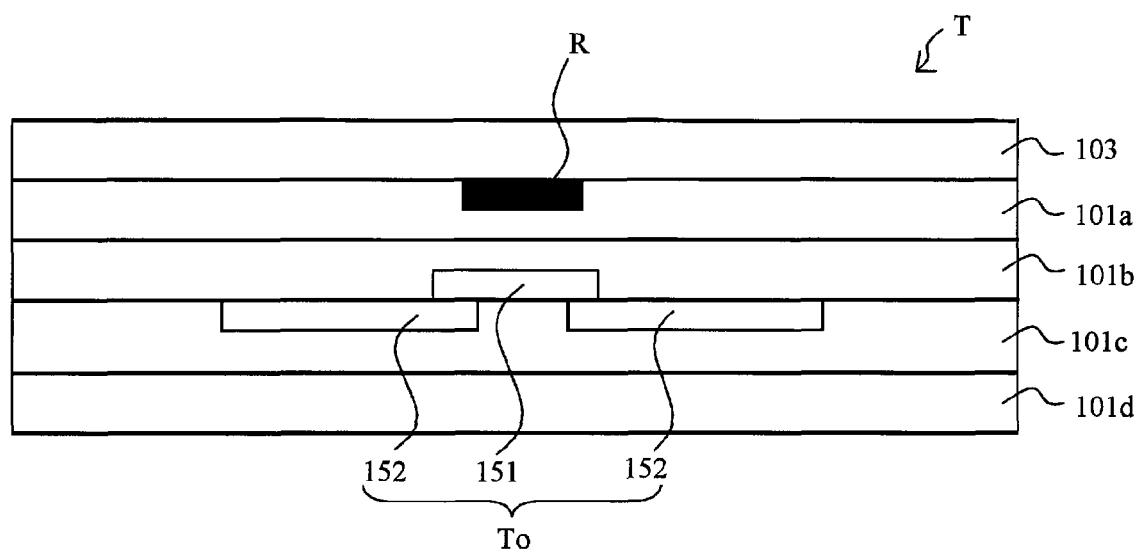
FIG. 52 is a lateral cross-sectional view taken along line XXXXXII-XXXXXII' in FIG. 51A.

As shown in FIGS. 51A, 51B, and 52, the RFID label T has a five-layer structure in which the cover film 103 is provided to the four-layer structure shown in FIG. 48. Specifically, the five-layer structure comprises the cover film 103, the adhesive layer 101a, the base film 101b, the adhesive layer 101c, and the detachable paper sheet 101d, in that order from the side of the cover film 103 (upper side in FIG. 52) to the opposite side (lower side in FIG. 52). Furthermore, as described above, the RFID circuit elements To including the antennas 152 provided on the back side of the base film 101b are provided within the adhesive layer 101c. Furthermore, the printed characters R (which read "RF-ID" to indicate the kind of RFID label T) are printed on the back of the cover film 103.

Figure 53:
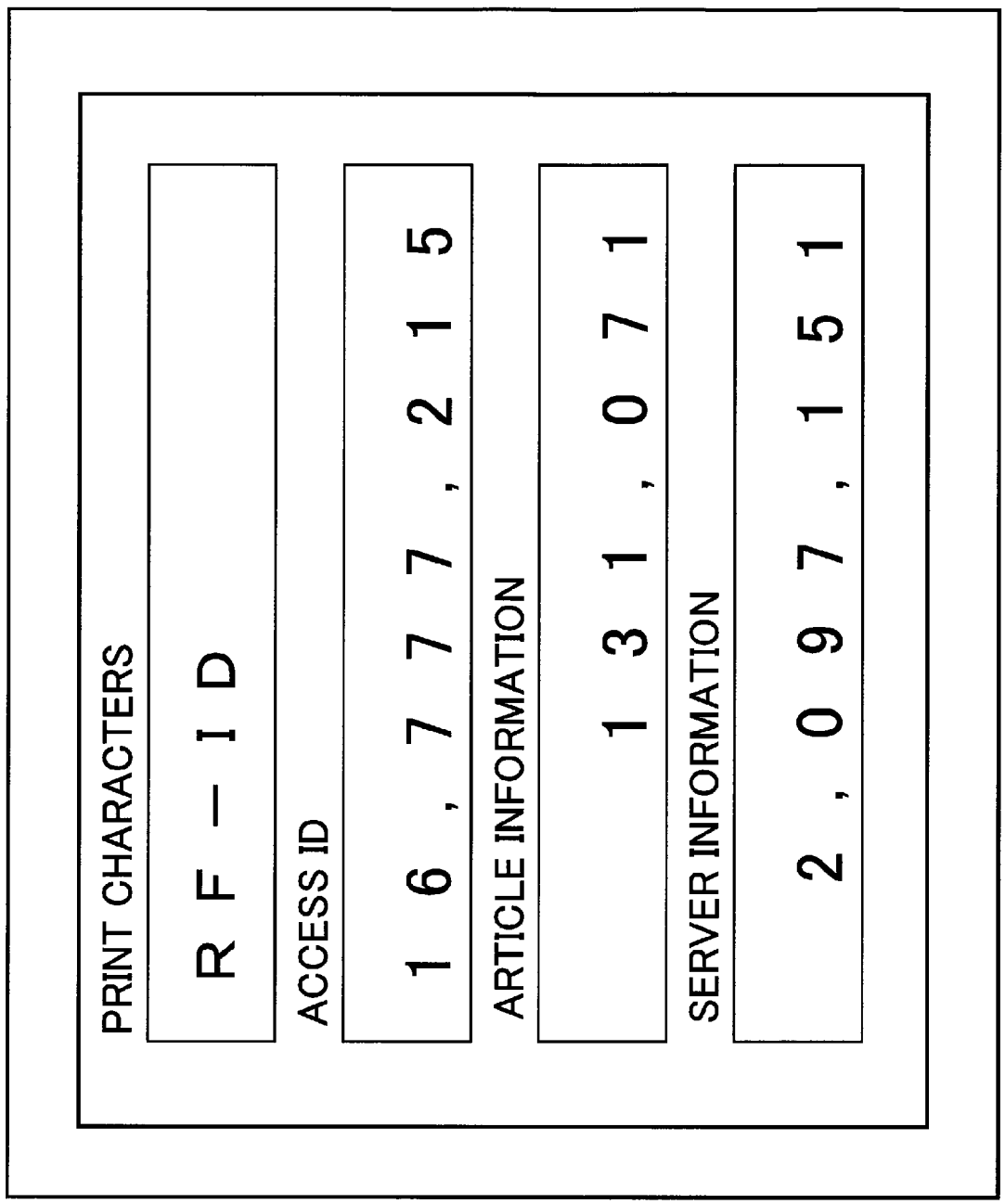
FIG. 53 is a diagram which shows an example of a screen displayed on a terminal or a general purpose computer when access to the RFID tag information is performed.

FIG. 53 is a diagram which shows an example of a screen displayed on the terminal 5 or the general purpose computer 6 when the apparatus 2 for communicating with a RFID tag accesses (reads or writes) RFID tag information stored in the IC circuit part 151 of the RFID circuit element To.

FIG. 53 shows an display arrangement in which the terminal 5 or the general purpose computer 6. The arrangement includes a printed characters R, an access (writing/reading) ID, a product information address, a storage destination address of the corresponding information, etc. The printed characters R is printed corresponding to each RFID circuit element To. The access ID is the unique ID of each RFID circuit element To. The product information address is stored in the information server 7. The storage destination address of the corresponding information is stored in the aforementioned route server 4. With such an arrangement, upon operating the terminal 5 or the general purpose computer 6, the apparatus 2 for communicating with a RFID tag operates. Specifically, the aforementioned printed characters R are printed on the cover film 103. Furthermore, the information such as the aforementioned writing ID and the product information is written to the IC circuit part 151 (alternatively, the RFID tag information such as the product information stored beforehand in the IC circuit part 151 is read out).

Note that while an example has been described above wherein the transporting guides 13 hold the printed tab label tape 110 which is being moved during the printing operations so as to be within the access area and access made thereto (reading or writing), the present invention is not restricted to this, and an arrangement may be made wherein the tag label tape 110 with print is stopped at a predetermined position and access is made in a state of being held at the transporting guides 13.

Also, at the time of reading or writing such as described above, the correlation between the ID of the generated RFID label T and the information read from the IC circuit part 151 of the RFID label T (or the information written to the IC circuit part 151) is stored in the aforementioned route server 4, and can be referred to as necessary.

Figure 54:
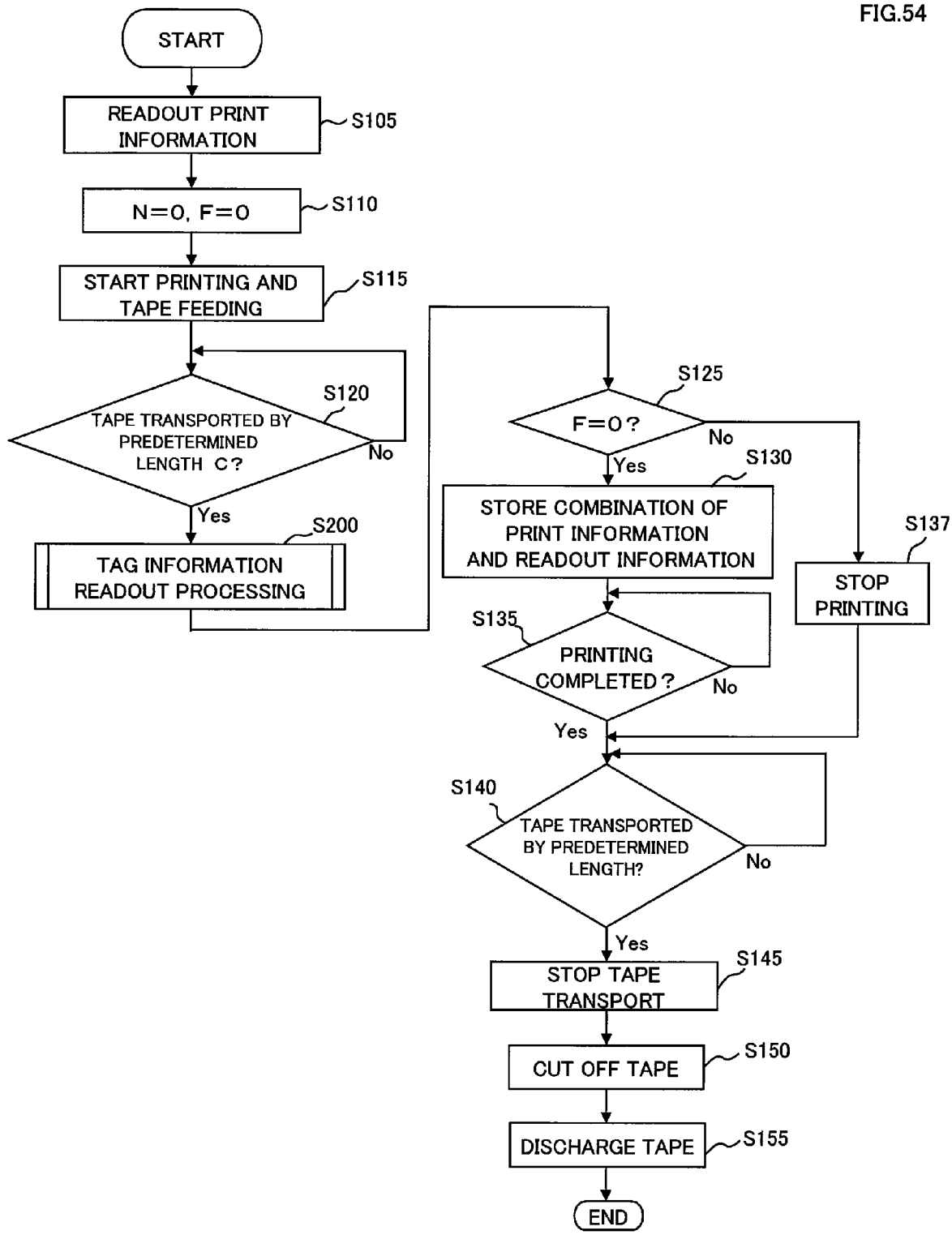
FIG. 54 is a flowchart which shows a control procedure executed by a control circuit.

FIG. 54 is a flowchart which shows a control procedure executed by the control circuit 30, at the time of creating the aforementioned RFID labels T, i.e., at the time of performing printing of the cover film 103 with the print head 10 while feeding the cover film 103, adhering the base tape 101 thereto so as to form the tag label tape 110 with print, and cutting off the tag label tape 110 with print in increments of the RFID circuit elements To so as to form the RFID labels T.

In FIG. 54, upon performance of the reading operation by the apparatus 2 for communicating with a RFID tag, the flow starts. First, in Step S105, the printing information to be printed on the RFID label T by the printing head 10, i.e., the printing information input by operations via the above-described terminal 5 or general purpose computer 6, is read in via the communication line 3 and the input/output interface 31.

Subsequently, in step S110, a variable N for counting the number of times that retry has been attempted due to no response from the RFID circuit element To, and a flag F indicating whether communication is good or bad, are initialized to 0.

In step S115, a control signal is output to the cartridge shaft drive circuit 24, and the ribbon take-up roller 106 and the pressure roller 107 are rotationally driven by the driving force of the motor 23 to drive cartridge shaft. Accordingly, the base tape 101 is supplied from the first roll 102 and supplied to the pressure roller 107, with the cover film 103 being supplied from the second roll 104. At this time, the a control signal is output to the printing driving circuit 25, power is applied to the printing head 10, and the characters, symbols, barcode, and other like printing R, read in Step S105, is printed in a predetermined region of the cover film 103 (a region to be adhered to the rear face of the RFID circuit elements To which are arrayed on the base tape 101 at a predetermined pitch with equal spacing, for example). Further, a control signal is output to the tape-feeding-roller motor 28 via the tape-feeding-roller drive circuit 29, thereby rotationally driving the feeding roller 17. Consequently, the base tape 101 and the cover film 103 upon which the above printing has been completed are integrated by being adhered by the pressure roller 107 and sub roller 109, thereby forming the tag label tape 110 with print, which is transported out from the cartridge 100.

Subsequently, in Step S120, determination is made regarding whether or not the printed tab label tape 110 has been transported by a predetermined value C (e.g., a transportation distance by which a RFID circuit element To to which the cover film 103, subjected to the corresponding printing, is adhered, reaches the transporting guides 13). The transporting distance determination at this time can be sufficiently made by detecting a suitable identification mark provided on the base tape 101 with a separately-provided known tape sensor, for example. Upon this determination being satisfied, the flow proceeds to Step S200.

In Step S200, tag information reading processing is performed, a query signal for reading is transmitted to the RFID circuit element To, a reply signal including RFID tag information is received, and read in (see the later-described FIG. 55 for details). Upon this Step S200 ending, the flow proceeds to Step S125.

In Step S125, determination is made regarding whether or not flag F=0. In the event that the reading processing has successfully ended, F=0 is unchanged (see Step S280 in the flowchart in the later-described FIG. 55), so this determination is satisfied, and the flow proceeds to Step S130.

In Step S130, the combination of the information read from the RFID circuit element To in the above-described Step S200 and the printing information already printed by the printing head 10 corresponding thereto are output via the terminal 5 of the general purpose computer 6, by way of the input/output interface 31 and communication line 3, and stored in the information server 7 or route server 4. Note that this stored data is stored and held in a database for example, so as to be referred to, by the terminal 5 or general purpose computer 6.

Subsequently, in Step S135, following confirmation regarding whether or not all printing to the region of the cover film 103 corresponding to the RFID circuit element To being processed at this point has ended, the flow proceeds to Step S140.

Note that in the aforementioned Step S125, in the event that the reading processing has not completed successfully for some reason, F=1 holds (see Step S280 in the flowchart in the later-described FIG. 55), so the determination in S125 is not satisfied. Accordingly, the flow proceeds to step S137, a control signal is output to the printing driving circuit 25, and power applied to the printing head 10 is stopped so that printing stops. Following clarification that this RFID circuit element To is not a passable item by such printing interruption, the flow proceeds to Step S140.

In Step S140, determination is made regarding whether or not the tag label tape 110 with print has further been transported by a predetermined amount (e.g., a transportation distance by which the RFID circuit element To and the printed region of the cover film 103 corresponding thereto all pass a predetermined length (clearage margin) of the cutter 15). The transporting distance determination at this time can also be sufficiently made by detecting marking with a tape sensor, for example, as with the above-described step S120. Upon this determination being satisfied, the flow proceeds to Step S145.

In Step S145, control signals are output to the cartridge shaft drive circuit 24 and the tape-feeding-roller drive circuit 29, the driving of the motor 23 to drive cartridge shaft and the tape-feeding-roller motor 28 is stopped, and the rotation of the ribbon take-up roller 106, the pressure roller 107, and the feeding roller 17 is stopped. Accordingly, supplying of the base type 101 from the first roll 102, supplying of the cover film 103 from the second roll 104, and transporting of the tag label tape 110 with print by the feeding roller 17, stop.

Subsequently, in Step S150 a control signal is output to the solenoid drive circuit 27 to drive the solenoid 26, and the tag label tape 110 with print is cut with the cutter 15. As described earlier, at this point, all of the RFID circuit element To being processed and the corresponding printing region of the cover film 103 have sufficiently cleared the cutter 15, so cutting with the cutter 15 yields a label-type RFID label T of which the RFID tag information of the RFID circuit element To has been read and printing corresponding thereto has been performed.

Subsequently, the flow proceeds to Step S155, a control signal is output to the tape-feeding-roller drive circuit 29, driving of the tape-feeding-roller motor 28 is resumed, and the feeding roller 17 rotates. Accordingly, transportation by the feeding roller 17 is resumed and the RFID labels T formed in labelshape in the above Step S150 are transported toward the discharge opening 16, and further discharged outside of the apparatus 2 from the discharge opening 16.

Figure 55:
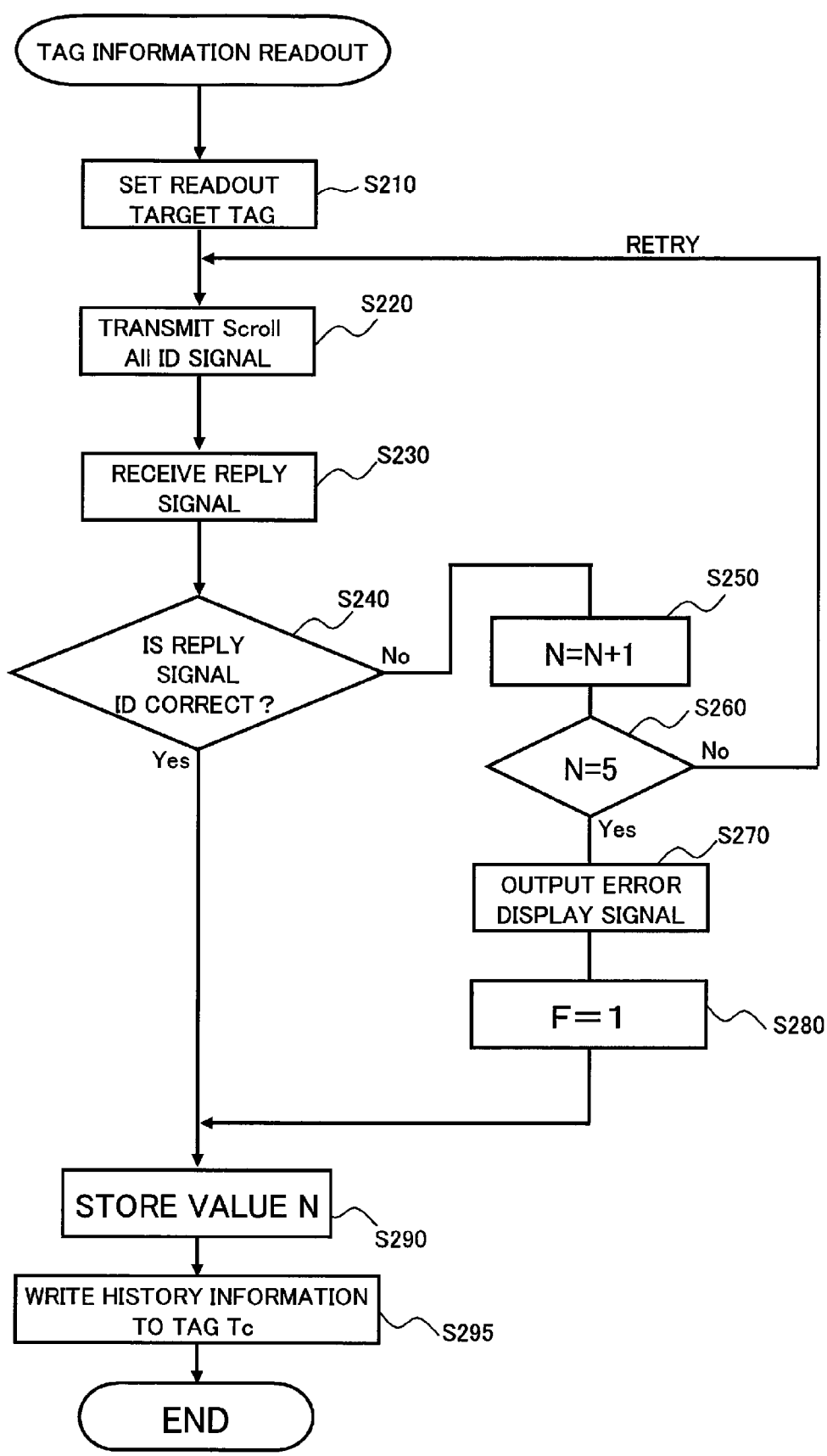
FIG. 55 is a flowchart which shows a procedure of Step S200 shown in FIG. 54 in detail.

FIG. 55 is a flowchart illustrating the detailed procedures of the aforementioned Step S200.

In FIG. 55, first, in Step S210, following printing of the tag label tape 110, the RFID circuit element To from which information is to be read is transported to nearby the antenna 14, and the tag of interest is set.

Subsequently, in Step S220, a selection signal is output to the antenna switch circuit 341 and the antenna switch circuit 341 is switched over such that the antenna 14 is connected to the transmit-receive splitter 34, following which a "Scroll All ID" command for reading out information stored in the RFID circuit element To following predetermined communication parameters and so forth is output to the signal processing circuit 22. Based thereupon, a "Scroll All ID" signal serving as access information is generated at the signal processing circuit 22 and transmitted to the RFID circuit element To be accessed via the radio frequency circuit 21, prompting a reply.

Next, in Step S230, a reply signal (RFID tag information such as inventory item information and tag identification information ID and so forth) transmitted from the RFID circuit element To be accessed in accordance with the aforementioned "Scroll All ID" signal is received via the antenna 14, and acquired via the radio frequency circuit 21 and signal processing circuit 22.

Next, in Step S240, whether or not there is any error in the reply signal received in the above Step S230 is determined using a known error detection code (CRC (Cyclic Redundancy Check) code, etc.).

In the event that determination has been made that the condition has not been satisfied, the flow proceeds to Step S250 where N is incremented by 1, and further, the flow proceeds to Step S260 where determination is made whether or not N is equal to a predetermined number of retries (5 in this case, other numbers of times may also be set as appropriate). In a case that N is equal to or less than 4, the condition has not been satisfied, and accordingly, the flow is returned to Step S220, and the same procedure is repeated. In a case that N is equal to 5, the flow proceeds to Step S270, an error display signal is output to the terminal 5 or the general purpose computer 6 via the input/output interface 31 and the communication line 3 so as to display the corresponding reading failure (error) notice, and in Step S280, the flag F is set to 1. With such an arrangement, a predetermined number of reading retries (5 in this example) are performed even if the information reading fails. Upon Step S280 ending, the flow proceeds to step S290.

In the event that determination is made in Step S240 that the condition has been satisfied, reading of RFID tag information from the RFID circuit element To be read is completed, and the flow directly proceeds to step S290.

In Step S290, the value of N (the number of retries required for a successful access) is temporarily stored in suitable record portion (e.g., RAM within the control circuit 30, etc.).

Subsequently, in step S295, following outputting a selection signal to the antenna switch circuit 341 and the antenna switch circuit 341 being switched over such that the antenna 19 is connected to the transmit-receive splitter 34, the number of retries N stored in the record portion is read out, this retry number N and the identification information of the RFID circuit element (tag ID) and identification of the apparatus 2 for communicating with a RFID tag (product No. or model No. or the like) are transmitted to the RFID tag Tc via the antenna 19 as access history information, so as to be written to the IC circuit part 151 of the RFID circuit element Tc. That is to say, the control circuit 30 outputs a "Program" command to the signal processing circuit 22, a "Program" signal serving as the above access history information is generated in the signal processing circuit 22, transmitted to the RFID circuit element Tc via the radio frequency circuit 21, and this information is written to the memory part 157 thereof.

Due to the above routine, the RFID tag information of the IC circuit part 151 can be accessed and read out for the RFID circuit element To within the cartridge 100 to be accessed, and also the access history thereof can be written to the RFID circuit element Tc be stored and saved.

FIG. 56 is a diagram illustrating an example of access history information written to the RFID circuit element Tc as described above.

In FIG. 56, in the "Tag ID" column are recorded identification information of each RFID circuit element To, in this case "Tag 1", "Tag 2", and so forth.

In the "Number of Read Retries" and "Results of Read" columns are recorded whether or not access to the RFID circuit elements To (reading in the above example) has ultimately succeeded (OK of successful, NG (meaning No Good) if unsuccessful), and the number of retries N (i.e., one of 1 through 5) to successful access. Note that as described earlier with reference to FIG. 55, failure to access when N is 5 results in an error, so a value of N of 6 or greater is impossible (in this example). The cases in the drawing indicated by a dash "-" are such cases, which are indicated by "NG" as being failed access attempts.

In the column "Device Side Identification Information" is recorded identification information of the RFID tag communication apparatus 2 which has accessed each RFID circuit element To, in the form of "ID-a", "ID-b", "ID-c", and so forth. In this example, of the RFID circuit elements To stored in the cartridge 100, the RFID circuit elements To represented by the identification information "Tag 1" and "Tag 7" have been accessed upon being mounted to the apparatus 2 for communicating with a RFID tag of which the cartridge 100 is represented by the identification information "ID-a". Also, the RFID circuit elements To represented by the identification information "Tag 2" through "Tag 6", "Tag 10", etc., have been accessed upon being mounted to the apparatus 2 for communicating with a RFID tag of which the cartridge 100 is represented by the identification information "ID-b". Further, the RFID circuit elements To represented by the identification information "Tag 8", "Tag 9", "Tag 11", etc., have been accessed upon being mounted to the apparatus 2 for communicating with a RFID tag of which the cartridge 100 is represented by the identification information "ID-c".

In the above, the antenna 14 serves as the device-side antenna which performs transmission/reception by wireless communication with the tag-side antenna of a particular RFID circuit element of the multiple tag-label RFID circuit elements.

Also, the communication processing circuit 22 serves as access information generating unit configured to generate access information ("Scroll All ID" signals, "Program" signals, later-described "Erase" signals, "Verify" signals, and so forth) for accessing the IC circuit part 151. Also, the transmitting portion 32 of the radio frequency circuit 21 serves as information transmitting unit configured to transmit the access information generated by the access information generating unit to the tag-side antenna in a non-contact manner via the device side antenna, and accessing the RFID tag information in the IC circuit part. Further, the RFID circuit element Tc serves as access history information storing unit configured to store access history information for the apparatus for communicating with a RFID tag and the tag-label RFID circuit element, and also serves as record portion configured to record a communication factor for determining communication capabilities as to the tag-label RFID circuit element.

Also, the signal processing circuit 22, transmitting portion 32 of the radio frequency circuit 21, and antenna 19 serve as writing unit configured to generate access history information and writing to the access history information record portion, and also serve as input/output unit configured to output the communication factor for determining communication capabilities as to the tag-label RFID circuit element to the record portion.

As described above, with the apparatus 2 for communicating with a RFID tag according to the present embodiment, a cartridge 100 is attached to a cartridge holder of the apparatus 2 for communicating with a RFID tag, and RFID tag information of the IC circuit part 151 of a RFID circuit element To is read. The access history information that has been read is then stored in a RFID circuit element Tc provided to the cartridge 100. Accordingly, access history of access to each RFID circuit element To can be preserved.

At the side of the manufacturer or service company or the like, acquiring the stored contents of the RFID circuit element Tc enables cases wherein unsatisfactory access or access failure (erroneous reading or erroneous writing) occurs to be detected, confirmed, and some sort of action to be taken.

For example, in the event that access failures are occurring randomly, this can be estimated to be due to mistaken operations by the user, so measures can be taken such as this user (or other users as well) being notified by postal mail or electronic mail to that effect, the RFID tag information apparatuses 2 manufactured in the future being provided with instructions on how to avoid such erroneous operations, the shape, design, etc., of the operating unit being improved to avoid such erroneous operations, and so forth.

Also, in the event that there is a trend of increased retries from a certain point in time regarding a certain RFID tag information apparatus 2, and access failures continue from that point on, this can be assumed to be due to insufficient power voltage (a dead battery) of the apparatus 2, so measures can be taken such as this user (or other users as well) being notified by postal mail or electronic mail to that effect, providing instructions giving an idea of how long the battery is expected to last or how to avoid dead batteries, adding a warning lamp or the like anew to the RFID tag information apparatuses 2 manufactured in the future to facilitate knowledge of when a battery is dead, implementing energy-conserving designs so as to extend the life of the battery itself, and so forth.

Also, in the event that access failures occur frequently with a certain RFID tag information apparatus 2, regardless of time period, it can be estimated that this is due to the apparatus 2 being adversely affected by the surrounding electromagnetic environment at the location of installation thereof, so measures can be taken such as this user (or other users as well) being notified by postal mail or electronic mail to that effect, or to avoid installation near other equipment generating radio waves or electromagnetic fields, the RFID tag information apparatuses 2 manufactured in the future being designed so as to be less susceptible to surrounding radio waves or electromagnetic fields, (reinforcing shielding member), and so forth.

Taking such measures ensures the capabilities of the apparatus 2 for communicating with a RFID tag and assures the product quality of the RFID labels T to be manufactured, thereby improving reliability, and enabling highly-reliable RFID labels T to be manufactured hereafter.

Also, with the apparatus 2 for communicating with a RFID tag according to the present embodiment, switching between connecting to the antenna 14 and antenna 19 using the antenna switch (switchover) circuit 341 enables sharing the radio frequency circuit 21, thereby yielding the advantage of a simpler and smaller apparatus configuration.

Note that the present invention is not restricted to the above embodiments, and that various modifications may be further made without departing from the essence and technical idea thereof. Examples of such modifications will be described in order below.

(3-1) Modification of Writing Information to RFID Circuit Element

While description has been made in the above seventh embodiment regarding a case of applying the present invention to a RFID tag manufacturing (producing) system which is read-capable (write-incapable), the present invention is not restricted to this and may also be applied to a RFID tag manufacturing system which writes RFID tag information to the IC circuit part 151 of RFID circuit elements To.

Figure 57:
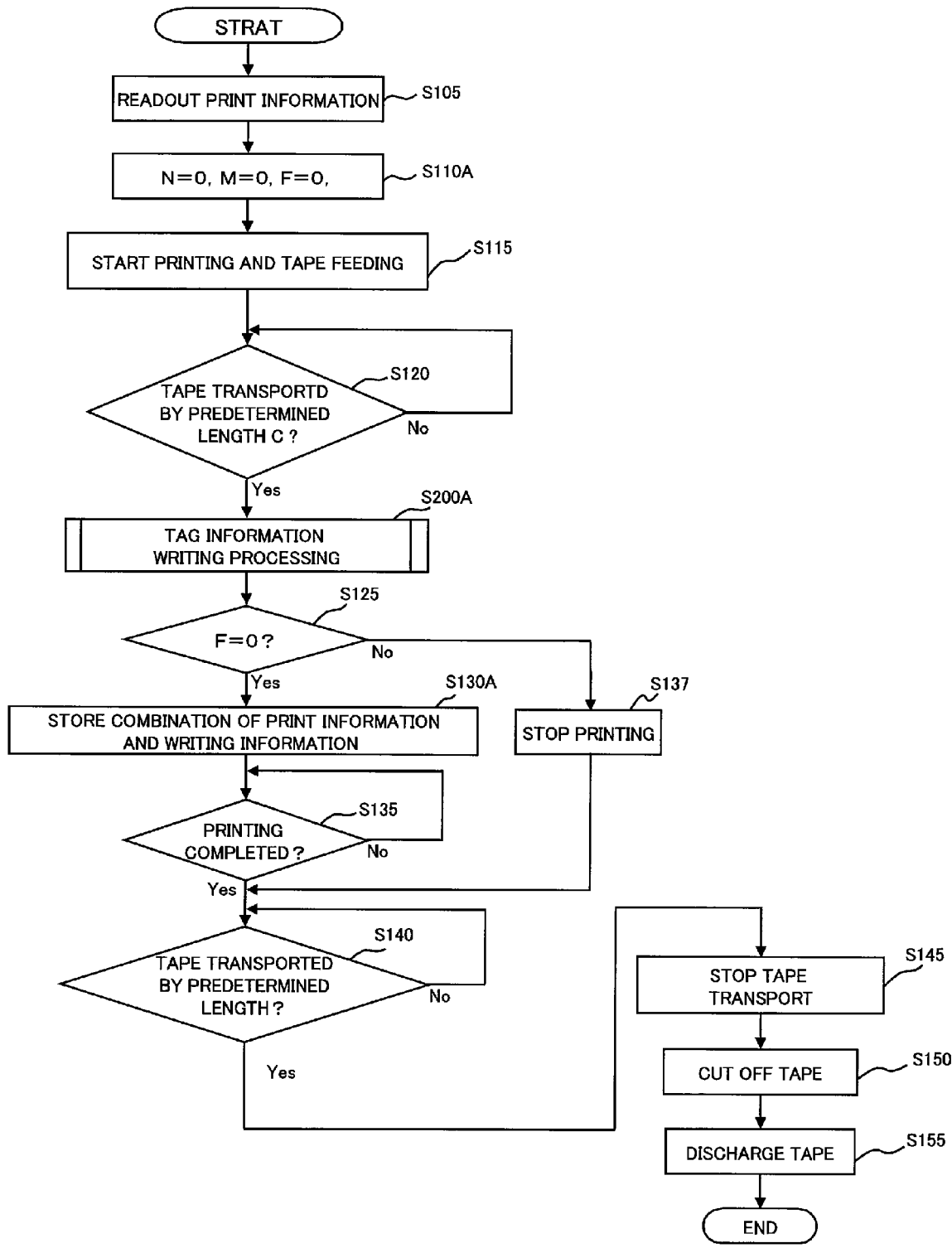
FIG. 57 is a flowchart which shows a procedure for creating the RFID labels, i.e., a procedure for writing information to the RFID circuit element, executed by the control circuit.

FIG. 57 is a flowchart illustrating the RFID label producing procedures (RFID tag information writing procedures) which are executed at the control circuit 30 in this modification, and is equivalent to FIG. 54 in the above seventh embodiment.

Procedures in FIG. 57 which are the same as those in FIG. 54 are denoted with the same reference symbols. In FIG. 57, upon performance of the writing operation by the apparatus 2 for communicating with a RFID tag, the flow starts. Step S105 is the same as that in FIG. 54, and upon this procedure ending, the flow proceeds to Step S110A, where, in addition to the variables N and flag F, a further variable M (details described later) is initialized to 0.

Subsequently, following steps S115 and S120 which are the same as in FIG. 54, the flow proceeds to step S200A. In Step S200A, tag information writing processing is performed, and following initializing (erasing) memory for writing, the RFID tag information is transmitted and written to the RFID circuit element To (See FIG. 58, which will be described later, for details). Upon this Step S200A ending, the flow proceeds to Step S125, in the same way as with FIG. 54.

In Step S125, determination is made regarding whether or not flag F=0, in the same way as with FIG. 54, and in the event that determination is made that this condition is satisfied, and the flow proceeds to Step S130A.

In Step S130A, the combination of the information written in the RFID circuit element To in the above-described Step S200A and the printing information already printed by the printing head 10 corresponding thereto are output via the terminal 5 of the general purpose computer 6, by way of the input/output interface 31 and communication line 3, and stored in the route server 4, in the same way as with step S130 in FIG. 54. Note that this stored data is stored and held in a database for example, so as to be referred to, by the terminal 5 or general purpose computer 6.

The subsequent procedures are substantially the same as those in FIG. 54, so description thereof will be omitted.

Figure 58:
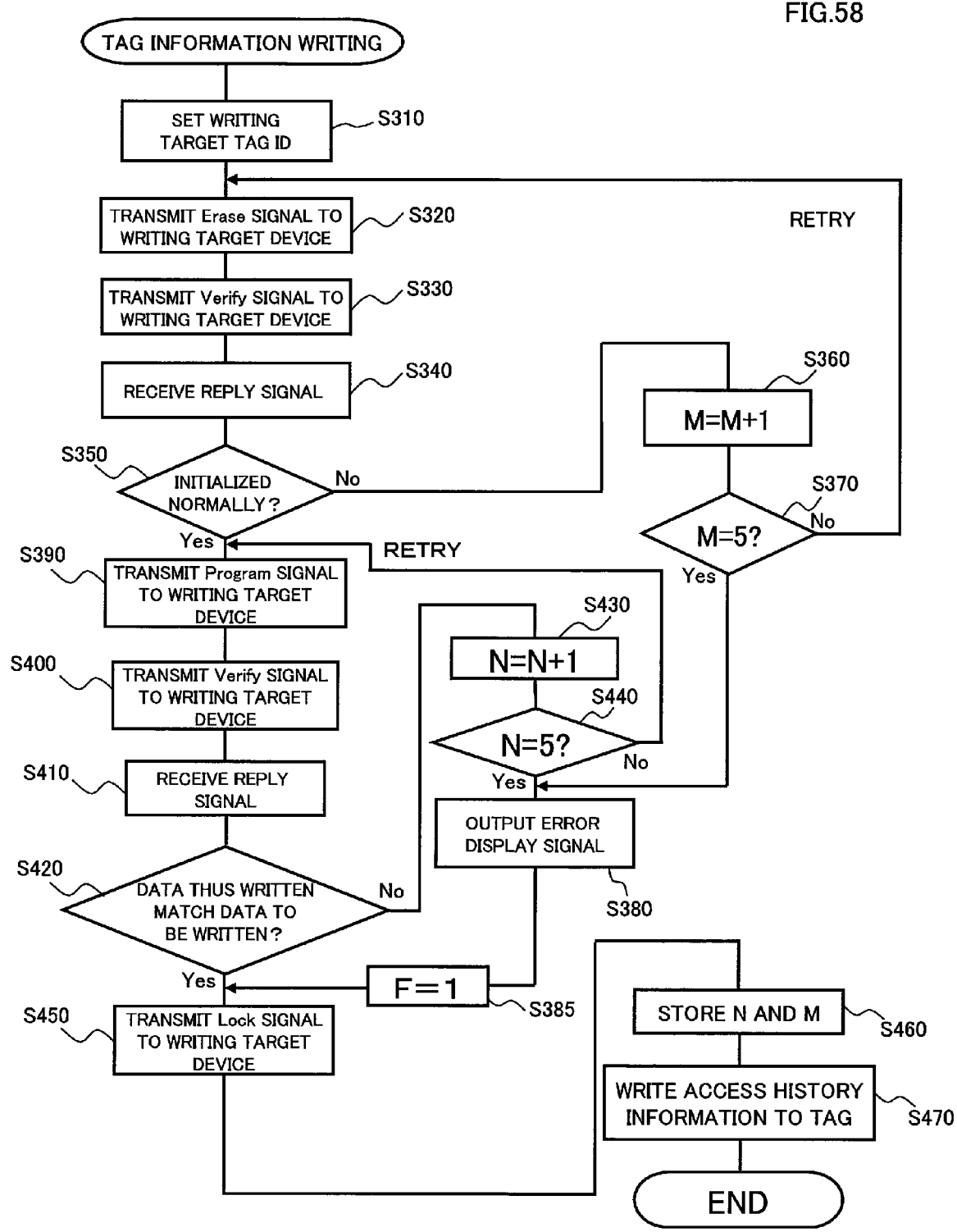
FIG. 58 is a flowchart which shows a procedure of Step S200A shown in FIG. 57 in detail.

FIG. 58 is a flowchart illustrating the detailed procedures of the aforementioned Step S200A.

In FIG. 58, first, in Step S310, an identification number ID is set by appropriate known means, and further, the RFID circuit element To which information is to be written is transported to nearby the antenna 14.

Subsequently, in Step S320, a selection signal is output to the antenna switch circuit 341 and the antenna switch circuit 341 is switched over such that the antenna 14 is connected to the transmit-receive splitter 34, following which an "Erase" command for initializing the information stored in the memory part 157 of the RFID circuit element To is output to the signal processing circuit 22. Based on this, an "Erase" signal is generated as access information at the signal processing circuit 22, which is transmitted to the RFID circuit element To which information is to be written via the radio frequency circuit 21, and the memory part 157 thereof is initialized.

Next, in Step S330, a "Verify" command for confirming the contents of the memory part 157 is output to the signal processing circuit 22. Based on this, a "Verify" signal is generated as access information at the signal processing circuit 22, which is transmitted to the RFID circuit element To which information has been written via the radio frequency circuit 21, prompting a reply. Subsequently, in Step S340, a reply signal transmitted from the written RFID circuit element To in accordance with the aforementioned "Verify" signal is received via the antenna 14, and acquired via the radio frequency circuit 21 and signal processing circuit 22.

Next, in Step S350, the information within the memory part 157 of the RFID circuit element To is confirmed based on the reply signal, thereby determining whether or not the memory part 157 has been successfully initialized.

In the event that determination has been made that the condition has not been satisfied, the flow proceeds to Step S360 where M is incremented by 1, and further, the flow proceeds to Step S370 where determination is made whether or not M is equal to a predetermined number of retries (5 in this case, other numbers of times may also be set as appropriate). In a case that M is equal to or less than 4, the condition has not been satisfied, and accordingly, the flow is returned to Step S320, and the same procedure is repeated. In a case that M is equal to 5, the flow proceeds to Step S380, an error display signal is output to the terminal 5 or the general purpose computer 6 via the input/output interface 31 and the communication line 3 so as to display the corresponding writing failure (error) notice. With such an arrangement, a predetermined number of writing retries (5 in this example) are performed even if the initialization fails. Upon Step S380 ending, the flow proceeds to step S385, in Step S385, the flag is set to F=1, and the flow proceeds to step S460.

On the other hand, in the event that determination is made in Step S350 that the condition has been satisfied, the flow proceeds to Step S390, and a "Program" command for writing the desired data to the memory part 157 is output to the signal processing circuit 22. Based on this, a "Program" signal, including ID information which is desired to be written, is generated as access information at the signal processing circuit 22, which is transmitted to the RFID circuit element To which information is to be written via the radio frequency circuit 21, and the information is written to the memory part 157 thereof.

Next, in Step S400, a "Verify" command for confirming the contents of the memory part 157 is output to the signal processing circuit 22. Based on this, a "Verify" signal is generated as access information at the signal processing circuit 22, which is transmitted to the RFID circuit element To which information has been written via the radio frequency circuit 21, prompting a reply. Subsequently, in Step S410, a reply signal transmitted from the written RFID circuit element To in accordance with the aforementioned "Verify" signal is received via the antenna 14, and acquired via the radio frequency circuit 21 and signal processing circuit 22.

Next, in Step S420, the information within the memory part 157 of the RFID circuit element To is confirmed based on the reply signal, thereby determining whether or not the predetermined information, that has been transmitted, has been successfully stored in the memory part 157.

In the event that determination has been made that the condition has not been satisfied, the flow proceeds to Step S430 where N is incremented by 1, and further, the flow proceeds to Step S440 where determination is made whether or not N is equal to a predetermined number of retries (5 in this case, other numbers of times may also be set as appropriate). In a case that N is equal to or less than 4, the condition has not been satisfied, and accordingly, the flow is returned to Step S390, and the same procedure is repeated. In a case that N is equal to 5, the flow proceeds to Step S680, an error display signal is output to the terminal 5 or the general purpose computer 6 via the input/output interface 31 and the communication line 3 so as to display the corresponding writing failure (error) notice, and in Step S385, the flag F is set to 1, and the flow proceeds to step S460. With such an arrangement, a predetermined number of writing retries (5 in this example) are performed even if the information writing fails.

On the other hand, in the event that determination is made in Step S420 that the condition has been satisfied, the flow proceeds to Step S450, and a "Lock" command is output to the signal processing circuit 22. Based on this, a "Lock" signal is generated at the signal processing circuit 22, and is transmitted to the RFID circuit element To which information has been written via the radio frequency circuit 21, thereby forbidding new writing of information to the RFID circuit element To. Accordingly, writing of RFID information to the RFID circuit element To which information has been written is completed, and the RFID circuit element To is discharged as described above. Upon Step S450 ending, the flow proceeds to step S460.

In Step S460, the values of N and M (the number of retries required for a successful initialization or write) are temporarily stored in suitable record portion (e.g., RAM within the control circuit 30, etc.). Following step S450, the flow proceeds to step S460.

Subsequently, in step S470, following outputting a selection signal to the antenna switch circuit 341 and the antenna switch circuit 341 being switched over such that the antenna 19 is connected to the transmit-receive splitter 34, the number of retries N and M stored in the record portion are read out, the identification information of the RFID circuit element (tag ID) and identification information of the apparatus 2 for communicating with a RFID tag (product No. or model No. or the like) are transmitted to the RFID tag Tc via the antenna 19 as access history information, so as to be written to the IC circuit part 151 of the RFID circuit element Tc. That is to say, the control circuit 30 outputs a "Program" command to the signal processing circuit 22, a "Program" signal serving as the above access history information is generated in the signal processing circuit 22, transmitted to the RFID circuit element Tc via the radio frequency circuit 21, and this information is written to the memory part 157 thereof.

Due to the above routine, desired RFID tag information can be written to the IC circuit part 151 for the RFID circuit element To within the cartridge 100 to be accessed, and also the access history thereof can be written to the RFID circuit element Tc to be stored and saved.

FIG. 59 is a diagram illustrating an example of access history information written to the RFID circuit element Tc as described above in the present modification, and is equivalent to FIG. 56 described above with the seventh embodiment.

Note that the number of retries M for the initialization shown in FIG. 58 are omitted from this diagram.

In FIG. 59, in the "Tag ID" column are recorded identification information of each RFID circuit element To, in this case "Tag 1", "Tag 2", and so forth, in the same way as with FIG. 56.

In the "Number of Write Retries" and "Results of Read" columns are recorded whether or not access to the RFID circuit elements To (writing in the above example) has ultimately succeeded (OK of successful, NG (meaning No Good) if unsuccessful), and the number of retries N (i.e., one of 1 through 5) to successful access. A failure to access when N is 5 is indicated by a dash "-", and is indicated by "NG" as being a failed access attempt.

The column "Device Side Identification Information" is the same as that in FIG. 56, so description thereof will be omitted.

As described above, with the present modification, advantages approximately the same as with the above seventh embodiment can be had with a RFID tag manufacturing (producing) system which writes RFID tag information.

(3-2) Variations of Access History Information

The description made above with reference to FIG. 56 and FIG. 59 has been regarding an example of saving, in the record portion of the RFID circuit element Tc, the number of retries N or M stored in record portion, the identification information (tag ID) of each RFID circuit element, and identification information of the apparatus 2 for communicating with a RFID tag (product No., model No., etc.), as access history information to the RFID circuit element To. However, the present invention is not restricted to this, and other information relating to access history may be stored, such as output information at the time of access, or the number of times of use (reuse) of the cartridge (assuming that the cartridge is reusable). Alternatively, one of the following may be stored.

FIG. 60 and FIG. 61 correspond to FIG. 56 of the above-described seventh embodiment and FIG. 59 of the modification, respectively, illustrating a case of also storing the power value (set in three states of relative value, "large", "medium", and "small" in this example) at the time of successful access, as the other access history information, with an arrangement wherein the output power from the variable transmission amplifier 39 is made variable at the time of access. Note that in the event that the operator (user) manually operates the output power so as to reach a suitable value, the manually-set value thereof may be taken as the access history information, or in the event that control is made (which will be described later in detail) wherein the output is gradually increased by the control circuit 30 each time access is attempted until access is successful, the value at which access is successful for the first time may be stored as the access history information.

(3-3) Modification Wherein Access History Information is Stored in Record Portion Other than the RFID Circuit Element While in the above-described arrangements, the access history information is stored in the RFID circuit element Tc provided within the cartridge 100, but the present invention is not restricted to this, and other record portion may be used. Here, non-volatile record portion, such as EEPROM or FRAM may be used. In this case, the stored contents can be held even when the power is off, so the manufacturer or servicing company or the like can obtain access history information later in a more sure manner, thereby ensuring capabilities and product quality more thoroughly.

(3-4) Modification without Adhesion Processing

That is to say, this is a case of applying the present invention to an apparatus for communicating with a RFID tag cartridge which prints on the tag tape itself, instead of printing on a cover film 103 separate from the tag tape (base tape) 101 provided with the RFID circuit elements To and adhering these together as with the above-described seventh embodiment.

Figure 62:
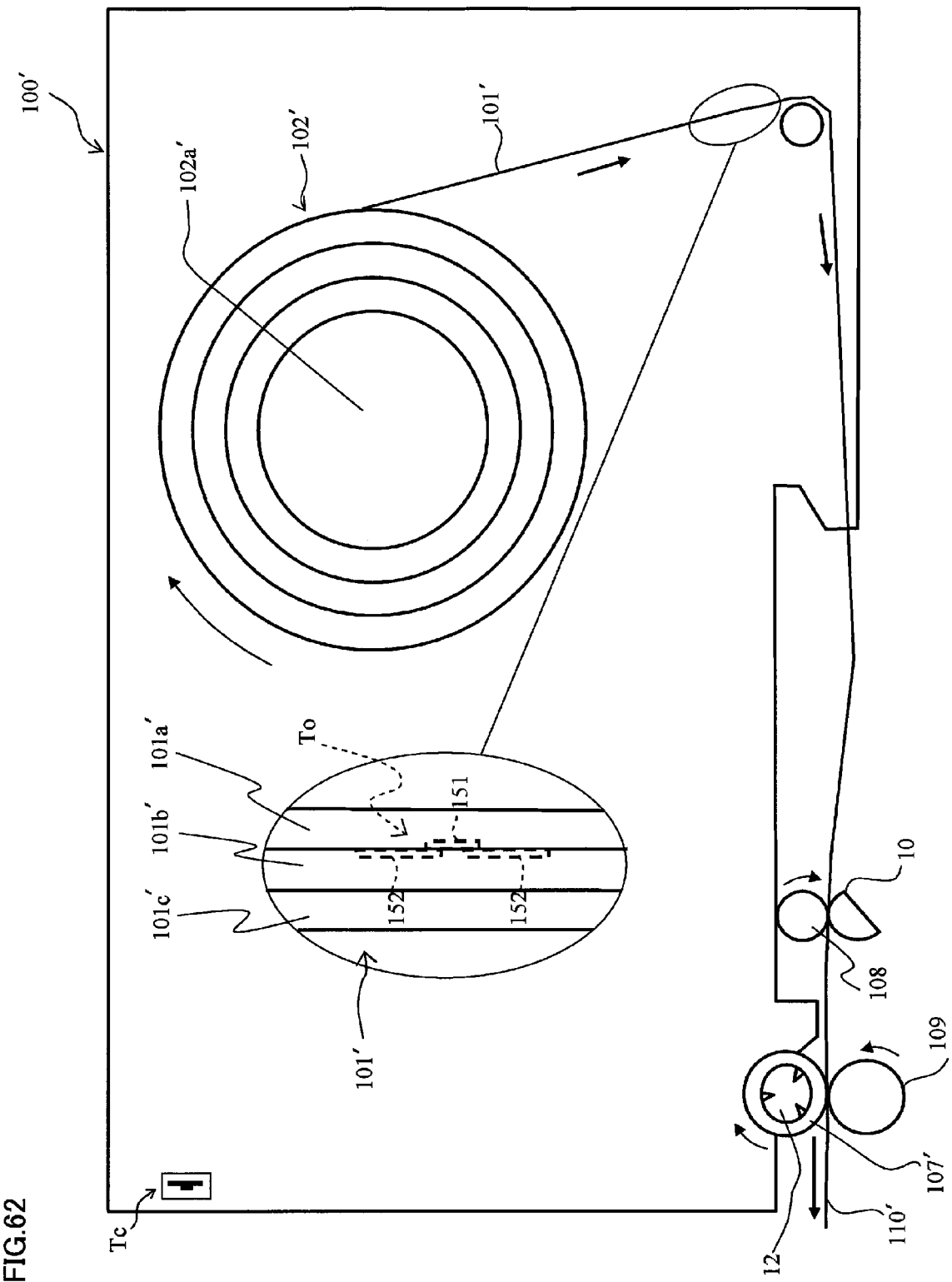
FIG. 62 is an explanatory diagram for describing a detailed structure of a cartridge without involving adhesion processing according to a modification.

FIG. 62 is an explanatory diagram for describing a detailed configuration of a cartridge 100' according to the present modification, which corresponds to FIG. 48 for describing the above-described embodiment. The same components as those shown in FIG. 48 are denoted by the same reference numerals, and description thereof will be omitted as appropriate.

As shown in FIG. 62, the cartridge 100' comprises a first roll (tag tape roll) 102' around which a thermo-sensitive tape 101' (tag tape) has been wound, and a tape feeding roller 107' configured to transport the thermo-sensitive tape 101' in the direction external to the cartridge 100'.

The first roll 102' has a structure in which the aforementioned strip-shaped transparent thermo-sensitive tape 101', on which multiple RFID circuit elements To have been consecutively formed along the longitudinal direction, is wound around a reel member 102*a'*.

In this example, the thermo-sensitive tape 101', which is to be wound around the first roll 102', has a three-layer structure (see partial enlarged view in FIG. 62) comprising a tape base material 101*a'*, an adhesive layer 101*b'* formed of an appropriate adhesive material, and a detachable sheet 101*c'*. The three layers are layered in that order from the layer that corresponds to the inner side of the rolled tape to the layer that corresponds to the opposite side.

IC circuit parts 151 configured to store information are integrally provided on the back face of the tape base material 101'*a*. Furthermore, the aforementioned antenna 152 is provided on the surface of the back side of the cover film 101'*a*. Moreover, the aforementioned detachable sheet 101*c'* is adhered onto the back face of the cover film 101'*a* through the aforementioned adhesion layer 101*b'*.

With the aforementioned configuration, upon shifting the roll holder (not shown) from the separate position to the contact position after mounting the cartridge 100' to the cartridge holder portion of the aforementioned apparatus 2 for communicating with a RFID tag, the thermo-sensitive tape 101' is held by the nip between the print head 10 and the platen roller 108, and the thermo-sensitive tape 101' is held by the nip between the feeding roller 107' and the sub roller 109. Then, the tape feeding roller 107', the sub roller 109, and the platen roller 108 are synchronously rotationally driven by the driving force provided from the motor 23 to drive cartridge shaft (see FIG. 47) through the feeding roller drive shaft 12.

The thermo-sensitive tape 101' that has been fed out is supplied to the print head 10 downstream in the transporting direction. Electric power is supplied to the multiple heater elements included in the print head 10 by the aforementioned print-head drive circuit 25 (see FIG. 47), thereby printing the surface of the tape base 101*a'* of the thermo-sensitive tape 101'. The tag label tape 110' with print thus formed is then transported to outside the cartridge 100'. Note that it is needless to say that an ink ribbon may be employed for printing in the same way as in the above-described seventh embodiment.

After the RFID label tape 110' with print has been transported to outside the cartridge 100', access (information read/write) of the RFID tag information is performed via the above-described antenna 14, and the access history information thereof is transmitted to and stored in the RFID circuit element Tc provided to the cartridge 100' via the antenna 19, in the same way as with the above seventh embodiment. Subsequent transport by the feeding roller 17 and cutting by the cutter 15 are the same as those in the above-described seventh embodiment, and accordingly, description thereof will be omitted.

With the present modification as well, the manufacturer or service company or the like acquiring the access history information of the RFID circuit element Tc provided to the cartridge 100' ensures the capabilities of the apparatus 2 for communicating with a RFID tag and assures the product quality of the RFID labels T to be manufactured, thereby yielding the advantage of improved reliability.

Note that instead of the above tape base 101'*a*, a thermosensitive tape (tag tape) having a cover film 103'*a* formed of PET (polyethylene terephthalate) or the like may be used, in the same way as with the above-described cover film 103.

(3-5) Printing Access History Information on Labels

That is to say, an arrangement may be made wherein the access history information to be stored in the RFID circuit element Tc as described above may be printed directly on the RFID labels T being produced by the printing head 10, so as to be clearly recognized visually as well.

In this case, printing may be performed for each label T, but taking into consideration the aspect of information acquisition (recovery) at the manufacturer or servicing company, and arrangement would be handy wherein printing is performed on the label T which remains at the end (a RFID circuit element To is not necessary here) following using all of the predetermined number of RFID circuit elements To in a cartridge 100 (or 100', likewise hereinafter).

Figure 63:
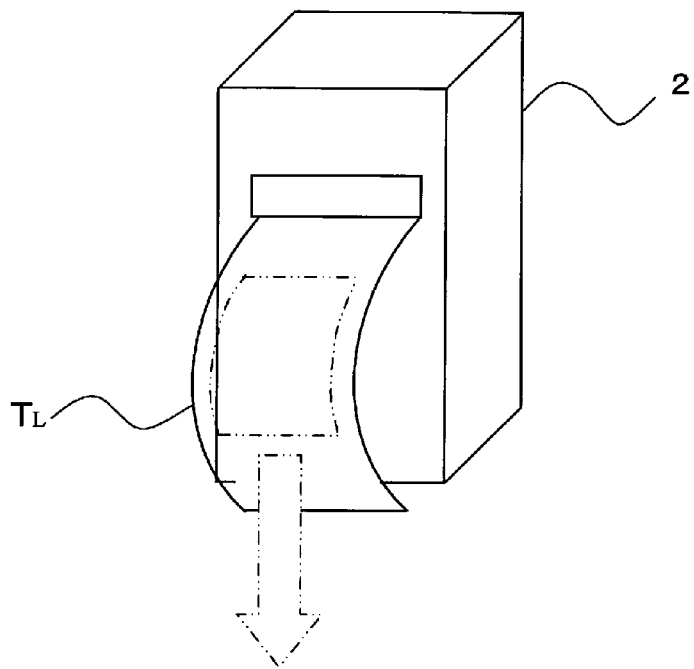
FIG. 63 is a diagram which shows an arrangement in which access history information is printed on a label in the final stage before the label is discharged from the apparatus for communicating with a RFID tag according to a modification in which the access history information is printed on the label.

FIG. 63 is a diagram illustrating a case of printing access history information (the contents shown earlier in FIG. 56 in the case of this example) on a label TL which is discharged from the apparatus 2 for communicating with a RFID tag last.

Figure 64:
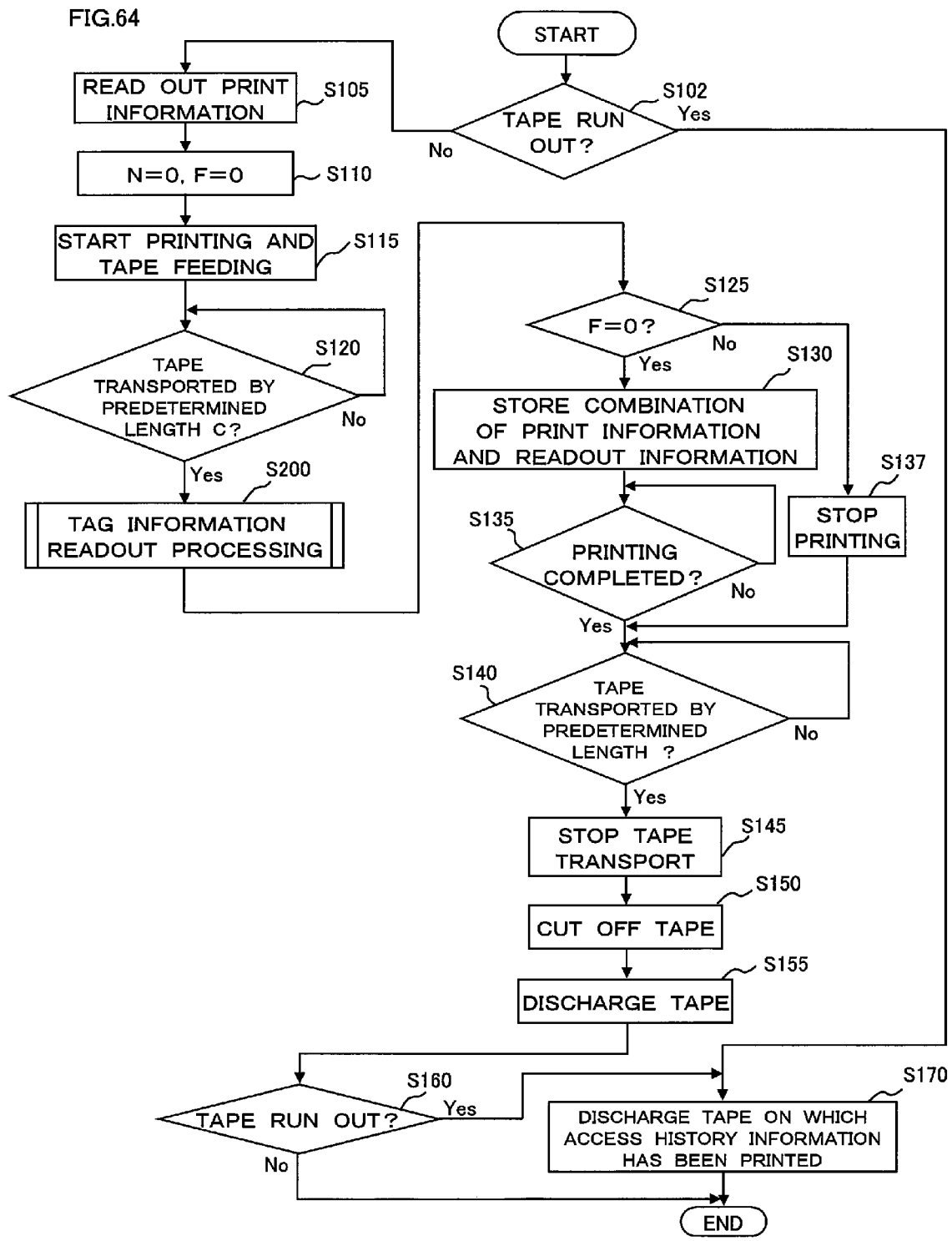
FIG. 64 is a diagram which shows a control flow executed by a control circuit.

FIG. 64 is a diagram illustrating a control flow which the control circuit 30 executes in this modification, corresponding to the above-described FIG. 54. Procedures which are the same as with those in FIG. 54 are denoted with the same reference numerals, and description will be omitted or simplified as appropriate.

What differs from FIG. 54 in FIG. 64 is first that a step S102 has been provided in front of step S105. In this step S102, determination is made regarding whether or not the tape length for creating RFID labels T including the normal RFID circuit elements for producing RFID labels To, before the last label T upon which access history information is printed according to the present modification, has run out. Examples which can be conceived of this determination include the following.

(a) Detecting Running Out of Base Tape

An arrangement is made beforehand wherein the cover film 103 is longer than the base tape 101 by the length of one label T, and the fact that the base tape 101 is no longer fed out from the first roll 102 (or that there is no more valid tape portion for the base tape) is detected by a suitable sensor or the like. In this case, the access history information is printed on the remaining cover film 103, and the last label TL is created of only the cover film.

(b) Detecting Running Out of Tags

Alternatively, an arrangement is made wherein no RFID circuit element To is placed at the last portion of the base tape 101, and a suitable sensor or the like is used to detect the non-placed portion. In this case, the last label TL is created of the base tape 101 not including the RFID circuit element To and the cover film 103 having been adhered together.

In the event that determination is made that the conditions in step S102 such as described above are satisfied, the flow proceeds to step S170. In step S170, tape transportation is started as with Step S115, the contents of the access history information recorded in the RFID circuit element Tc in the cartridge 100 so far are printed on the cover film 103 with the printing head 10 as illustrated in FIG. 63, and further, this is discharged from the apparatus 2 from the discharge opening 16 by the feeding roller 17. Upon step S170 ending, this flow ends.

In the event that determination is made the conditions in step S102 are not satisfied, normal RFID circuit element To access, printing, cutting and so forth, are performed in step S105 through step S155 in the same way as described above, and following completion of step S155, the flow proceeds to step S160. In step S160, determination is made regarding whether or not the tape length for creating a normal RFID label T including a normal RFID circuit element To for producing RFID label has run out, the same way as in step s102. In the event that determination is made that the conditions are not satisfied, the flow ends there, while in the event that determination is made that the conditions are satisfied, the flow proceeds to step S170 and performs the above-described procedures, and then this flow ends.

Thus, access history information can be printed on the RFID label TL discharged last from the apparatus 2 for communicating with a RFID tag.

Note that an arrangement may be made wherein, instead of providing a portion on the base tape with no RFID circuit element To as described above, (c) The last RFID circuit element To is proactively used for writing access history information.

In this case, in the above step S102 and step S170, detection is made that there is just one RFID circuit element To remaining. Specifically, it is sufficient to have a particular identifier formed at a position corresponding to the last RFID circuit element To on the base tape 101 (or a position on the cover film 103 corresponding thereto), so as to be detected with a suitable sensor or the like. In this case, the final RFID circuit element To differs from the preceding ones, with no information access being performed for the user but with access history information being written in the same way as with the RFID circuit element Tc of the cartridge 100, thereby generating the last label TL containing the same.

According to the present modification, in addition to the above-described advantages of writing access history information to the RFID circuit element Tc of the cartridge 100, a further advantage is obtained in that the access history information can be clearly recognized visually.

(3-6) Expanded Services to Users

That is to say, printing of the last label TL is not restricted to a visual record of access history information described above in (3-5), and may be aggressively applied to user services.

FIG. 65 is a diagram illustrating such a modification, and is equivalent to the above-described FIG. 63. In this example, the access history information is printed at the bottom portion of the last label TL in the same way as in FIG. 63, with notices to the user (discount service information, i.e., so-called coupons) being printed above this. With the service in this example, the next purchase of a cartridge is discounted by an amount corresponding to the number of RFID circuit elements To which resulted in access failure or poor access due to the above-described erroneous operations made by the user.

By printing such service information, the user is given a stronger incentive to take the cartridge 100 and the label T to the manufacturer or servicing company or the like (in the example, a dealer or electronics shop), thereby increasing the acquisition of access history information and also increasing the recovery percentage for the manufacturer or servicing company.

Note that in the event that the access history information itself is printed on the last label TL, the access history information can be recovered by the label TL regardless of whether or not there is a cartridge 100 having the RFID circuit element Tc, which is advantageous. Also, in the event that the access history information is stored in the RFID circuit element To in the last label TL in addition to the RFID circuit element Tc of the cartridge 100, as described above in Modification (3-5) (c), the access history information can be obtained from the RFID circuit element To as electronic information, regardless of whether or not there is a cartridge 100 as described above.

Conversely, in the event that an assumption is made that the user will bring the cartridge 100 in, or even of not so but the access history information is stored in the RFID circuit element To of the last label TL, it is not necessarily imperative to print both the access history information and the service information as shown in FIG. 65, and an arrangement may be made wherein only the user service information is printed.

(3-7) Others (A) Frequency of Writing Access History Information

The present invention is not restricted to writing recording of the access history information to the RFID circuit element Tc each time a RFID circuit element To is accessed as described above, and arrangements may be made wherein writing is performed every certain number, or upon arbitrary operations performed at the operator side.

(B) Modification of not Cutting with Cutter

While description has been made above regarding an example of a case wherein tag label tape 110 with print regarding which printing and accessing (reading/writing) of the RFID circuit elements To has ended and cut with the cutter 15 to produce RFID labels T, the present invention is not restricted to this. That is to say, in the event that label sheets separated beforehand into predetermined size corresponding to the labels (so-called die-cut labels) are consecutively arrayed on a tape which is fed out from the roll, an arrangement may be made wherein there is no cutting with the cutter 15, and only the label sheet (having an accessed RFID circuit element To and having been printed with corresponding information) is peeled off from the tape so as to form the RFID label T after the tape has been discharged from the discharge opening 16.

Moreover, in addition to that described above, the technique according to the above-described seventh embodiment and techniques according to each of the above-described modifications may be combined and used as appropriate.

An eighth embodiment of the present invention will be described with reference to the drawings. To clarify understanding of the configuration, parts which are equivalent to those in the first through seventh embodiments will be denoted with the same reference numerals, and description will be made with reference to equivalent drawings as suitable.

Figure 66:
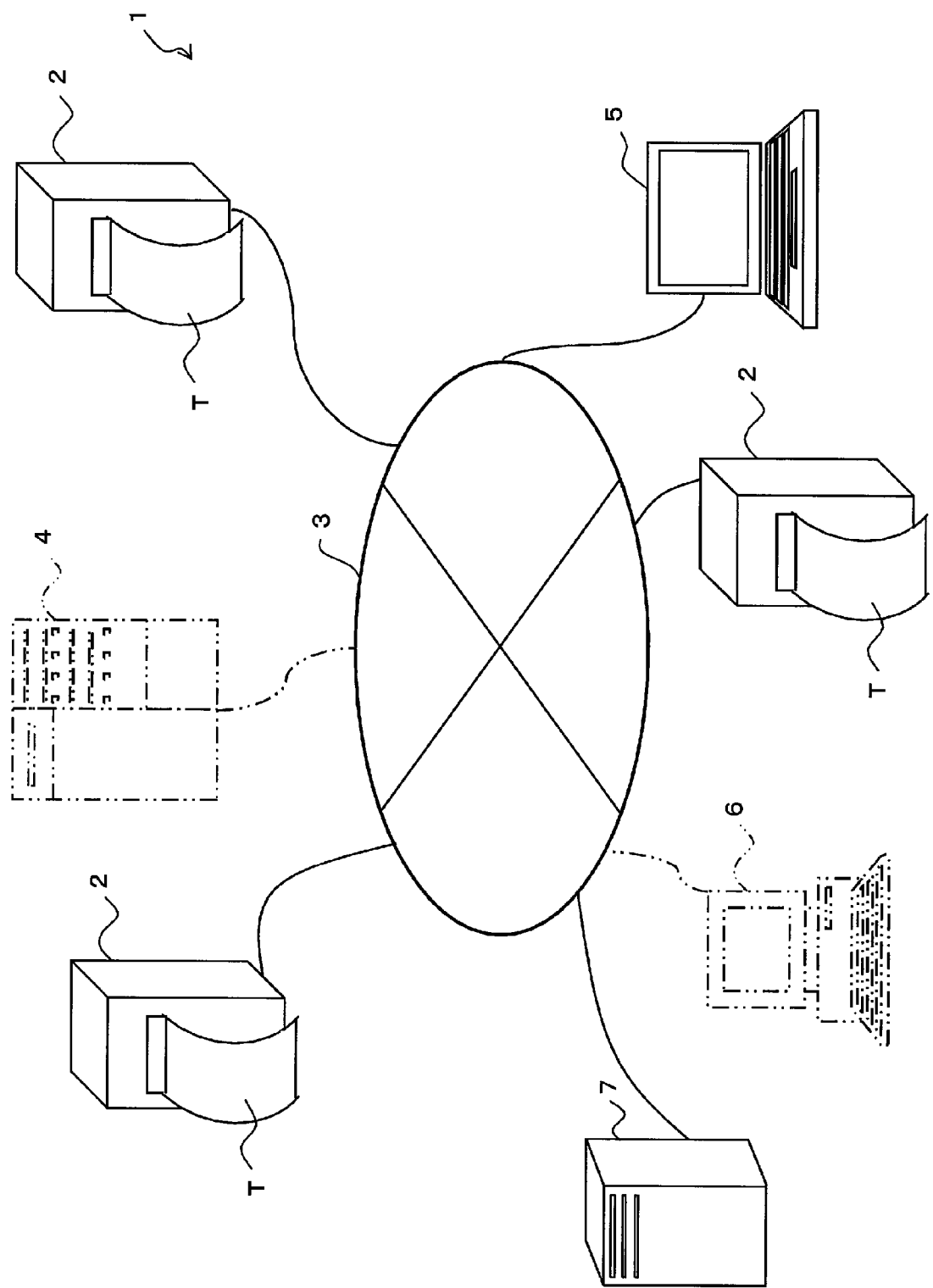
FIG. 66 is a system configuration diagram which shows a management system for managing production information of a RFID tag according to an eighth embodiment of the present invention.

FIG. 66 is a system configuration diagram illustrating a RFID tag manufacturing information management system to which the apparatus for communicating with a RFID tag according to the present embodiment is applied. This embodiment is an embodiment wherein the present invention has been applied to a RFID tag manufacturing (producing) system capable of only reading (i.e., writing is not enabled).

With the management system for managing production information of RFID tag 1 shown in FIG. 66, multiple apparatuses 2 for communicating with a RFID tag are connected to a user PC 5 and a management server 7 via a communication line 3 in a wired or wireless manner.

Though detailed illustrating in the drawing and detailed description will be omitted, the user PC 5 is a normal personal computer having RAM and ROM as record portion, a CPU as computing unit, a keyboard and a mouse as operating unit, a display as display unit, an external communication interface, and so forth.

Figure 67:
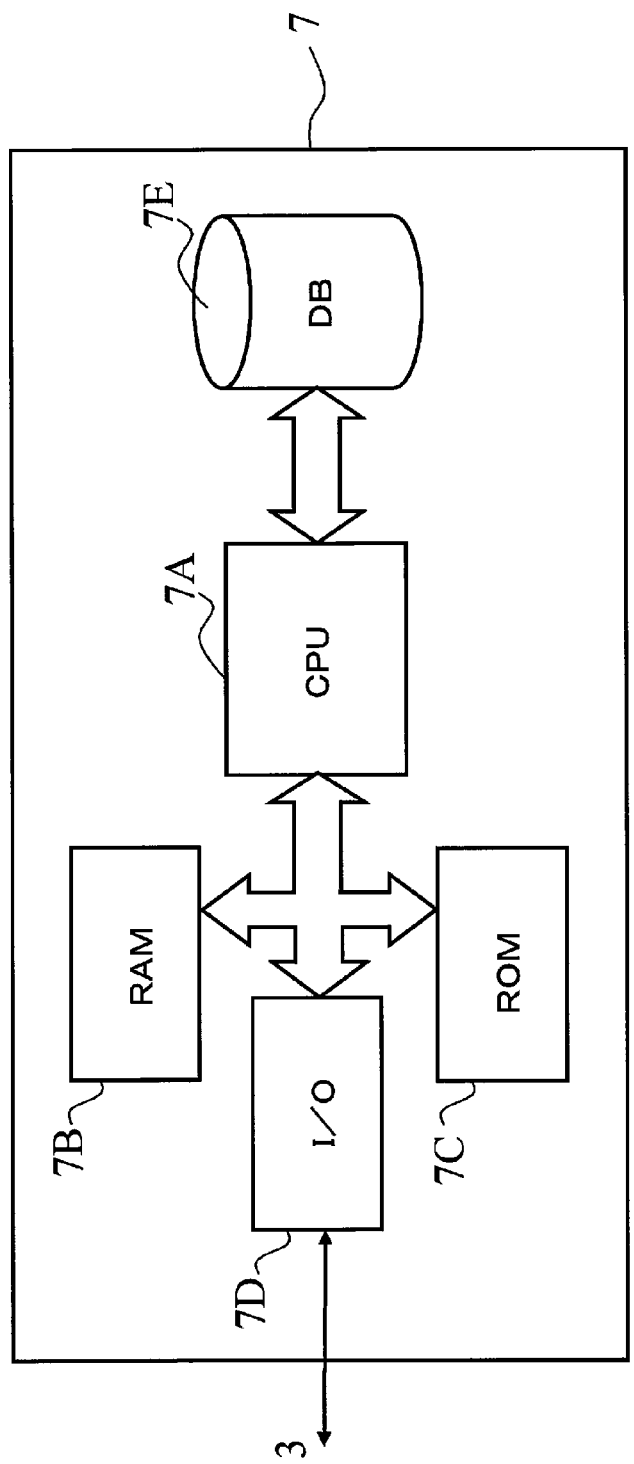
FIG. 67 is a functional block diagram which shows a function of a management server in detail.

FIG. 67 is a functional block diagram which shows a detailed configuration of the management server 7.

The management server 7 comprises a CPU 7A which performs control of the various parts thereof, transfer of data, various types of computations, and so forth, RAM 7B which temporarily stores data, ROM 7C which stores control programs and the like, an input/output interface (I/O) 7D configured to control input/output of data from and to the apparatus 2 for communicating with a RFID tag and user PC 5 via the above-described communication line 3 and so forth, and a main storage device 7E configured to store a database (record portion) DB. Also note that the database DB may be provided externally from the management server 7.

Figure 68:
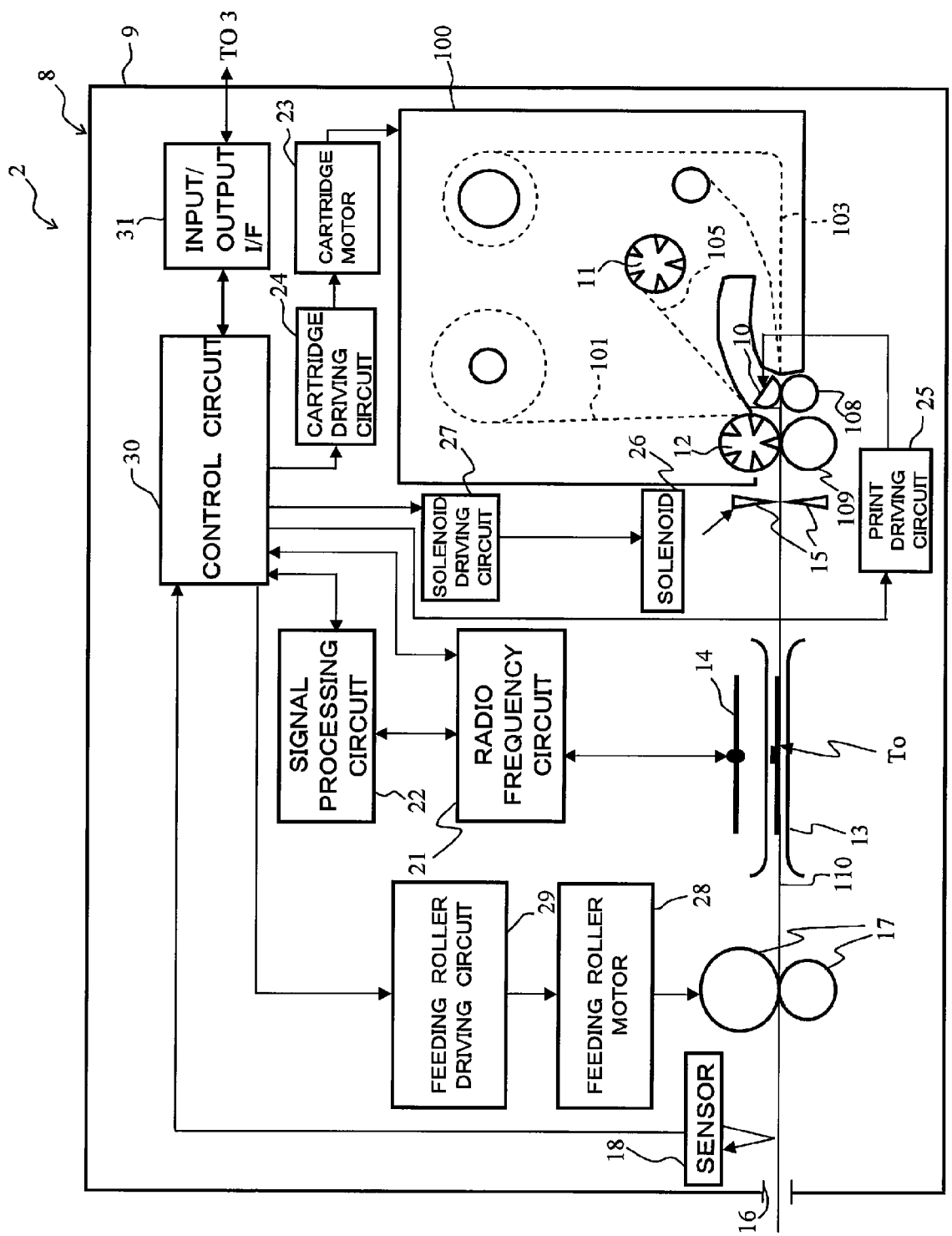
FIG. 68 is a schematic configuration diagram which shows a detailed configuration of an apparatus for communicating with a RFID tag.

FIG. 68 is a conceptual configuration diagram which shows a detailed configuration of the aforementioned apparatus 2 for communicating with a RFID tag.

In FIG. 68, the apparatus main body 8 of the apparatus 2 for communicating with a RFID tag includes a cartridge holder portion (portion for mounting the storing member, not shown) formed in the shape of a recess. The cartridge 100 serving as a container for including at least a RFID tag is detachably mounted to the holder portion.

The apparatus main body 8 includes a housing 9, a print head (thermal head in this case) 10, a ribbon take-up roller driving shaft 11, a feeding roller drive shaft 12 (driving shaft), an antenna 14, a cutter 15, a pair of transporting guides 13, a feeding roller 17, and a sensor 18. The housing 9 has the above-described cartridge holder portion to which the cartridge 100 is fit and also makes up the outline. The print head 10 as printing unit performs predetermined printing of the cover film 103. The ribbon take-up roller driving shaft 11 drives the ink ribbon 105 after the printing of the cover film 103. The feeding roller drive shaft 12 adheres the cover film (print-receiving tape) 103 to a base tape 101 and feeds out the pressure-bonded tape from the cartridge 100 as a tag label tape 110 with print. The antenna 14 transmits/receives signals to/from a RFID circuit element To included in the tag label tape 110 with print (RFID circuit element for a RFID label, of which detailed description will be made later) via wireless communication using a high frequency band such as a UHF band or the like. The cutter 15 cuts the aforementioned tag label tape 110 with print at a predetermined timing and to a predetermined length, thereby forms label-shaped RFID labels T (of which detailed description will be made later). The pair of transporting guides 13 sets and holds the RFID circuit element To at a predetermined access area facing the antenna 14 at the time of receiving/transmitting signals by the wireless communication described above, and guides the tape 100 following cutting, which is then the RFID label T. The feeding roller 17 transports the RFID labels T guided thereunto to an output opening (discharge opening) 16, thereby outputs the RFID labels T. The sensor 18 detects whether or not there is a RFID label T at the output opening 16.

Also, through omitted from the drawings, the cartridge holder portion is provided with suitable reading unit configured to detect that a cartridge 100 has been mounted thereupon, and also configured to read the identification information thereof. Any suitable means may be used for the reading unit, such as an optical sensor such as a barcode scanner configured to read identification information in the form of a barcode or the like on the cartridge side, a contact (or optical) sensor configured to read mechanical recess/protrusion identification information on the cartridge side, means for reading, either by contact or non-contact, identification information stored in suitable record portion (either volatile or non-volatile media) at the cartridge side, or the like. These reading unit output signals corresponding to the reading results (cartridge identification information) to the later-described control circuit 30.

On the other hand, the apparatus main body 8 also includes a radio frequency circuit 21, a signal processing circuit 22, a motor 23 to drive cartridge shaft, a cartridge shaft drive circuit 24, a print-head drive circuit 25, a solenoid 26, a solenoid drive circuit 27, a tape-feeding-roller motor 28, a tape-feeding-roller drive circuit 29, and a control circuit 30. The radio frequency circuit 21 accesses (writes or reads) the aforementioned RFID circuit element To via the antenna 14. The signal processing circuit 22 processes signals read out from the RFID circuit element To. The motor 23 to drive cartridge shaft drives the ribbon take-up roller driving shaft 11 and the feeding roller drive shaft 12. The cartridge shaft drive circuit 24 controls the driving of the motor 23 to drive cartridge shaft. The print-head drive circuit 25 controls the supply of power to the aforementioned print head 10. The solenoid 26 drives the aforementioned cutter 15 such that it performs the cutting operation. The solenoid drive circuit 27 controls the solenoid 26. The tape-feeding-roller motor 28 drives the aforementioned feeding roller 17. The tape-feeding-roller drive circuit 29 controls the tape-feeding-roller motor 28. The control circuit 30 controls the radio frequency circuit 21, the signal processing circuit 22, the cartridge shaft drive circuit 24, the print-head drive circuit 25, the solenoid drive circuit 27, the tape-feeding-roller drive circuit 29, and so forth, thereby controls the operation of the overall system of the apparatus 2 for communicating with a RFID tag.

The control circuit 30 is a so-called microcomputer. While detailed description thereof will be omitted, the control circuit 30 comprises a CPU which is a central computation processing device, ROM, RAM, and so forth, and performs signal processing according to a program stored beforehand in the ROM using the temporary storage function provided by the RAM. Furthermore, the control circuit 30 is connected to the communication line via the input/output interface 31, for example. Such an arrangement allows the control circuit 30 to transmit/receive information with the user PC 5 and management server 7 connected to the communication line.

Figure 69:
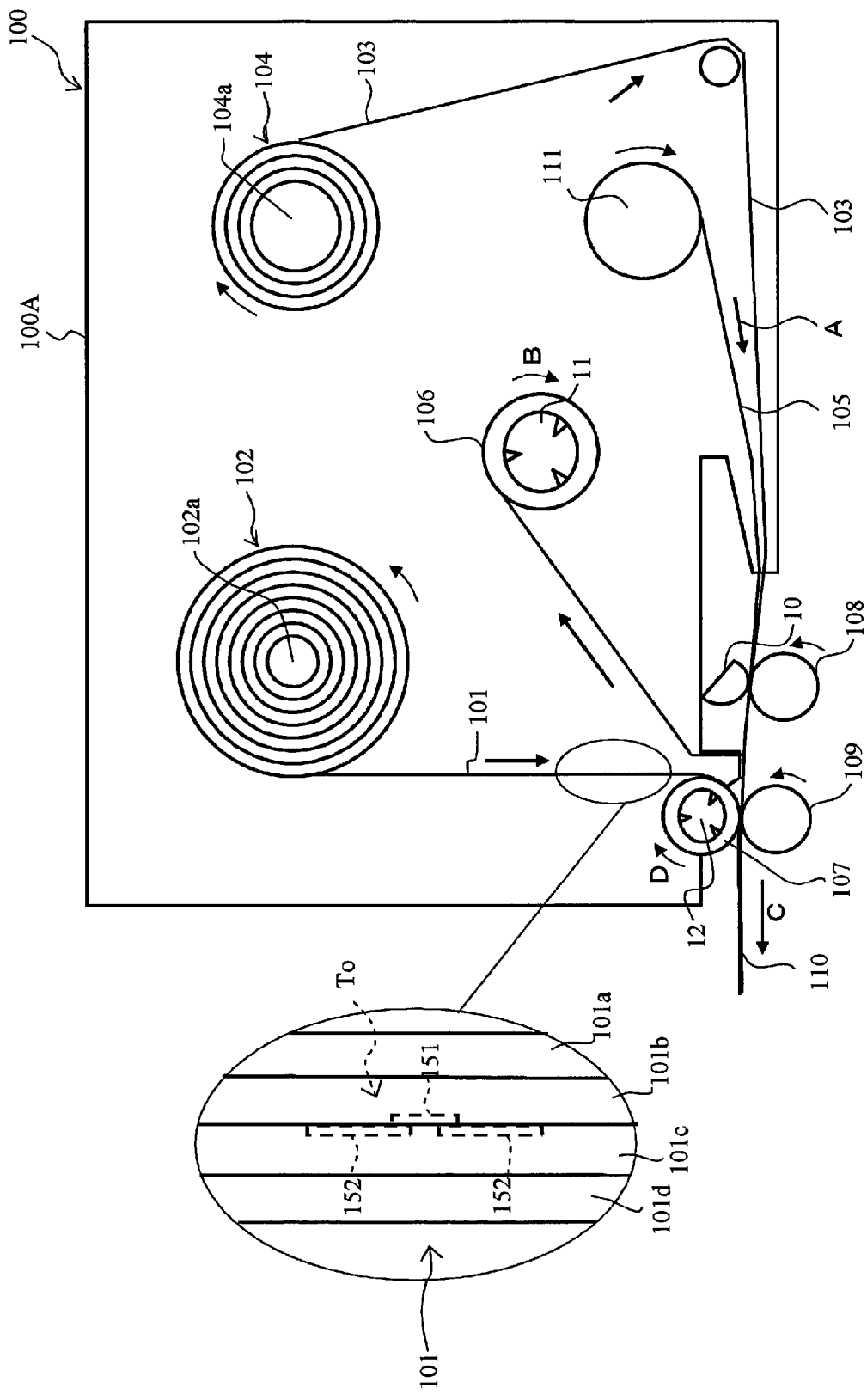
FIG. 69 is an explanatory diagram for describing a detailed structure of a cartridge.

FIG. 69 is an explanatory diagram for describing the detailed configuration of the aforementioned cartridge 100.

In FIG. 69, the cartridge 100 comprises a housing 100A, the first roll 102, the second roll 104, a ribbon-supply-side roll 111, a ribbon take-up roller 106, and a pressure roller 107. The first roll 102 winds the strip base tape 101 (tag tape), and is disposed within the housing 100A. The second roll 104 winds the transparent cover film 103. The cover film has approximately the same width as that of the base tape 101. The ribbon-supply-side roll 111 supplies the ink ribbon 105 (heat transfer ribbon, which can be eliminated in a case of employing a thermo-sensitive tape as the cover film). The ribbon take-up roller 106 rewinds the ribbon 105 after the printing. The pressure roller 107 adheres the base tape 101 and the cover film 103 to each other by applying pressure and transports the tag label tape 110 with print thus formed in the direction of the arrow A (i.e., serving as a feeding roller).

The first roll 102 stores, in a manner so as to be wound around a reel member 102a, the base tape 101, which has a structure in which multiple RFID circuit elements To are consecutively formed at a predetermined pitch along the longitudinal direction.

The base tape 101 in this example has a four-layer structure (see partial enlarged view in FIG. 69) comprising an adhesive layer 101a formed of an appropriate adhesive material, a colored base film 101b formed of PET (polyethylene terephthalate) or the like, an adhesive layer 101c formed of an appropriate adhesive material, and a detachable paper sheet 101d. The four layers of the base tape 101 are layered in that order from the layer that corresponds to the inner side of the rolled tape (the rightmost layer in FIG. 69) to the layer that corresponds to the opposite side (the leftmost layer in FIG. 69).

The base film 101b includes antennas (first antennas) 152, which provide a function of transmission/reception of information, on the back face of the base film 101b (on the left side in FIG. 69) such that they and the base film 101b form a single member. Furthermore, an IC circuit part (first IC circuit part) 151 for updatably (rewritably) storing information is formed such that it is connected to each first antenna 152, thereby forming individual RFID circuit elements To.

The aforementioned adhesive layer 101a configured to adhere the cover film later is formed on the front face (right side in FIG. 69) of the base film 101b, and the aforementioned detachable paper sheet 101d is adhered to the base film 101b by the aforementioned adhesive layer 101c provided on the back face of the base film 101b (left side in FIG. 69) so as to enclose the RFID circuit elements To. Note that the user peels off the detachable paper sheet 101d when the user adheres the completed RFID label T to a product or the like, thereby adhering the RFID label T to the product or the like by the adhesive layer 101c.

The second roll 104 stores the aforementioned cover film 103 such that it is wound around a reel member 104a. The cover film 103 is supplied from the second roll 104. The ribbon 105 is supplied on the back side of the cover film 103 (i.e., on the face of the side which is to be adhered to the base tape 101), and is driven by the ribbon-supply-side roll 111 and the ribbon winding roll 106. The ribbon 105 thus supplied is pressed by the print head 10, thereby coming into contact with the back face of the cover film 103.

The aforementioned motor 23 to drive cartridge shaft (see FIG. 68 described above), which is a pulse motor externally provided to the cartridge 100, transmits driving force to each of the ribbon take-up roller driving shaft 11 and the feeding roller drive shaft 12, thereby rotationally driving the ribbon take-up roller 106 and the pressure roller 107.

With the cartridge 100 having the aforementioned configuration, the base tape 101 fed out from the aforementioned first roll 102 is supplied to the pressure roller 107. On the other hand, the ink ribbon 105 is driven by the ribbon-supply-side roll 111 and ribbon take-up roller 106 so as to be located on the back face side (i.e., the face of the side which is to be adhered to the base tape 101) of the cover film 103 fed out from the second roll 104. Furthermore, the ink ribbon 105 thus driven is pressed by the print head 10, thereby being brought into contact with the back face of the cover film 103.

With such an arrangement, upon shifting the roll holder (not shown) from the separate position to the contact position after mounting the cartridge 100 to the cartridge holder portion of the apparatus main body 8, the cover film 103 and the ink ribbon 105 are held by the nip between the print head 10 and the platen roller 108, and the base tape 101 and the cover film 103 are held by the nip between the pressure roller 107 and a sub roller 109. Then, the ribbon take-up roller 106 and the pressure roller 107 are synchronously rotationally driven along the directions denoted by the arrow B and the arrow D, respectively, by the driving force provided from the motor 23 to drive cartridge shaft. Furthermore, the feeding roller drive shaft 12, the sub roller 109, and the platen roller 108 are connected to one another by a gear set (not shown). With such an arrangement, upon driving the feeding roller drive shaft 12, the pressure roller 107, the sub roller 109, and the platen roller 108 rotate, thereby feeding out the base tape 101 from the first roll 102. The base tape 101 thus fed out is supplied to the pressure roller 107 as described above. On the other hand, the cover film 103 is fed out from the second roll 104. At the same time, power is supplied to multiple heater elements provided to the print head 10 from the print-head drive circuit 25. As a result, printing is performed, thereby forming printed letters R (see FIG. 72 described later) on the back face of the cover film 103. Then, the base tape 101 and the printed cover film 103 are adhered (pressure-bonded) to each other by the pressure roller 107 and the sub roller 109 so as to form a single tape, thereby forming the tag label tape 110 with print. The printed tag label 110 tape thus formed is transported to outside the cartridge 100. Note that the ink ribbon 105 is wound onto the ribbon take-up roller 106 by the driving force provided from the ribbon take-up roller driving shaft 11 after the printing of the cover film 103.

Figure 70:
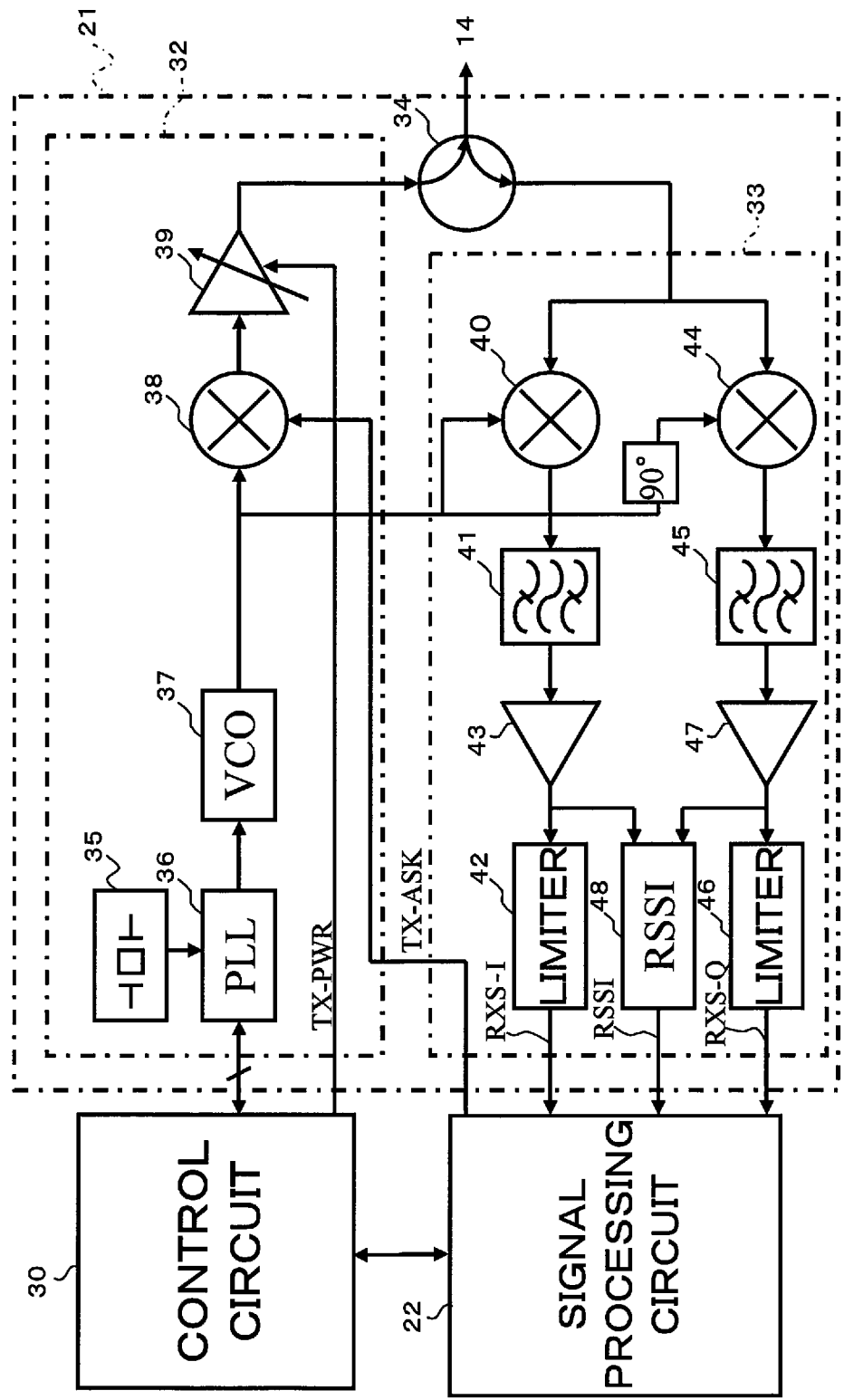
FIG. 70 is a functional block diagram which shows a function of a radio frequency circuit in detail.

FIG. 70 is a functional block diagram which shows the functions of the aforementioned radio frequency circuit 21 in detail. In FIG. 70, the radio frequency circuit 21 comprises a transmitting portion 32 configured to transmit signals to the RFID circuit elements To via the antenna 14, a receiving portion 33 configured to receive the reflected waves from the RFID circuit elements To via the antenna 14, and a transmit-receive splitter 34.

The transmitting portion 32 includes a quartz oscillator 35, a PLL (Phase Locked Loop) 36, a VCO (Voltage Controlled Oscillator) 37, a transmission multiplying circuit 38 (note that, in a case of amplitude modulation, it may be replaced by an amplitude factor variable amplifier or the like), and a variable transmission amplifier 39. The quartz oscillator 35 the PLL 36, and the VCO 37 generate carrier waves for accessing (reading in this example, also including writing in a later-described modification) the RFID tag information stored in the IC circuit part 151 of the RFID circuit element To. The transmission multiplying circuit 38 modulates (in this case, amplitude modulation according to the "TX_ASK" signal supplied from the signal processing circuit 22) the carrier waves (RFID tag information) generated as described above according to a signal supplied from the signal processing circuit 22. The variable transmission amplifier 39 amplifies the modulated waves (RFID tag information) modulated by the transmission multiplying circuit 38 with an amplification factor determined according to a "TX_PWR" signal supplied from the control circuit 30. With such an arrangement, the UHF frequency band is preferably employed for the carrier waves generated as described above. The output signal from the transmission amplifier 39 is transmitted to the antenna 14 via the transmit-receive splitter 34, whereby the output signal is supplied to the IC circuit part 151 of the RFID circuit devices To. Note that the RFID tag information is not restricted to the signals thus modulated. In some cases, only a plain carrier wave is transmitted as the RFID tag information.

The receiving portion 33 includes a first receiving signal multiplying circuit 40, a first band-pass filter 41, a first receiving signal amplifier 43, a second receiving signal multiplying circuit 44, a second band-pass filter 45, and a second receiving signal amplifier 47. The first receiving signal multiplying circuit 40 multiplies the reflected waves received from the RFID circuit element To via the antenna 14 by the carrier waves generated as described above. The first band-pass filter 41 extracts only the signals within the necessary frequency band range from the output signals received from the first receiving signal multiplying circuit 40. The first receiving signal amplifier 43 amplifies the output signal from the first band-pass filter 41 and supplying the output signal thus amplified to a first limiter 42. The second receiving signal multiplying circuit 44 multiplies the reflected waves received from the RFID circuit element To via the antenna 14 by the carrier waves that have been delayed by a phase angle of 90° after having been generated as described above. The second band-pass filter 45 extracts only the signals within the necessary frequency band range from the output signals of the second receiving signal multiplying circuit 44. The second receiving signal amplifier 47 amplifies the output signal input from the second band-pass filter 45, and supplies the signal thus amplified to a second limiter 46. With such an arrangement, the signal "RXS-I" output from the aforementioned first limiter 42 and the signal "RXS-Q" output from the aforementioned second limiter 46 are input to the aforementioned signal processing circuit 22, whereupon these signals are processed by the signal processing circuit 22.

Furthermore, the output signals from the first receiving signal amplifier 43 and the second receiving signal amplifier 47 are input to an RSSI (Received Signal Strength Indicator) circuit 48. With such an arrangement, the signal "RSSI" which indicates the magnitude of these signals is input to the signal processing circuit 22. As described above, the apparatus 2 for communicating with a RFID tag performs demodulation of the reflected waves from the RFID circuit device To by I-Q quadrature demodulation.

Figure 71:
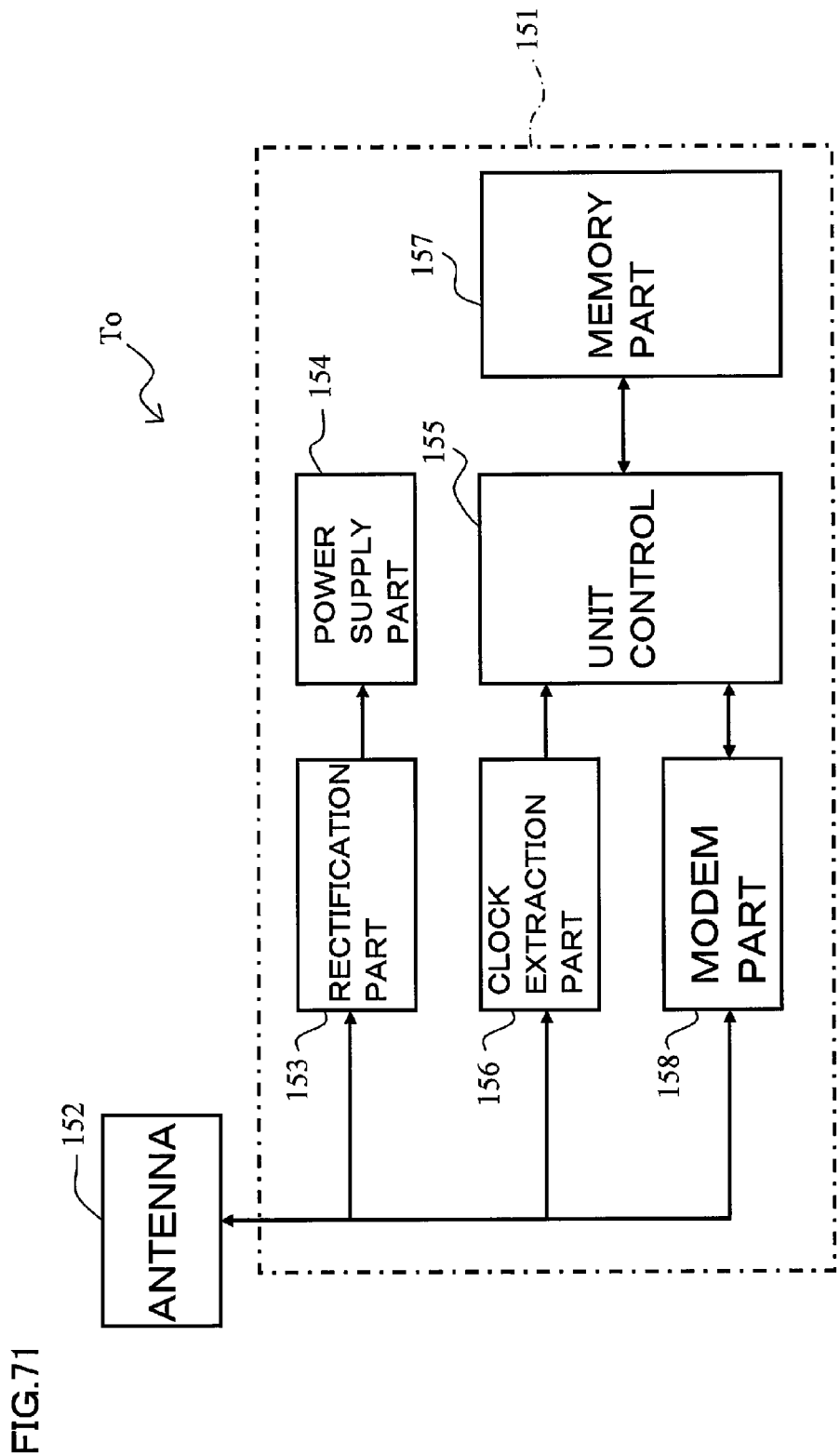
FIG. 71 is a functional block diagram which shows a functional configuration of a radio frequency circuit.

FIG. 71 is a functional block diagram which shows the functional configuration of the aforementioned RFID circuit element To. In FIG. 71, the RFID circuit element To includes the aforementioned antenna 152 configured to perform transmission/reception of signals of the antenna 14 at the apparatus 2 for communicating with a RFID tag side in a non-contact manner using high-frequency radio waves of the UHF frequency band or the like, and the aforementioned IC circuit part 151 connected to the antenna 152.

The IC circuit part 151 includes a rectification part 153, a power source part 154, a clock extraction part 156, a memory part 157, a modem part 158, and a control unit 155, etc. The rectification part 153 rectifies the carrier waves received via the antenna 152. The power source part 154 stores the energy of the carrier waves thus rectified by the rectification part 153, which serves as a driving power supply. The clock extraction part 156 extracts the clock signals from the carrier waves thus received by the antenna 152 and supplies the clock signals thus extracted to a control unit 155. The memory part 157 can stores predetermined information signals. The modem part 158 is connected to the antenna 152. The control unit 155 controls the operation of the aforementioned RFID circuit element To via the modem part 158 connected to the antenna 152, the rectification part 153, the clock extraction part 156, and the modem part 158, etc.

The modem part 158 performs demodulation of communication signals which have been transmitted from the antenna 14 of the aforementioned apparatus 2 for communicating with a RFID tag, and which have been received via the antenna 152. Also, the modem part 158 performs modulation of the carrier waves received via the antenna 152 according to a response signal from the aforementioned control unit 155, and the carrier waves thus modulated are transmitted as reflected waves.

The control unit 155 analyzes the received signals demodulated by the modem part 158, creates the response signals based upon the information signals stored in the memory part 157, and executes basic control such as the control for instructing the modem part 158 to transmit a response signal.

Figure 72A:
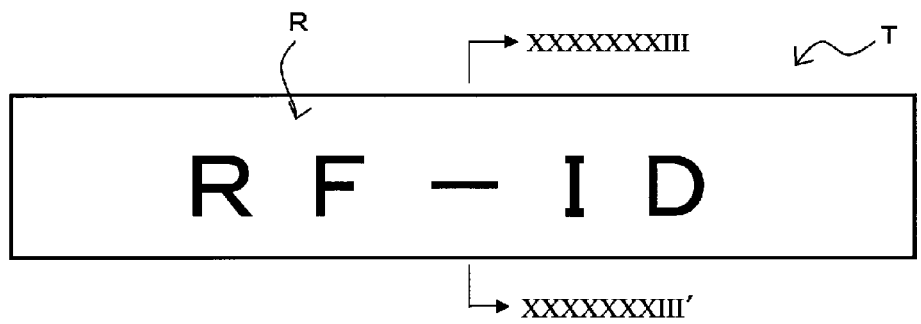
FIG. 72A shows a top view which show an example of the exterior of a RFID label.
Figure 72B:
FIG. 72B shows a bottom view which show an example of the exterior of a RFID label.

FIGS. 72A and 72B are diagrams which show an example of the exterior of a RFID label T cut off from the tag label tape 110 with print after information writing of the RFID circuit element To. FIG. 72A is a top view, and FIG. 72B is a bottom view. On the other hand, FIG. 73 is a lateral cross-sectional view taken along line XXXXXXXIII-XXXXXXXIII' in FIG. 72A.

Figure 73:
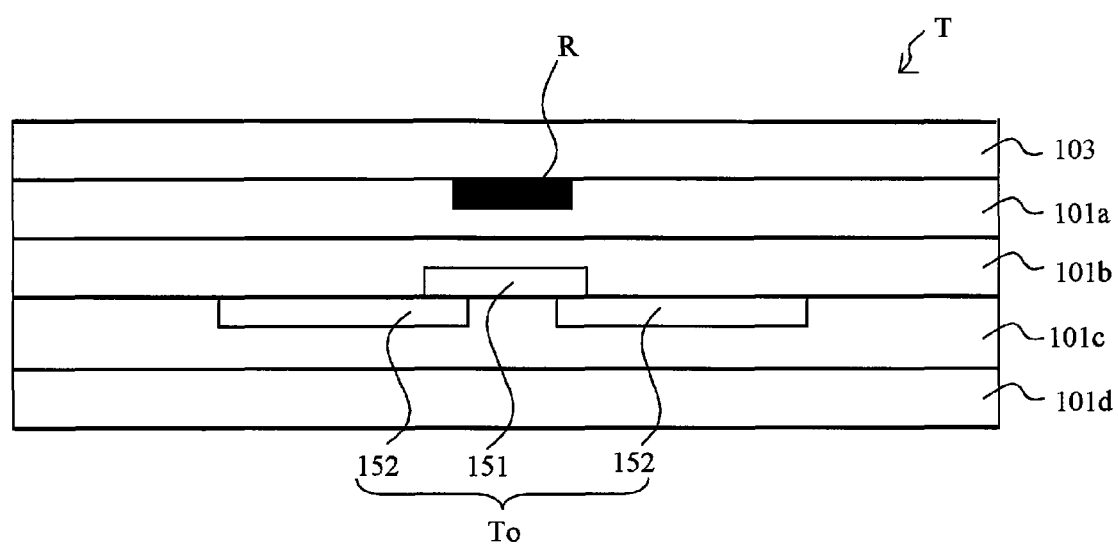
FIG. 73 is a lateral cross-sectional view taken along line XXXXXXXIII-XXXXXXXIII' in FIG. 72A.

As shown in FIGS. 72A, 72B, and 73, the RFID label T has a five-layer structure in which the cover film 103 is provided to the four-layer structure shown in FIG. 69. Specifically, the five-layer structure comprises the cover film 103, the adhesive layer 101a, the base film 101b, the adhesive layer 101c, and the detachable paper sheet 101d, in that order from the side of the cover film 103 (upper side in FIG. 73) to the opposite side (lower side in FIG. 73). Furthermore, as described above, the RFID circuit elements To including the antennas 152 provided on the back side of the base film 101b are provided within the adhesive layer 101c. Furthermore, the printed characters R (which read "RF-ID" to indicate the kind of RFID label T) are printed on the back of the cover film 103.

Note that while an example has been described above wherein the transporting guides 13 hold the printed tab label tape 110 which is being moved during the printing operations so as to be within the access area and access made thereto (reading or writing), the present invention is not restricted to this, and an arrangement may be made wherein the printed tab label tape 110 is stopped at a predetermined position and access is made in a state of being held at the transporting guides 13.

Figure 74:
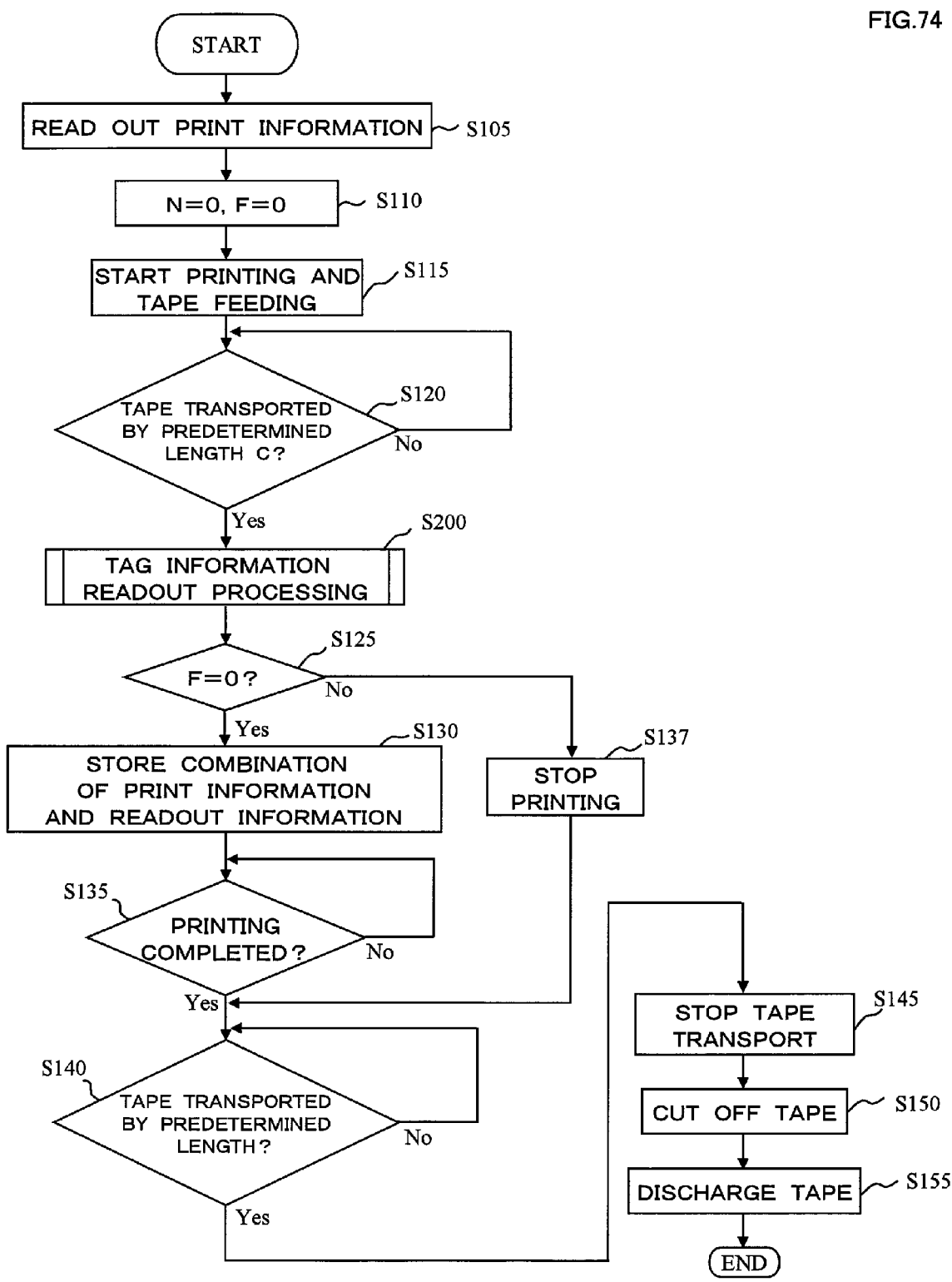
FIG. 74 is a flowchart which shows a control procedure executed by a control circuit.

FIG. 74 is a flowchart which shows a control procedure executed by the control circuit 30, at the time of creating the aforementioned RFID labels T, i.e., at the time of performing printing of the cover film 103 with the print head 10 while feeding the cover film 103, adhering the base tape 101 thereto so as to form the tag label tape 110 with print, and cutting off the tag label tape 110 with print in increments of the RFID circuit elements To so as to form the RFID labels T.

In FIG. 74, upon performance of the reading operation by the apparatus 2 for communicating with a RFID tag by the user PC 5 for example (or may be operating unit provided to the apparatus 2 for communicating with a RFID tag itself), the flow starts. First, in Step S10S, the printing information to be printed on the RFID label T by the printing head 10, i.e., the printing information input by operations via the above-described user PC 5, is read in via the communication line 3 and the input/output interface 31.

Subsequently, in step S110, a variable N for counting the number of times that retry has been attempted due to no response from the RFID circuit element, and a flag F indicating whether communication is good or bad, are initialized to 0.

In step S115, a control signal is output to the cartridge shaft drive circuit 24, and the ribbon take-up roller 106 and the pressure roller 107 are rotationally driven by the driving force of the motor 23 to drive cartridge shaft. Accordingly, the base tape 101 is supplied from the first roll 102 and supplied to the pressure roller 107, with the cover film 103 being supplied from the second roll 104. At this time, a control signal is output to the printing driving circuit 25, power is applied to the printing head 10, and the characters, symbols, barcode, and other like printing R, read in Step S105, is printed in a predetermined region of the cover film 103 (a region to be adhered to the rear face of the RFID circuit elements T0 which are arrayed on the base tape 101 at a predetermined pitch with equal spacing, for example). Further, a control signal is output to the tape-feeding-roller motor 28 via the tape-feeding-roller drive circuit 29, thereby rotationally driving the feeding roller 17. Consequently, the base tape 101 and the cover film 103 upon which the above printing has been completed are integrated by being adhered by the pressure roller 107 and sub roller 109, thereby forming the tag label tape 110 with print, which is transported out from the cartridge 100.

Subsequently, in Step S120, determination is made regarding whether or not the printed tab label tape 110 has been transported by a predetermined value C (e.g., a transportation distance by which a RFID circuit element To to which the cover film 103 with the corresponding printing is adhered reaches the transporting guides 13). The transporting distance determination at this time can be sufficiently made by detecting a suitable identification mark provided on the base tape 101 with a separately-provided known tape sensor, for example. Upon this determination being satisfied, the flow proceeds to Step S200.

In Step S200, tag information reading processing is performed, a query signal for reading is transmitted to the RFID circuit element To, a reply signal including RFID tag information is received, and read in (see the later-described FIG. 75 for details). Upon this Step S200 ending, the flow proceeds to Step S125.

In Step S125, determination is made regarding whether or not flag F=0. In the event that the reading processing has successfully ended, F=0 is unchanged (see Step S280 in the flowchart in the later-described FIG. 75), so this determination is satisfied, and the flow proceeds to Step S130.

In Step S130, the combination of the information read from the RFID circuit element To in the above-described Step S200 and the printing information already printed by the printing head 10 corresponding thereto are output via the input/output interface 31 and communication line 3, and stored in the above-described database DB on the management server 7. Note that this stored data is stored and held in the database DB, so as to be referred to, by the user PC 5.

Subsequently, in Step S135, following confirmation regarding whether or not all printing to the region of the cover film 103 corresponding to the RFID circuit element To being processed at this point has ended, the flow proceeds to Step S140.

Note that in the aforementioned Step S125, in the event that the reading processing has not completed successfully for some reason, F=1 holds (see Step S280 in the flowchart in the later-described FIG. 55), so the determination in S125 is not satisfied. Accordingly, the flow proceeds to step S137, a control signal is output to the printing driving circuit 25, and power applied to the printing head 10 is stopped so that printing stops. Following clarification that this RFID circuit element To is not a passable item by such printing interruption, the flow proceeds to Step S140.

In Step S140, determination is made regarding whether or not the tag label tape 110 with print has further been transported by a predetermined amount (e.g., a transportation distance by which the RFID circuit element To and the printed region of the cover film 103 corresponding thereto all pass a predetermined length (clearage margin) of the cutter 15). The transporting distance determination at this time as well can also be sufficiently made by detecting marking with a tape sensor, for example, as with the above-described Step S120. Upon this determination being satisfied, the flow proceeds to Step S145.

In Step S145, control signals are output to the cartridge shaft drive circuit 24 and the tape-feeding-roller drive circuit 29, the driving of the motor 23 to drive cartridge shaft and the tape-feeding-roller motor 28 is stopped, and the rotation of the ribbon take-up roller 106, the pressure roller 107, and the feeding roller 17 is stopped. Accordingly, supplying of the base type 101 from the first roll 102, supplying of the cover film 103 from the second roll 104, and transporting of the tag label tape 110 with print by the feeding roller 17, stop.

Subsequently, in Step S150 a control signal is output to the solenoid drive circuit 27 to drive the solenoid 26, and the tag label tape 110 with print is cut with the cutter 15. As described earlier, at this point, all of the RFID circuit element To being processed and the corresponding printing region of the cover film 103 have sufficiently cleared the cutter 15, so cutting with the cutter 15 yields a label-type RFID label T of which the RFID tag information of the RFID circuit element To has been read and printing corresponding thereto has been performed.

Subsequently, the flow proceeds to Step S155, a control signal is output to the tape-feeding-roller drive circuit 29, driving of the tape-feeding-roller motor 28 is resumed, and the feeding roller 17 rotates. Accordingly, transportation by the feeding roller 17 is resumed and the RFID labels T formed in labelshape in the above Step S150 are transported toward the discharge opening 16, and further discharged outside of the apparatus 2 from the discharge opening 16.

Figure 75:
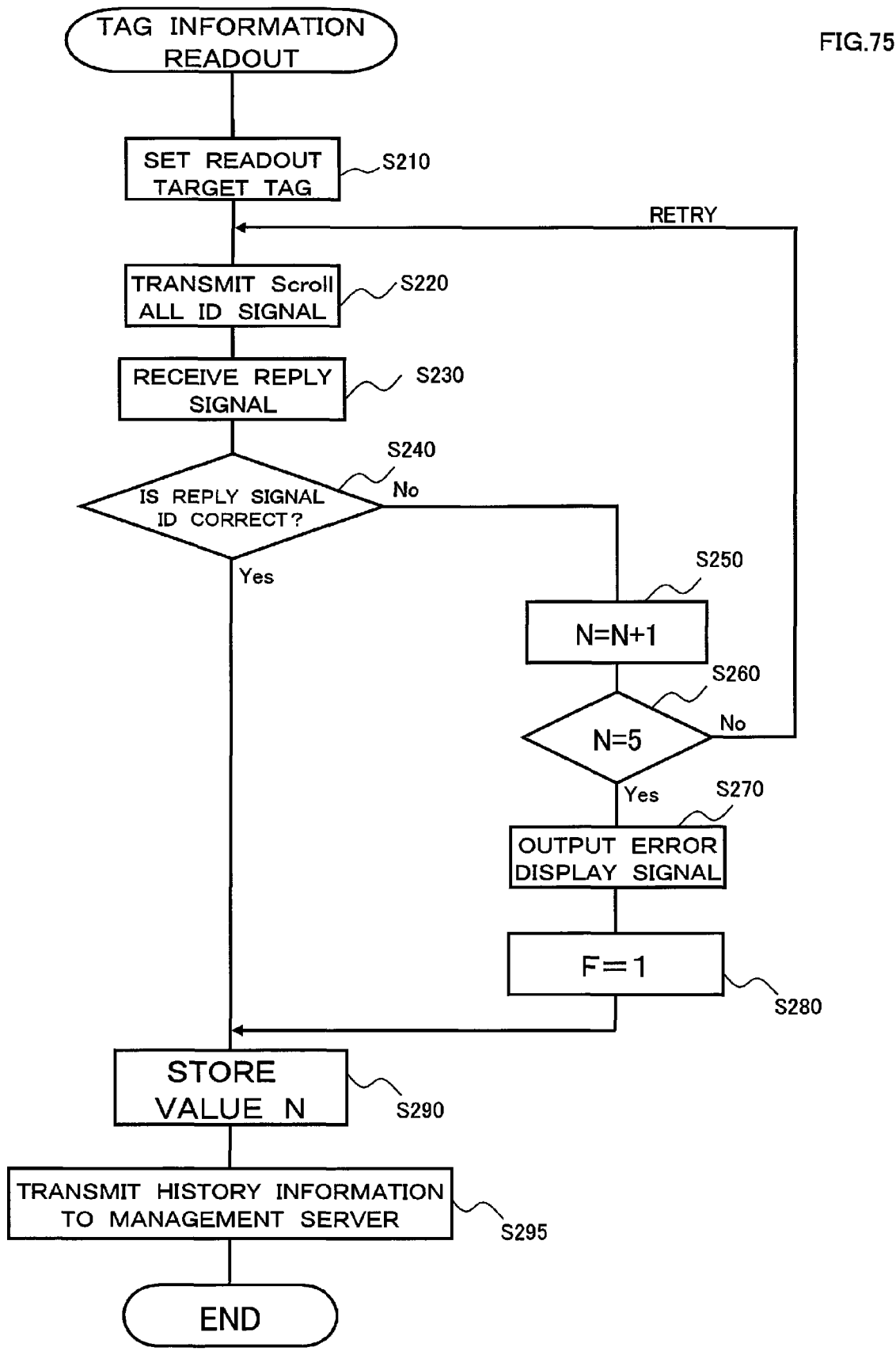
FIG. 75 is a flowchart which shows a procedure of Step S200 shown in FIG. 74 in detail.

FIG. 75 is a flowchart illustrating the detailed procedures of the aforementioned Step S200.

In FIG. 75, first, in Step S210, following printing of the tag label tape 110, the RFID circuit element To from which information is to be read is transported to nearby the antenna 14, and the tag of interest is set.

Subsequently, in Step S220, a "Scroll All ID" command for reading out information stored in the RFID circuit element To is output to the signal processing circuit 22. Based thereupon, a "Scroll All ID" signal serving as access information is generated at the signal processing circuit 22 and transmitted to the RFID circuit element To be accessed via the radio frequency circuit 21, prompting a reply.

Next, in Step S230, a reply signal (RFID tag information such as tag identification information ID for example, and so forth) transmitted from the RFID circuit element To be accessed in accordance with the aforementioned "Scroll All ID" signal is received via the antenna 14, and acquired via the radio frequency circuit 21 and signal processing circuit 22.

Next, in Step S240, whether or not there is any error in the reply signal received in the above Step S230 is determined using a known error detection code (CRC (Cyclic Redundancy Check) code, etc.).

In the event that determination has been made that the condition has not been satisfied, the flow proceeds to Step S250 where N is incremented by 1, and further, the flow proceeds to Step S260 where determination is made whether or not N is equal to a predetermined number of retries (5 in this case, other numbers of times may also be set as appropriate). In a case that N is equal to or less than 4, the condition has not been satisfied, and accordingly, the flow is returned to Step S220, and the same procedure is repeated. In a case that N is equal to 5, the flow proceeds to Step S270, and an error display signal is output to the user PC 5 via the input/output interface 31 and the communication line 3 so as to display the corresponding error. Here, a writing failure (error) display is performed, and in Step S280, the flag F is set to 1. With such an arrangement, a predetermined number of writing retries (5 in this example) are performed even if the information reading fails. Upon Step S280 ending, the flow proceeds to step S290.

In the event that determination is made in Step S240 that the condition has been satisfied, reading of RFID tag information from the RFID circuit element To be read is completed, and the flow directly proceeds to step S290.

In Step S290, the value of N (the number of retries required for a successful access) is temporarily stored in suitable record portion (e.g., RAM within the control circuit 30, etc.).

Subsequently, in step S295, the number of retries N stored in the record portion is read out, the number of retries N and the identification information of the RFID circuit element (tag ID) and identification of the apparatus 2 for communicating with a RFID tag (product No. or model No. or the like) are output to the management server 7 via the input/output interface 31 and communication line 3 as access history information (making up a communication factor for determining communication capabilities as to the RFID circuit element To), and these are written to and stored in the database DB on the management server 7.

Due to the above routine, the RFID tag information of the IC circuit part 151 can be accessed and read out for the RFID circuit element To within the cartridge 100 to be accessed, and also the access history thereof can be written to the database DB of the management server 7 to be stored and saved.

FIG. 76 is a diagram illustrating an example of access history information written to the database DB of the management server 7 as described above.

In FIG. 76, in the "Tag ID" column are recorded identification information of each RFID circuit element To, in this case "Tag 1", "Tag 2", and so forth. While description of the details of the tag IDs will be omitted, it should be understood that the numbers of 1, 2, and so on are written at the time of fabricating the base tape 101, when inserting the RFID circuit elements To and winding up, the IDs corresponding to the IDs which the apparatus 2 for communicating with a RFID tag will be read out. The IDs are written such that re-writing is impossible, and accordingly the RFID circuit elements To stored in the cartridge 100 are read-only.

In the "Number of Read Retries" and "Results of Read" columns are recorded whether or not access to the RFID circuit elements To (reading in the above example) has ultimately succeeded (OK of successful, NG (meaning No Good) if unsuccessful), and the number of retries N (i.e., one of 1 through 5) to successful access. Note that as described earlier with reference to FIG. 75, failure to access when N is 5 results in an error, so a value of N of 6 or greater is impossible (in this example). The cases in the drawing indicated by a dash "-" are such cases, which are indicated by "NG" as being failed access attempts.

In the column "Device Side Identification Information" is recorded identification information of the RFID tag communication apparatus 2 which has accessed each RFID circuit element To, in the form of "ID-a", "ID-b", "ID-c", and so forth. In this example, of the RFID circuit elements To stored in the cartridge 100, the RFID circuit elements To represented by the identification information "Tag 1" and "Tag 7" have been accessed upon being mounted to the apparatus 2 for communicating with a RFID tag of which the cartridge 100 is represented by the identification information "ID-a". Also, the RFID circuit elements To represented by the identification information "Tag 2" through "Tag 6", "Tag 10", etc., have been accessed upon being mounted to the apparatus 2 for communicating with a RFID tag of which the cartridge 100 is represented by the identification information "ID-b". Further, the RFID circuit elements To represented by the identification information "Tag 8", "Tag 9", "Tag 11", etc., have been accessed upon being mounted to the apparatus 2 for communicating with a RFID tag of which the cartridge 100 is represented by the identification information "ID-c".

Also, identification information of the cartridge 100 may be recorded as access history information, instead of the identification information of the RFID tag communication apparatus 2 (or in addition thereto). Further, user IDs of later-described registered members may also be recorded as access history information.

Now, one major feature of the management system for managing production information of RFID tag 1 according to the present embodiment is that, at the time of creating the RFID labels T at the apparatus 2 for communicating with a RFID tag such as described above, the management server 7 performs online RFID label creating services and billing services, by way of display on the user PC 5 and user operations made thereat. The contents thereof will be described in order with reference to FIG. 77, which is a flowchart illustrating the flow of screen display made on the display unit of the user PC 5.

Figure 77:
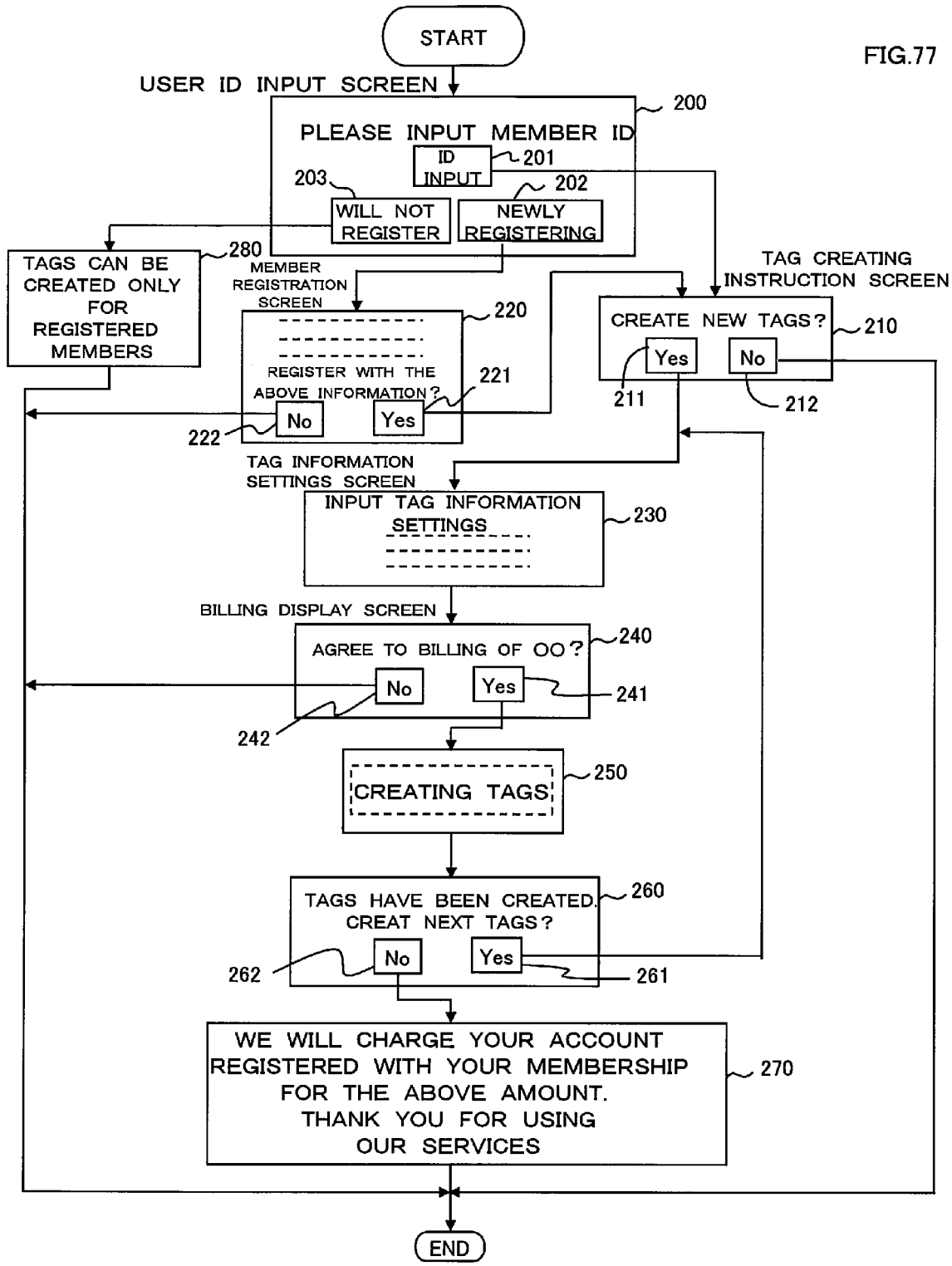
FIG. 77 is a flowchart which shows the flow of the screen displayed on the display unit of the user's personal computer.

In FIG. 77, the screen 200 is a main screen first displayed on the display unit of the user PC 5 (more accurately, display signals are output from the management server 7 to the user PC 5, and the user PC 5 makes a display based on these signals, which is the same hereinafter), in the event that there is an access from the user PC 5 to the management server 7. Here, as one example with the present embodiment, the user is charged separately each time the cartridge 100 is mounted to the cartridge holder portion of the apparatus 2 for communicating with a RFID tag and RFID labels T are produced (the sales prices of the cartridge 100 can be reduced accordingly). Accordingly, upon the cartridge 100 being mounted to the apparatus 2 for communicating with a RFID tag, the above-described reading unit read the identification information of the cartridge 100, which is input to the control circuit 30, the control circuit 30 accordingly outputs information to the effect that a cartridge has been amounted and also the above identification information to the management server 7, and the management server 7 requests access from the corresponding user PC 5 (in other words, the user PC 5 is automatically recognized by the management server 7 and is placed under the administration thereof). In order to ensure payment for the charges, only registered members (each having a user ID) can use this online RFID label creating service operated by the manufacturer of the apparatus for communicating with a RFID tag which owns the administrating server 7 (or a servicing company, business commissioned to handle the service, etc.). Note that a registered member may include corporate members wherein multiple individuals would use a single account within a department, and so forth.

Based on the above, the above screen 200 which is an initial screen is a screen which prompts for input of the user ID, and has a "user ID input" box 201. Upon the user operating the operating unit of the user PC 5 (the way in which subsequent user input is performed as well) in this screen 200 to input his/her own user ID in the ID input box 201, a tag producing instruction screen 210 comes up.

Also, a "newly registering" button 202 is provided in the user ID input screen 200 for users who have not been registered as members as of yet, and upon the user operating this button 202, a member registration screen 220 comes upon. The user is prompted in this member registration screen 220 to input various types of information necessary for member registration, such as postal code, address, name, telephone number, FAX number, e-mail address, age, occupation, and so forth. The user inputs information for each of the items, and presses a "Yes" button 221 for registration confirmation, whereupon the user is provided with a new user ID, and the tag creation instruction screen 210 comes up.

In the tag creation instruction screen 210, confirmation is made whether or not the user wants to make new RFID labels T using the database DB of the management server 7. In the event that the user operates the "Yes" button 211 for instructing creating tags, a tag information setting screen 230 comes up.

Figure 79:
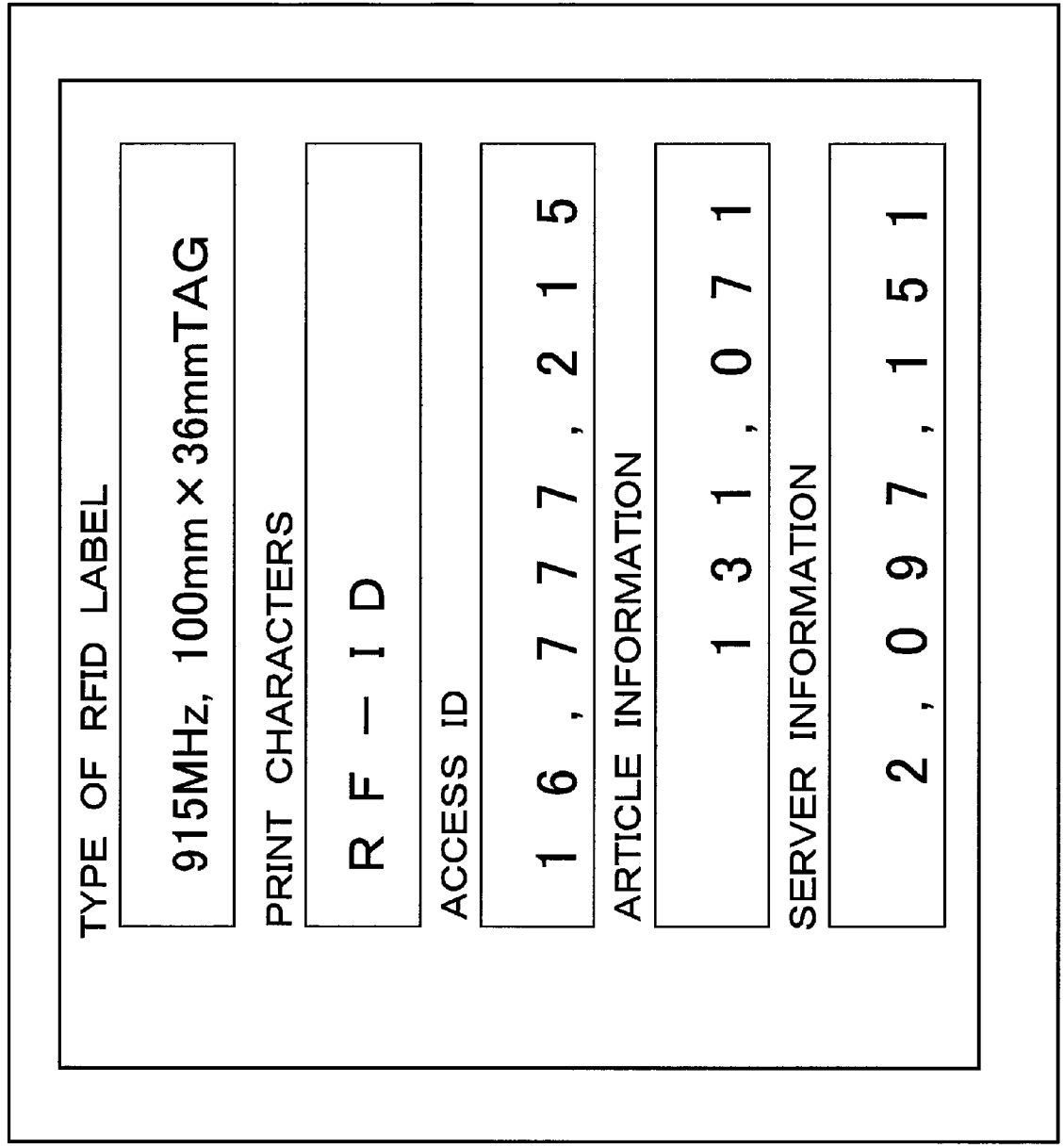
FIG. 79 is an example of a tag information setting screen shown in FIG. 77.

In the tag information setting screen 230, the address of inventory article information to be correlated with the RFID circuit element To, the printed characters R to be printed on the cover film 103 accordingly, the access (write) ID to be newly written to the RFID circuit element To in the event of writing, a storage address in the database DB (server information) to which the correlated information is to be stored, and so forth, are set, either by selection or by user input (see the later-described FIG. 79 also). In the event that multiple labels can be consecutively produced, an arrangement may be made wherein the number of labels to be consecutively produced can also be input. Upon this setting input ending, a charges display screen 240 comes up.

With the charges display screen 240, charges for the services of creating the RFID labels is displayed in response to the settings made at the tag information setting screen 230, and the user is prompted to either accept or decline.

Upon the user indicating acceptance of the charges by operating a "Yes" button 241, the actions shown in the flowchart in FIG. 74 are carried out by the apparatus 2 for communicating with a RFID tag. That is to say, the apparatus 2 for communicating with a RFID tag is activated and the printed characters R are printed on the cover film 103, and also the RFID tag information of the inventory item information or the like stored in the IC circuit part 151 beforehand is read out (or, in a later-described modification, the writing ID and inventory item information and other like information are written to the IC circuit part 151), following which the tag label tape 110 with print is cut, thereby generating a printed RFID label T. During this time, an appropriate screen 250 is displayed on the display unit of the user PC 5, indicating that the RFID labels are currently being produced. When the procedures described earlier with reference to FIG. 74 end and production of the RFID labels T (including the process of writing the access history information thereof to the database DB) has ended, a creating completion screen 260, indicating that production has ended, comes up.

At the creating completion screen 260, the user is prompted by a display regarding whether to end RFID label creation here or to create the next RFID labels.

Upon the user operating a "Yes" button 261 which is an instruction to make the next RFID labels, the flow returns to the above-described screen 230 and the same procedures are repeated. Upon the user operating a "No" button 262 which is an instruction for ending making RFID labels, a screen 270 is displayed, a notice is made to the effect that the account of the charges which have been accepted in the display in screen 240 will be applied to the account of the user, and the screen flow ends.

Note that in the event that the user operates the "No" button 212 in the tag creation instruction screen 210, the "No" button 222 in the member registration screen 220, or the "No" button 242 in the charges display screen 240, this screen flow ends at that point.

Also, in the event that a user who has not been registered as a member does not desire member registration and operates a "will not register" button 203 separately provided to the user ID input screen 200, a screen 280 comes up and makes a display to the effect that this online RFID label creating service is only available to registered members (or, an arrangement may be made wherein non-members are completely forbidden but can test-make a certain number), following which the screen flow ends. In the aforementioned case of corporate members, an arrangement may be made wherein the creation-forbidden mode is removed once registration is made within a department. Or, an arrangement may be made wherein membership ID input is unnecessary until the cartridge is replaced with a new cartridge.

FIG. 78 is a diagram illustrating an example of the initial screen (member ID input screen) 200. As described above, the screen 200 has a "user ID input" box 201, a "register" button 202 for newly-registering users, and a "will not register" button 203.

FIG. 79 is a diagram illustrating an example of the tag information setting screen 230. In FIG. 79, the screen 230 is a screen displayed on the user PC 5 at the time of accessing the RFID tag information of the IC circuit part 151 of the RFID circuit element (reading or writing) with an apparatus 2 for communicating with a RFID tag such as described above. As shown in the drawing, the screen 230 shows, on the display unit of the user PC 5, printed characters R to be printed corresponding to the RFID circuit element To, access (read or write) ID which is the unique ID of the RFID circuit element To, address of the inventory article information stored in the management server 7, the address where the corresponding information is stored in the above database DB, and so forth.

Note that these charges are calculated by the management server 7 for each user (or may be for each apparatus 2 for communicating with a RFID tag), and charged to the account for each predetermined period (e.g., once a month), with a receipt corresponding to the charges being issued and mailed to the user (or delivered by e-mail). FIG. 80 illustrates an example of such a receipt. As shown in the drawing, in addition to the amount received, date of receipt, year and month of billing, name of bank, account No., and so forth, an itemized statement (day/time produced, number of statements produced, list of successful/unsuccessful access, and billing status) is provided for the RFID labels produced. In this example, in the event that access to a RFID circuit element has ended in failed access (or unsuitable access), no charges are placed regardless of the cause, as a sort of membership service. This is indicated by the "NG" and "not billed" in the drawing.

It is needless to say that the invention is not restricted to such arrangements of charging accounts, and that an invoice may be issued for later payment. FIG. 81 illustrates an example of such a invoice. In this case, the screen 270 shown in FIG. 77 described above is not a notification of charging an account but a notification of a billing invoice.

Alternatively, a rebate system may be employed wherein any amount to be refunded is deducted from the next bill.

In the above, the antenna 14 makes up an apparatus side antenna which performs transmission/reception by wireless communication with a tag-side antenna of a particular RFID circuit element out of multiple RFID circuit elements.

Also, the signal processing circuit 22 makes up access information generating unit configured to generate the access information for accessing the IC circuit part 151 ("Scroll All ID" signals, "Program" signals, later-described "Erase" signals, "Verify" signals, and so forth). Also, the transmitting portion 32 of the radio frequency circuit 21 makes up information transmitting unit configured to transmit access information generated at the access information generating unit to the tag side antenna via the apparatus side antenna in a non-contact manner, thereby accessing the RFID tag information of the IC circuit part. Also, the control circuit 30 and input/output interface 31 make up access history output unit configured to output access history information of multiple RFID circuit elements, and also make up input/output unit configured to output to record portion the communication factor for determining communication capabilities as to a RFID circuit element for producing a RFID label.

Also, the input/output interface 7D of the management server 7 makes up access history input unit of inputting the access history information of multiple RFID circuit elements provided to a cartridge mounted to the RFID tag producing terminal, and the CPU 7A makes up storage control unit configured to store access history information input with the access history input unit to the database.

Further, in a sate wherein the management server 7 and the user PC 5 operate cooperatively to display the screen 280 shown in FIG. 77 to a user which has not input the user ID, the apparatus 2 for communicating with a RFID tag cannot access the management server 7 based on the control of the control circuit 30, and thus the RFID labels T cannot be made. This means that making the RFID labels is permitted only otherwise, and is equivalent to the control circuit 30 functioning as access permission control unit configured to permit access to the management server in accordance with the cartridge identification information read by the reading unit at the apparatus 2 for communicating with a RFID tag.

As described above, with the apparatus 2 for communicating with a RFID tag according to the present embodiment, the cartridge 100 is attached to the cartridge holder of the apparatus 2 for communicating with a RFID tag, and the RFID tag information in the IC circuit part 151 of the RFID circuit element To is read out. The access history information that has been read is automatically output from the apparatus 2 for communicating with a RFID tag to the management server 7, and stored in the database DB and saved. Thus, access suitability history and result history can be efficiently collected and recorded in the database DB. Thus, the access history of accessing the RFID circuit elements To can be retained.

At the side of the manufacturer or service company or the like, acquiring the stored contents of the database DB enables cases wherein unsatisfactory access or access failure (erroneous reading or erroneous writing) occurs to be detected, confirmed, and some sort of action to be taken.

For example, in the event that access failures are occurring randomly, this can be estimated to be due to mistaken operations by the user, so measures can be taken such as this user (or other users as well) being notified by postal mail or electronic mail at the user PC 5 to that effect, the RFID tag information apparatuses 2 manufactured in the future being provided with instructions on how to avoid such erroneous operations, the shape, design, etc., of the operating unit being improved to avoid such erroneous operations, and so forth.

Also, in the event that there is a trend of increased retries from a certain point in time regarding a certain RFID tag information apparatus 2, and access failures continue from that point on, this can be assumed to be due to insufficient power voltage (a dead battery) of the apparatus 2, so measures can be taken such as this user (or other users as well) being notified by postal mail or electronic mail at the user PC 5 to that effect, providing instructions giving an idea of how long the battery is expected to last or how to avoid dead batteries, adding a warning lamp or the like anew to the RFID tag information apparatuses 2 manufactured in the future to facilitate knowledge of when a battery is dead, implementing energy-conserving designs so as to extend the life of the battery itself, and so forth.

Also, in the event that access failures occur frequently with a certain RFID tag information apparatus 2, regardless of time period, it can be estimated that this is due to the apparatus 2 being adversely affected by the surrounding electromagnetic environment at the location of installation thereof, so measures can be taken such as this user (or other users as well) being notified by postal mail or electronic mail at the user PC 5 to that effect, or to avoid installation near other equipment generating radio waves or electromagnetic fields, the RFID tag information apparatuses 2 manufactured in the future being designed so as to be less susceptible to surrounding radio waves or electromagnetic fields, (reinforcing shielding member), and so forth.

Taking such measures ensures the capabilities of the apparatus 2 for communicating with a RFID tag and assures the product quality of the RFID labels T to be manufactured, thereby improving reliability, and enabling highly reliable RFID labels T to be manufactured hereafter.

Also, as shown in Step S240 in FIG. 77, the management server 7 outputs cost invoicing information to the user PC 5 according to the access history information, whereby billing is performed per each in accordance with access history (the history of creating the RFID labels T) while keeping sale costs for the cartridges 100 relatively inexpensive, so the initial cost which the user side has to bear can be reduced. At this time, only members having a user ID can receive the online RFID label producing service as described above, so sales plans involving differentiation such as providing only registered users with cartridges 100 having special service conditions (in this case, an example has been described with members being provided with an initial cost which is cheaper than that of non-members; however, other arrangements may be made, such as having more tags within the cartridge, tags of a higher grade, and so forth). Also, as described regarding the "NG" classification in the "Completion" column and the "Not billed" status corresponding thereto in the receipt shown in FIG. 80 and the invoice shown in FIG. 81, in the event that there is some sort of unsuitable access or access is impossible, charges can be reduced at the user side accordingly, thereby improving service.

Also, an arrangement may be made wherein accumulated points (so-called "frequent user points") are accumulated based on the number of RFID labels created this time or in the past (or based on product purchasing history) wherein a discount is offered after a certain number of jobs, obtained from or accumulated in the database DB of the management server 7, so as to give the user various services such as a wider range of jobs which are not charged for, "discounted billing" where successful access is also discounted in addition to "normal billing", or a certain number of tags are not charged for even for successful access, and so forth.

Moreover, in the screen 200 shown in FIGS. 77 and 78 displayed on the display unit of the management server 7, a display is made prompting a registered user for input of the member ID, and in the screen 220 unregistered users are requested to register for customer and billing management purposes, whereby management of the apparatus 2 for communicating with a RFID tag is facilitated, and also the user side can more readily receive services and the like.

Note that the present invention is not restricted to the above embodiments, and that various modifications may be further made without departing from the essence and technical idea thereof. Examples of such modifications will be described in order below.

(4-1) Modification of Writing Information to RFID Circuit Element

While description has been made in the above eighth embodiment regarding a case of applying the present invention to a RFID tag manufacturing (producing) system which is read-capable (write-incapable), the present embodiment is not restricted to this and may also be applied to a RFID tag manufacturing system which writes RFID tag information to the circuit unit 151 of RFID circuit elements To.

Figure 82:
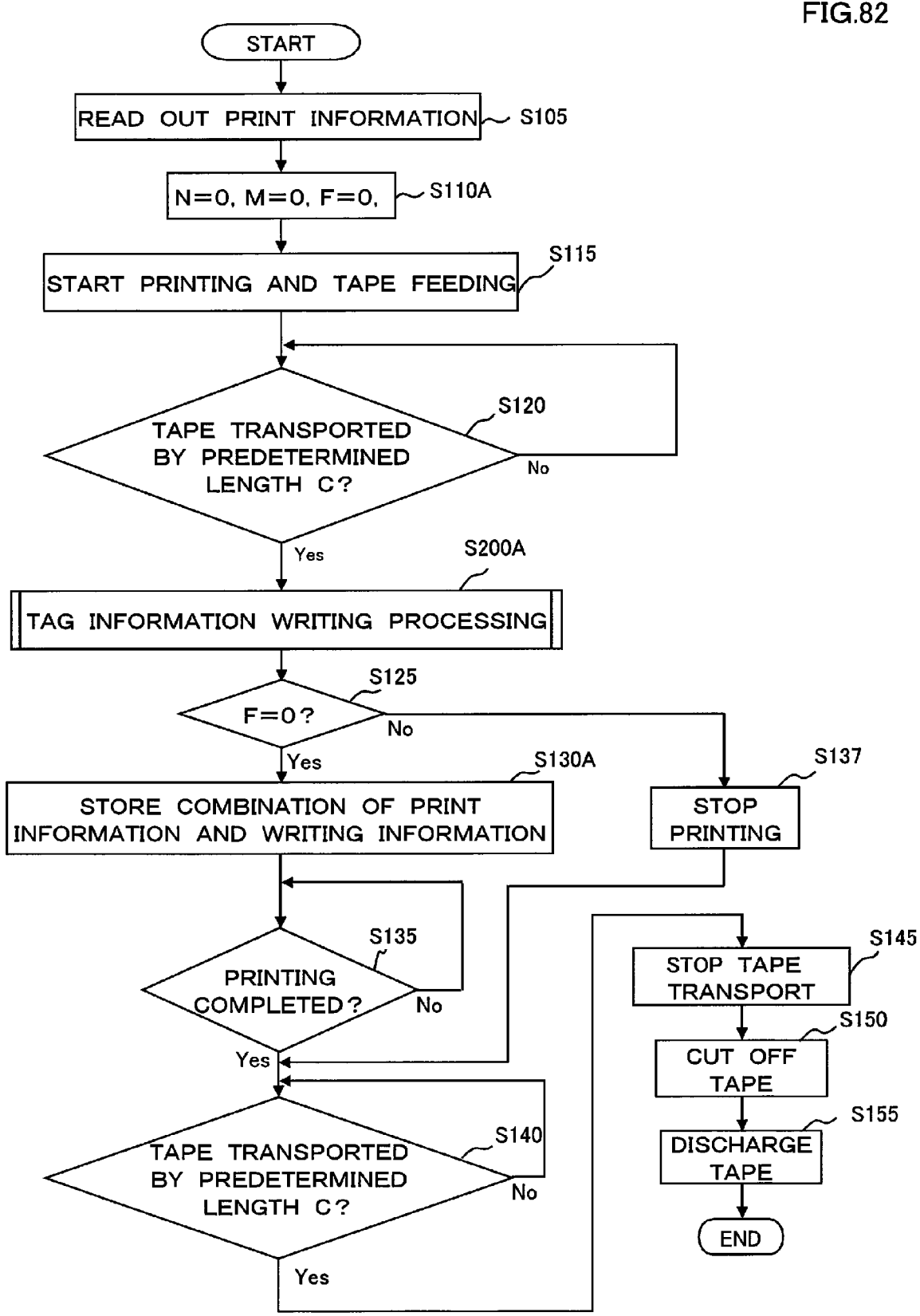
FIG. 82 is a flowchart which shows a procedure for creating the RFID labels, which is executed by the control circuit according to a modification that writes information to each RFID circuit element.

FIG. 82 is a flowchart illustrating the RFID label producing procedures (RFID tag information writing procedures) which are executed at the control circuit 30 in this modification, and is equivalent to FIG. 74 in the above eighth embodiment.

Procedures in FIG. 82 which are the same as those in FIG. 74 are denoted with the same reference symbols. In FIG. 82, upon performance of the writing operation by the user PC 5 (or this may be operating unit provided to the apparatus 2 for communicating with a RFID tag itself), the flow starts. Step S105 is the same as that in FIG. 74, and upon this procedure ending, the flow proceeds to Step S110A, where, in addition to the variables N and flag F, a further variable M (details described later) is initialized to 0.

Subsequently, following steps S115 and S120 which are the same as in FIG. 74, the flow proceeds to step S200A. In Step S200A, tag information writing processing is performed, and following initializing (erasing) memory for writing, the RFID tag information is transmitted and written to the RFID circuit element To (See FIG. 83, which will be described later, for details). Upon this Step S200A ending, the flow proceeds to Step S125, in the same way as with FIG. 74.

In Step S125, determination is made regarding whether or not flag F=0, in the same way as with FIG. 74, and in the event that determination is made that this condition is satisfied, and the flow proceeds to Step S130A.

In Step S130A, the combination of the information read from the RFID circuit element To in the above-described Step S200A and the printing information already printed by the printing head 10 corresponding thereto are output by way of the input/output interface 31 and communication line 3, and stored in the database DB of the management server 7, in the same way as with step S130 in FIG. 74. Note that this stored data is stored and held in the database DB so as to be referred to by the user PC 5 if necessary.

The subsequent procedures are substantially the same as those in FIG. 74, so description thereof will be omitted.

Figure 83:
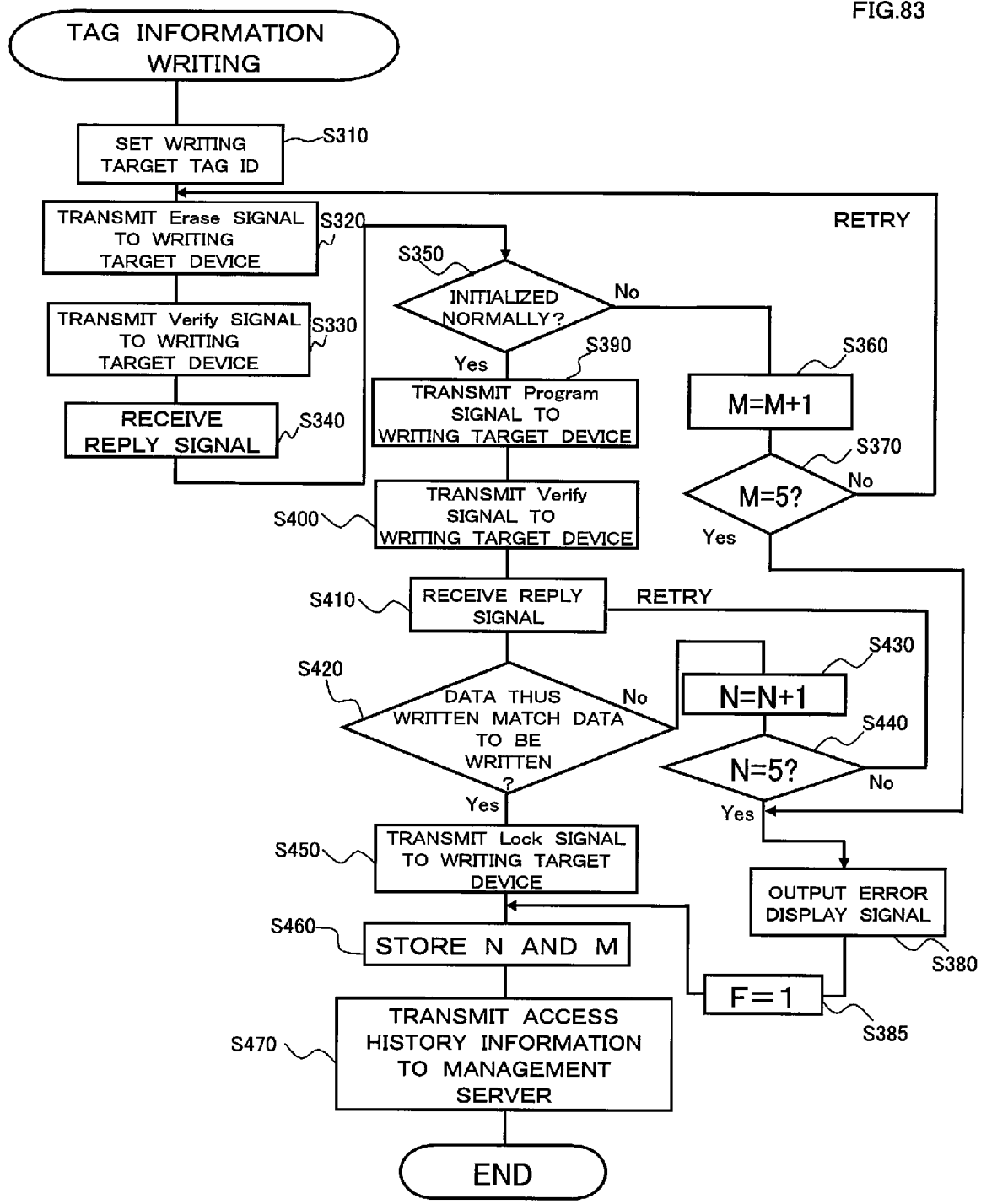
FIG. 83 is a flowchart which shows a procedure of Step S200A shown in FIG. 82 in detail.

FIG. 83 is a flowchart illustrating the detailed procedures of the aforementioned Step S200A.

In FIG. 83, first, in Step S310 (step S300 in FIG. 83, FIG. 3 should be corrected), tag identification information (tag ID) is set by appropriate known means, and further, the RFID circuit element To which information is to be written is transported to nearby the antenna 14.

Subsequently, in Step S320, an "Erase" command for initializing the information stored in the memory part 157 of the RFID circuit element To is output to the signal processing circuit 22. Based on this, an "Erase" signal is generated as access information at the signal processing circuit 22, which is transmitted to the RFID circuit element To which information is to be written via the radio frequency circuit 21, and the memory part 157 thereof is initialized.

Next, in Step S330, a "Verify" command for confirming the contents of the memory part 157 is output to the signal processing circuit 22. Based on this, a "Verify" signal is generated as access information at the signal processing circuit 22, which is transmitted to the RFID circuit element To which information has been written via the radio frequency circuit 21, prompting a reply. Subsequently, in Step S340, a reply signal transmitted from the written RFID circuit element To in accordance with the aforementioned "Verify" signal is received via the antenna 14, and acquired via the radio frequency circuit 21 and signal processing circuit 22.

Next, in Step S350, the information within the memory part 157 of the RFID circuit element To is confirmed based on the reply signal, thereby determining whether or not the memory part 157 has been successfully initialized.

In the event that determination has been made that the condition has not been satisfied, the flow proceeds to Step S360 where M is incremented by 1, and further, the flow proceeds to Step S370 where determination is made whether or not M is equal to a predetermined number of retries (5 in this case, other numbers of times may also be set as appropriate). In a case that M is equal to or less than 4, the condition has not been satisfied, and accordingly, the flow is returned to Step S320, and the same procedure is repeated. In a case that M is equal to 5, the flow proceeds to Step S380, an error display signal is output to the user PC 5 via the input/output interface 31 and the communication line 3 so as to display the corresponding writing failure (error) notice. With such an arrangement, a predetermined number of writing retries (5 in this example) are performed even if the initialization fails. Upon Step S380 ending, the flow proceeds to step S385. In Step S385, the flag is set to F=1, and the flow proceeds to step S460.

On the other hand, in the event that determination is made in Step S350 that the condition has been satisfied, the flow proceeds to Step S390, and a "Program" command for writing the desired data to the memory part 157 is output to the signal processing circuit 22. Based on this, a "Program" signal, including ID information which is desired to be written, is generated as access information at the signal processing circuit 22, which is transmitted to the RFID circuit element To which information is to be written via the radio frequency circuit 21, and the information is written to the memory part 157 thereof.

Next, in Step S400, a "Verify" command is output to the signal processing circuit 22. Based on this, a "Verify" signal is generated as access information at the signal processing circuit 22, which is transmitted to the RFID circuit element To which information has been written via the radio frequency circuit 21, prompting a reply. Subsequently, in Step S410, a reply signal transmitted from the written RFID circuit element To in accordance with the aforementioned "Verify" signal is received via the antenna 14, and acquired via the radio frequency circuit 21 and signal processing circuit 22.

Next, in Step S420, the information within the memory part 157 of the RFID circuit element To is confirmed based on the reply signal, thereby determining whether or not the predetermined information, that has been transmitted, has been successfully stored in the memory part 157.

In the event that determination has been made that the condition has not been satisfied, the flow proceeds to Step S430 where N is incremented by 1, and further, the flow proceeds to Step S440 where determination is made whether or not N is equal to a predetermined number of retries (5 in this case, other numbers of times may also be set as appropriate). In a case that N is equal to or less than 4, the condition has not been satisfied, and accordingly, the flow is returned to Step S390, and the same procedure is repeated. In a case that N is equal to 5, the flow proceeds to Step S380, where the corresponding writing failure (error) notice is similarly displayed to the user PC 5, and in Step S385, the flag F is set to 1, and the flow proceeds to step S460. With such an arrangement, a predetermined number of writing retries (5 in this example) are performed even if the information writing fails.

On the other hand, in the event that determination is made in Step S420 that the condition has been satisfied, the flow proceeds to Step S450, and a "Lock" command is output to the signal processing circuit 22. Based on this, a "Lock" signal is generated at the signal processing circuit 22, and is transmitted to the RFID circuit element To which information has been written via the radio frequency circuit 21, thereby forbidding new writing of information to the RFID circuit element To. Accordingly, writing of RFID information to the RFID circuit element To which information has been written is completed, and the RFID circuit element To is discharged as described above. Upon Step S450 ending, the flow proceeds to step S460.

In Step S460, the value of N and M (the number of retries required for a successful initialization or write) is temporarily stored in suitable record portion (e.g., RAM within the control circuit 30, etc.).

Subsequently, in step S470, the number of retries N and M stored in the record portion are read out, the identification information of the RFID circuit element (tag ID) and identification of the apparatus 2 for communicating with a RFID tag (product No. or model No. or the like) are output as access history information to the management server 7 via the input/output interface 31 and communication line 3, to be written to the database DB on the management server 7.

Due to the above routine, desired RFID tag information can be written to the IC circuit part 151 for the RFID circuit element To within the cartridge 100 to be accessed, and also the access history thereof can be written to the database DB of the management server 7 to be stored and saved.

FIG. 84 is a diagram illustrating an example of access history information written to the database DB of the management server 7 as described above in the present embodiment, and is equivalent to FIG. 76 described above with the eighth embodiment. Note that the number of retries M for the initialization shown in FIG. 83 are omitted from this diagram.

In FIG. 84, in the "Tag ID" column are recorded identification information of each RFID circuit element To, in this case "Tag 1", "Tag 2", and so forth, in the same way as with FIG. 76.

In the "Number of Write Retries" and "Results of Read" columns are recorded whether or not access to the RFID circuit elements (writing in the above example) has ultimately succeeded (OK of successful, NG (meaning No Good) if unsuccessful), and the number of retries N (i.e., one of 1 through 5) to successful access. A failure to access when N is 5 is indicated by a dash "-", and is indicated by "NG" as being a failed access attempt.

The column "Apparatus Side Identification Information" is the same as that in FIG. 76, so description thereof will be omitted.

As described above, with the present modification, advantages approximately the same as with the above eighth embodiment can be had with a RFID tag manufacturing (producing) system which writes RFID tag information.

(4-2) Variations of Access History Information

The description made above with reference to FIG. 76 and FIG. 84 has been regarding an example of saving, in the database DB of the management server 7, the number of retries N or M stored in record portion, the identification information (tag ID) of each RFID circuit element, and identification information of the apparatus 2 for communicating with a RFID tag (product No., model No., etc.). However, the present invention is not restricted to this, and other information relating to access history may be stored, such as output information at the time of access, or the number of times of use (reuse) of the cartridge (assuming that the cartridge is reusable). Alternatively, one of the above may be stored. Or, the date-and-time of access may be recorded. For example, if there can be deduced a relation of some sort between occurrence of access failures or difficulty and a certain time span of the day or the like, this may help in studying a solution.

FIG. 85 and FIG. 86 correspond to FIG. 76 of the above-described eighth embodiment and FIG. 84 of the modification, respectively, illustrating a case of also storing the power value (set in three states of relative value, "large", "medium", and "small" in this example) at the time of successful access, as the other access history information, with an arrangement wherein the output power from the variable transmission amplifier 39 is made variable. Note that control an arrangement may be made (details of which will be omitted) wherein the output is gradually increased by the control circuit 30 each time access is attempted upon access, and the value at which access is successful for the first time may be stored as the access history information, or in the event that the operator (user) manually operates the output power so as to reach a suitable value, the manually-set value thereof may simply be taken as the access history information.

(4-3) Modification without Adhesion Processing

That is to say, this is a case of applying the present invention to a cartridge for an apparatus for communicating with a RFID tag which prints on the tag tape itself, instead of printing on a cover film 103 separate from the tag tape (base tape) 101 provided with the RFID circuit elements and adhering these together as with the above-described eighth embodiment.

Figure 87:
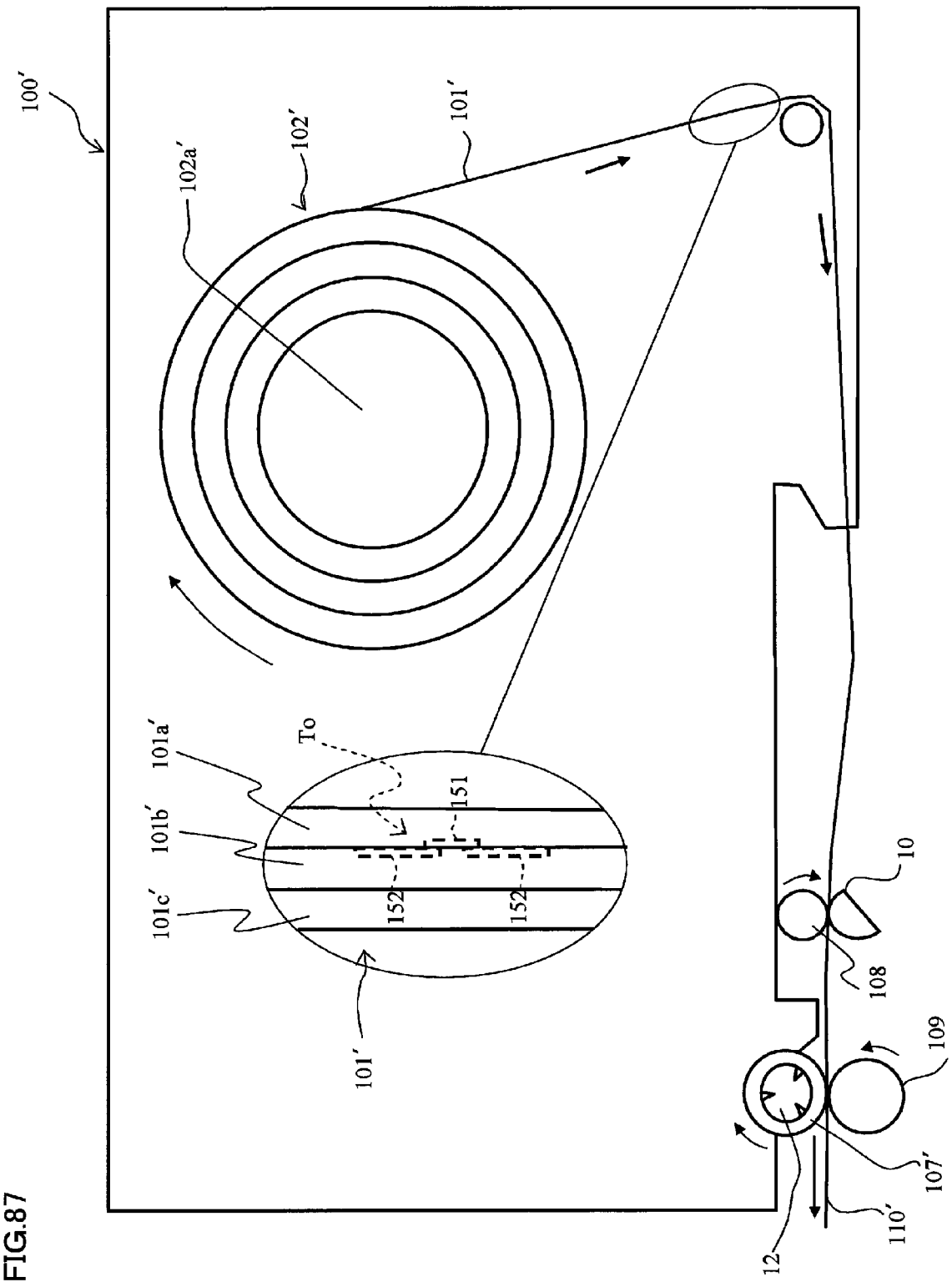
FIG. 87 is an explanatory diagram for describing a detailed structure of a cartridge without involving adhesion processing according to a modification.

FIG. 87 is an explanatory diagram for describing a detailed configuration of a cartridge 100' according to the present modification, which corresponds to FIG. 69 for describing the above-described embodiment. The same components as those shown in FIG. 69 are denoted by the same reference numerals, and description thereof will be omitted as appropriate.

As shown in 87, the cartridge 100' comprises a first roll (tag tape roll) 102' around which a thermo-sensitive tape 101' (tag tape, medium subject to printing) has been wound, and a feeding roller 107' for tape transporting the thermo-sensitive tape 101' in the direction external to the cartridge 100'.

The first roll 102' has a structure in which the aforementioned transparent thermo-sensitive tape 101', on which multiple RFID circuit elements To have been consecutively formed along the longitudinal direction, is wound around a reel member 102a'.

In this example, the thermo-sensitive tape 101', which is to be wound around the first roll 102', has a three-layer structure (see partial enlarged view in FIG. 87) comprising a stock tape base 101a', an adhesive layer 101b' formed of an appropriate adhesive material, and a detachable sheet 101c'. The three layers are layered in that order from the layer that corresponds to the outer side of the rolled tape to the layer that corresponds to the opposite side.

IC circuit parts 151 configured to store information are integrally provided on the back face of the stock tape base 101'a. Furthermore, the aforementioned antenna 152 is provided on the surface of the back side of the cover film 101'a. Moreover, the aforementioned detachable sheet 101c' is adhered onto the back face of the cover film 101c' through the aforementioned adhesion layer 101b'.

Upon shifting the roll holder (not shown) from the separate position to the contact position after mounting the cartridge 100' to the cartridge holder portion of the aforementioned apparatus 2 for communicating with a RFID tag, the thermo-sensitive tape 101' is held by the nip between the print head 10 and the platen roller 108, and the thermo-sensitive tape 101' is held by the nip between the feeding roller 107' and the sub roller 109. Then, the tape feeding roller 107', the sub roller 109, and the platen roller 108 are synchronously rotationally driven by the driving force provided from the motor 23 to drive cartridge shaft (see FIG. 68) through the feeding roller drive shaft 12.

The thermo-sensitive tape 101' that has been fed out is supplied to the print head 10 downstream in the transporting direction. Electric power is supplied to the multiple heater elements included in the print head 10 by the aforementioned print-head drive circuit 25 (see FIG. 68), thereby printing the surface of the tape base 101a' of the thermo-sensitive tape 101'. The tag label tape 110' with print thus formed is then transported to outside the cartridge 100'. Note that it is needless to say that an ink ribbon may be employed in the same way as in the above-described eighth embodiment.

After the tag label tape 110' with print has been transported to outside the cartridge 100', access information read/write) of the RFID tag information is performed via the above-described antenna 14, and the access history information thereof is transmitted to and stored in the database dB of the management server 7, in the same way as with the above eighth embodiment. Subsequent transport by the feeding roller 17 and cutting by the cutter 15 are the same as those in the above-described eighth embodiment, and accordingly, description thereof will be omitted.

With the present modification as well, the manufacturer or service company or the like acquiring the access history information in the database DB of the management server 7 ensures the capabilities of the apparatus 2 for communicating with a RFID tag and assures the product quality of the RFID labels T to be manufactured, in the same way as with the above eighth embodiment, thereby yielding the advantage of improved reliability.

Note that instead of the above tape base 101', a thermo-sensitive tape (tag tape) having a cover film 101' formed of PET (polyethylene terephthalate) or the like may be used.

(4-4) Other (A) Frequency of Writing Access History Information

The present invention is not restricted to writing recording of the access history information to the server each time a RFID circuit element To is accessed, and arrangements may be made wherein writing is performed every certain number, or upon arbitrary operations performed at the operator side.

(B) Display Unit Configured to Perform Screen Display

Though in the above, description has been made regarding an example of all displays of the screen displays shown in FIGS. 77 through 79, and reading and writing error displays being displayed on the user PC 5 at the user side, the present invention is not restricted to this arrangement. That is to say, in the event that the apparatus 2 for communicating with a RFID tag itself has a display unit, part of all of the above-described displays made be made at this display unit. In this case, the user operations (input of member ID, new membership registration, etc.) described above with FIG. 77 as being performed by operating the user PC 5 may be performed from operating unit (buttons, keys, switches, etc.) provided to the RFID tag information apparatus 2 while viewing the display made on the display unit hereof. Conversely, a terminal (personal computer or the like) may be provided connected to the communication line, for the above user ID and new membership registration and so forth, for example.

(C) Modification of not Cutting with Cutter

While description has been made above regarding an example of a case wherein tag label tape 110 with print regarding which printing and accessing (reading/writing) of the RFID circuit elements To has ended, the present invention is not restricted to this. That is to say, in the event that label sheets separated beforehand into predetermined size corresponding to the labels (so-called die-cut labels) are consecutively arrayed on a tape which is fed out from the roll, an arrangement may be made wherein there is no cutting with the cutter 15, and only the label sheet (having an accessed RFID circuit element To and having been printed with corresponding information) is peeled off from the tape so as to form the RFID label T after the tape has been discharged from the discharge opening 16.

(D) Network Configuration

While description has been made above regarding an arrangement wherein the apparatus 2 for communicating with a RFID tag is connected only to the user PC 5 and management server 7 via the communication line or the like 3, the present invention is not restricted to this arrangement, and arrangements may be made wherein a general purpose personal computer 6 (including those not individually owned by the user for example, but installed in a shared space) and a route server 4 are provided, as indicated by the dotted lines in FIG. 66, from which access can be made.

(E) Printing Variations

Figure 88:
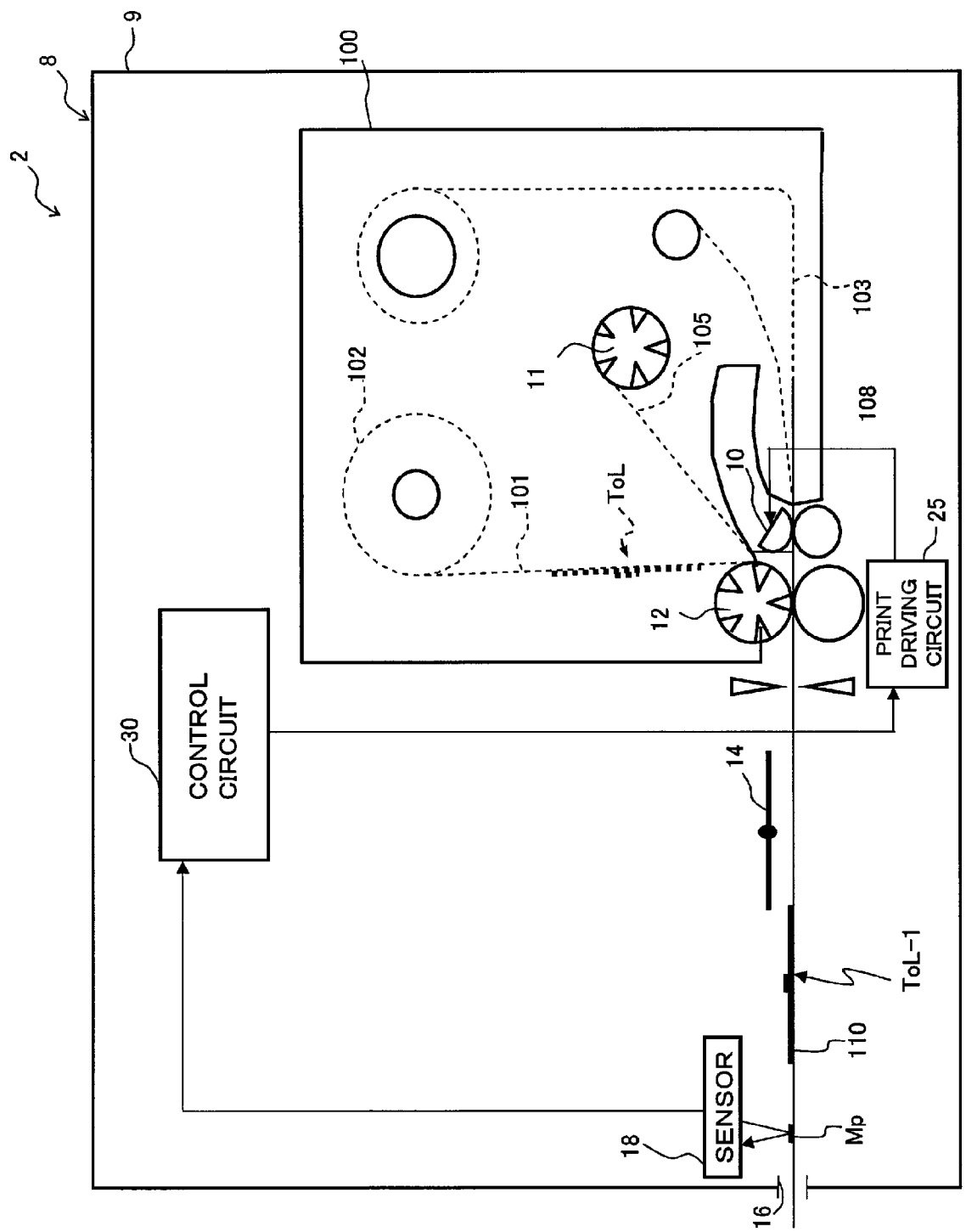
FIG. 88 is a schematic configuration diagram which shows a schematic configuration of the apparatus for communicating with a RFID tag mounting the RFID circuit element cartridge according to a modification that prints the access history information.

That is to say, an arrangement may be made wherein the access history information to be stored in the database of the management server 7 as described above may be printed directly on the RFID labels T being produced, so as to be clearly recognized visually as well. In this case, printing may be performed for each label T, but taking into consideration the aspect of information acquisition (recovery) at the manufacturer or servicing company, and arrangement would be handy wherein printing is performed on the label T which remains at the end (a RFID circuit element To is not necessary here) following using all of the predetermined number of RFID circuit elements To in a cartridge 100 (or 100', likewise hereinafter). This is advantageous in that the access history information can be recorded in a visually clearly recognizable form. FIG. 88 is a conceptual configuration diagram which shows an overview of the an apparatus 2 for communicating with a RFID tag to which is mounted a RFID circuit element cartridge 100 according to such a modification. In this example, the first roll 102 provided to the cartridge 100 is provided with a predetermined number (L−1) RFID circuit elements for normal use, and a RFID circuit element ToL (management-use RFID circuit element, which may be of exactly the same configuration as a normal-use RFID circuit element with no distinction therebetween, provided separately from the normal-use RFID circuit elements To for writing the access history information of the other L minus 1 RFID circuit elements To. Also, the first roll 102 has a predetermined mark (identifier) Mp provided for printing commands on the base tape 101, at a position ahead of the last (i.e., the L−1'th) normal-use RFID circuit element ToL−1 in the direction of transportation thereof (or at a corresponding position on the cover film 103 adhered to the base tape 101), with this mark Mp being detected with the aforementioned sensor 18 (or another sensor or the like, for that matter), and a detection signal thereof is input to the control circuit 30.

Figure 89:
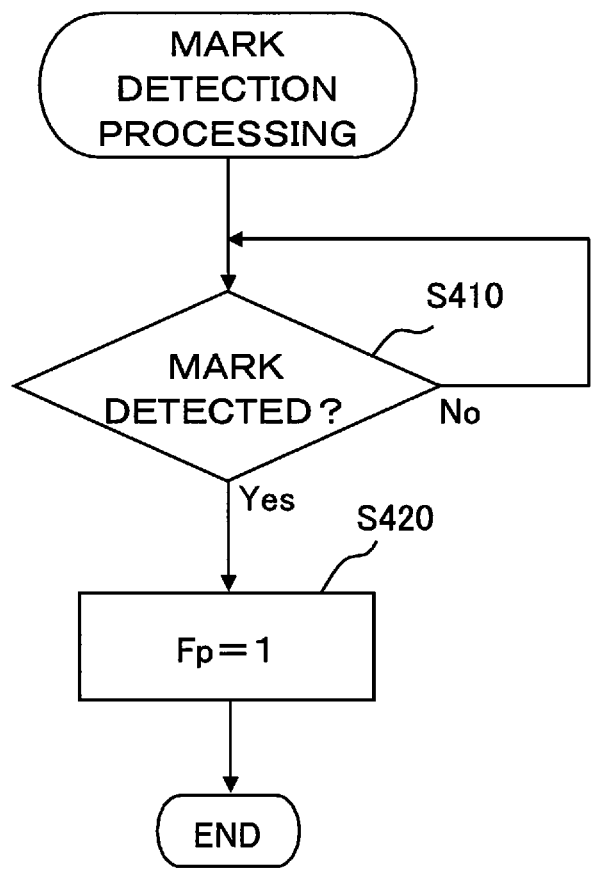
FIG. 89 is a flowchart which shows a processing procedure for the control circuit for processing detection signals output from a sensor for detecting a print instruction identifier.

FIG. 89 is a flowchart illustrating the procedures for the processing of the control circuit 30 which processes the detection signal from the sensor 18. The flow shown in FIG. 89 is executed at all times for example, and upon the mark Mp being detected by the sensor 18, determination is made in step S410 that the condition thereof has been satisfied, and in Step S420 a flag Fp (having a initial value of 0) indicating detection of the mark is set to 1.

Figure 90:
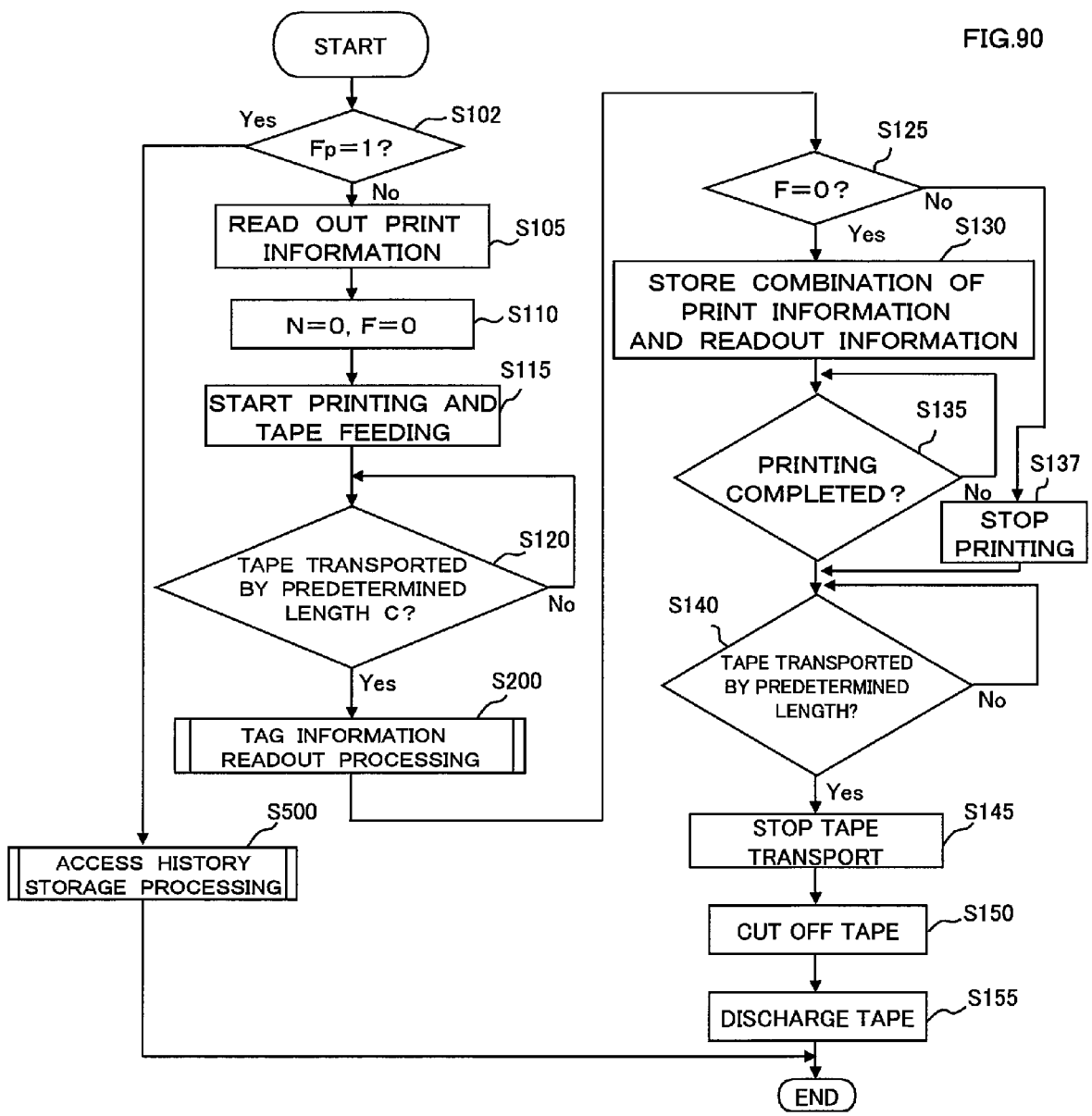
FIG. 90 is a flowchart which shows a basic control procedure executed by the control circuit for creating the RFID labels according to a modification that prints the access history information.

FIG. 90 is a flowchart illustrating the basic control procedures which the control circuit 30 executes in producing the RFID labels T in this modification, and corresponds to the above-described FIG. 74. Procedures which are equivalent to those in FIG. 74 are denoted with the same reference numerals, and description thereof will be omitted or simplified.

In FIG. 90, first, a new Step S102 is provided, where determination is made regarding whether or not the flag Fp relating to the mark detection is 1 (i.e., whether or not the mark Mp has been detected). In the event that the mark Mp has not been detected, determination is made that the condition is not satisfied, and subsequently Steps S105 through S155 are executed in the same way as with FIG. 68. In the event that the mark Mp has been detected, determination is made that the condition has been satisfied, and the flow proceeds to step S500 where access history recording processing is executed.

Figure 91:
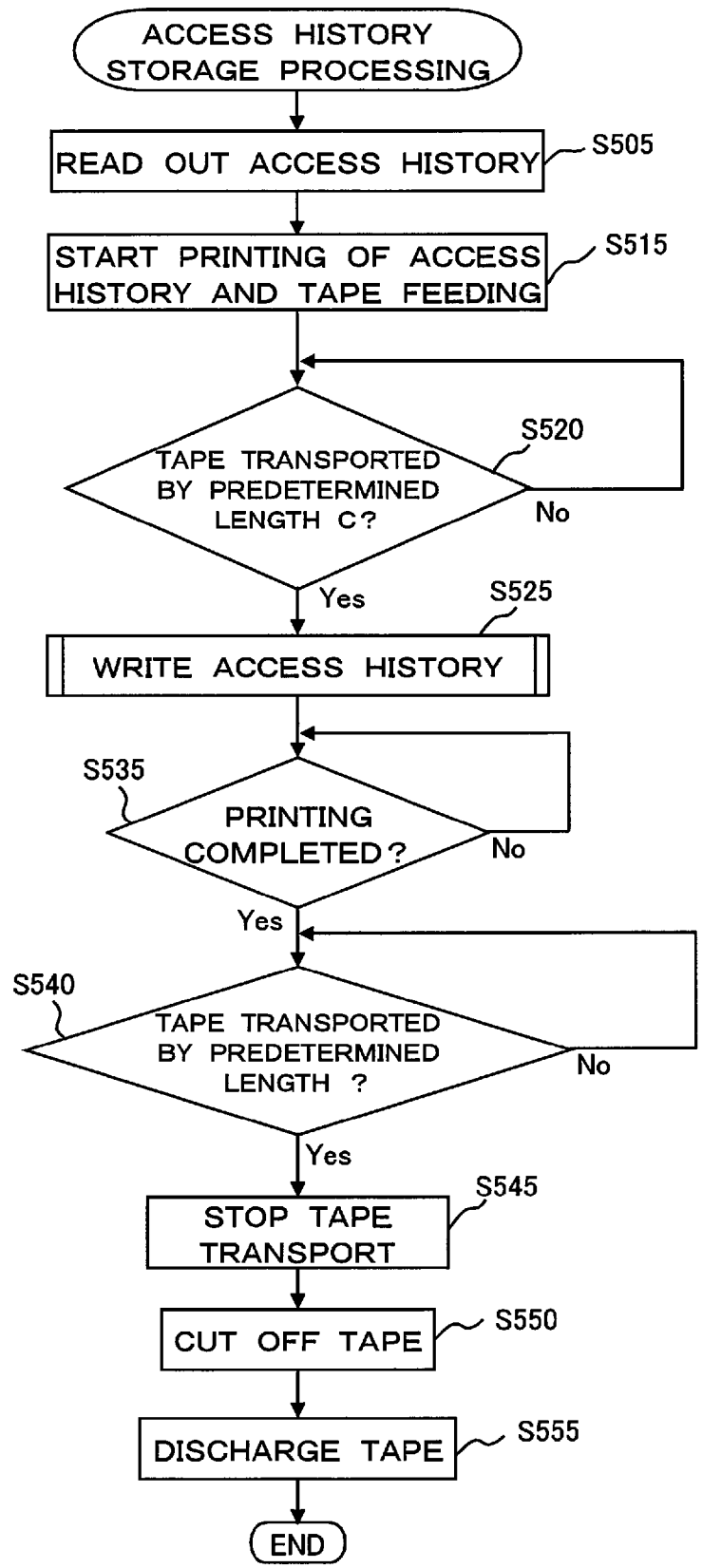
FIG. 91 is a flowchart which shows a procedure of the access history record processing in Step S500 shown in FIG. 90 in detail.

FIG. 91 is a flowchart illustrating the detailed procedures of the access history recording processing in this Step S500.

In FIG. 91, first, in step S505, the access history information of the predetermined number of RFID circuit elements To stored in the database DB of the management server 7 at this point in time is read in via the communication line 3 and the input/output interface 31.

Subsequently, the flow proceeds to Step S515, and as with the above-described step S115, a control signal is output to the cartridge shaft drive circuit 24, and the ribbon take-up roller 106 and the pressure roller 107 are rotationally driven by the driving force of the motor 23 to drive cartridge shaft. Accordingly, the base tape 101 is supplied from the first roll 102 and supplied to the pressure roller 107, with the cover film 103 being supplied from the second roll 104. At this time, the a control signal is output to the printing driving circuit 25, power is applied to the printing head 10, and the access information read in Step S505 is printed in a predetermined region of the cover film (a region to be adhered to the rear face of the RFID circuit element ToL positioned on the base tape 101, for example). Further, a control signal is output to the tape-feeding-roller motor 28 via the tape-feeding-roller drive circuit 29, thereby rotationally driving the feeding roller 17. Consequently, the base tape 101 and the cover film 103 upon which the above printing has been completed are integrated by being adhered by the pressure roller 107 and sub roller 109, thereby forming the tag label tape 110 with print, which is transported out from the cartridge 100.

Subsequently, in Step S520, determination is made regarding to whether or not the printed tab label tape 110 has been transported by a predetermined value C, as with the above-described step S120. Upon determination being made that this condition is satisfied, the flow proceeds to Step S525.

While detailed description will be omitted here, in Step S525 the access history is written in the same way as with the the information writing shown in FIG. 83, and the access history information is sent to the above RFID circuit element ToL and written. When this Step S353 ends, the flow proceeds to step S535.

In Step S535, as with the above-described Step S135, following confirmation regarding whether or not all printing to the region of the cover film 103 corresponding to the RFID circuit element being processed at this point has ended, the flow proceeds to Step S540.

In Step S540, as with the above-described Step S140, determination is made regarding whether or not the tag label tape 110 with print has further been transported by a predetermined amount. The transporting distance determination also can also be sufficiently made by detecting marking with a tape sensor, for example, as with the above-described Step S520. Upon this determination being satisfied, the flow proceeds to Step S545.

In Step S545, control signals are output to the cartridge shaft drive circuit 24 and the tape-feeding-roller drive circuit 29, the driving of the motor 23 to drive cartridge shaft and the tape-feeding-roller motor 28 is stopped, and the rotation of the ribbon take-up roller 106, the pressure roller 107, and the feeding roller 17 is stopped. Accordingly, supplying of the base type 101 from the first roll 102, supplying of the cover film 103 from the second roll 104, and transporting of the tag label tape 110 with print by the feeding roller 17, stop.

Subsequently, in Step S550 a control signal is output to the solenoid drive circuit 27 to drive the solenoid 26, and the tag label tape 110 with print is cut with the cutter 15. This yields a label-type RFID label TL in which the access history of a predetermined number of RFID circuit elements has been written and upon which printing corresponding thereto has been performed.

Subsequently, the flow proceeds to Step S555, and in the same way as with the above-described Step S155, a control signal is output to the tape-feeding-roller drive circuit 29, driving of the tape-feeding-roller motor 28 is resumed, and the feeding roller 17 rotates. Accordingly, transportation by the feeding roller 17 is resumed and the RFID label TL formed in labelshape in the above Step S550 is transported toward the discharge opening 16, and further discharged outside of the apparatus 2 from the discharge opening 16.

Note that printing of the access history information is performed at the last portion of the cover film 103, so there may be cases wherein the cover film 103 is fed out and automatically detached from the reel member 102a (the same with the base tape 101 also), such that cutting with the cutter 15 is unnecessary. In such cases, following completion of printing in Step S535, the article can be discharged without stopping tape transportation.

Figure 92:
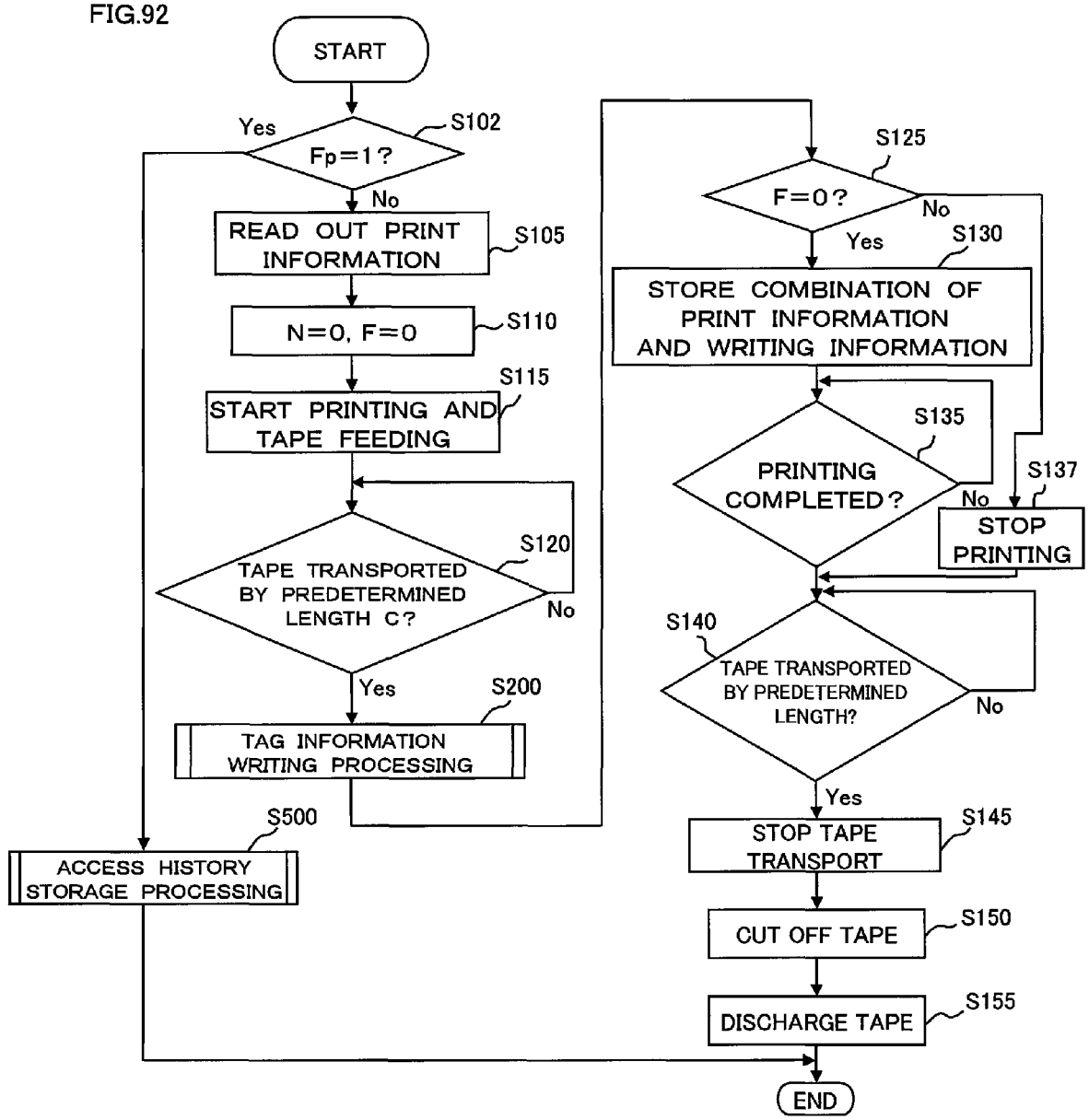
FIG. 92 is a flowchart which shows a procedure for creating the RFID labels, which is executed by the control circuit in a case of writing information to the RFID circuit element.

Also, though FIG. 90 described above is a flowchart executed by the control circuit 30 in the modification where a RFID label is generated regarding which RFID tag information is only read, but it is needless to say that this can also be applied to cases of creating RFID tags by writing RFID tag information such as described earlier with reference to FIG. 82. FIG. 92 is a flowchart executed by the control unit 30 in such a case. This is the same as FIG. 90 except that step S100A, Step S200A, and Step S130A, the same as in FIG. 82, have been added.

Further, the present invention is not restricted to the arrangement wherein the mark Mp serving as the identifier for printing command on the base tape 101 or cover film 103 or the like is detected by the sensor 18. That is to say, a special code may be input and stored in the RFID circuit element To beforehand as an identifier, with this being distinguished at the time of access to the RFID circuit element To, so as to write the access history information to the RFID circuit element ToL and print the access history information to the print-receiving medium.

Moreover, while description has been made above regarding an example wherein access history information is printed in a system in which the base tape 101 and cover film 103 are adhered to each other, however, the present invention is not restricted to this, and access history information may be printed on thermo-sensitive tape 101' for generating RFID labels T without adhering, as described above with reference to FIG. 87.

Also, the present invention is not restricted to the arrangement of printing the access history information on the print-receiving medium (cover film 103 or thermo-sensitive film 101') and also writing to the RFID circuit element ToL, and an arrangement may be made wherein the access history information is only printed on the recording medium without writing thereof to the RFID circuit element ToL. In this case, disposing the RFID circuit element ToL on the base tape 101 or thermo-sensitive tape 101' is unnecessary, disposing a normal-use RFID circuit element To alone is sufficient.

Further, in the event of printing the access history information on the last RFID label TL as described above, the access history information does not necessarily have to be stored in the database DB of the management server 7, insofar as the advantages of the present invention, wherein the manufacturer or servicing company side can obtain the access history information and take appropriate measures, can be obtained.

Moreover, the present invention is not restricted to visual recognition of the access history information, and the printing performed on the last label TL may be aggressively used for user services. Though not shown in the drawings, an arrangement may be made wherein, in addition to printing the access history information at the lowest portion as printing on the last label TL, data regarding the user received from the management server 7 (e.g., the name of the user, a preferred character design which the user has set beforehand and registered in the database DB, wallpaper, image, text, etc.), or data regarding the apparatus 2 for communicating with a RFID tag (product No., model, common name of the product, name of manufacturer, etc.), and so forth, may be printed. Note that in the case of the character design, wallpaper, or the like, an arrangement may be made wherein the user does not connect to the management server 7 but to a new contents server via the communication line 3, from which downloads can be made. In this case, an arrangement may be made wherein charges are discounted at the management server 7 by using such contents, since this amounts to advertisement at the contents server side.

In the above, the control circuit configured to control printing of the print head 10 via the print-head drive circuit 25 makes up printing control unit configured to print, at the printing unit, the data relating to the user or the data relating to the RFID tag producing terminal, that has been received from the management server.

According to such a configuration, even in the event that there is a margin portion on the tag label tape 110, 110' with print at the time of creating labels T, the above information can be printed on the margin, thereby making good use of the margin.

Further, information relating to various services to be provided to the user, described in the above eighth embodiment (various types of discounts according to accumulated points based on creating RFID labels, purchasing products, etc.) may be printed in the margin, or discount coupons themselves may be printed in the margin.

Also, all other combinations of the above-described eighth embodiment and the modifications thereof that have not been described above may be carried out.

Note that the "Scroll All ID" "Erase" signal, "Verify" signal, and the "Program" signal are created in accordance with a specification stipulated by EPC global. Here, EPC global is a nonprofit corporation co-established by EAN (European Article Number) International, which is an international distribution code organization, and the Uniform Code Council (UCC), which is an American distribution code organization. Note that any signals in accordance with other standards may be employed as long as the signals provide the same functions.

Note that various modifications which are not described in particular may be made according to the present invention without departing from the spirit and scope of the invention.

What is claimed is:

1. An apparatus configured to produce RFID labels by reading or writing information from/to a plurality of RFID circuit elements for producing said RFID labels by wireless communication, comprising:

a container mounting portion configured to receive a container including said plurality of RFID circuit elements for producing said RFID labels, each of said plurality of RFID circuit elements for producing said RFID labels including a first IC circuit part configured to store information and a first antenna connected to said first IC circuit part; and an input/output unit configured to receive a communication factor from a record portion or output said communication factor to said record portion, said communication factor determining a performance of communication with said plurality of RFID circuit elements for producing said RFID labels, wherein said container mounting portion comprises a cartridge holder portion configured to receive a RFID circuit element cartridge as said container, wherein said container comprises a RFID circuit element for identifying said container as said record portion, and said plurality of RFID circuit elements for producing said RFID labels, wherein said RFID circuit element for identifying said container includes a second IC circuit part configured to store container identification information as said communication factor and a second antenna connected to said second IC circuit part;

said input/output unit comprises:

a device antenna unit configured to carry out wireless communication with said RFID circuit element for identifying said container and said plurality of RFID circuit elements for producing said RFID labels;

an access information generating unit configured to generate second access information for accessing said container identification information of said second IC circuit part and first access information for accessing RFID tag information of said first IC circuit part; and an information transmitting unit configured to transmit said second and first access information generated at said access information generating unit to said second and first antennas respectively in a non-contact manner via said device antenna unit, so as to access said container identification information of said second IC circuit part or said RFID tag information of said first IC circuit part;

said container identification information is acquired from said second IC circuit part of said RFID circuit element for identifying said container, said device antenna unit comprises a container identification antenna configured to carry out wireless communication with said RFID circuit element for identifying said container, and an antenna for producing said RFID labels configured to carry out wireless communication with each of said plurality of RFID circuit elements for producing said RFID labels;

said apparatus further comprises a switchover connecting unit configured to selectively connect said information transmitting unit to one of said container identification antenna and said antenna for producing said RFID labels.

2. The apparatus according to claim 1 wherein:

said information transmitting unit uses mutually different frequencies for transmitting said second access information to said second antenna via said device antenna unit and transmitting said first access information to said first antenna via said device antenna unit.

3. The apparatus according to claim 1 wherein:

said information transmitting unit uses mutually different communication protocols for transmitting said second access information to said second antenna via said device antenna unit and transmitting said first access information to said first antenna via said device antenna unit.

4. The apparatus according to claim 1 wherein:

said apparatus further comprises a directivity control unit configured to control a directivity of said device antenna unit.

5. The apparatus according to claim 1, further comprising a polarization plane control unit configured to control a direction of a polarization plane of said device antenna unit.

6. The apparatus according to claim 1 wherein:

said cartridge holder portion is further configured to detachably receive said RFID circuit element cartridge as said container;

said record portion further comprises recorded tag property information relating to each of said plurality of RFID circuit elements for producing said RFID labels;

said input/output unit further comprises a reading unit configured to read said tag property information relating to each of said plurality of RFID circuit elements for producing said RFID labels, recorded in said record portion; and said apparatus further comprises a transmission control unit configured to control a transmission mode of communication signals when performing wireless communication with said first IC circuit part of one of said plurality of RFID circuit elements for producing said RFID labels, so as to match said tag property information read by said reading unit.

7. The apparatus according to claim 6 wherein:

said transmission unit control controls a magnitude of output of said communication signals so as to match said tag property information.

8. The apparatus according to claim 7, further comprising a determining unit configured to determine whether said magnitude of said output or a duration of transmission time corresponding to said tag property information is within a predetermined allowable range or not.

9. The apparatus according to claim 6 wherein:

said transmission control unit controls a duration of transmission time of said communication signals so as to match said tag property information.

10. The apparatus according to claim 1 wherein:

said cartridge holder portion is further configured to detachably receive said RFID circuit element cartridge as said container;

said record portion of said container further comprises an access history storage portion configured to store access history information of said plurality of RFID circuit elements for producing said RFID labels as said communication factor; and said input/output unit further comprises a writing unit configured to generate said access history information and write to said access history storage portion.

11. The apparatus according to claim 10 wherein:

said plurality of RFID circuit elements for producing said RFID labels are consecutively disposed at a tag tape wound as a tag tape roll, in the longitudinal direction of said tag tape; and said apparatus further comprises a printing unit configured to perform predetermined printing on one of said tag tape or a print-receiving tape adhered to said tag tape.

12. The apparatus according to claim 11 wherein:
said printing unit performs printing representing said access history information on said tag tape or said print-receiving tape.

13. The apparatus according to claim 1 wherein:
said input/output unit further comprises an access history output unit configured to generate access history information of said plurality of RFID circuit elements for producing said RFID labels and output to a management server for storage in a database as said record portion.

14. The apparatus according to claim 13, further comprising a display unit configured to display a request for user registration, for managing of said management server.

15. The apparatus according to claim 14 wherein:
said display unit displays a request for input of a registered user identification information.

16. The apparatus according to claim 14, wherein said display unit displays a request for said user registration or a request for input of said user identification information, according to said container identification information.

17. The apparatus according to claim 16, further comprising an access permission control unit configured to permit access to said management server in accordance with said container identification information.

18. The apparatus according to claim 13 wherein:
said plurality of said RFID circuit elements for producing said RFID labels are consecutively disposed at a tag tape wound as a tag tape roll, in the longitudinal direction of said tag tape; and
said apparatus further comprises a printing unit configured to perform predetermined printing on one of said tag tape or a print-receiving tape adhered to said tag tape.

19. The apparatus according to claim 18, further comprising a printing control unit configured to control said printing unit to perform printing of data relating to said apparatus, received from said management server.

* * * * *